Sept. 23, 1952 W. HATTON 2,611,538
ELECTRICAL CALCULATING APPARATUS
Filed July 27, 1942 58 Sheets-Sheet 1
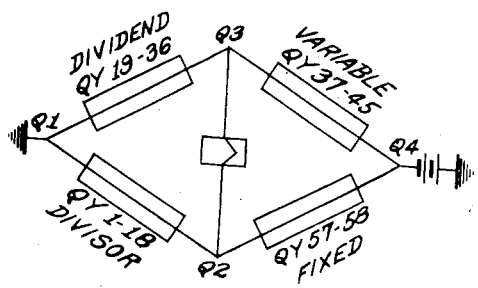
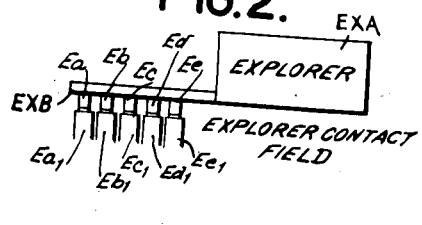
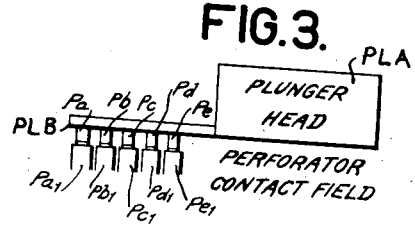
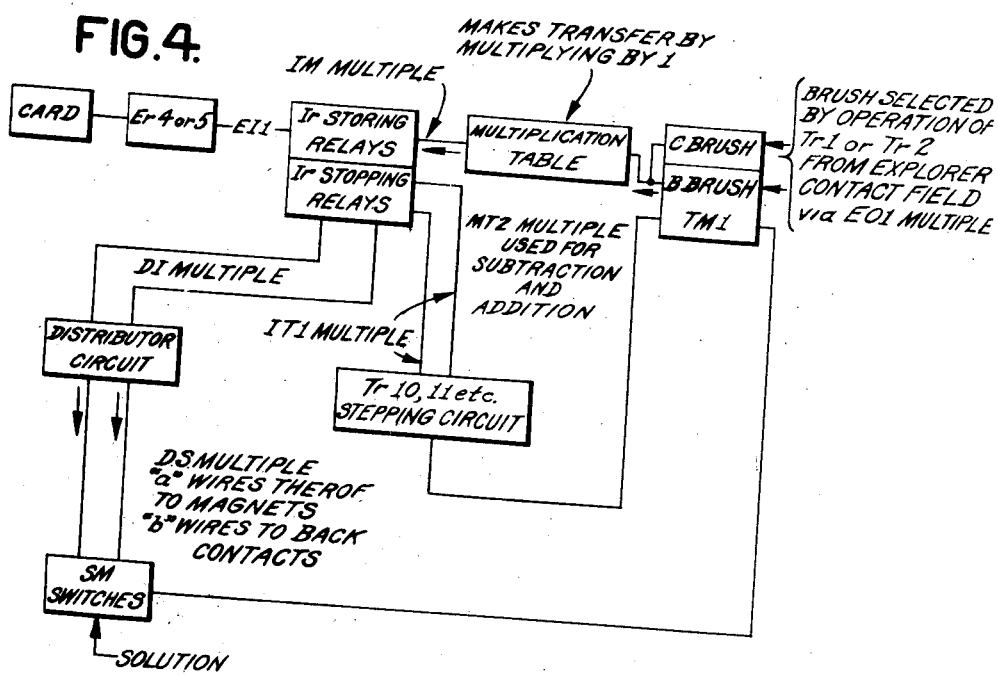
INVENTOR.
William Hatton
BY James N. Curtin
ATTORNEY.

Sept. 23, 1952　　　　W. HATTON　　　　2,611,538
ELECTRICAL CALCULATING APPARATUS
Filed July 27, 1942　　　　　　　　　　58 Sheets-Sheet 2
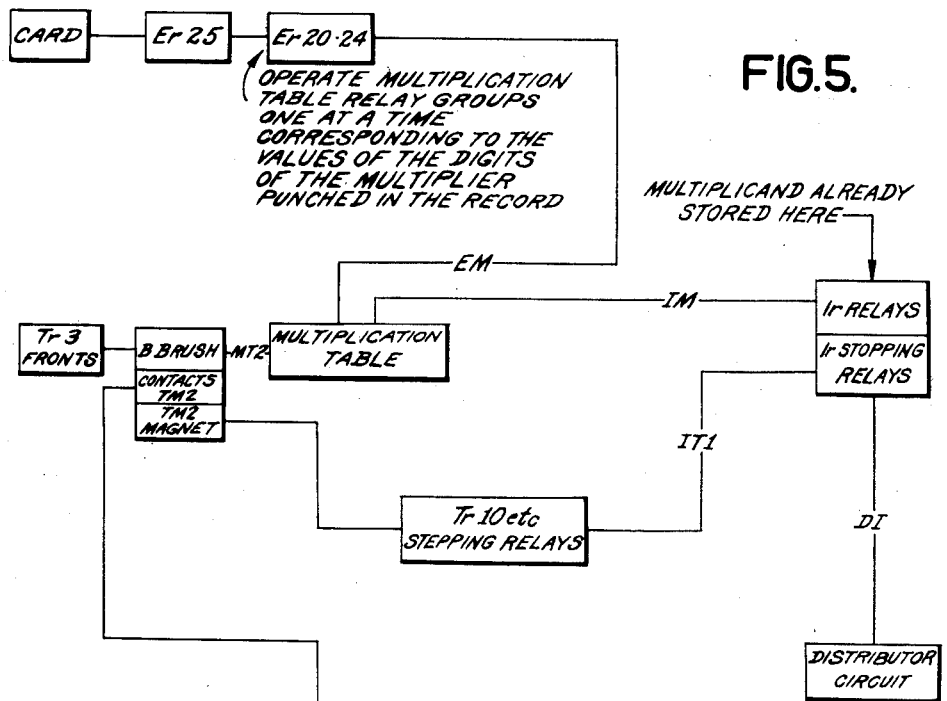
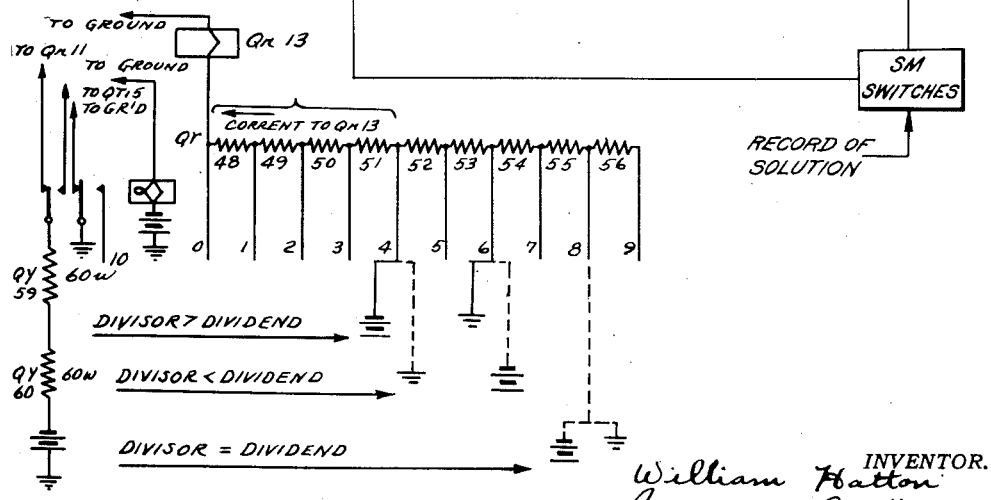
INVENTOR.
William Hatton
BY James N. Curtin
ATTORNEY.

Sept. 23, 1952      W. HATTON      2,611,538
ELECTRICAL CALCULATING APPARATUS
Filed July 27, 1942      58 Sheets-Sheet 3

Sept. 23, 1952 W. HATTON 2,611,538
ELECTRICAL CALCULATING APPARATUS
Filed July 27, 1942 58 Sheets-Sheet 4

INVENTOR.
William Hatton
James N. Curtin
ATTORNEY.

Sept. 23, 1952 — W. HATTON — 2,611,538
ELECTRICAL CALCULATING APPARATUS
Filed July 27, 1942 — 58 Sheets-Sheet 5

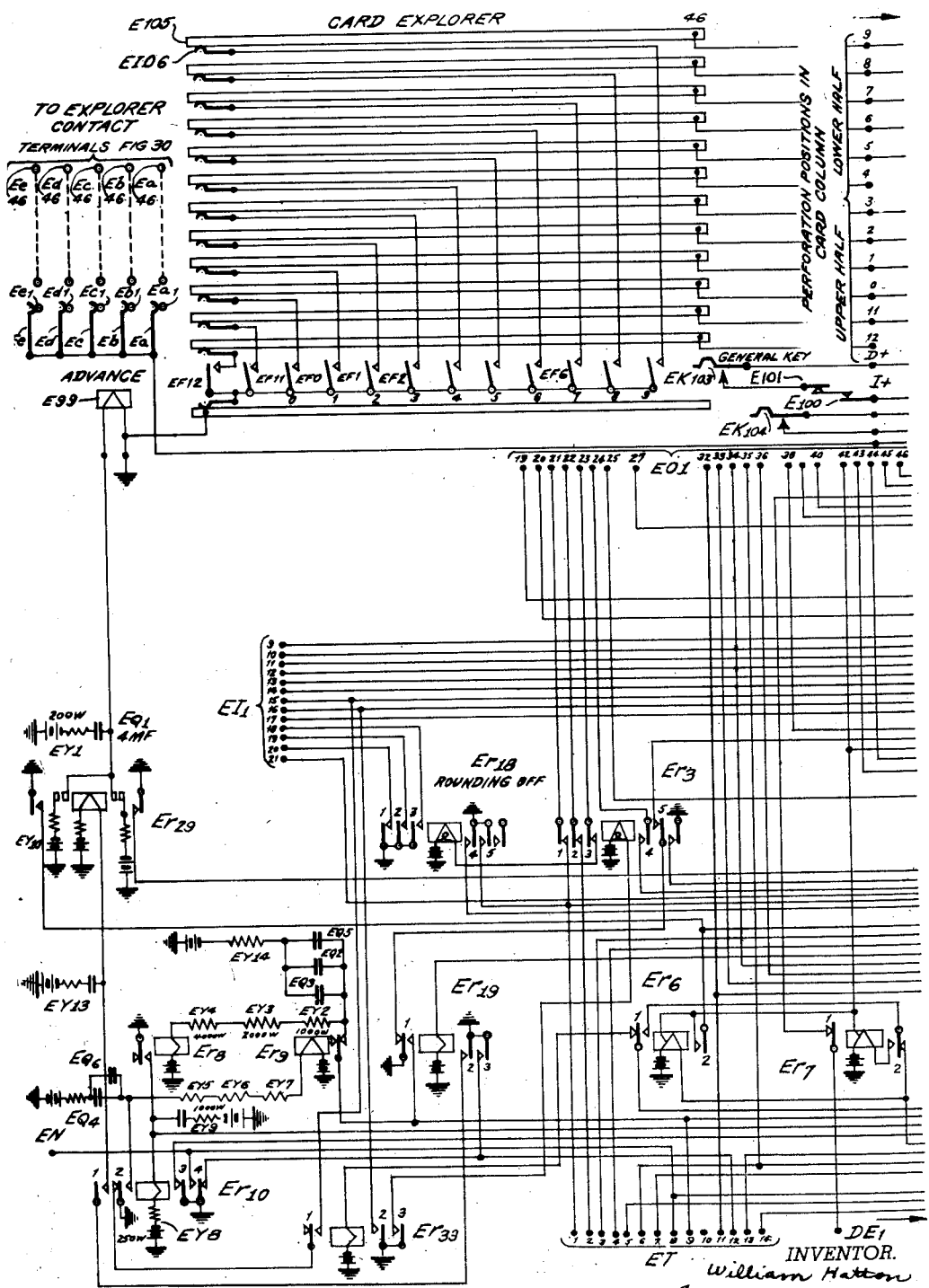

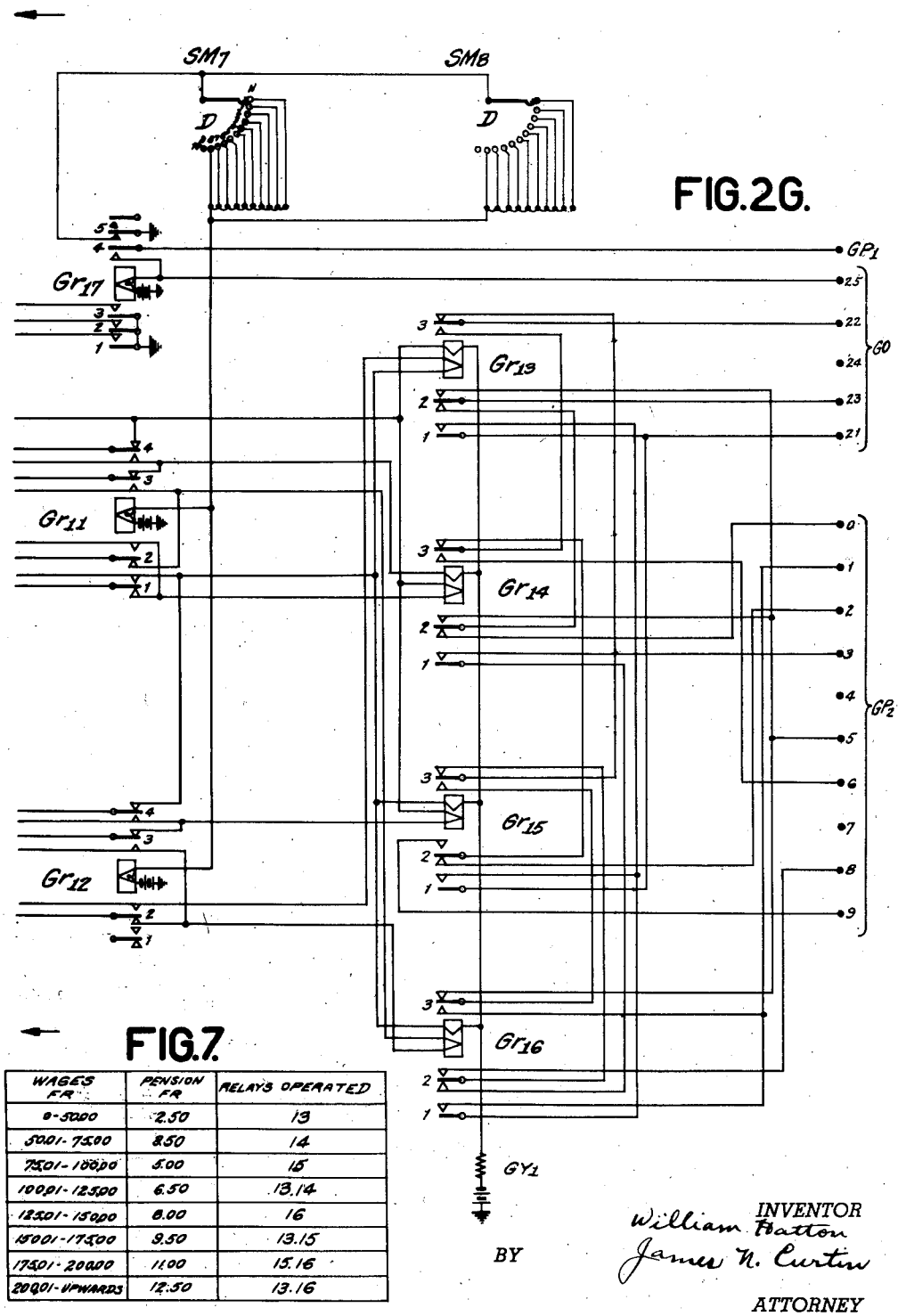

Sept. 23, 1952     W. HATTON     2,611,538
ELECTRICAL CALCULATING APPARATUS
Filed July 27, 1942     58 Sheets-Sheet 16
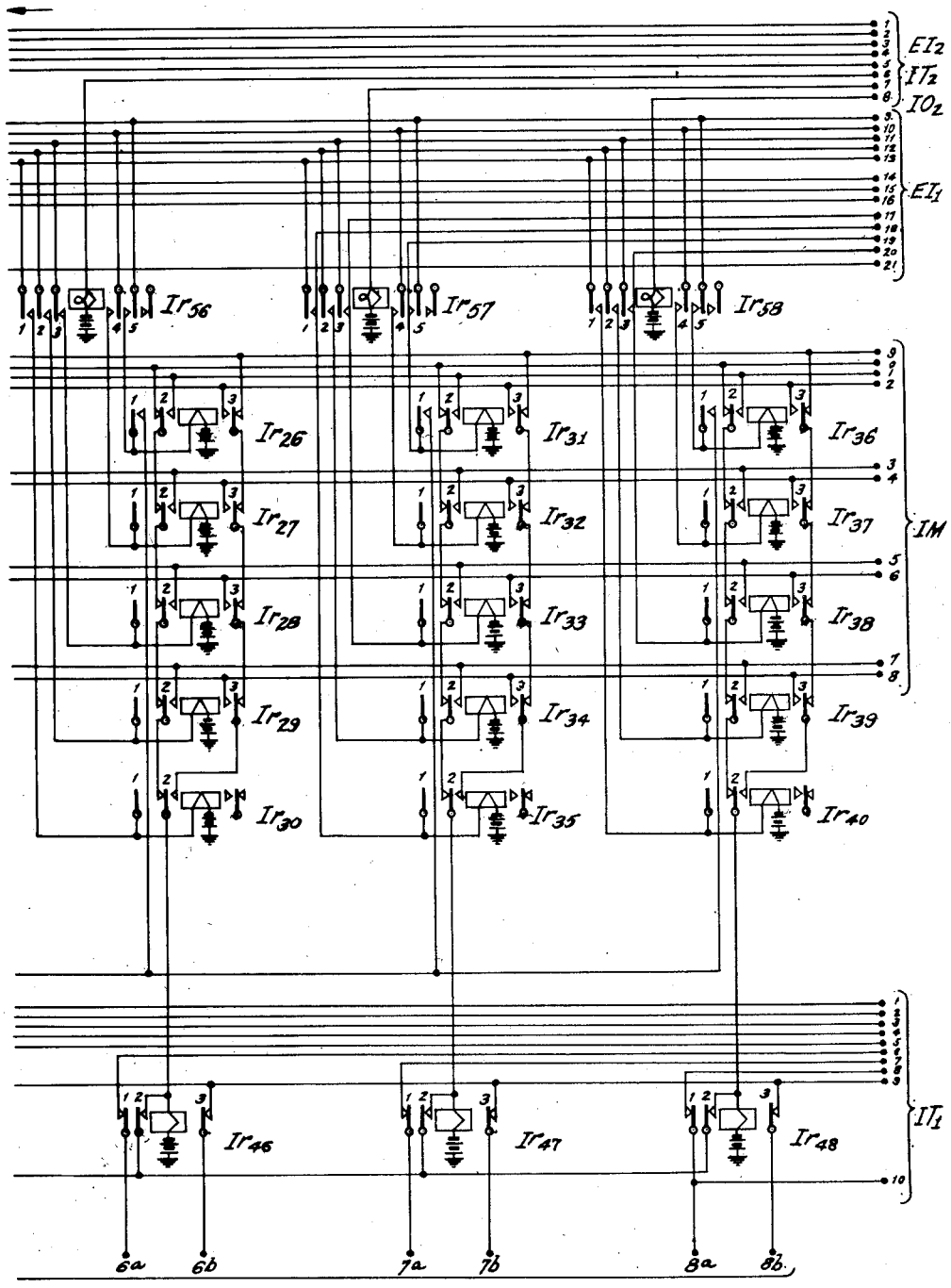
FIG.31.     BY
INVENTOR.
William Hatton
James N. Curtin
ATTORNEY.

Sept. 23, 1952  W. HATTON  2,611,538
ELECTRICAL CALCULATING APPARATUS
Filed July 27, 1942  58 Sheets-Sheet 17

INVENTOR.
William Hatton
BY James N. Curtin
ATTORNEY.

Sept. 23, 1952 W. HATTON 2,611,538
ELECTRICAL CALCULATING APPARATUS
Filed July 27, 1942 58 Sheets-Sheet 20

| COLUMNS | | | | | | | |
|---|---|---|---|---|---|---|---|
| 41 | | 42 | | 43 | | 44 | |
| FR | PERF | FR | PERF | FR | PERF | FR | PERF |
| 100 | 1 | 10 | 5 | 1 | 1 | 0.5 | 1 |
| 200 | 1-9 | 20 | 1 | 2 | 1-9 | | |
| 300 | 3 | 30 | 1-5 | 3 | 3 | | |
| 400 | 3-9 | 40 | 1-9 | 4 | 3-9 | | |
| 500 | 0 | 50 | 0 | 5 | 0 | | |
| 600 | 0-1 | 60 | 0-5 | 6 | 0-1 | | |
| 700 | 0-1-9 | 70 | 0-9 | 7 | 0-1-9 | | |
| 800 | 0-3 | 80 | 0-5 | 8 | 0-5 | | |
| 900 | 0-3-9 | 90 | 0-9 | 9 | 0-3-9 | | |

INVENTOR
William Hatton
BY James N. Curtin
ATTORNEY

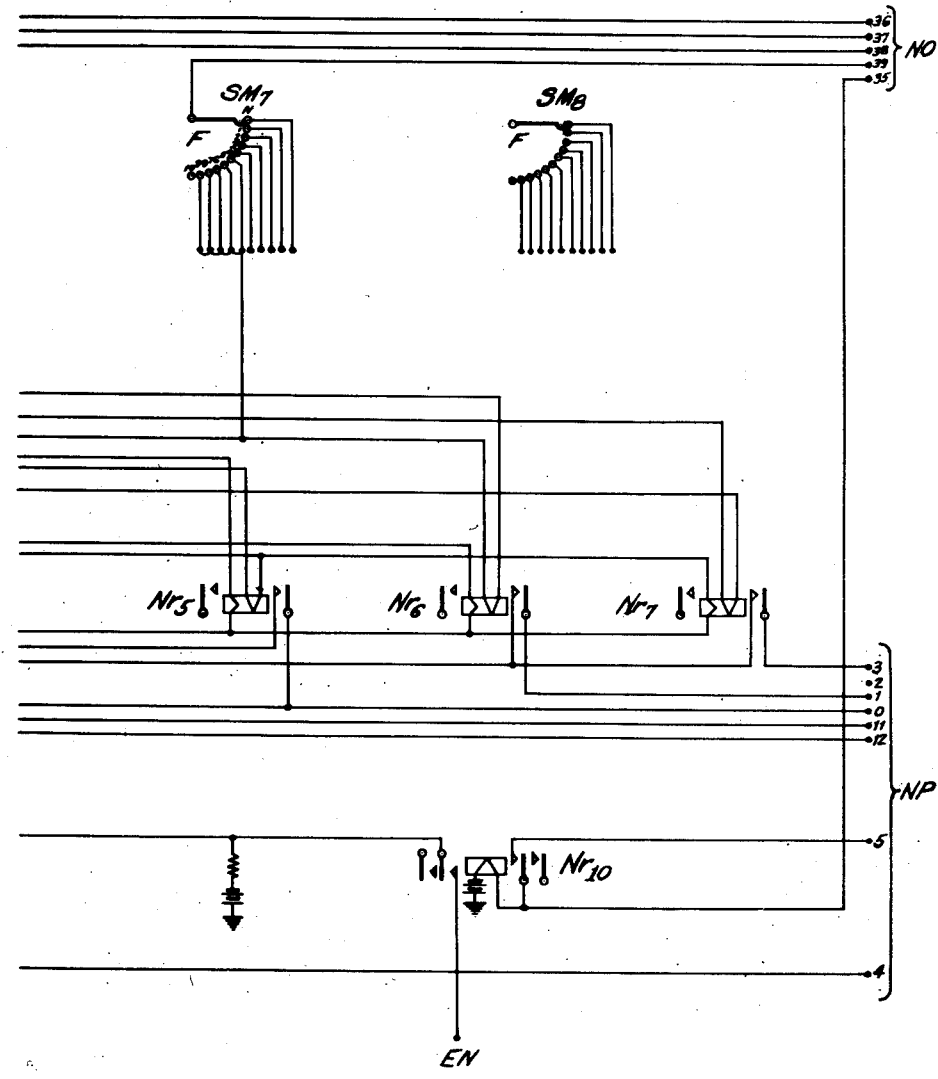

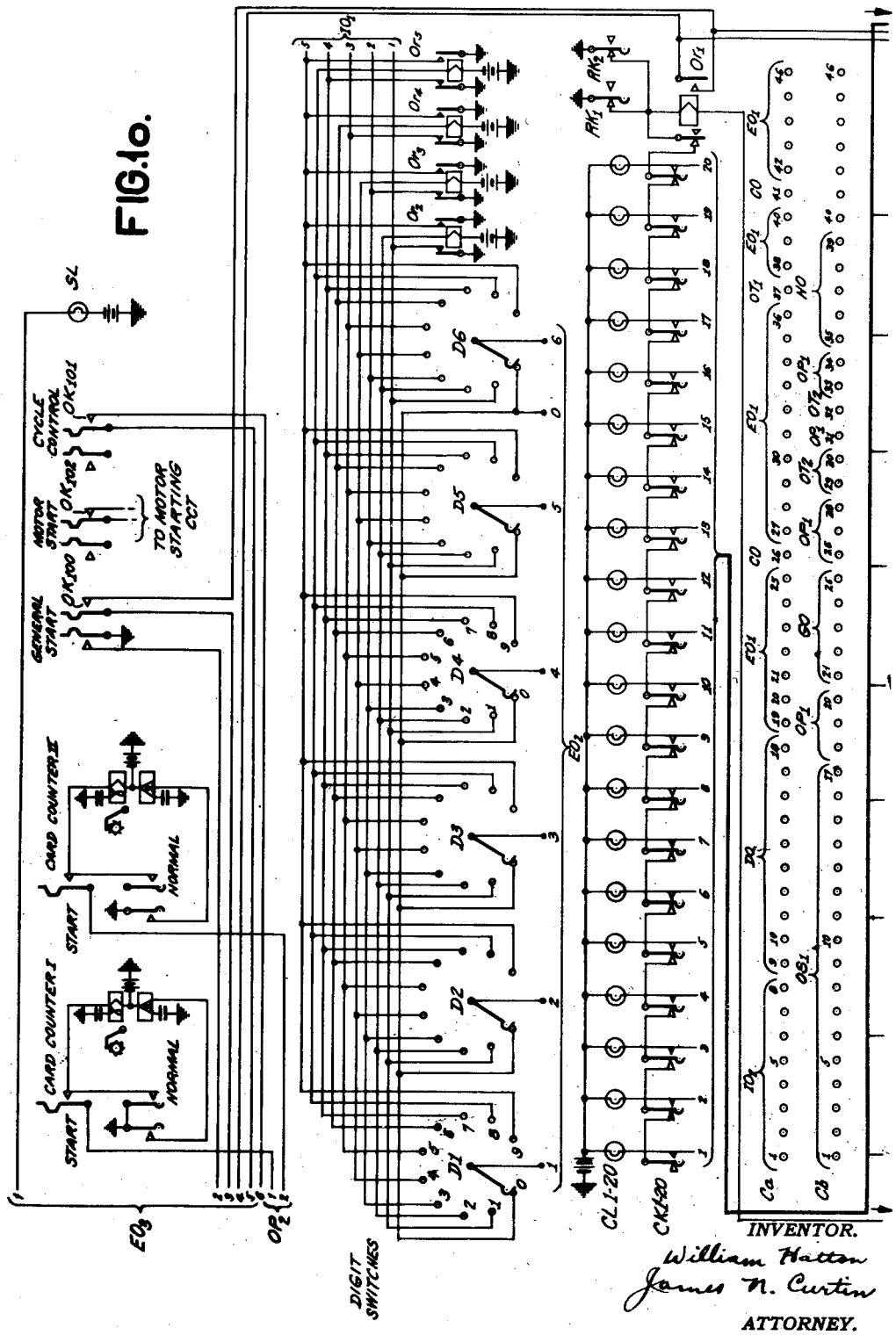

Sept. 23, 1952   W. HATTON   2,611,538
ELECTRICAL CALCULATING APPARATUS
Filed July 27, 1942   58 Sheets-Sheet 24
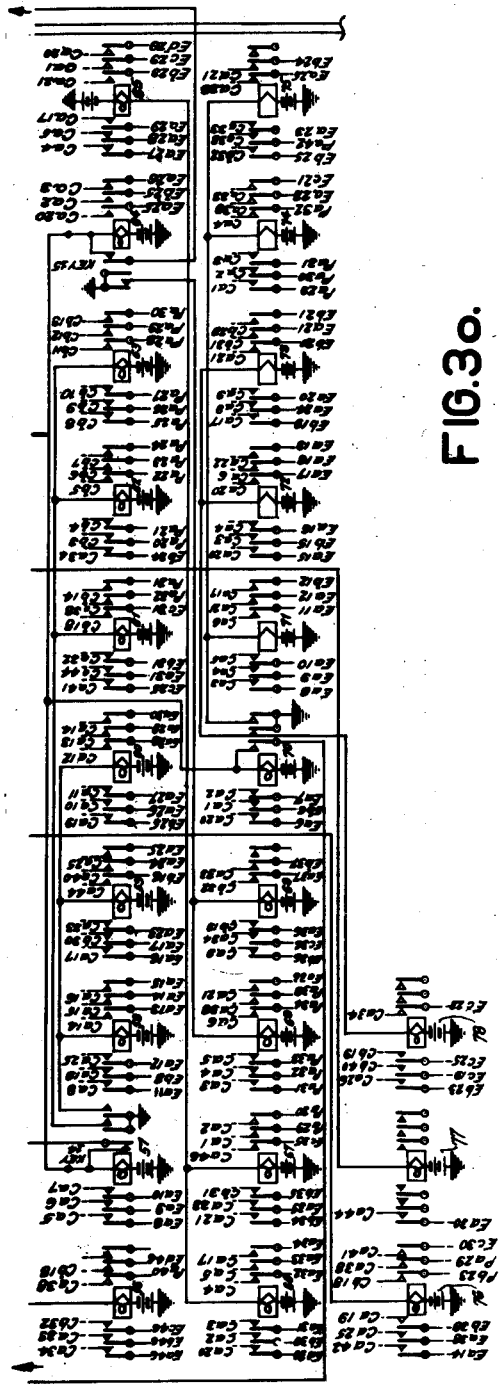
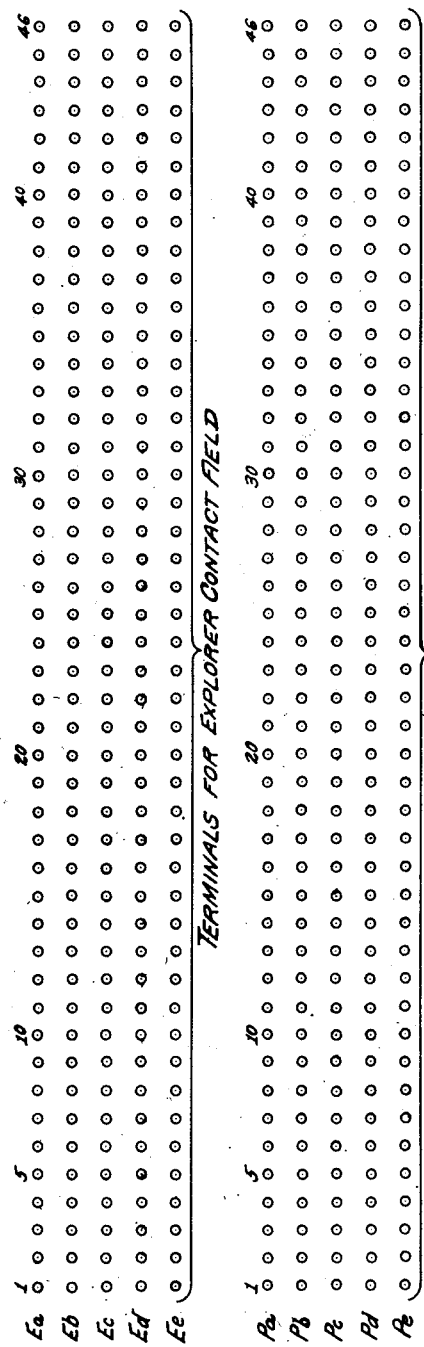
FIG.3o.
INVENTOR.
William Hatton
BY James N. Curtin
ATTORNEY.

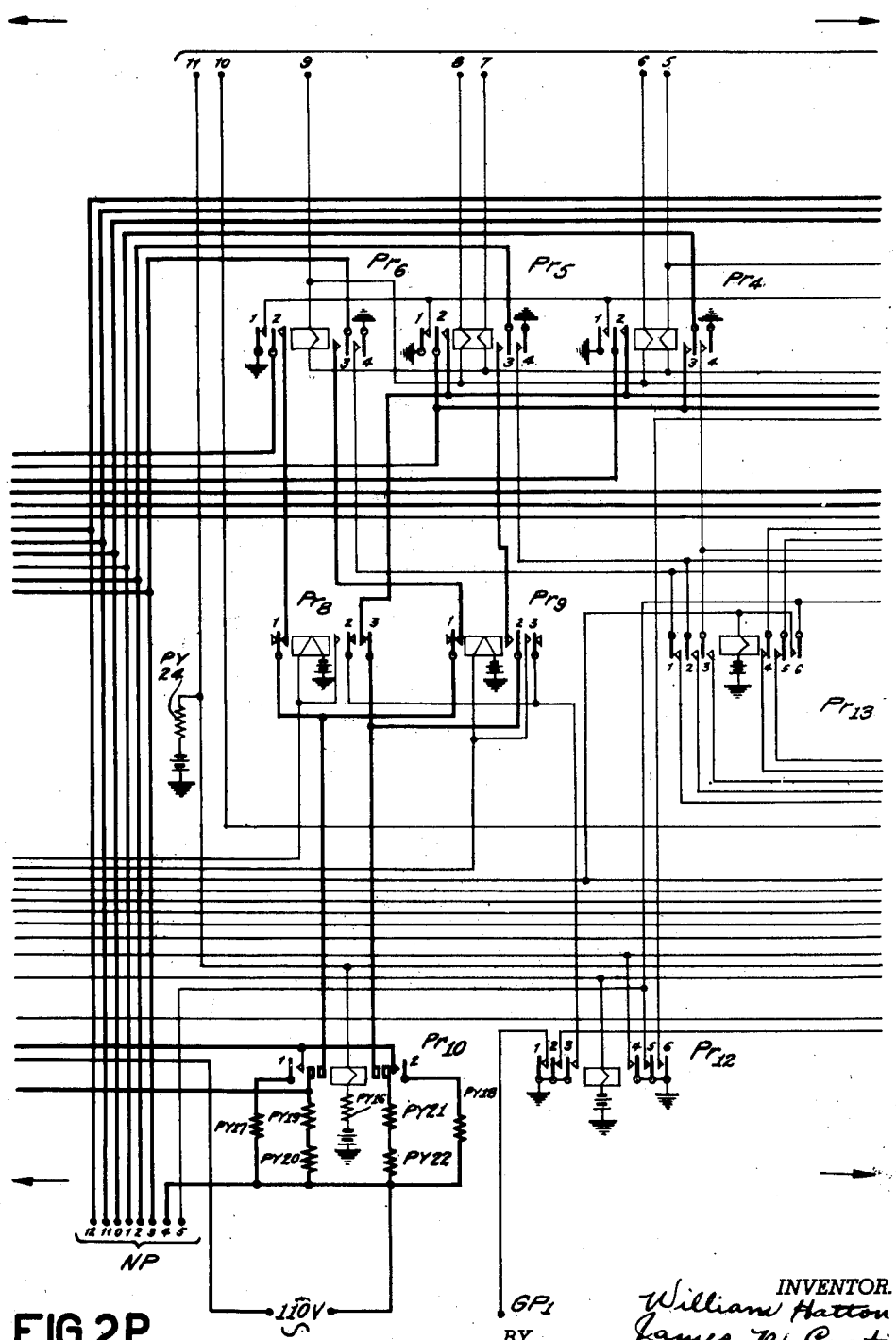

Sept. 23, 1952 W. HATTON 2,611,538
ELECTRICAL CALCULATING APPARATUS
Filed July 27, 1942 58 Sheets-Sheet 27

Sept. 23, 1952 W. HATTON 2,611,538
ELECTRICAL CALCULATING APPARATUS
Filed July 27, 1942 58 Sheets-Sheet 31

INVENTOR
William Hatton
BY James N. Curtin
ATTORNEY

Sept. 23, 1952 W. HATTON 2,611,538
ELECTRICAL CALCULATING APPARATUS
Filed July 27, 1942 58 Sheets-Sheet 37
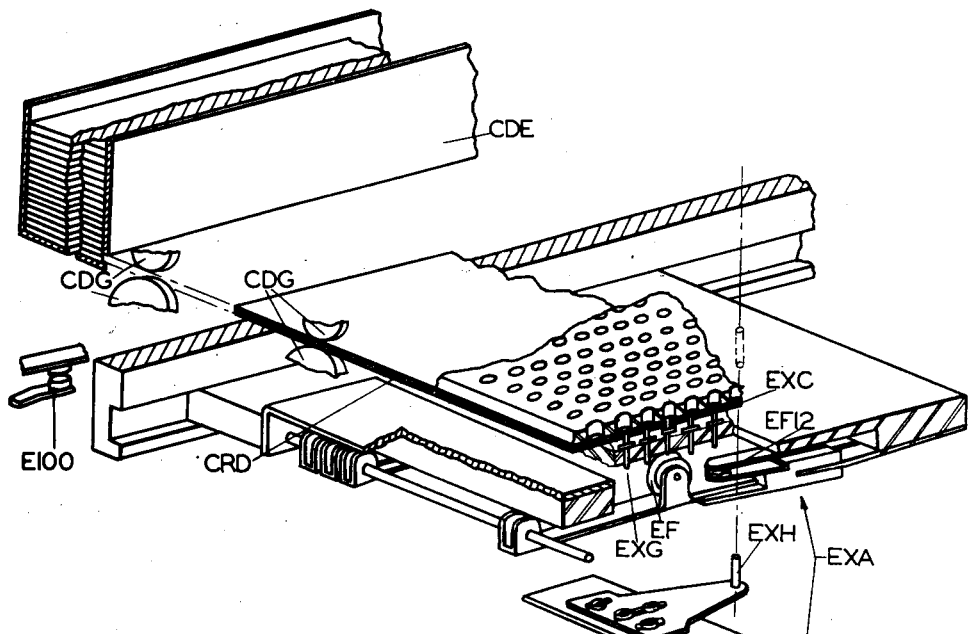
FIG. 8'
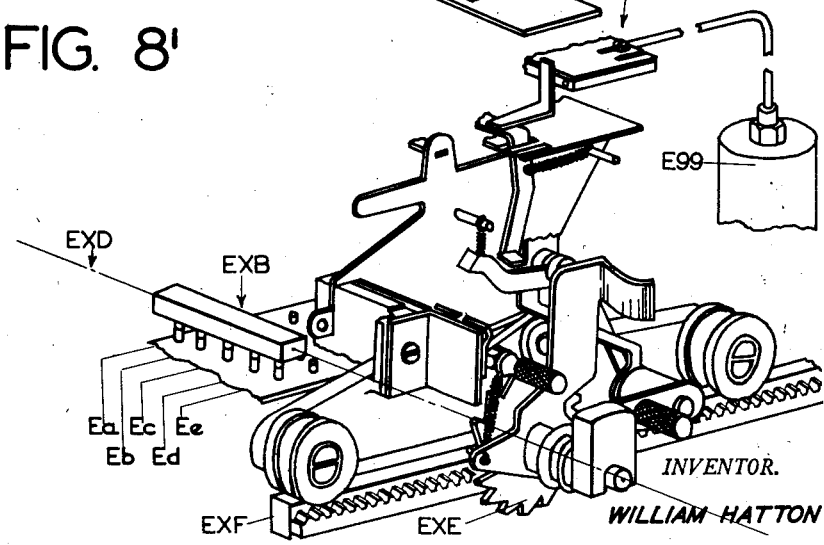
INVENTOR.
WILLIAM HATTON
ATTORNEY Sept. 23, 1952 W. HATTON 2,611,538
ELECTRICAL CALCULATING APPARATUS
Filed July 27, 1942 58 Sheets-Sheet 38
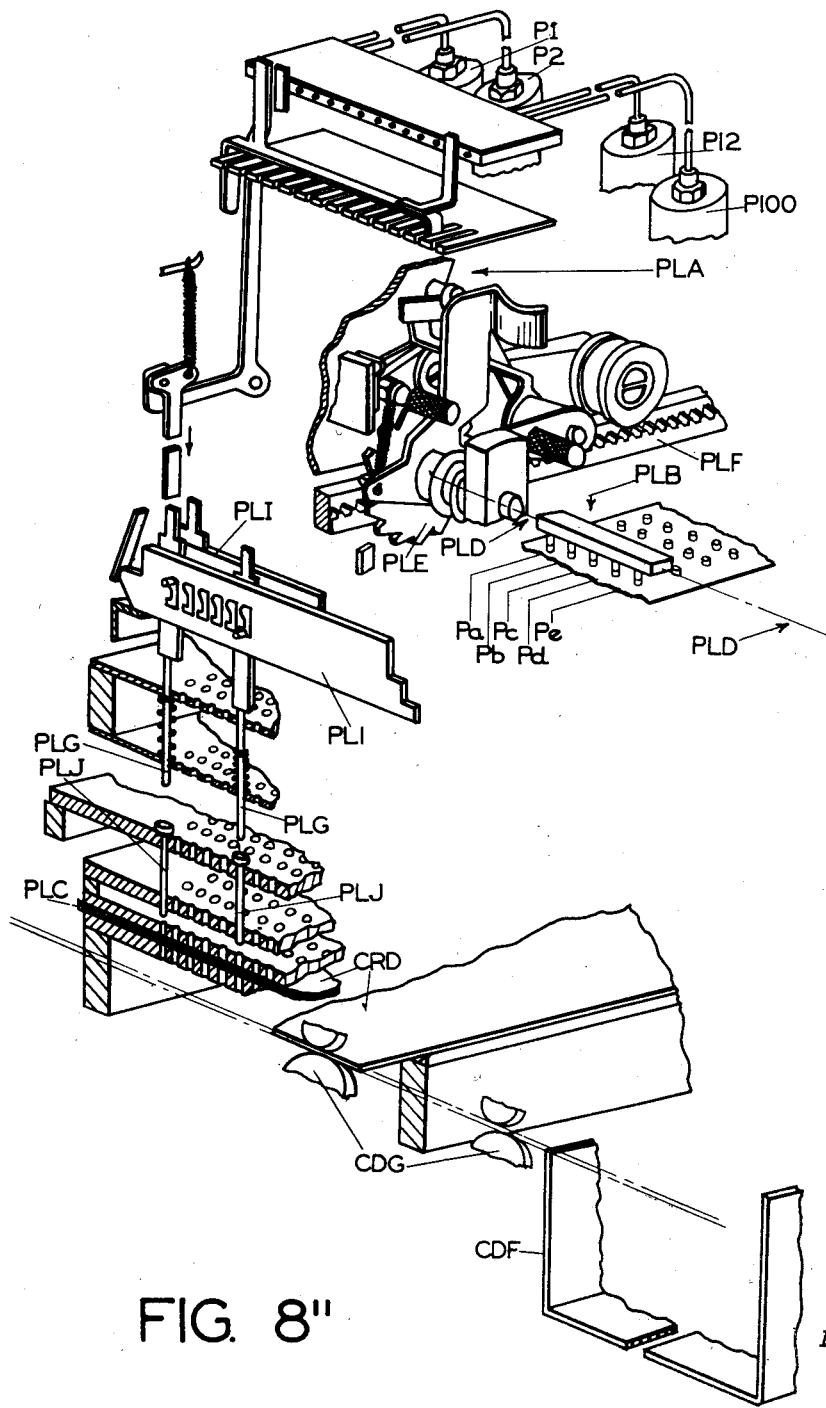
FIG. 8"
INVENTOR.
WILLIAM HATTON
ATTORNEY

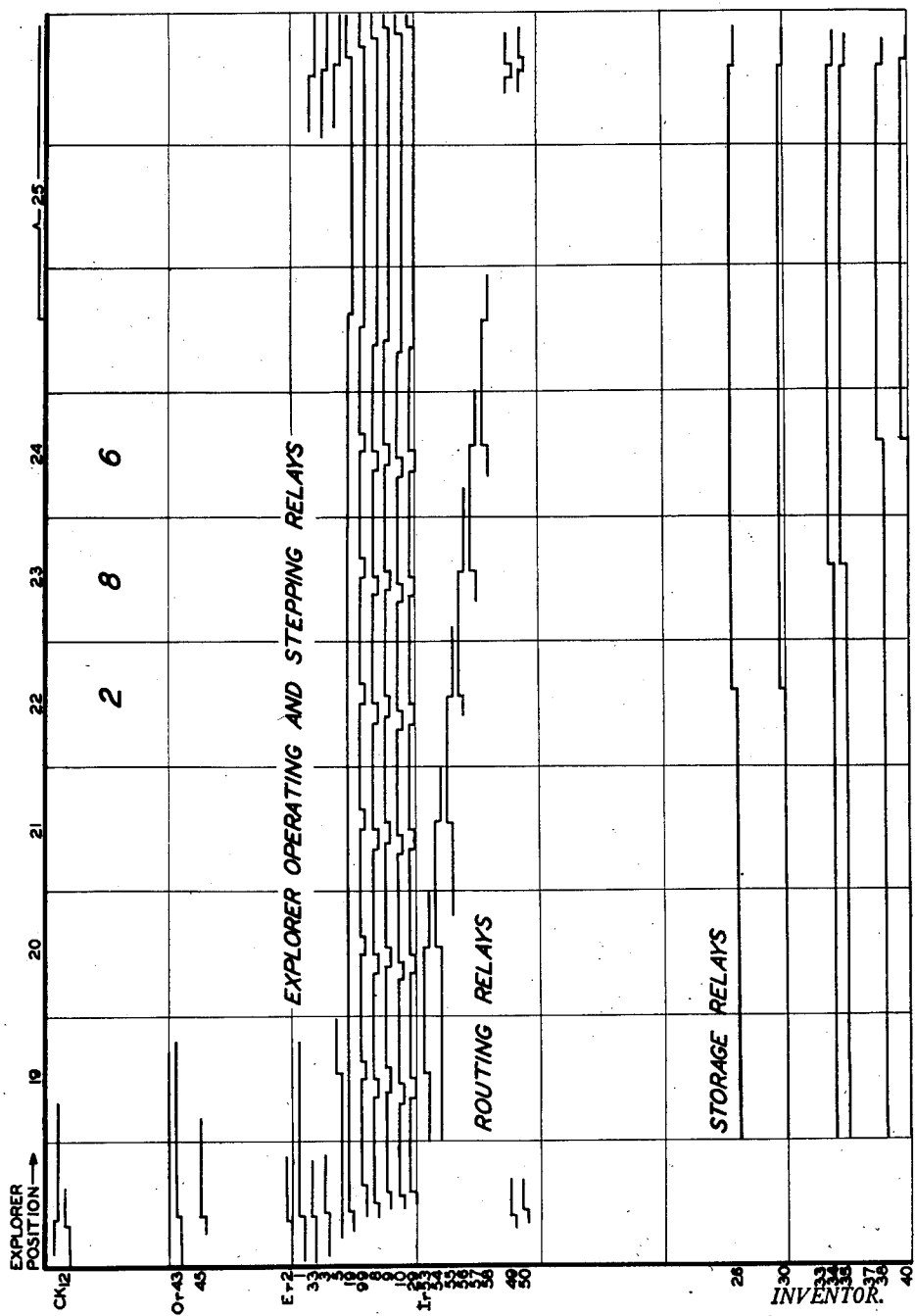

Sept. 23, 1952 W. HATTON 2,611,538
ELECTRICAL CALCULATING APPARATUS
Filed July 27, 1942 58 Sheets-Sheet 40
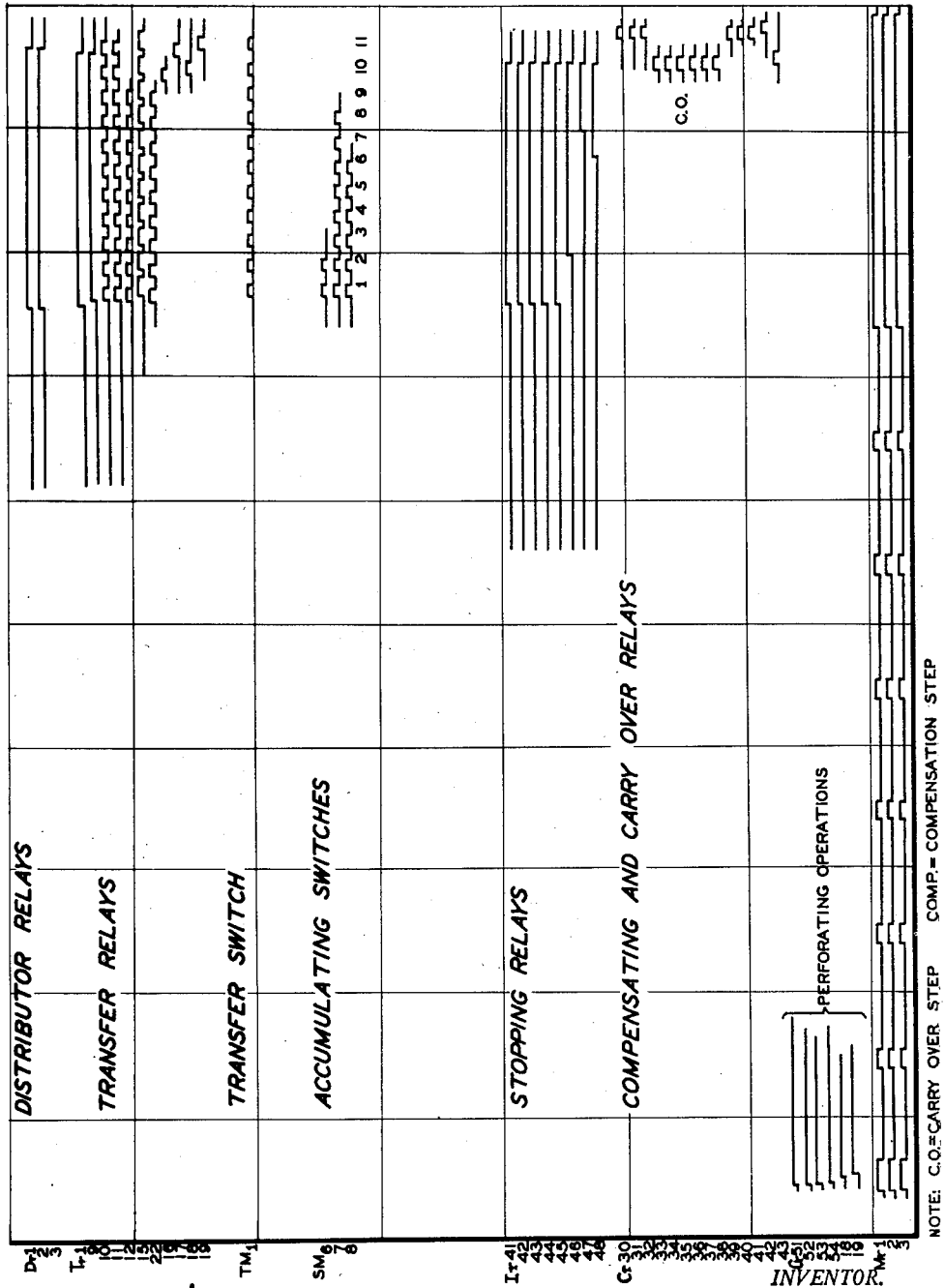
FIG. 9a2
ADDITION
NOTE: C.O.=CARRY OVER STEP COMP.=COMPENSATION STEP
INVENTOR.
WILLIAM HATTON
BY
E. D. Phinney
ATTORNEY

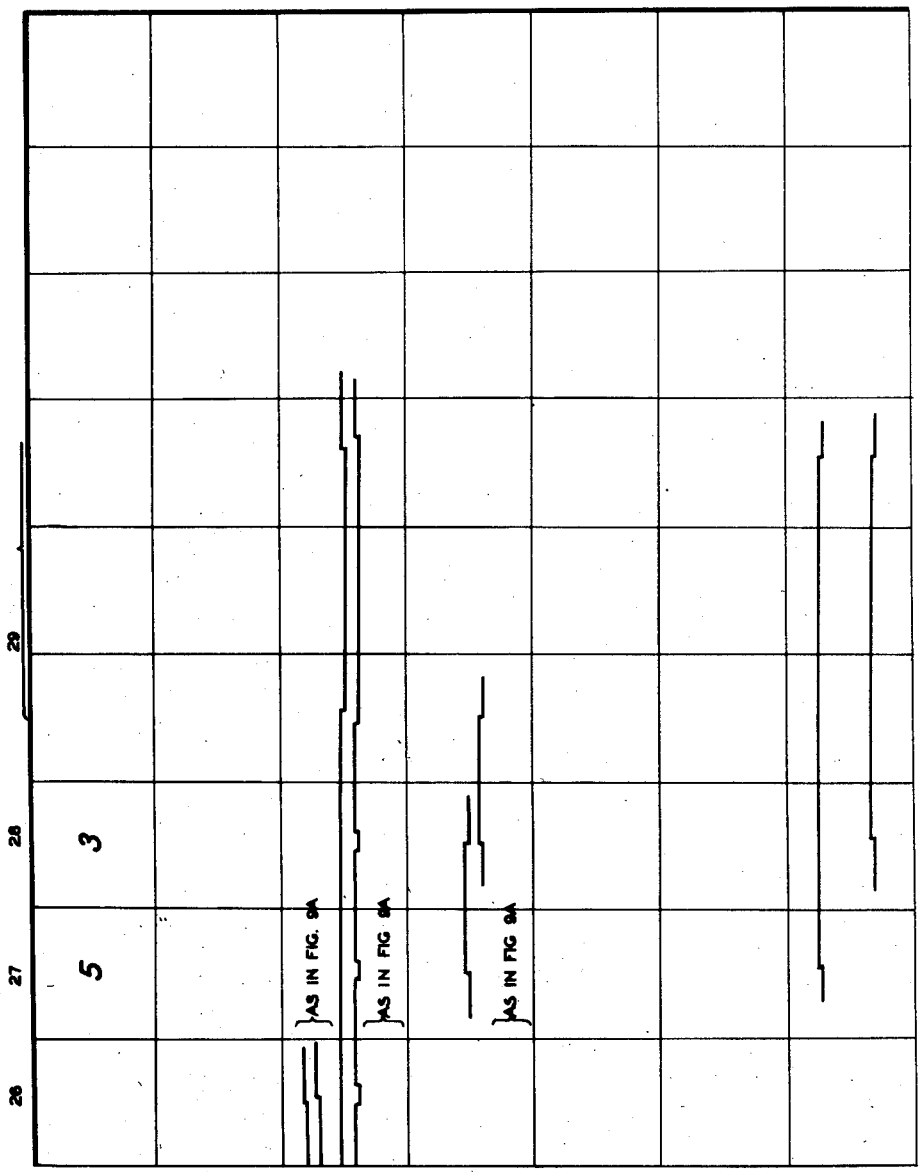

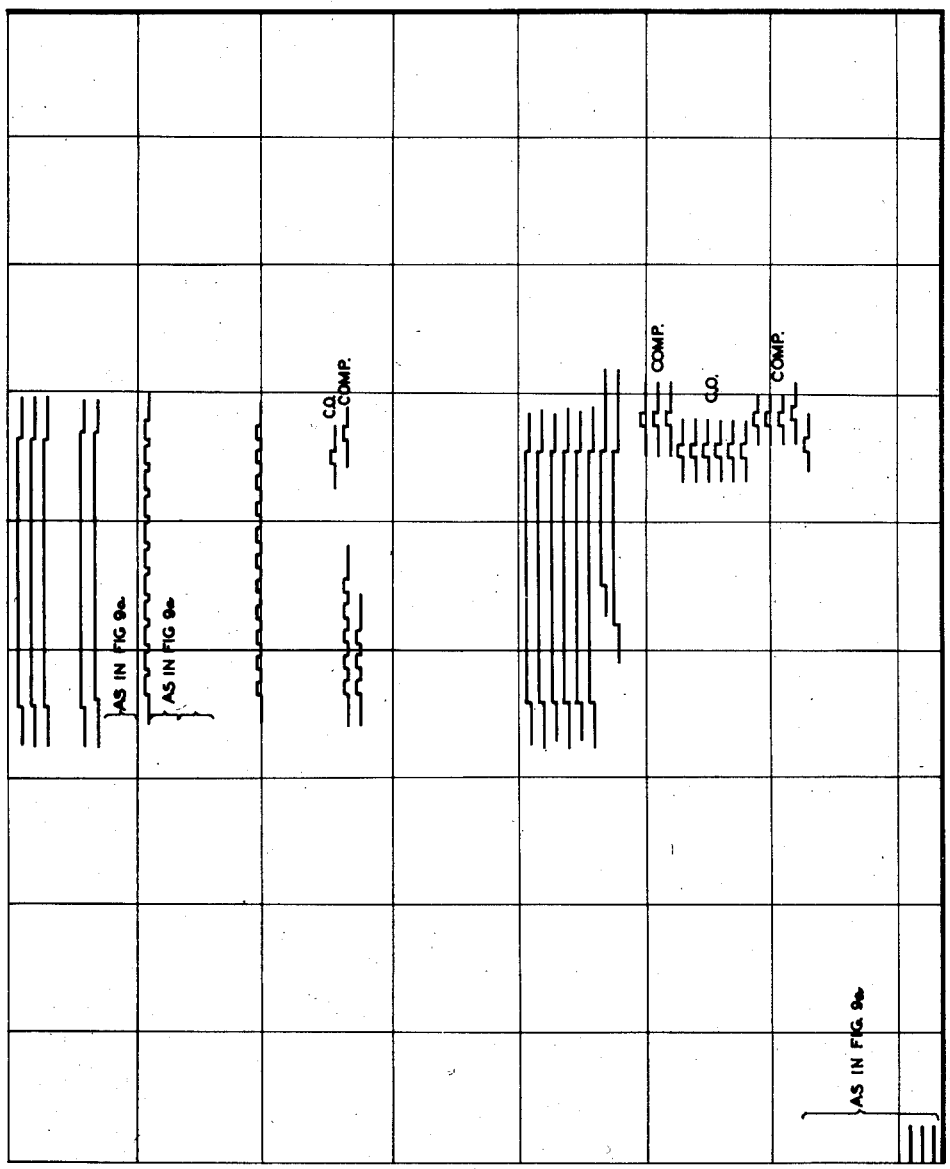

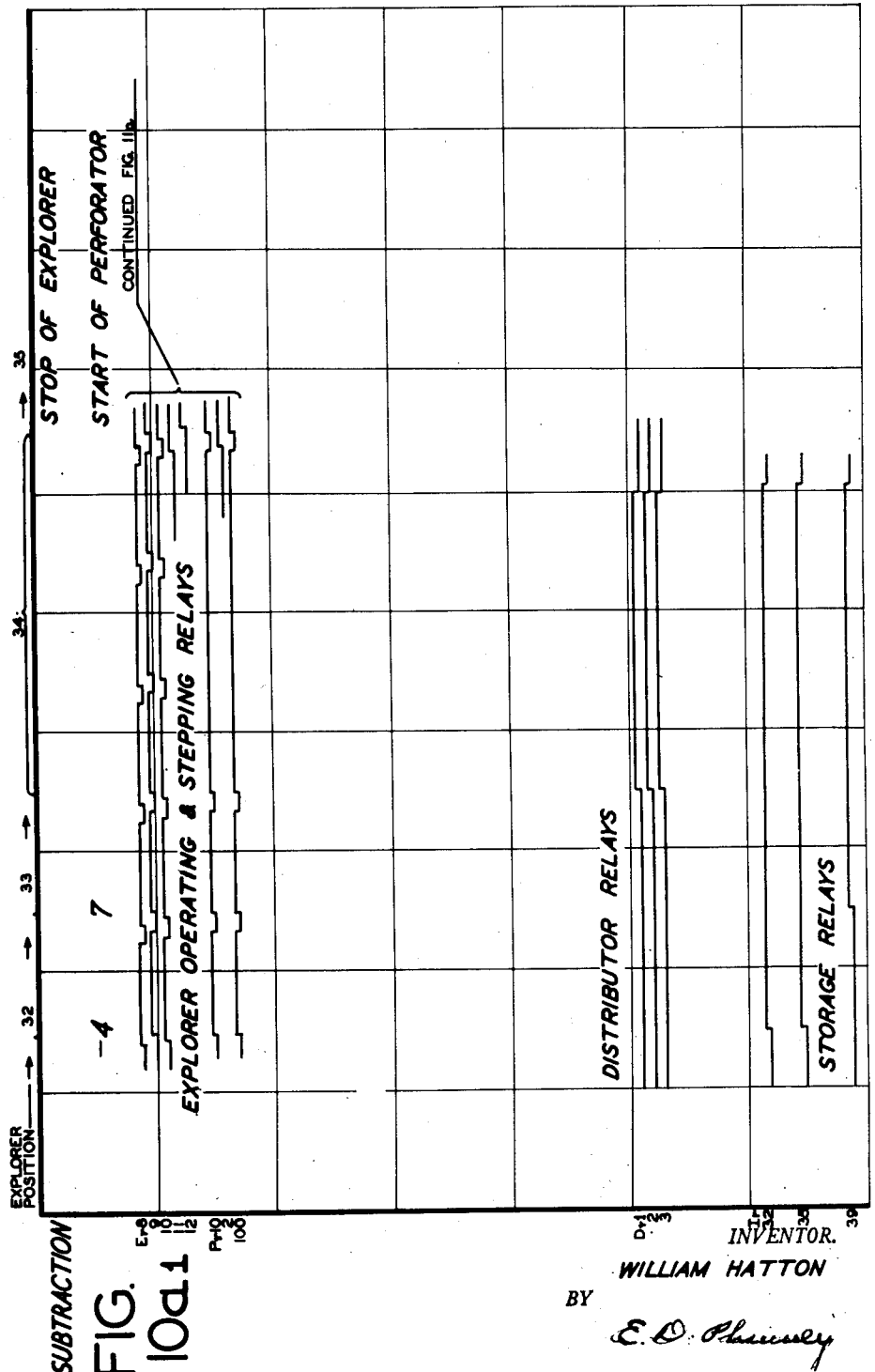

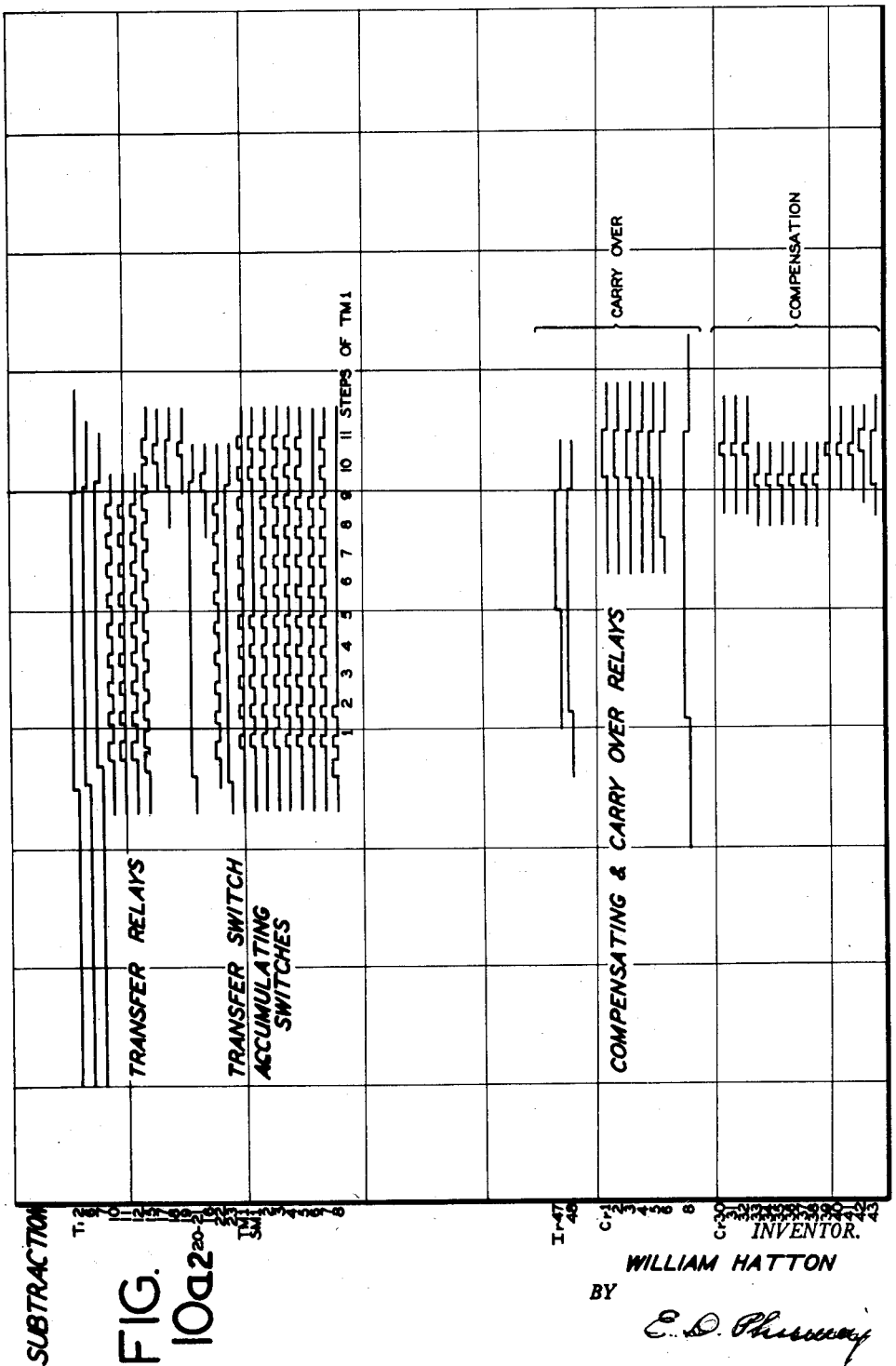

Sept. 23, 1952 W. HATTON 2,611,538
ELECTRICAL CALCULATING APPARATUS
Filed July 27, 1942 58 Sheets-Sheet 45
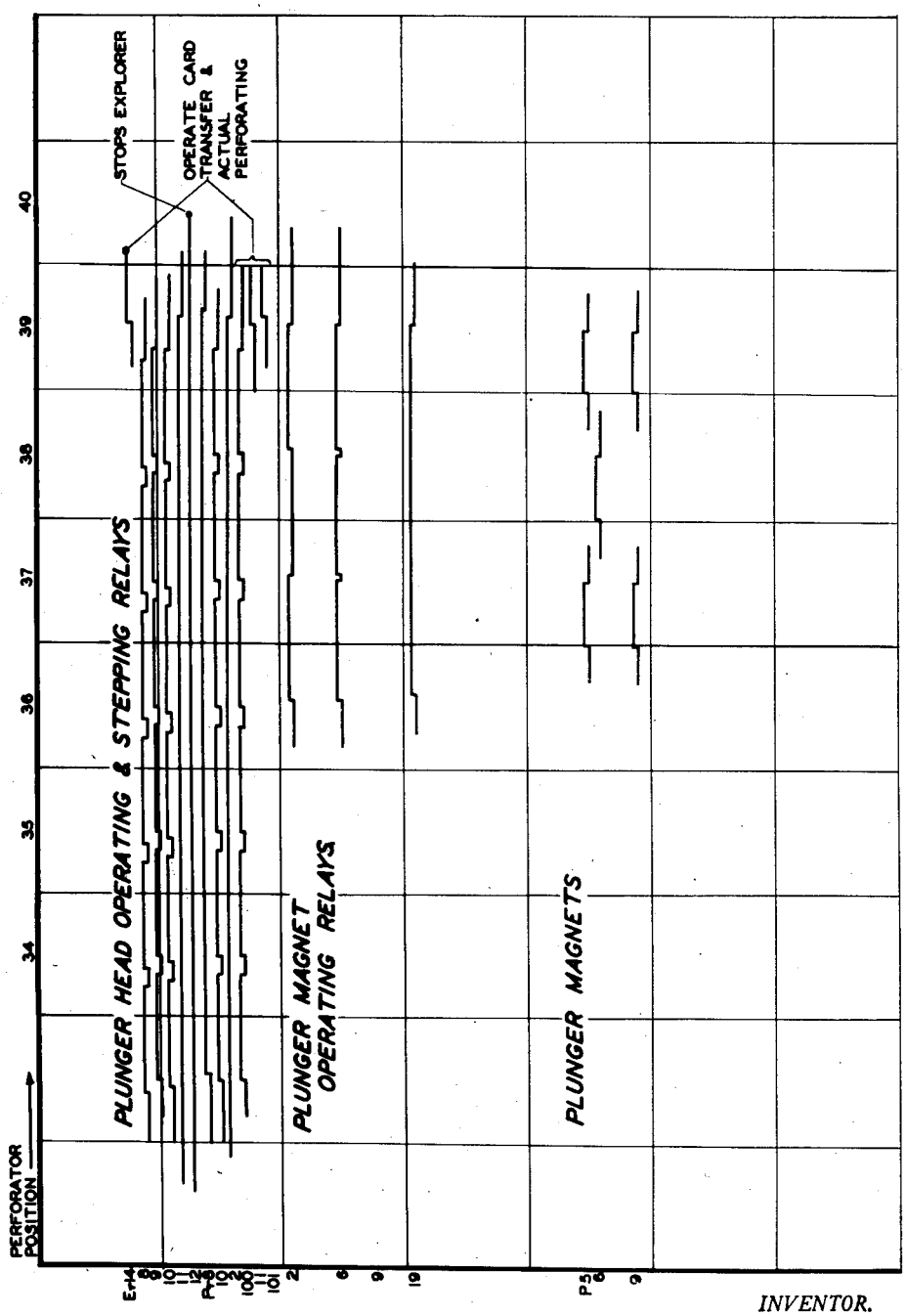
INVENTOR.
WILLIAM HATTON
BY
E. D. Phinney
ATTORNEY Sept. 23, 1952 W. HATTON 2,611,538
ELECTRICAL CALCULATING APPARATUS
Filed July 27, 1942 58 Sheets-Sheet 46

FIG. 11a1 MULTIPLICATION

INVENTOR.
WILLIAM HATTON
BY
E. D. Phinney
ATTORNEY

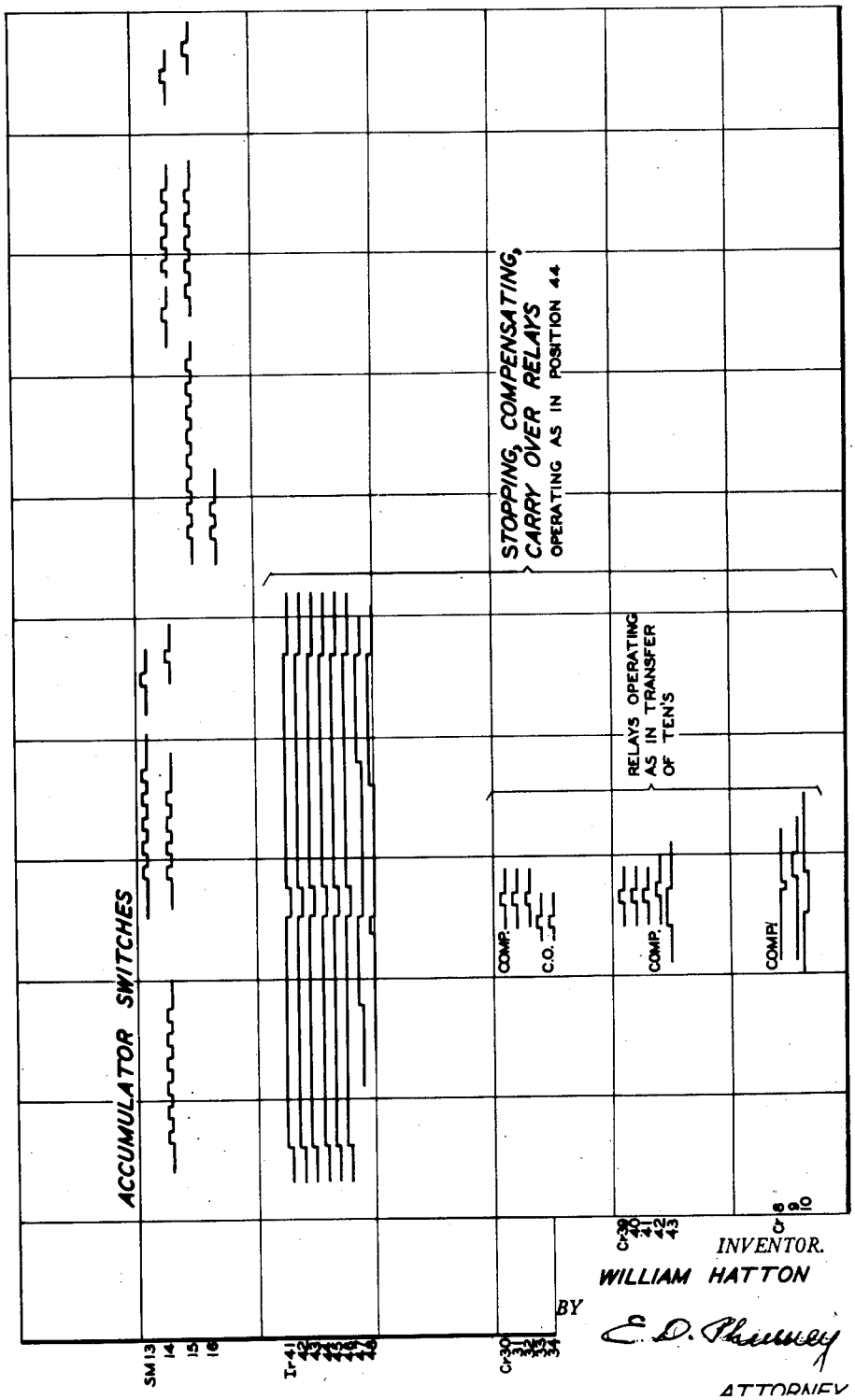

Sept. 23, 1952 W. HATTON 2,611,538
ELECTRICAL CALCULATING APPARATUS
Filed July 27, 1942 58 Sheets-Sheet 48

DIVISION

INVENTOR.
WILLIAM HATTON
BY
E. D. Plummer
ATTORNEY

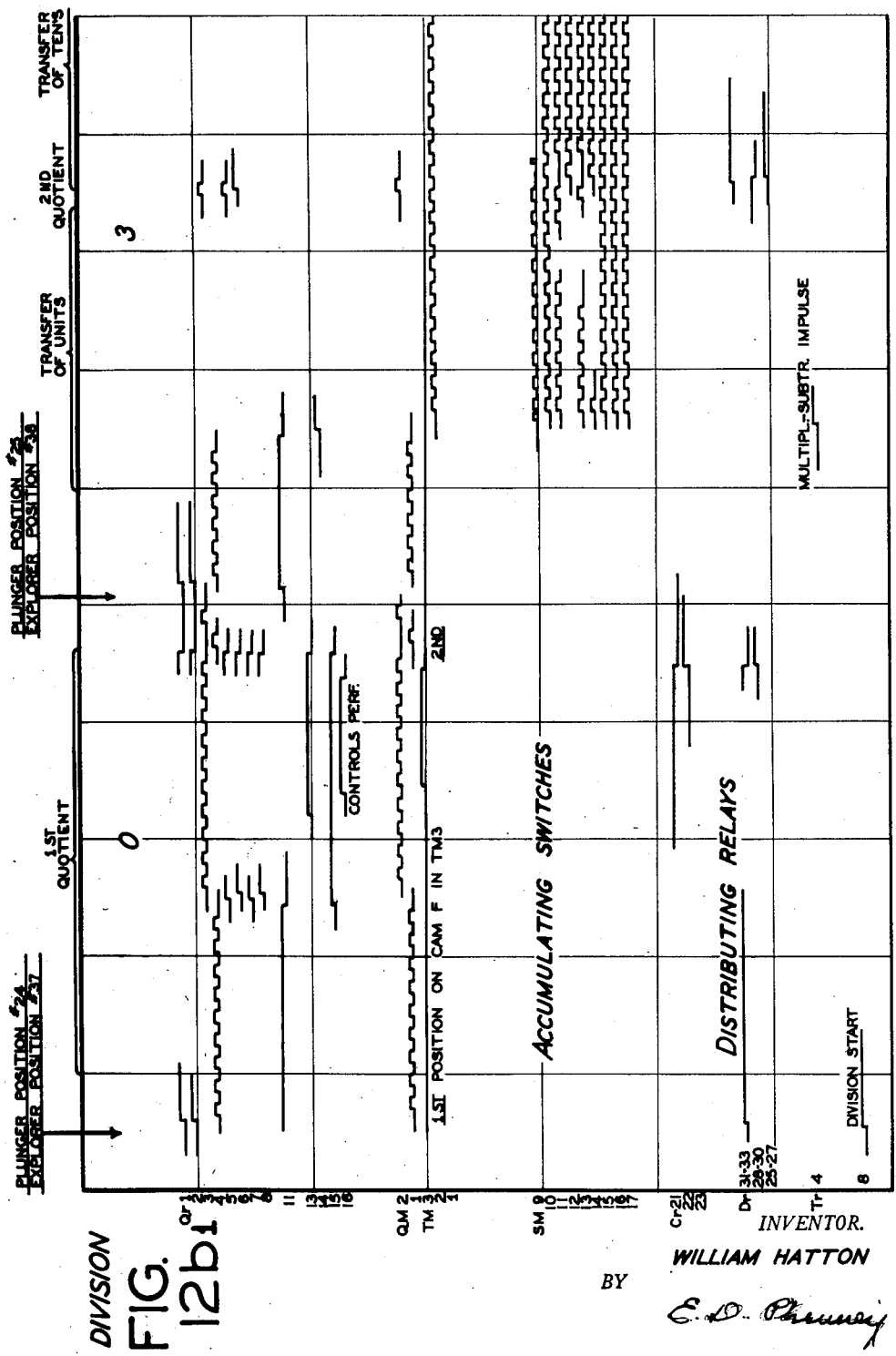

Sept. 23, 1952 W. HATTON 2,611,538
ELECTRICAL CALCULATING APPARATUS
Filed July 27, 1942 58 Sheets-Sheet 50
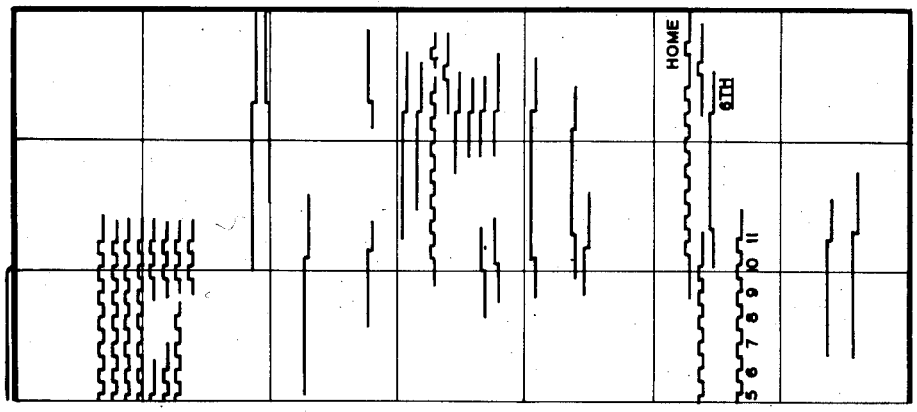
FIG. 12g DIVISION
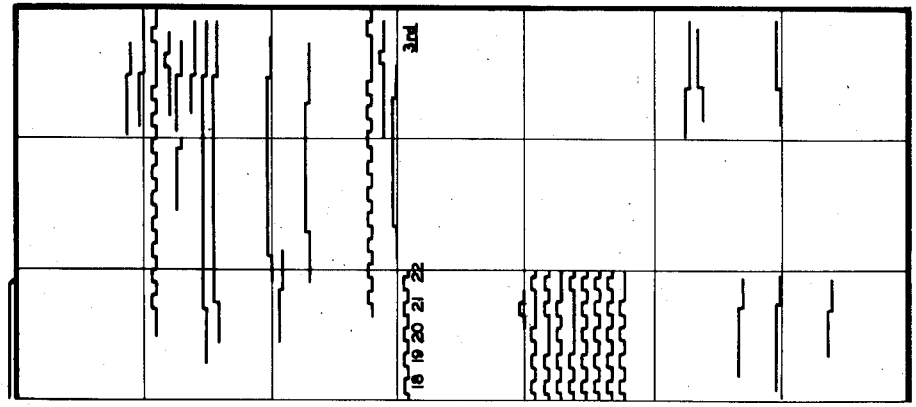
FIG. 12b2 DIVISION
*INVENTOR.*
WILLIAM HATTON
BY
*ATTORNEY*

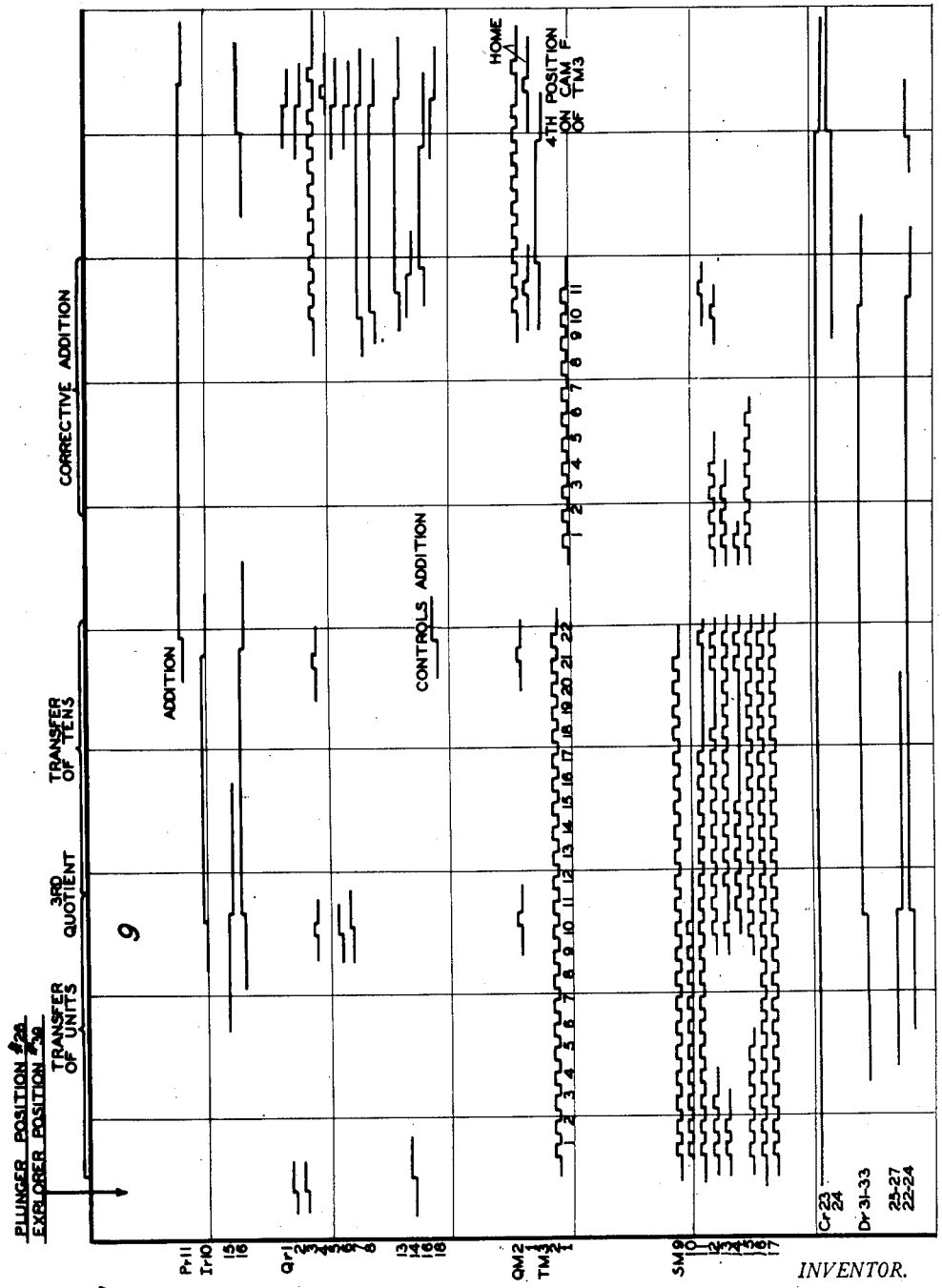

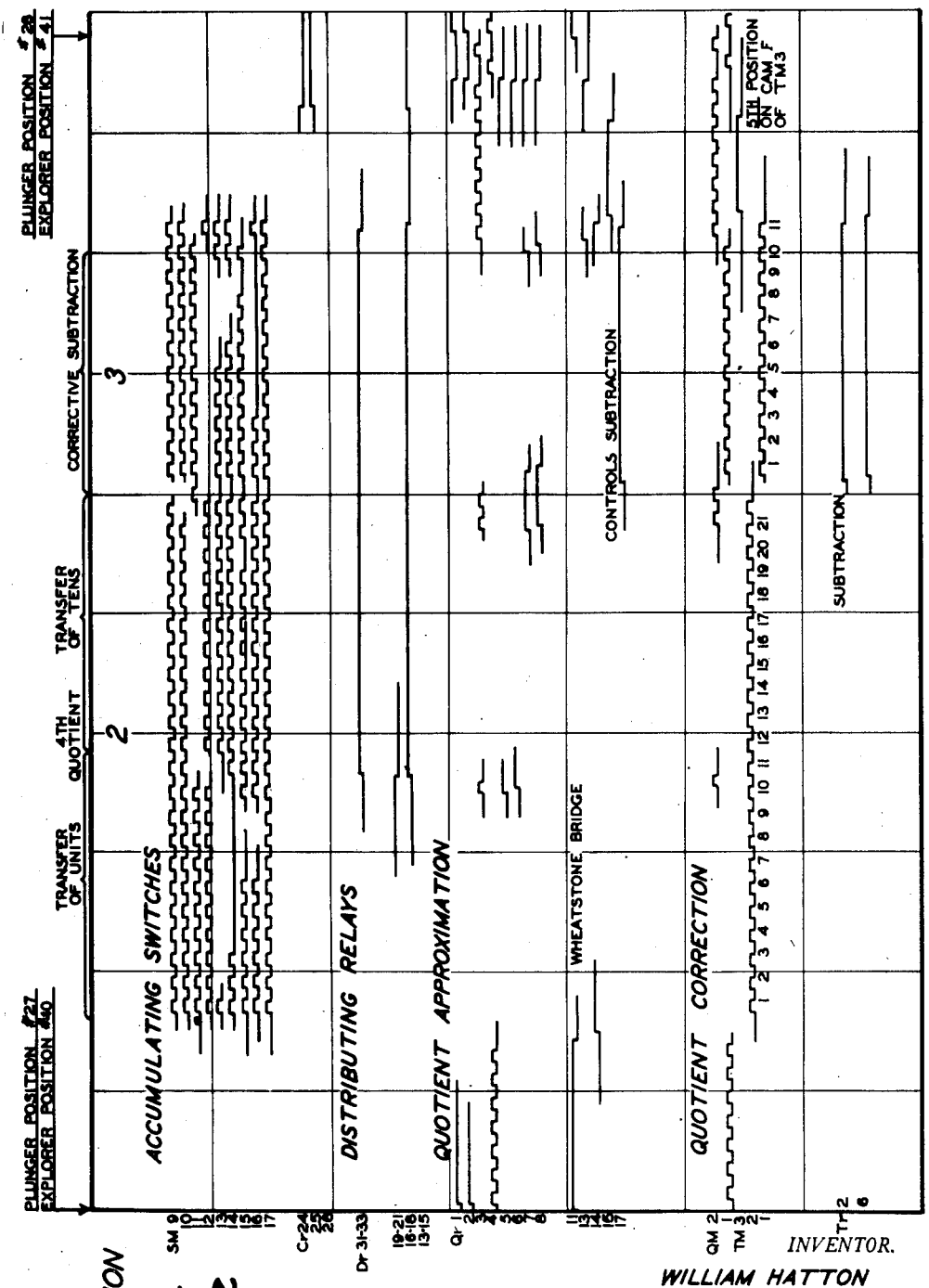

Sept. 23, 1952      W. HATTON      2,611,538
ELECTRICAL CALCULATING APPARATUS

Filed July 27, 1942      58 Sheets-Sheet 53

DIVISION

INVENTOR.
WILLIAM HATTON
BY
E. D. Phinney
ATTORNEY

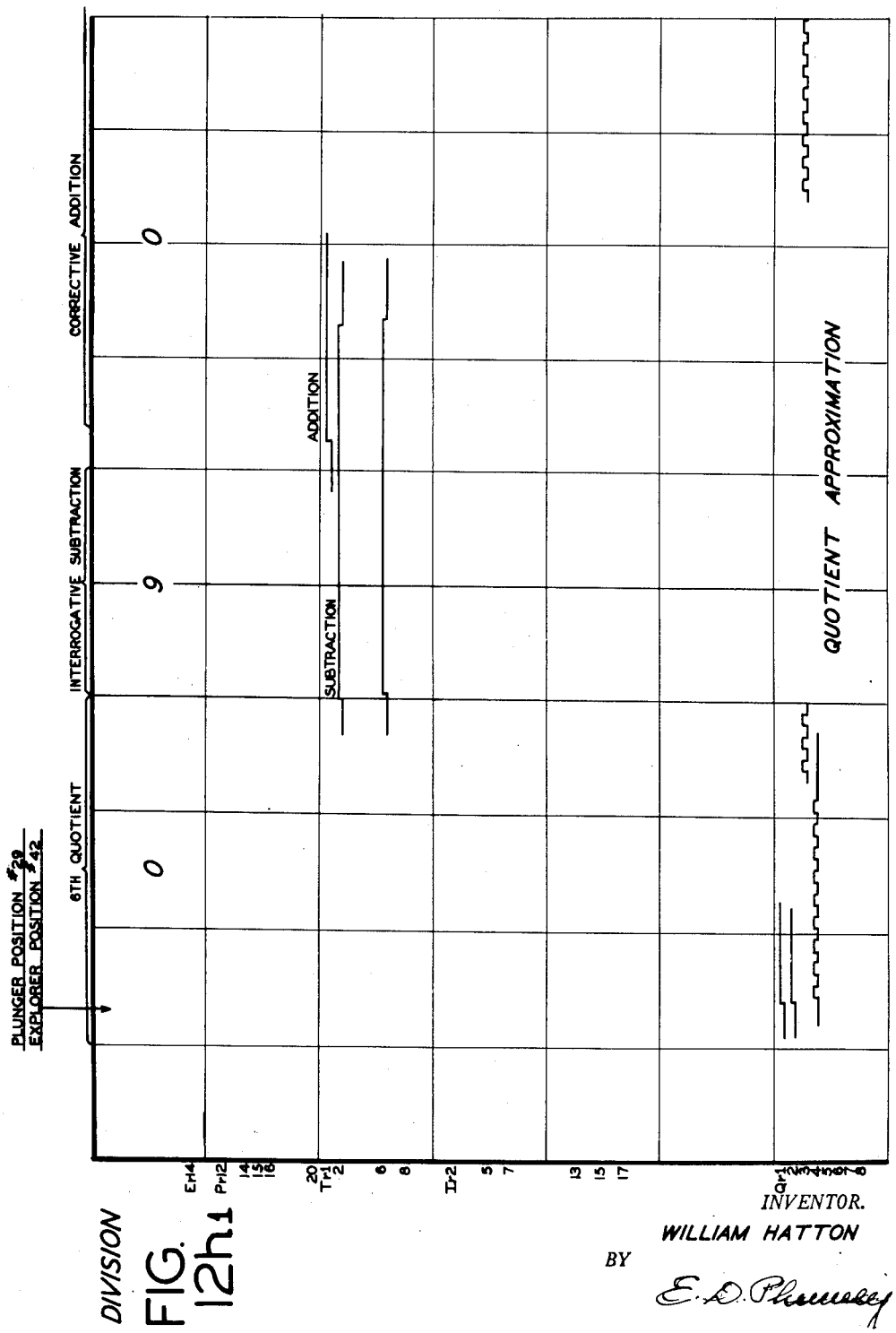

Sept. 23, 1952 W. HATTON 2,611,538
ELECTRICAL CALCULATING APPARATUS
Filed July 27, 1942 58 Sheets-Sheet 55
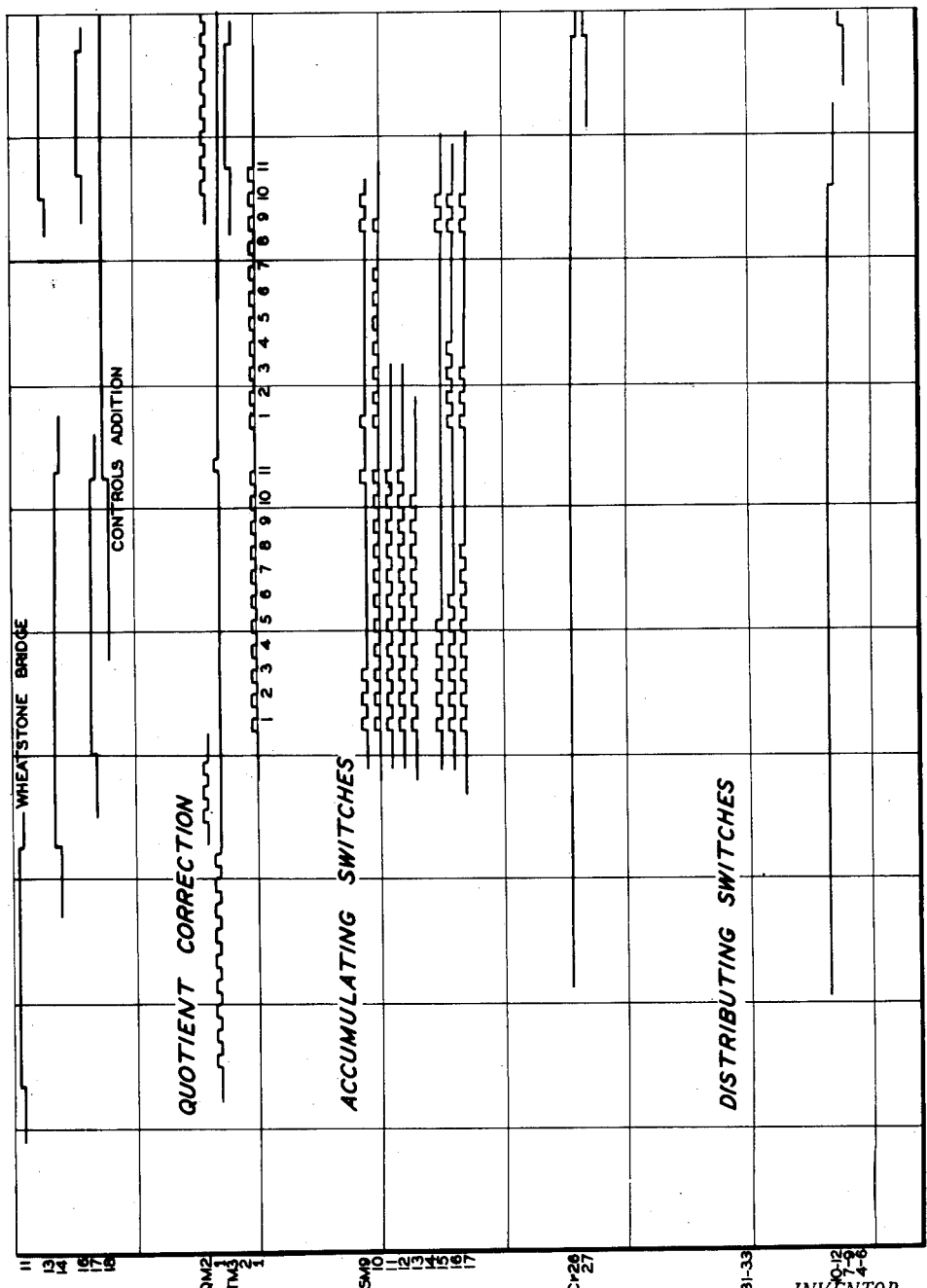
INVENTOR.
WILLIAM HATTON
BY
E. D. Phenney
ATTORNEY Sept. 23, 1952 W. HATTON 2,611,538
ELECTRICAL CALCULATING APPARATUS
Filed July 27, 1942 58 Sheets-Sheet 56

DIVISION

INVENTOR.
WILLIAM HATTON
BY
E. D. Phinney
ATTORNEY

Sept. 23, 1952  W. HATTON  2,611,538
ELECTRICAL CALCULATING APPARATUS
Filed July 27, 1942  58 Sheets-Sheet 57
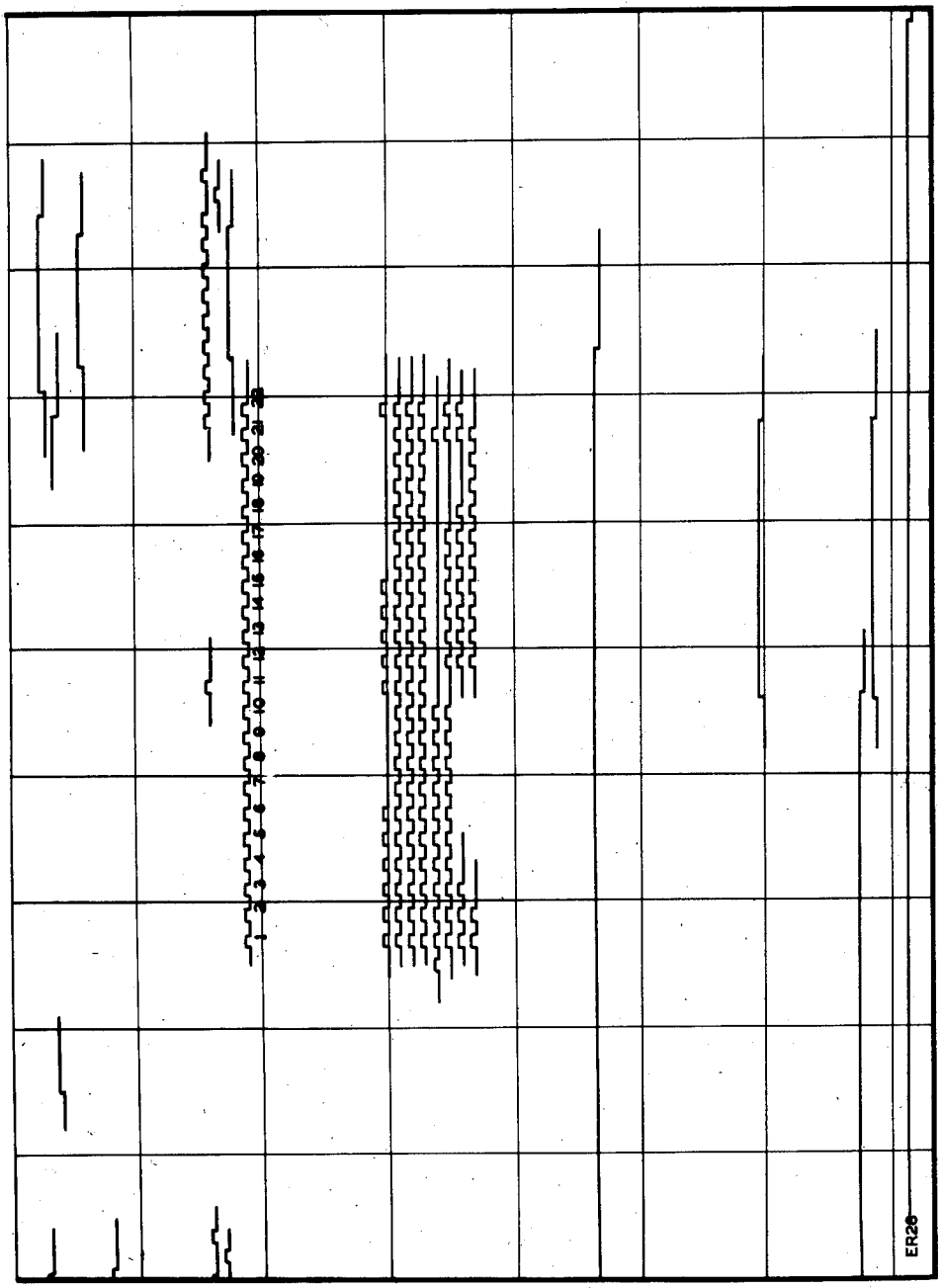
FIG. 12i2 DIVISION
INVENTOR.
WILLIAM HATTON
BY
ATTORNEY Sept. 23, 1952  W. HATTON  2,611,538
ELECTRICAL CALCULATING APPARATUS
Filed July 27, 1942  58 Sheets-Sheet 58

MULTIPLICATION

| 11a1 | 11a2 |
|---|---|

SUBTRACTION

| 10a1 | 10b |
|---|---|
| 10a2 | |

ADDITION

| 9a1 | 9b1 |
|---|---|
| 9a2 | 9b2 |

DIVISION

| 12a | 12b1 | 12b2 | 12c | 12e | 12f | 12g | 12h1 | 12i1 |
|---|---|---|---|---|---|---|---|---|
| | | | | | | | 12h2 | 12i2 |

FIG. 13

*INVENTOR.*
WILLIAM HATTON
BY
*E.D. Phinney*
*ATTORNEY*

Patented Sept. 23, 1952

2,611,538

UNITED STATES PATENT OFFICE 2,611,538

ELECTRICAL CALCULATING APPARATUS

William Hatton, South Orange, N. J., assignor to International Standard Electric Corporation, New York, N. Y., a corporation of Delaware Application July 27, 1942, Serial No. 452,506

54 Claims. (Cl. 235—61.8)

This invention relates to electrical calculating apparatus and pertains more particularly to calculating apparatus designed to cooperate with a card sensing and perforating machine.

Calculating machines have been known heretofore in which perforated cards are explored one at a time for certain data from which computations are made automatically and the results of the computations are perforated in the cards from which the original data was taken. It has been difficult with these known forms of machines quickly and easily to change the operation of the machine from one type of computation to another.

It is accordingly an object of the present invention to provide calculating apparatus having means whereby the type of computation can quickly and easily be selected or altered by the operator. And it is more specifically an object of the present invention to provide electrical calculating apparatus comprising two functionally distinct units hereafter referred to as the calculator unit and the operator's control unit.

A further object of the present invention is to provide a calculator unit which consists essentially of four types of apparatus which have been widely used for many years in automatic telephone installations, namely, relays, step-by-step switches, condensers and resistances. With this apparatus all calculating operations are carried out electrically, the factors from which a computation is to be made being read from a perforated card by an explorer and the solution produced by the calculator being perforated in the said card.

It is also an object of this invention to provide a control unit which determines in advance, by the setting of various keys and dial switches, the operations which the calculator is to perform as well as the positions on the card in which the explorer is to find the factors representing the problem and the positions on the card in which the perforator is to punch the solution. The word "factor" is used in this specification in its broad sense to mean any number forming part of a problem to be calculated regardless of whether or not the problem involves multiplication.

Another object of the present invention is to provide a control unit having manually adjustable switch means upon which constant factors appearing in a series of problems or computations may be set up by the operator. By these means when one of the factors applying to a group of cards is invariable the need for recording this factor on the cards is avoided and time and card space are saved.

Calculator and control units embodying the present invention are intended to cooperate with known forms of card sensing and perforating machines which are designed to use cards of standard shape and size. Such cards are well known and have 45, 80 and 90 or other numbers of columns in which holes are punched in selected columns in accordance with a decimal or code convention, to represent digital values by their positions.

The essential functions of a card sensing and perforating machine which will cooperate with the calculator are as follows:

1. To seize a card from a pile, read the holes in selected columns, one or more columns at a time, and close electrical contacts to communicate their positions to the calculator.

2. To indicate, electrically, the columns to which the readings refer.

3. To punch holes in selected columns in response to electrical indications received from the calculator.

4. To indicate, electrically, the columns it is about to perforate.

5. To eject the card and signal the end of the cycle of operations.

POSSIBLE OPERATIONS OF THE CALCULATING APPARATUS

Fundamental calculations

The calculating apparatus includes means to carry out the four fundamental calculating operations of addition, subtraction, multiplication and division, both singly and in combination. Thus, it can take a factor read from a card and add to it, subtract from it, multiply it by, or divide it by a second factor read from the card and produce the solution of the calculation. It can cause this solution to be recorded on the same card; alternatively, or in addition, it can hold it, subject to a further calculating operation, not necessarily of the same type as before, and produce a second solution which can again be recorded on the card and/or held for subsequent calculating operations. During all these operations the card remains within the card sensing and perforating machine.

The number of successive calculating operations which can be performed (with most types of operations) for one card is limited only by the number of factors which can be read from the card, and by the number of digits with which the calculator can deal at a time. The latter may be made large enough for any commercial and industrial purposes. The calculator, described in detail hereinafter can deal with sums, differences, or products having up to 17 digits, whilst a quotient can, in principle, be extracted to any desired number of digits.

The calculating apparatus is capable of reading any one of the factors used in a complete calculating operation from the "constant factor" dials provided on the control unit instead of from the card.

Table 1 includes the basic calculating operations most commonly required.

| No. | Type of Operation | Maximum number of digits with particular apparatus described hereinafter | | |
|---|---|---|---|---|
| | | A, B, C | P1, P2, P3 | S |
| 1 | A±B=S | 8 | | 9 or 17. |
| 2 | A×B=S | 8 | | 17. |
| 3 | A÷B=S | 8 | | Unlimited. |
| 4 | P1+C=S | 8 | 8 | 17. |
| 5 | P1+P2=S | | 8 | 17. |
| 6 | P1÷C=S | 8 | 8 | Unlimited. |
| 7 | P1×C=S | 8 | 8 | 17. |
| 8 | P1×P3=S | | 8 | 17. |
| 9 | P1÷P3=S | | 8 | Unlimited. |

In this table A, B and C represent factors read from the card, or from the "constant factor" dials. S is an intermediate or a final solution and P1, P2, P3 are solutions of previous calculation operations used as factors for fresh operations, P1 and P2 can be the solution of operations of types 1, 2, 4, 5, 7 and 8, but P3 is restricted to the solution of operations of type 1.

*Practical applications*

By performing several of the above types of operations in succession in the calculator, the following typical combinations may be obtained, and the entire operation completed during a single passage of the card through the machine.

$$(A+B+C+ \ldots )=S$$
$$(A+B+ \ldots )\times C=S$$
$$(A\times B)+C+ \ldots =S$$
$$A\times B\times C\times \ldots =S$$
$$(A\times B\times \ldots )+(C\times D\times \ldots )+ \ldots =S$$
$$(A\times B\times \ldots )\times (C+D+ \ldots )\times \ldots =S$$
$$\frac{A+B+ \ldots}{C+D+ \ldots}=S$$
$$\frac{A\times B\times \ldots}{C+D+ \ldots}=S$$
$$\frac{A+B+ \ldots}{C\times D\times \ldots}=S$$
$$\frac{A\times B\times \ldots}{C\times D\times \ldots}=S$$

It is also possible to use the factors read from the card more than once. The following combinations, which are useful in calculating percentage difference, are typical of this class:

$$\frac{A-B}{A}=S$$
$$\frac{A-B}{B}=S$$
$$\frac{A}{A+B}=S$$

The calculator can cause any intermediate of final solution to be recorded on the card or not, in part or as a whole, as the commercial requirements may dictate. The final solution can be produced, if desired, in "rounded off" form, and any selected digit can be rounded off to the nearest unit or half-unit. For example, the solution 7654 can be produced in a variety of ways. It can be recorded, without rounding off, in the form 76, 765, or 7654 according to the number of significant digits required; or it can be rounded off after say 2 digits and recorded in the form 77, 770 or 7700 (nearest unit), or in the form 765 or 7650 (nearest unit), or in the form 765 or 7650 (nearest half-unit).

*Special calculations*

The calculator is also able to carry out special calculating operations of the type in which a factor is read from a card, a second factor is calculated as an arbitrary function of the first, and the difference between the two is produced and recorded on the card.

For example, in the determination of net earnings for payrolls, deductions are to be made from the gross earnings in respect of taxes, pension, insurance, etc., and these are all functions of the gross earnings. In dealing with such problems, the calculator reads the gross earnings from the card, calculates the appropriate deductions, deducts them, and produces and records the net earnings, rounded off as required.

Another example of the industrial problems which the calculator can solve is the determination of the values of fiscal stamps to be affixed to the receipts of public utility companies.

Furthermore, for transactions of this kind, the calculator is able to determine the numbers of notes and coins, or stamps, of each of the different denominations, which are necessary to make up the net sum it has calculated, and to record these numbers, as well as the sum itself, on the card, whilst it remains in the machine.

DRAWINGS

The above mentioned and further objects of the invention and the manner for attaining them will be more fully explained in the following description taken in conjunction with the accompanying drawings. The drawings include thirteen main sheets, each subdivided into either two or three Patent Office drawings. Each main sheet is, in a sense, a unitary drawing and the circuits may be traced from one main sheet to another by means of suitably numbered multiples. In addition to these there are a few smaller independent figures.

In order to simplify circuit tracing, each main sheet is indicated by a characteristic letter of the alphabet which follows the number of the particular subdivision of the main sheet in the various Patent Office drawings. Three sheets of drawings bearing the same identifying letter, when placed side to side in numerical order will form a main sheet.

Fig. 1 is a schematic diagram of a Wheatstone bridge circuit;

Figs. 2 and 3 are block diagrams showing the explorer and plunger heads with their associated contact arrangements;

Fig. 4 is a block diagram showing the interconnection of the various circuits for addition or subtraction;

Fig. 5 is a block diagram showing the interconnection of the circuits for a division operation;

Fig. 6 is a table to be used in connection with the circuit shown in Figs. 1N and 2N;

Fig. 7 is a table to be used in connection with the circuit shown in Figs. 1G and 2G;

Figs. 8' and 8'' are perspective views of an explorer and of a perforator of known construction;

Figs. 9a 1—2, b 1—2, 10a 1—2, b, 11a 1—2, 12a, b 1—2, c, e, f, g, h, 1—2, and i 1—2 show timing charts illustrating the operation of the relays during basic calculation processes;

Figs. 9a 1—2 and b 1—2 show a timing chart for a process of addition;

Figs. 10a 1—2 and b show a timing chart for a process of subtraction followed by perforation;

Figs. 11a 1—2 show a timing chart for a process of multiplication; and

Figs. 12a, b 1—2, c, e, f, g, h 1—2 and i 1—2 show a timing chart for a process of division;

Fig. 13 is a chart facilitating the assembly of the timing charts in the proper order;

Fig. 14 explains the principle of the comparing multiple used in division when approximating the quotient;

Figs. 1C, 2C and 3C show the carry-over circuit "C."

Figs. 1,D, 2D and 3D form a diagram of the distributor circuit "D."

Figs. 1E, 2E, and 3E form a diagram of the card sensing circuit or "explorer" E.

Figs. 1G and 2G form a diagram of a special portion "G" of the calculator adapted to compute government pensions or the like.

Figs. 1I, 2I, 3I illustrate the entry receiving or "input" circuit "I."

Figs. 1M, 2M and 3M illustrate the multiplying circuit "M."

Figs. 1N and 2N illustrate the coin and note portion of the calculator.

Figs. 1o, 2o and 3o illustrate the operator's control circuit.

Figs. 1P, 2P and 3P illustrate the card perforator circuit "P."

Figs. 1Q, 2Q and 3Q illustrate the quotient circuit "Q."

Figs. 1S, 2S and 3S illustrate the accumulator or solution circuit "S."

Figs. 1T, 2T and 3T form a diagram of the timing or "transfer" circuit "T."

SEPARATION OF CALCULATOR APPARATUS INTO SUB UNITS

Component circuits of calculator unit

Although the apparatus mounted in the calculator unit forms a single undivided part of the equipment, its electrical circuits may conveniently be considered as divided, functionally, into several parts each of which is shown in a separate figure of the drawings. The principal functions of the component circuits are as follows:

The card sensing or "explorer" circuit E contains relays which control the card sensing mechanism and determine the sequence of the calculating operations in accordance with the setting of the selecting keys on the control unit.

The entry receiving or "input" circuit I contains relay storage sets for the temporary recording factors read from cards by the card sensing device, or from the dial switches on the operator's control unit. In this entry receiving circuit, the readings are transposed from the code used in perforating the cards (if this is not decimal) to the decimal system which is used throughout for calculating purposes.

The readout controlling or "transfer" circuit T contains relays and step-by-step switches, which control the simultaneous transfer of the digital values of all digits of a factor from the storage relays of the entry receiving circuit I to the accumulating switches of an accumulator circuit hereafter mentioned. These digital values undergo transformation automatically in the process, according to the calculating operation involved. Thus these values may be double, tripled, or otherwise multiplied during transfer by the aid of a multiplying circuit hereafter mentioned. Alternately these digital values may be transformed into their nine's complements. In accordance with a feature of the invention both the complementary and the multiplying transformations may be effected simultaneously during one transfer to facilitate high speed division.

The multiplying circuit M contains relays, interconnected in such a way as to constitute an electrical "multiplication table" on the Pythagoras principle, in which the value of each digit of a factor being transferred to accumulating switches undergoes transformation automatically into the product of itself and another digital value.

The accumulator or "solution" circuit S contains step-by-step accumulating switches, one of which is assigned for each digit of a factor transferred from the storage relays. Each switch accumulates successive digital values of the same ordinal value. These switches record the solution of addition, subtraction and multiplication operations, and control the value of the holes which the perforator punches in the cards.

The distributor circuit D contains relays which determine the accumulating switches to which a factor shall be transferred in accordance with the ordinal value of its digits.

The carry-over circuit C contains relays which take a record every time an accumulating switch completes its cycle of 10 steps and arrange for "carry-over" from this switch to the switch assigned to digits of next higher ordinal value.

The quotient circuit Q contains a step-by-step quotient switch and relays, constituting a Wheatstone bridge device which materially increases the speed of division operations.

The perforator circuit P contains relays, which control through plunger magnets, punches in the cord perforator mechanism and transpose the successive digital values indicated by the quotient switch, or accumulating switches, from the decimal form to the code used in perforating the cards.

For special calculations, additional circuits such as the government pension circuit G or the note indicating circuit N may be incorporated in the calculating unit. These additional circuits are not essential for ordinary arithmetic calculations. These special circuits will be described later on, after the description of operation of the regular apparatus used in normal arithmetic calculations.

CIRCUITS OF OPERATOR'S CONTROL UNIT

The circuits of the operator's control unit comprise several separate groups of relays. Each group is wired to prepare the circuits of the calculator unit for one particular job, i. e. for effecting one specific type of calculation involving certain specific columns of the cards. These relays are therefore called "job" relays. Keys for selectively actuating any one of such groups of job relays are provided, as well as lamps to show which of the groups is actuated. All this equipment is individual to each particular type of calculation, the number of job relay groups, keys, and lamps, being equal to the number of different calculations to be selectable.

In addition to such equipment individual to the several separate types of calculations, there is also provided some common equipment, particularly in Fig. 1o, including a few common relays, five common control keys, and six dial type digit switches on which one may set up six fixed digits representing a constant factor (or factors) to be used in a series of calculations.

Although the circuits of the operator's control unit may be logically separated into a common circuit and a plurality of job circuits as above outlined, these are all shown in Figs. 1o, 2o and 3o which together form one main sheet of drawings, and therefore it is more convenient to designate them all together as the operator's control circuit O.

EXPLANATION OF DRAWINGS

In order to facilitate finding the many circuit elements such as lamps, manual switching means, machine operated switching means, relays, step-by-step switches, resistances, and condensers, the designations applied to all such elements begin with an initial letter which represents the circuit wherein such element is located. Thus elements in the "explorer" circuit "E" have designations beginning with "E," elements in the "input" circuit I have designations beginning with "I," elements in the "transfer" or read out circuit T have "T" as their initial letter, etc.

Furthermore, the second letter in the designation of an element indicates the general type of apparatus it is. The letter "r" used as a second letter represents a relay, "Y" a resistance, "q" a condenser, "K" a key. Either "i" or "J" used as a second letter represents a jack. Letters a, b, c, d and e as second letters following either "E" or "P" represent certain machine-actuated wipers provided on the card sensing and perforating machine as well as the rows of contacts which cooperate with such wipers, a combination of this kind followed by a numeral such as Ec36 denotes, for example, a circuit grounded by the card explorer wiper "Ec" when it is in engagement with a contact in the thirty-sixth column of the contact field. The letter M preceded by a letter designating one of the main sheets indicates a rotary step-by-step telephone switch, or more particularly the magnet operating such switch. This system will avoid the use of two sets of reference characters for each switch, one for the magnet and one set for the switch per se. Where there is a plurality of such switches on a sheet the two letters are followed by a numeral to indicate the particular switch. Thus SM9 indicates switch 9 of the "S" circuit. The respective brushes of such switches are designated by letters A to F coupled with the switch designation according to conventional practice, the brush "A" of SM1, for example being designated as SM1A.

Figure 1C:
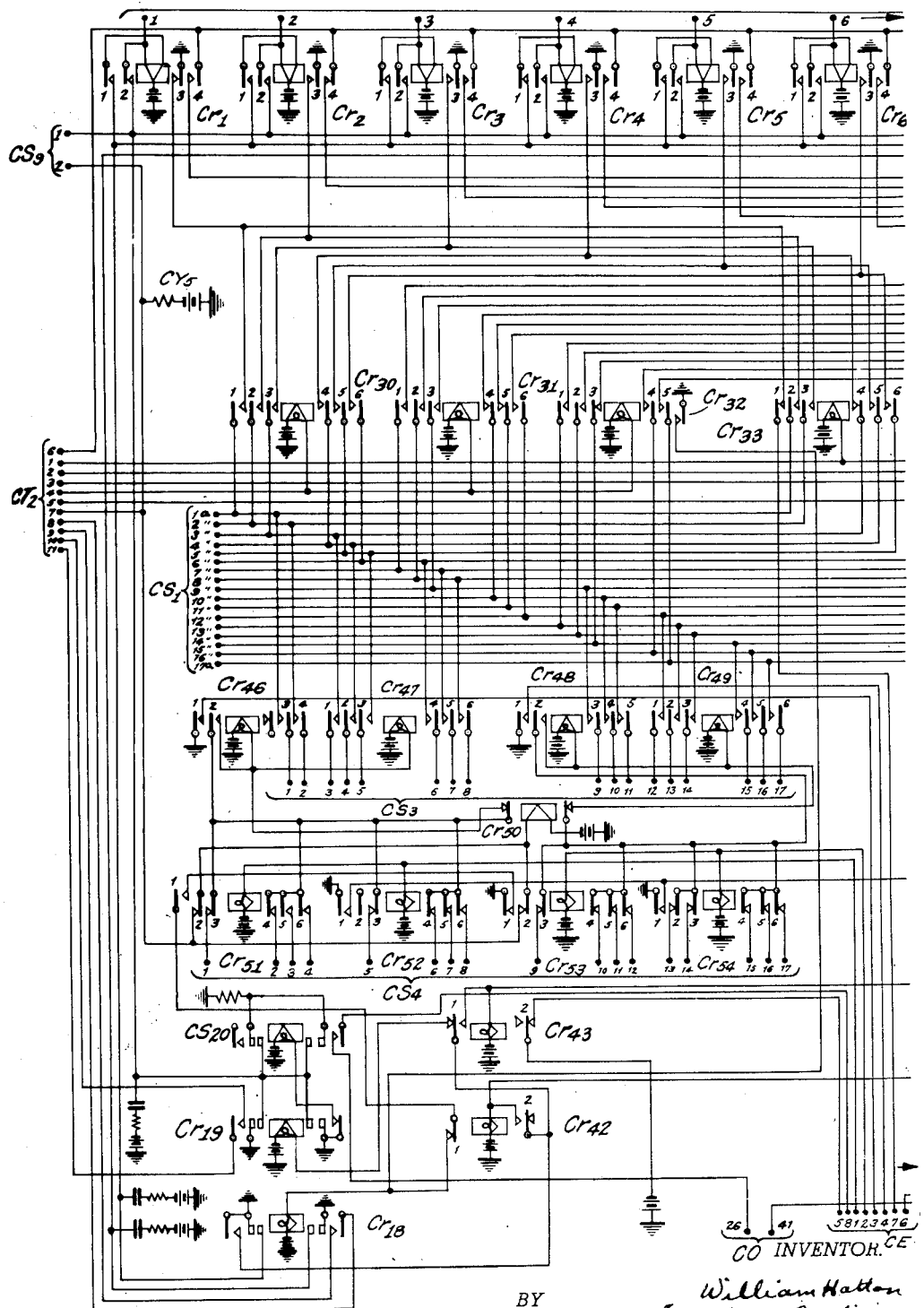

Interconnecting wires or groups of wire between any of the two different circuits are similarly designated on both drawings by the initial letters of the circuits concerned and the separate wires of such groups are numbered to correspond on both drawings. A group of connections between the solution storing circuit S (Figs. 1S, 2S and 3S), and the carry-over circuits "C," Figs. 1C, 2C and 3C, for example, would be marked CS. The two letters are always placed in alphabetical order. If there are several groups of interconnections between the same circuits they are designated CS1, CS2, CS3, etc. This system will be followed as closely as possible, but in a few instances, particularly in Figures 1o, 2o and 3o where odd elements including certain terminal strips are shown, to which the foregoing method of assigning reference characters is not readily applicable, other suitable reference characters or legends will be used. Contrary to the usual approved practice, in order to simplify reading of the case, the number of reference characters used has been kept as small as possible. For example, since the construction of all step-by-step switches is similar, reference characters have only been applied to the front and back contacts of TM1. This is thought to be sufficient to enable one to identify the front and back contacts of the twenty odd switches of identical construction used in the present embodiment of the invention. Furthermore it permits the use of a maximum of four characters to be used for reference purposes which simplifies locating in the drawings the various elements as they are mentioned in the specification.

While following the description of the addition and subtraction on the approximate circuit diagram, Fig. 4 will be found helpful for an over-all view. Similarly, Fig. 5 will aid in explaining the general scheme.

CARD SENSING AND PERFORATING MACHINE

The circuits about to be described are designed to cooperate with a card sensing and perforating machine having electrical connections as shown schematically in Figs. 1E, 2E and 3E, and 1P, 2P and 3P respectively comprising, essentially, the following elements as shown in Figs. 2, 3 and 8' and 8":

1. Mechanism EXA in Figs. 2 and 2' to read holes in a perforated card, one column at a time, and transmit the reading electrically to the calculator unit.

2. A device EXB in Figs. 2 and 8' to indicate electrically, to the control unit, the column being read.

3. Mechanism PLA in Figs. 3 and 8" to prepare sets of punches, one column at a time, in accordance with electrical indications received from the calculator unit and, later to perforate a card in one operation by means of the prepared punches.

4. A device PLB in Figs. 3 and 8" to indicate electrically, to the control unit, the set of punches being prepared.

5. Mechanism CDC, CDE, CDF, CDG in Figs. 8' and 8" to seize, position, advance and eject cards, one at a time such as described in the patent to Mixer 2,214,029.

The type of card used by this machine is divided into 45 columns, in which holes representing digital values may be perforated. Every column is divided into an upper and a lower half, in each of which one digit may be recorded. It is thus possible, in the 90 available half-columns, to record 90 digits. A digit is represented by one or two holes perforated in a selection of 6 positions in half a column. There are thus 12 positions per column in which holes may be perforated. The 6-unit code used is the same as the well known 90 column code used by the Remington-Rand Company and is shown in the following table:

| Digital Value | Upper half-column Holes in: | Lower half-column Holes in: |
|---|---|---|
| 0 | Pos. 1 (top) | Pos. 7 (top). |
| 1 | Pos. 2 | Pos. 8. |
| 2 | Pos. 2 and 6 | Pos. 8 and 12. |
| 3 | Pos. 3 | Pos. 9. |
| 4 | Pos. 3 and 6 | Pos. 9 and 12. |
| 5 | Pos. 4 | Pos. 10. |
| 6 | Pos. 4 and 6 | Pos. 10 and 12. |
| 7 | Pos. 5 | Pos. 11. |
| 8 | Pos. 5 and 6 | Pos. 11 and 12. |
| 9 | Pos. 6 (bottom) | Pos. 12 (bottom). |

In the above table, the positions of the perforations are numbered consecutively starting from the top of the card. Thus position 1 corresponds to the position numbered 12 on standard commercial cards, position 2 to 11; 3 to 0; 4 to 1; 5 to 2; etc.

The card sensing mechanism, as shown in Fig. 8', comprises a slot EXC into which a card CRD can be slid and accurately positioned, and a reciprocating head EXA carrying a set of 12 feelers EF, which can be located in turn in 46 different positions. In each of the first 45 positions, the feelers EF are in line with one column on the card, and after traversing the last of these columns they can be moved into a 46th position. The feeler head EXA is advanced step-by-step, from column to column, across the card from left to right, by an "advance" magnet E99, Fig. 1E, controlled from the calculator unit and controlling a stepping mechanism of which shaft EXD is shown in Fig. 8'. This shaft is driven over rack and rail EXF by means of an escapement mechanism EXE. Such stepping mechanism is well known in the art (see, for example, Rice, No. 2,172,758, Fig. 5).

In this position, advance magnet E99, on operation, through pin EXH presses all twelve of the feelers or rollers EXR against correspondingly situated sensing pins EF. The contact springs of the feeler contacts Ef12, Ef11, Ef0, Ef1, Ef2, Ef3, Ef4, Ef5, Ef6, Ef7, Ef8, Ef9 provide a spring tension which will force the sensing pins Ef through the card CRD if any data holes have been punched in their respective positions and in so doing close one of the feeler contacts Ef12, Ef11, Ef0, Ef1, Ef2, Ef3, Ef4, Ef5, Ef6, Ef7, Ef8, Ef9, corresponding to the holes encountered. Feller contact Ef12 senses the top hole on the card; Ef11 the second hole; Ef0 the third hole; etc.

On release of the magnet E99, the feeler head EXA is advanced to the next column. The operation of a "return" magnet P101, Fig. 1P, which corresponds to carriage return control magnet 187 in Fig. 13 of the Rice patent, which is common to both explorer and perforator mechanisms, causes the feeler head to traverse the card from right to left (without reading it) to its starting position.

Simultaneously with feeler head EXA, a set of five brushes Ea, Eb, Ec, Ed, Ee, of distributing device EXB, are moved along five rows of stationary contact pins, Ea1 . . . Ea46; Eb1 . . . Eb46; Ec1 . . . Ec46; Ed1 . . . Ed46; and Ee1 . . . Ee46 in synchronism with the advance and return movements of the feeler head across the card.

The distributing devices EXB and PLB are coupled to the explorer and perforator heads in a manner shown schematically in Figs. 2, 3, 8' and 8''.

A card contact E100, Fig. 1E (contact switch 94, Fig. 7 of Rice) closes when a card is positioned beneath the feeler head EXA. A return contact E101, controlled by relay CR187 in Fig. 13 of Rice, opens during the time the feeler and plunger heads EXA and PLA corresponding to parts 84 and 30, respectively, in the patent to Rice are returning to their starting positions after a calculating operation, as will be explained later, and closes when the mechanism is ready to start a new operation. Besides these automatically controlled contacts E100 and E101, the card sensing and perforating machine has two manually operated locking keys designated as "general key" Ek103 and "cycle key" Ek104. These manual keys are normally not opened except in emergencies and may be therefore considered as being permanently closed.

The card sensing mechanism as shown in Figs. 2 and 8' and the card perforating mechanism, as shown in Figs. 3 and 8'', which will be described briefly further on are well known devices and a complete description of the same herein is thought to be unnecessary since these mechanisms per se are not part of the present invention. These mechanisms are contained in a unitary structure, together with two contact fields, the Ea . . . Ee1 . . . 46 field and a similar field Pa . . . Pe1 . . . 46 which will be described further on. This unit, represented schematically by joining Figs. 8' and 8'', is well known in Europe as the "cross" calculator.

In addition to the patents to Rice and Mixer, already cited, the patent to Kelley (2,160,152) which is cited in the patent to Rice, especially page 2, line 70, shows in more detail the carriage return mechanism. Punching is disclosed in the patents to Lasker, Nos. 1,868,111, issued July 19, 1932; 1,985,101, December 18, 1934; 2,004,208, June 11, 1935; 2,044,707–8, June 16, 1934; 2,124,178, July 19, 1938. These patents are also cited by Rice and give detailed descriptions of all the parts of a standard punch and the various operations performed by them.

The group of five wipers Ea . . . Ee are grounded from the fourth tongue of Er1 when Er1 is operated. The arrangement of wipers and their five rows of forty-six contacts is merely a distributing device, the use of which greatly simplifies the calculator circuits.

On referring to Fig. 1o, Ca and Cb are terminal strips having terminals from 1 to 46 to which for the purposes of explanation in the present embodiment, the contacts of various Or relays are considered to be permanently wired, while the tongues of the relays are connected to predetermined ones of the contacts Ea1 . . . Ea46 . . . Ec46 or to Pa1 . . . Pa46 . . . Pe1 . . . Pe46 in the respective contact fields. It will be understood that the usual cord and jack arrangement may be provided to take care of variations of the interconnections in addition to that made possible by the connections shown in Figs. 1o, 2o and 3o. See tables in "Card Reading and Number Storing," "Storing of the First Number Read From the Card," and Fig. 3o.

Reference characters are provided adjacent to each Or relay contact, where circuits connections do not appear in the drawings, to show the particular terminal to which the contact is wired.

When a group of relays is operated by a CK key, the terminals designated by the contact reference characters are interconnected for the duration of the series of operations controlled by the key.

This distributor arrangement eliminates counting relay banks, relay timing circuits and the like and generally simplifies the operation of the calculator.

Various multiples extending to other sheets of drawings are connected to the Ca and Cb terminals. These multiples have their wires numbered with digits corresponding to those of the Ca and Cb contact strips. With this arrangement, the circuits from the respective contacts of the contact fields through the contacts of the Or relays to the Ca or Cb terminal strips and thence to the respective multiples may be traced almost at a glance.

Tracing one or more of the groups of circuits closed by the operation of an Or relay group at this time would serve no useful purpose. It is sufficient to remember that these relays merely establish connections, for the duration of the operation or operations called for by the operated CK key, between desired contacts of the contact field and predetermined wires of the multiples connected to Ca or Cb.

Where a card is being sensed, for example, starting with a predetermined column, it will be found that provision is made for establishing circuits for the sensing operation from a contact in the field usually but not always corresponding in number to the column to be sensed. As the explorer advances the Ea . . . Ee brushes engage one set of contacts after another, closing and then opening the circuits required for the particular problem, and at the proper column, some relay will be operated from these contacts to initiate the calculation of the problem. The tracing of such circuits will be simplified if it is remembered, that while Er1 is operated, all wipers Ea . . . Ee are grounded and this ground is connected through the contacts of the operated Or relays to the wires of various multiples, the particular wire or wires of the multiples being grounded or disconnected from ground as the feeler head advances in accordance with the way the Or relay group has interconnected the contact field, or fields with the terminal strips Ca or Cb and the associated multiples.

During the course of the following description, numerous circuits for various purposes will be traced from the front contact of Er1 through the Or relay contacts, through the particular relay to be operated to battery, and in this way the operation of the control circuit may be easily understood and remembered.

PREPARING THE EQUIPMENT FOR THE CALCULATION DESIRED

Selecting desired group of job relays

The calculating equipment is capable of performing a variety of different calculating operations, which will be described in detail later. In order to pre-set the equipment so that it will perform a particular calculation operation, the operator depresses one of the 20 selection keys CK1 . . . CK20, in the control circuit O, Fig. 1o. Depressing such a key has the effect that a certain combination of the job relays Or1 . . . 78 operate. Although in the present embodiment twenty CK keys are shown, operating circuits for only sixteen of these keys appear in the drawings. This number of circuits is thought to disclose amply the method of operating the device. With the operation of the selected job relays the connections required between a card explorer and perforating machine, hereinafter referred to as CEP, and the calculator units are automatically established.

The keys mentioned above are non-locking. The first job relay which operates, however, is provided with a locking circuit over common pilot relay Or1. If the key CK1, for example, is depressed, relay Or6 operates as follows: Ground, RK1 and RK2 back, Or1 back, back contacts of keys CK20 to CK2 in series, CK1 front, Or6, to battery.

Or6 locks as follows: Ground, RK1 and RK2 back, Or1 back, back contacts of keys CK20 to CK2 in series, CK1 front, Or6 front, Or6, battery. Or1 does not operate in this circuit having ground on both ends of its winding. Or6 operates Or15, Or16, Or17, Or18 and Or19 in obvious circuits.

When key CK1 is released Or1 operates. An indicator lamp CL1 is connected in parallel with Or6, and accordingly lights when this relay operates. It remains alight, after the release of key CK1, in series with Or1, which has a very low resistance. The lamp indicates to the operator which key has been depressed and the type of calculation operation for which the calculator has been preset.

The back contact of Or1 disconnects ground from the lever springs of all the CK keys, so that once one of these keys has been operated, the depression of another key has no effect. To change the type of calculation operation to be performed, it is necessary first to release the existing combination of relays by depressing both releasing keys RK1 and RK2 simultaneously, as a result of which all operated Or relays release. The reason why two releasing keys are provided is to prevent the release of a relay combination by the inadvertent depression of one of them. The contacts of all CK keys are connected in series in order to prevent the simultaneous operation of two combinations of Or relays, should the operator inadvertently depress two of these keys at the same time. In the latter event, the particular combination of Or relays which has been operated is always indicated by the lamp which is alight at the time.

The front contact of Or1 is included in the general starting circuit, now about to be described, so that calculation can start only if a key CK has first been operated and the equipment preset to perform a particular calculation operation.

Setting equipment in motion

To start calculation, the operator starts the motor of the card explorer and perforation machine by closing the locking "motor start" key, OK102 Fig. 1o. This motor furnishes the energy required for the different mechanical operations. The "general start" key, OK100 is closed and also the cycle control key, OK101. Lamp BL, Fig. 2E, glows during the time the general start key is closed, by means of the following circuit: Ground, general start key, EO3 wire 2, BL, battery. The closing of the cycle control key operates relay Er2 Fig. 3E through the normally closed cycle key EK109, via the following circuit: Ground, Er28 back, EO3 wire 6, cycle control key OK101, EO3 wire 5, cycle key EK104, Er2 to battery. This operation will be referred to further on. Er2 operates Er33, Fig. 1E as follows: Ground, Er2 front, Er6 back, Er33, battery.

Er33 operates Er3 in an obvious circuit.

Er2 also operates Ir50, as follows: Ground, Tr18 back, ET wire 4, Er2 front, EI1 wire 14, Ir50, battery.

Ir50 operates Ir49, as follows: Ground, Er13 back, EI1 wire 21, Ir50 front, Ir49, battery.

Er2 also operates Mr1, Mr2 and Mr3, as follows: Ground, Qr14 back, EQ, Er2 front, Er24 back, Er23 back, Er22 back, Er21 back, EM wire 1, Mr1, Mr2 and Mr3, battery.

Er1 is operated from the front 3 contact of Er2. The circuit therefore will be described below.

Er1 also operates Cr51, Cr52, Cr53 and Cr54, via ground, Er1 front 5, Er26 back, CE wire 1, Cr51 and Cr52, to battery; and via ground, Er1, front, Er27 back, CE wire 2, Cr53 and Cr54, battery.

Cr51 and Cr53 operate Cr18, as follows: Ground, Cr53 front, Cr51 front, Cr42 back, Cr18, battery.

Cr18 operates Cr19, as follows: Ground, Cr18 front, Cr43 back, Cr19, battery.

Cr19 operates Cr20 in an obvious circuit.

The operation of Er1 and Er2 also initiates exploring operations by which holes punched in the card in the column concerned in the calculation are read as will now be explained. The operator assures herself that there are cards duly perforated with a record of the "problem" of the calculation operation to be performed in the input hopper of the CEP machine as shown schematically in Fig. 8, which hopper is provided with a card feeding device including a card picker and skid rolls CDG which are well known in the business machine art, as may be seen from the Rice patent, Fig. 2, where the card is fed out of the punch and deposited in a pocket 41 while another card is picked from the bottom of a stack 42 and fed into the punch preparatory to another setting and punching operation. These parts form no part of the present invention and therefore are not shown in detail in the drawings. In the present instance such a mechanism operating in timed relationship with the rest of the machine seizes a card from the bottom of a stack at the proper time and positions it beneath the explorer head EXA. This mechanism may be controlled by the same motor or motor start key which controls the CEP machine.

The operator also closes the "general key" EK103, Fig. 1E, and the "cycle key" EK104, which are shown operated in Fig. 1E, at the CEP machine. These keys provide for emergency control only and may hereafter be considered as permanently operated. The machine is also provided with "card contact" E100, Fig. 1E, of a known type, mechanically actuated by the explorer mechanism which closes when a card is in position beneath the feeler head. A "return contact" E101 opens during the time the feeler and plunger heads, EXA and PLA, are returning to their starting positions after calculating operation, as will be explained later, and closes when the mechanism is ready to start a new operation. This contact arrangement also is a part of the card sensing mechanism and forms no part of the present invention.

Figure 2C:
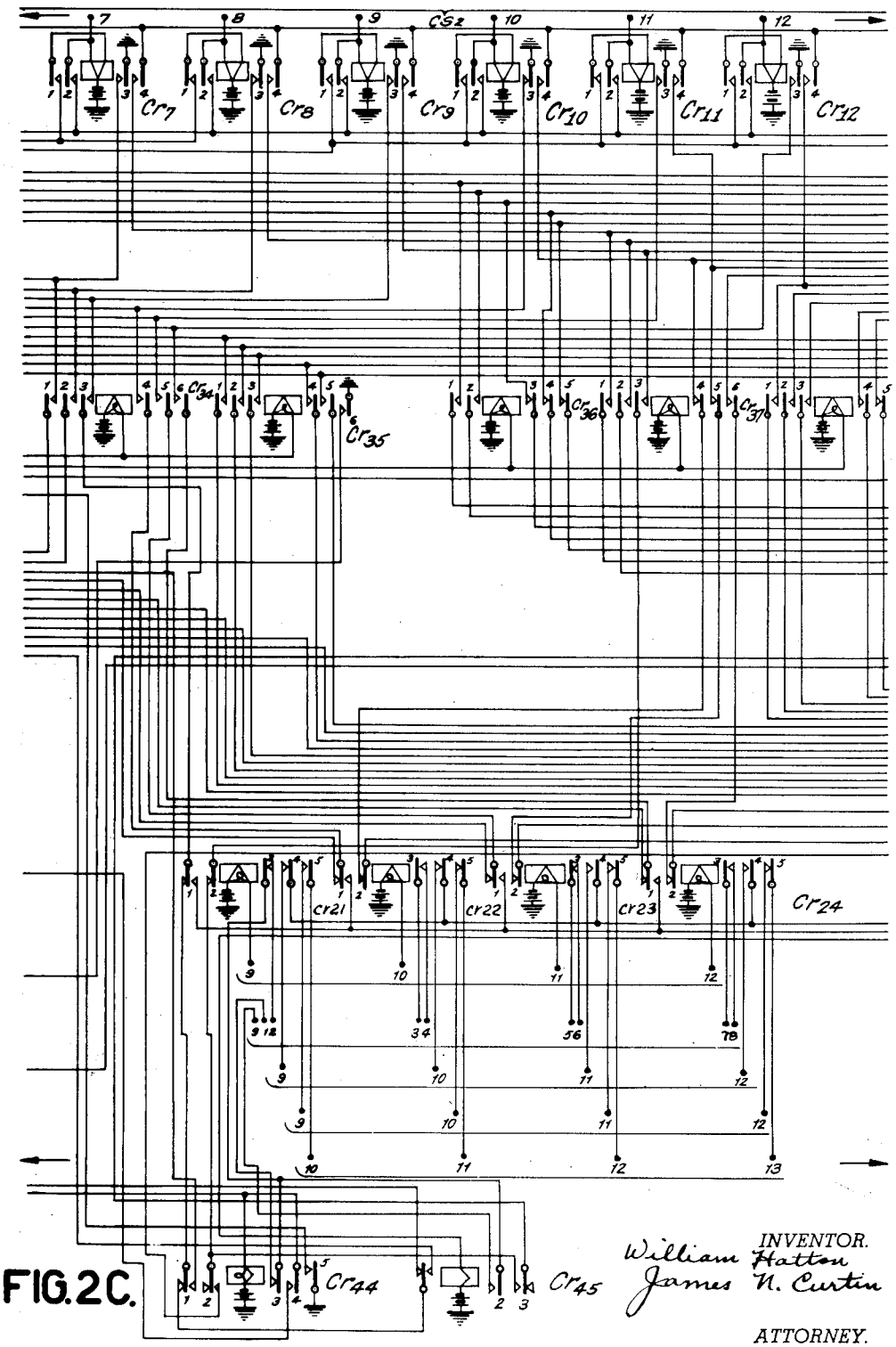
Figure 2D:
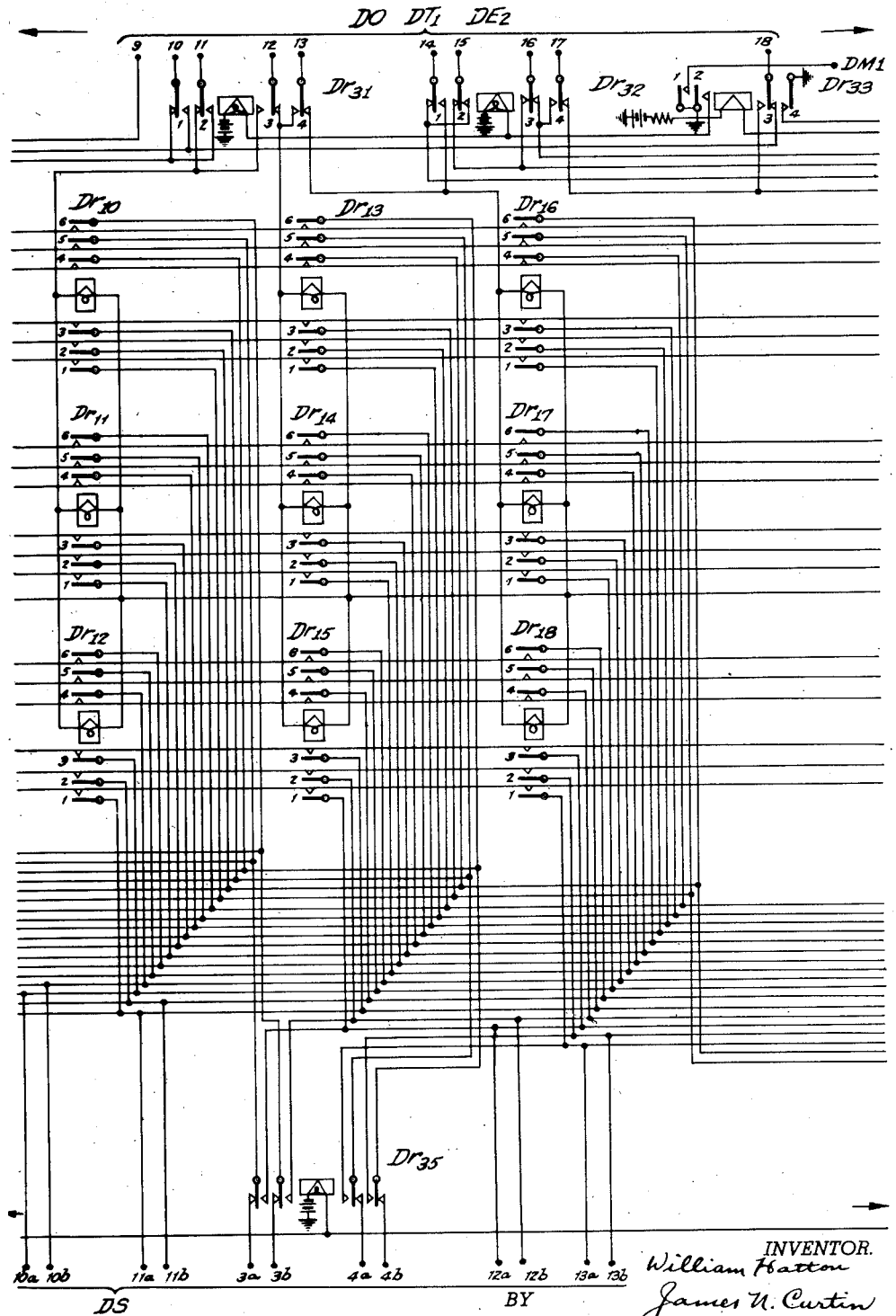
Figure 2E:
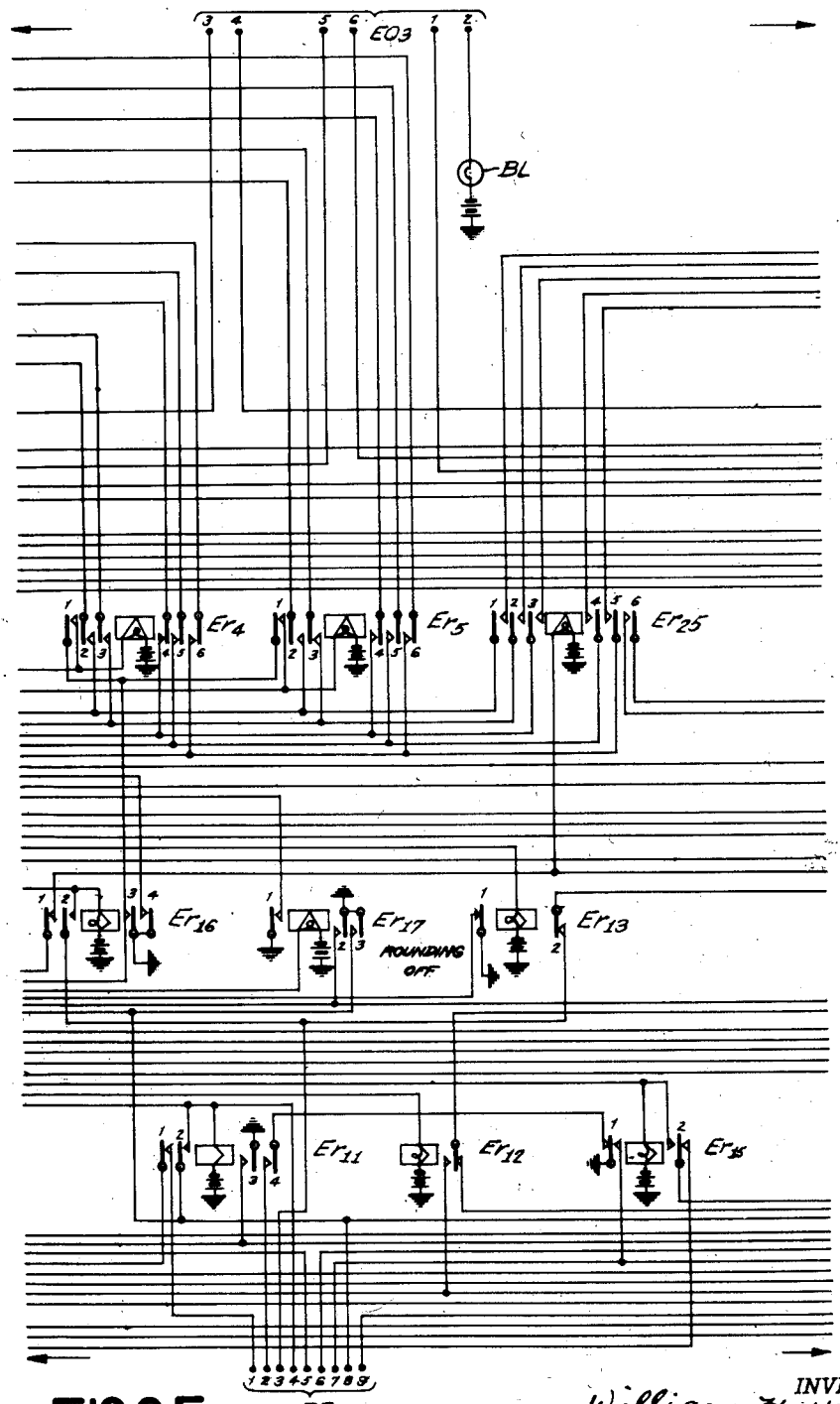
Figure 3E:
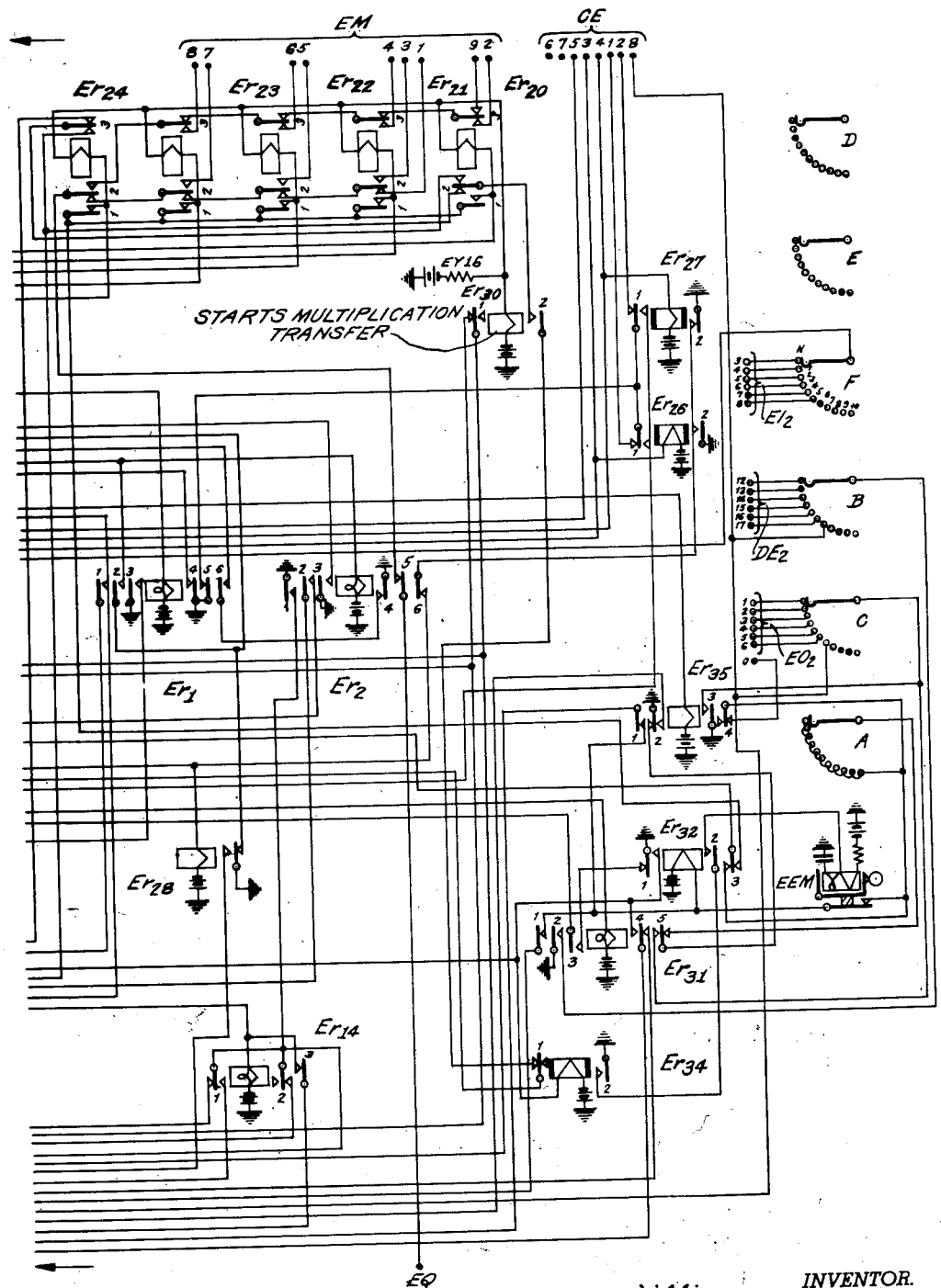
Figure 1G:
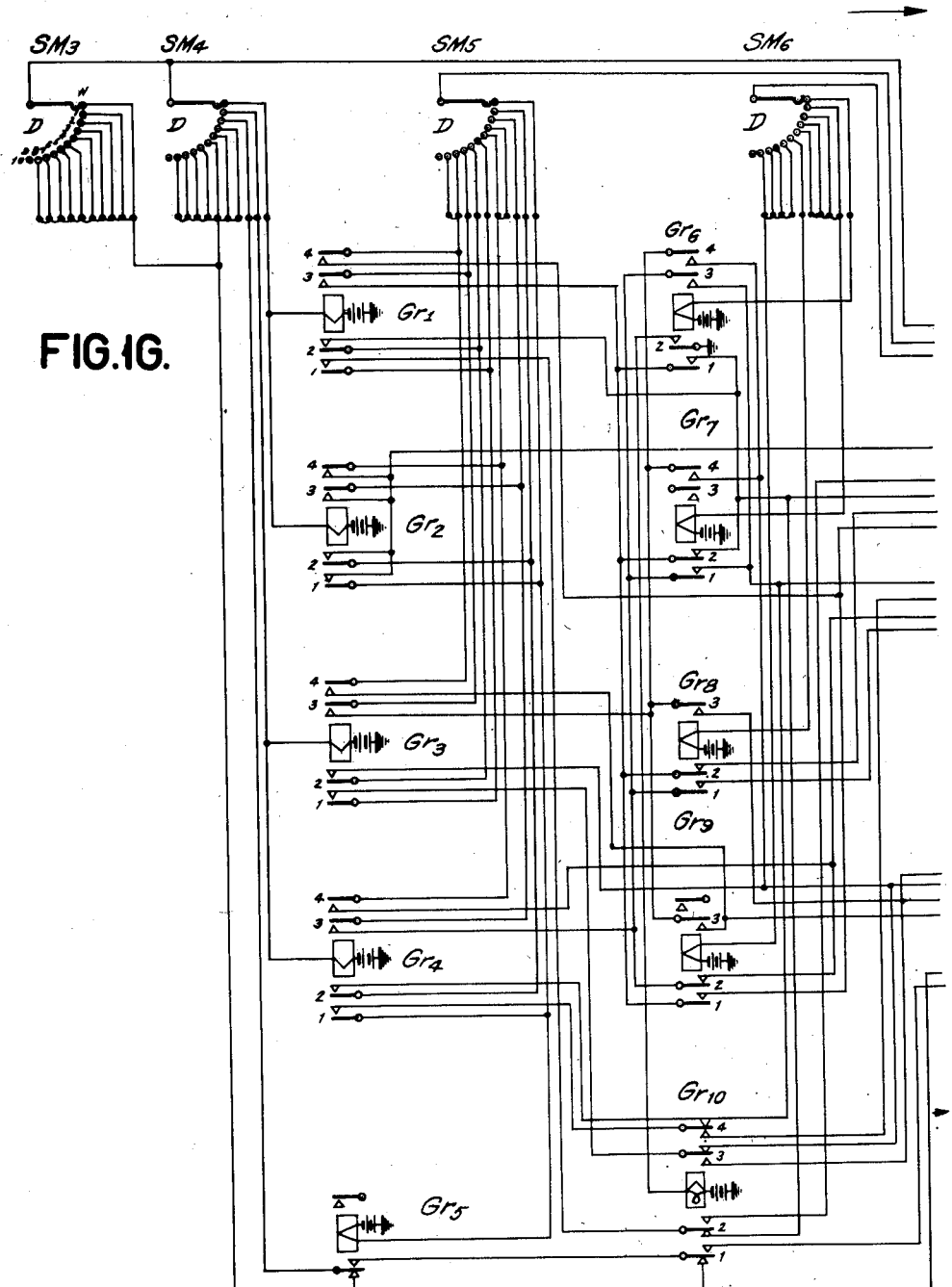

Assuming the card contact and return contact both closed, Er2, Fig. 2E, operates as already described.

Er1 now operates, provided Or1 has been operated, via ground, Er2 front, card contact, returning contact, general key, EO3 wire 3, general start key, Or1 front, EO3 wire 4, Er1, battery.

Er1 locks Er2 independently of the cycle key and the cycle control key via ground, Er28 back, Er1 front, Er2, battery.

*Card reading and number storing*

Whenever a column is to be read, relay Er29 is operated, as will be described later. Advance magnet, E99 Fig. 1E, operates in an obvious circuit from the contacts of Er29, and through the twelve feelers EF (86 in the patent to Rice) in the head EXA of the explorer mechanism, the feeler pins EXG are pressed against the card, as explained. Feeler contact Ef12 closes if there is a hole in the first (top) position in the column, and contacts EF11, EF0, EF1, EF2, EF3, EF4, EF5, EF6, EF7, EF8 and EF9 if there are holes in the second, third ... and twelfth positions, respectively. Thus, contacts EF12, EF11, EF0, EF1, EF2 and EF3 are used to signal the digital value represented by the perforations in the upper half column and contacts EF4, EF5, EF6, EF7, EF8 and EF9 that in the lower half column. When the advance magnet E99 releases the feeler head EXA advances, to the next column on the card where the operation is repeated. A circuit is maintained between each of the feelers EF through contacts EF12, EF11, EF10 ... and external circuits by means of a conventional bus bar E105 and wiper E106 arrangement.

Figure 2M:
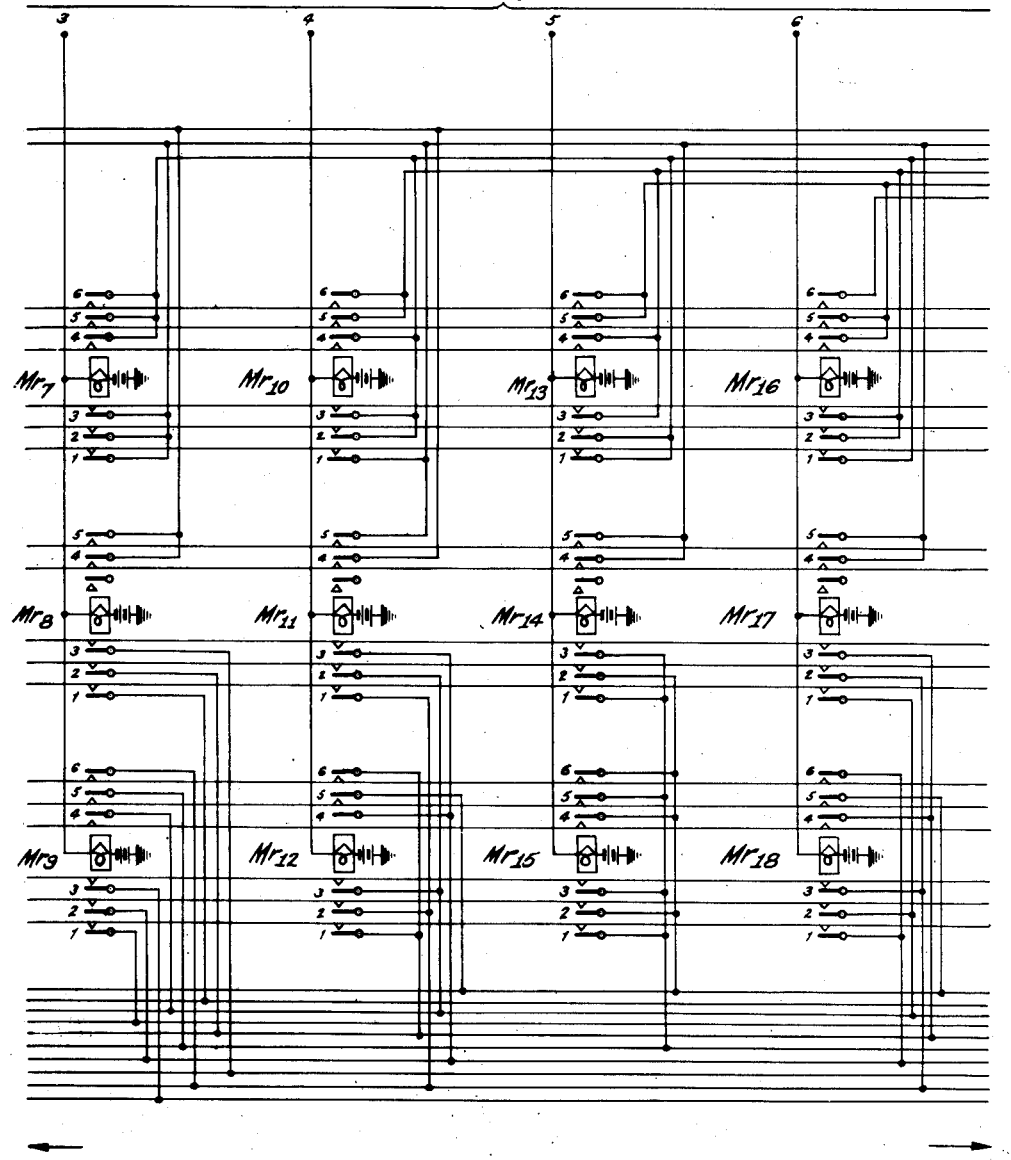
Figure 2O:
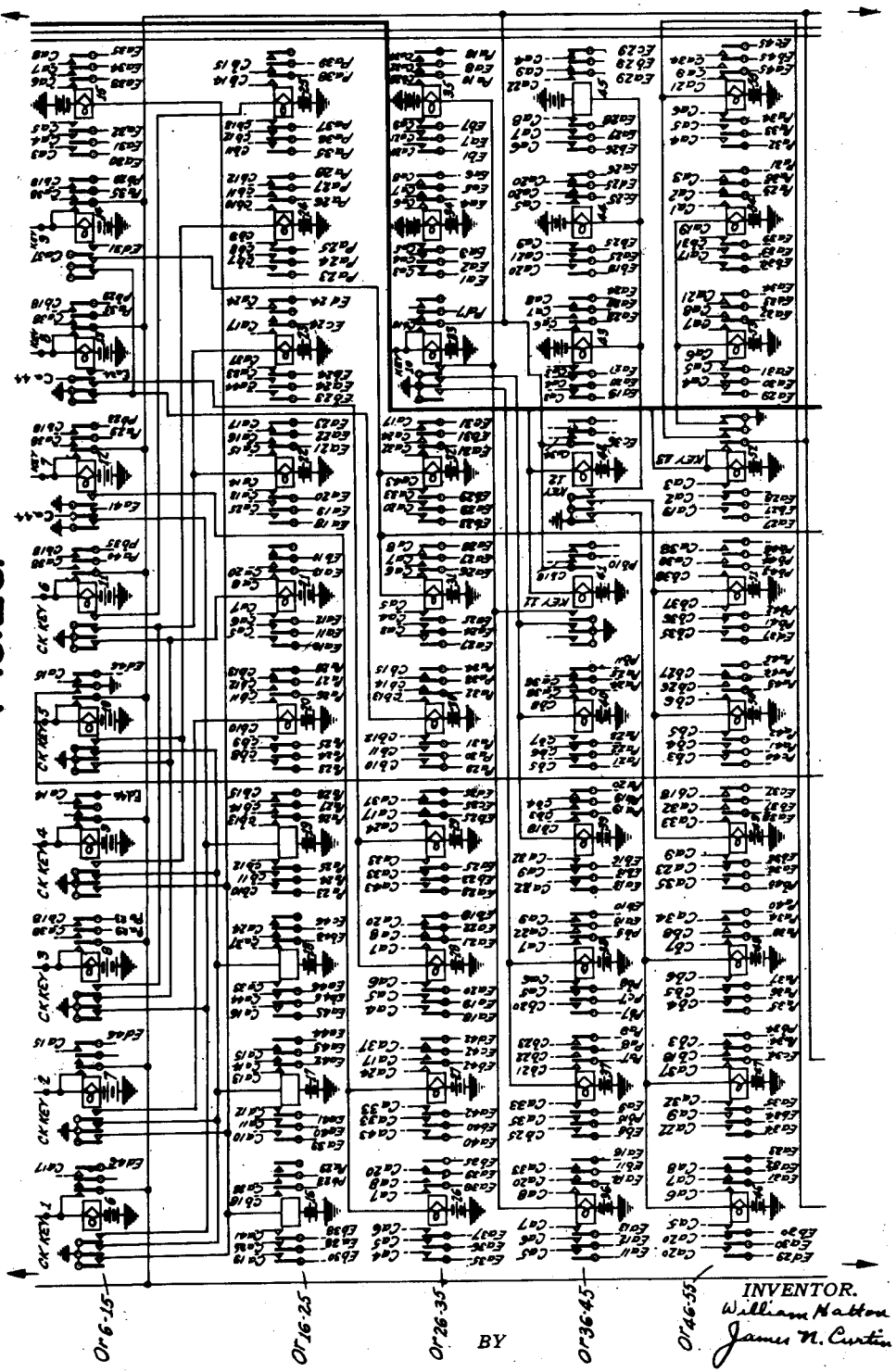

The feeler head EXA also carries, at EXB, the five brushes Ea, Eb, Ec, Ed, Ee, already referred to which wipe over a bank of forty-six sets of terminal contacts Ea, Eb, Ec, Ed, Ee, as the head advances, to signal to the control circuit, Figs. 1o, 2o, and 3o, to which these contacts are wired, the position in which the feeler head EXA is standing.

The control circuit, depending upon the relay combinations set up therein, controls the use the calculator makes of the reading of the card in any given position.

The various CK keys operate different groups of Or relays. These relays once operated remain energized until the particular series of calculation operations controlled thereby has been completed. The tongues and contacts of the Or relays merely establish circuits between predetermined contacts in the perforator contact field or the explorer contact field and the Ca and Cb contact strips. To these two terminal strips are wired various multiples extending to other parts of the equipment. The respective wires of each multiple are numbered with the same digits as that used on the contact strips.

For example, if CK1 has been depressed relays Or6, Or15, Or16, Or17, Or18, and Or19 are operated. The following table will show how these relays when operated connect the respective contact fields to various terminals on the Ca and Cb terminal strip and thence to the various multiples.

CK1—Or6, Or15—Or16—Or17—Or18—Or19—

|  |  |  | Multiple | Wire |
|---|---|---|---|---|
| Or6 | Ed46 | Ca17 | DO | 17 |
| Or15 | Ea30 | Ca3 | IO2 | 3 |
|  | Ea31 | Ca4 | IO2 | 4 |
|  | Ea32 | Ca5 | IO2 | 5 |
|  | Ea33 | Ca6 | IO2 | 6 |
|  | Ea34 | Ca7 | IO2 | 7 |
|  | Ea35 | Ca8 | IO2 | 8 |
| Or16 | Eb30 | Ca19 | EO1 | 19 |
|  | Ea38 | Ca25 | EO1 | 25 |
|  | Eb38 | Ca41 | CO41 | 41 |
|  | Pb23 | Cb18 | OP1 | 18 |
|  | Pa29 | Ca38 | EO1 | 38 |
| Or17 | Ea39 | Ca10 | DO | 10 |
|  | Ea40 | Ca11 | DO | 11 |
|  | Ea41 | Ca12 | DO | 12 |
|  | Ea42 | Ca13 | DO | 13 |
|  | Ea43 | Ca14 | DO | 14 |
|  | Ea44 | Ca15 | DO | 15 |
|  | Ea45 | Ca16 | DO | 16 |
| Or18 | Eb45 | Ca44 | EO1 | 44 |
|  | Ea46 | Ca33 | EO1 | 33 |
|  | Eb46 | Ca37 | OT1 | 37 |
|  | Ec46 | Ca24 | EO1 | 24 |
| Or19 | Pa23 | Cb10 | OS1 | 10 |
|  | Pa24 | Cb11 | OS1 | 11 |
|  | Pa25 | Cb12 | OS1 | 12 |
|  | Pa26 | Cb13 | OS1 | 13 |
|  | Pa27 | Cb14 | OS1 | 14 |
|  | Pa28 | Cb15 | OS1 | 15 |

The circuit arrangement set up by the operation of key CK1 might be used for labor cost calculation. For example, if piece work cost were to be calculated, the number of pieces in this case would be punched in positions 30 to 35 at the top of the card, which is to be multiplied by the unit price punched in positions 38 to 44 at the top of the card. The decimal point is behind position 41. The product is to be perforated in positions 23 to 28 at the bottom of the card. Two decimals are required in the solution after having been rounded off to the third decimal.

With this operation the perforations in the top half of column 30 will first be read and the value of the digits they represent will be recorded on a set of storage relays in the input storing circuit, Figs. 1I, 2I and 3I, comprising relays Ir11, Ir12, Ir13, Ir14, Ir15. The windings of these relays are individually connected by the wires of the IE1 multiple to the five bottom terminals 11, 0, 1, 2 and 3 of bus bars E105, Fig. 1E. At this point, we are not concerned with the circuits affected by the operation of these relays. As soon as the feeler head is standing over column 30 two circuits are closed as will be seen from the above table. Er4 operates to determine that the upper half of the column is to be read via the following circuit: Ground, Er1 front, brush Eb in position 30, Or16 front, terminal Ca13, EO1 wire 19, Er4, battery. If the circuit from the contact field was such that Er5 was operated then the lower half of the column would be read. The operation of Er4 connects feelers EF11, EF0, EF1, EF2 and EF3, respectively to wires 9 to 13 of the EI1 multiple. If Er5 had operated, EF5 . . . EF9 would have been connected to these wires instead in which case the lower half of the column would be read. Er5 is operated by an operating ground from the contact field on EO1 wire 20.

It will be noted that Er4 locks to ground at Er3 front 6. Ir53 operates by the following circuit to direct the digital value indication to the third set of storage relays: Ground, Er1 front, brush Ea in position 30, Or15 front, terminal Ca3, IO2 wire 3, Ir53, battery. Assuming that a hole has been punched in positions 2 and 6 of column 30 of the card to represent digit 2 in the upper half column, feeler contacts EF11 and EF3 will have closed and Ir11 and Ir15 operate to record this digit as follows: Ground, feeler contact EF11, Er4 front, EI1 wire 9, Ir53 front, Ir11, battery; and a similar circuit for Ir15. In this manner the holes punched in either half of any column of the card can be read and the digits they represent recorded on a set of storage relays. Eight such sets of five relays, Ir1 to Ir40 are provided and the input storing circuit is thus capable of recording a maximum of eight digits, one on each set. The first set comprises Ir1 to Ir5, the second Ir6 to Ir10, and so on to the eighth set comprising Ir35 to Ir40.

Digits are recorded on a relay set by operating none, one or two of its relays. The code chosen corresponds to that used for the perforations in the cards, except that the digit 0, represented by a hole in the top position of a half column, is recorded by leaving all the relays unoperated. Thus, the relays operated in the first storage set to record the different digits are as follows:

| Digit | Feeler contacts closed | Relays operated |
|---|---|---|
| 0 | 12 or 4 | None. |
| 1 | 11 or 5 | Ir1. |
| 2 | 11 and 3 or 5 and 9 | Ir1 and Ir5. |
| 3 | 0 or 6 | Ir2. |
| 4 | 0 and 3 or 6 and 9 | Ir2 and Ir5. |
| 5 | 1 or 7 | Ir3. |
| 6 | 1 and 3 or 7 and 9 | Ir3 and Ir5. |
| 7 | 2 or 8 | Ir4. |
| 8 | 2 and 3 or 8 and 9 | Ir4 and Ir5. |
| 9 | 3 or 9 | |

Since no storage relays operated to record a digit of 0 value, and since this digit is represented on the card by a hole perforated in position 1 (upper half column) or 7 (lower half column), the feeler contacts EF12 and EF4 which close when holes are encountered in these positions, are not connected to the calculator.

A digit may be recorded in any storage set, as desired, by operating one of eight routing relays Ir51 to Ir58 at the appropriate time from the explorer contact field. The operation of Ir51 selects the first set, Ir52 the second, etc. If the last digit of a number is recorded on the eighth set the penultimate digit is recorded on the seventh, etc.

Control of explorer

The feeler head EXA of the explorer mechanism begins to advance step by step from column to column, exploring each in turn, since Er1 operates when the equipment is set in motion, as described. In principle, it continues to advance until the first number to be read from the card has been read and the digital values recorded in the input storing circuit, when its motion is arrested. It is caused to advance again as and when further columns are to be read. Current impulses to energize and de-energize the advance magnet E99 and so advance the feeler head, are created by a group of relays Er8, Er9, Er10 and Er29, set in motion by the operation of Er19. Er19 may be energized in various ways at different stages of a calculation operation, and the feeler head EXA continues to advance so long as it is operated. It is first energized upon the operation of Er1, as follows: Ground, Tr2 back, Tr1 back, ET wire 7, Er30 back, Er12 back, Er1 front, Er19, battery.

Er19 energizes Er8, as follows: Ground, Er19 front, Er9 back, EY2, EY3, EY4, Er8, battery. Er8 energized Er10 and Er10 energizes Er9 in obvious circuits. Er9 releases Er8, Er8 releases Er10, and Er10 releases Er9. Er9 recloses the circuit of Er8 and the cycle begins again.

The release of Er8 is retarded by the discharge of shunting condensers Eq2, Eq3 and Eq5. Similarly, the release of Er9 is retarded by the discharge of condensers Eq4 and Eq6. Every time Er10 operates, it energizes Er29 and Er29 operates the advance magnet as stated, via ground, Er19 front, Er10 front, Er29, EY12, battery. The condenser and resistance values are so adjusted that Er29 is alternately energized and de-energized about six times per second, so that the card explorer explores about six columns per second, until its advance is arrested by the release of Er19. Every time Er29 operates, it energizes Er34 in an obvious circuit, but the latter relay has no function at this stage.

The operating circuit of Er19 may be opened in any of the following ways for arresting the advance of a card explorer, depending on the calculation operation being performed:

(a) By the operation of Tr1 or Tr2. This method is used during operations involving addition and subtraction. These operations will be described later as at present we are only concerned with the control relay Er19. For example, when combination key CK10 has been depressed and Or35 is operated, Tr1 operates to initiate an addition operation as soon as the feeler head reaches position 7, and releases Er19. This circuit is traced as follows: Ground, Er1 front, brush Ea in position 7, Or35 front, terminal Ca21, EO1 wire 21, Er3 front, ET wire 1, Tr1, battery. Tr2 operates in a similar circuit for a subtraction operation when, for example, key CK12 has been depressed, Or45 is operated and the feeler head reached position 29.

(b) By the operation of Er30. This method is used during operations involving multiplication, as will be explained later.

(c) By the operation of Er12. For example, when CK1 has been depressed and Or18 is operated, Er12 operates as soon as the feeler head reaches position 46, and releases Er19 via ground, Er1 front, brush Ea in position 46, Or18 front, terminal Ca33, EO1 wire 33, Er12, battery. The normal step-by-step motion of the feeler head EXA starts from its position 1, over column 1 of the card. The feeler head returns to its starting position in one movement when the return magnet, P101 Fig. 1P, is operated as stated. Since it may happen that the first column to be read is among the last on the card, provision is made to arrest the return motion at a desired position by the insertion of a mechanical stop, and the time otherwise taken at the beginning of the calculation cycle to step the feeler head to this position is saved. This stop arrangement is shown in some of the patents referred to above and is well known in the business machine art. (See for example the skip function as illustrated in Figs. 1 and 5 at 161, 165, 166, 167, 168 and 169, and described on page 4, line 67 of the Rice patent.) The circuit is in no way affected by this restriction of the motion of the feeler head.

*Storing of the first number read from the card*

Whatever the type of calculation operation to be performed, the digital values of the first number read from the card are always recorded in the input storing circuit shown in Figures 1I, 2I and 3I. For example, the first number concerned in the operation for which key CK1 is depressed, is a six digit number and is to be read from the upper half of columns 30 to 35. Routing relay Ir53 is therefore considered to operate while the first digit is being read from the card, so that this digit may be recorded on the third set of storing relays. The remaining five digits will then be recorded on the fourth to eighth sets, respectively. In greater detail, these operations take place as follows:

It has already been explained that when CK1 has been depressed, Er4 operates from ground, Er1 front, contact field, etc. As soon as the feeler head reaches position 30 and locks under the control of Er3, Ir53 operates from the contact field also and one or two of the five relays of the third storage set are operated to record the value of the digit read from the card in the upper half of column 30. The operating circuit for these relays already has been described. These relays lock in an obvious circuit to ground at Ir49 front 1, through the front 1 contacts of the storage relays operated, and remain operated until such time as Ir49 releases. When the feeler head leaves position 30, Ir53 releases, the operating ground circuit therefore being broken by the movement of the feeler head, and when the latter reaches position 31 Ir54 operates instead, as follows: Ground, Er1 front, brush Ea in position 31, terminal Ca4, IO2 wire 4, Ir54, battery. When the advance magnet next operates, feeler contacts close in accordance with the holes encountered in the upper half of column 31. Since Er4 is still operated and Ir54 is now operated, the value of the digit represented by the holes is recorded by the operation and locking of one or two of the five relays Ir16 to Ir20 of the fourth storage set.

When the feeler head reaches position 36, Ir58 releases. The entire first number concerned in the calculation operation has now been read from the card and recorded in the input storing circuit. The use the calculator makes of the record and the further control of the explorer mechanism are determined by signals sent from the control circuit. The number recorded may, in principle, be the multiplicand of a multiplication operation or the dividend of a division operation or another number may be added to or subtracted from it. These possibilities will now be described.

*Addition*

In a calculation operation involving addition, two numbers are read from a card in succession and added together by the calculator. The sum may then either be recorded on the card by the perforation of holes in selected columns, or be retained in the calculator and undergo a further calculation operation, or both. In either case, the digits of the first number read from the card are transferred from the storage relays of the input storing circuit, Figs. 1I, 2I and 3I, upon which they have been temporarily stored, to a set of step-by-step accumulator switches in solution storing sets, Figs. 1S, 2S and 3S. One of the switches is assigned to each digit of the number and is advanced by one step for each unit of the value of the digit transferred thereto. Thus, to transfer the digital value 2 to an accumulating switch, its brushes are advanced by two steps, value 8 by 8 steps, etc.

Figure 3C:
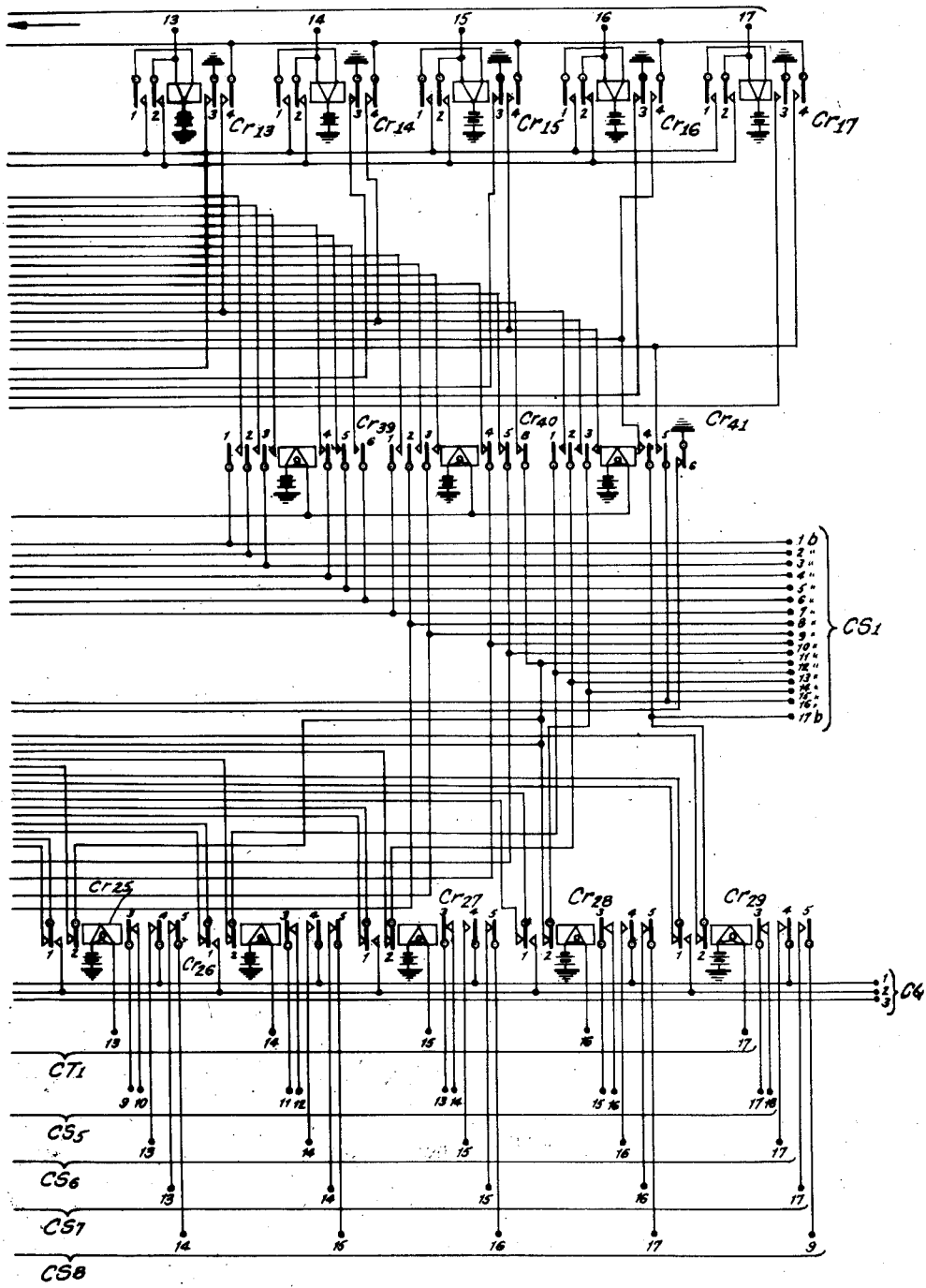
Figure 1D:
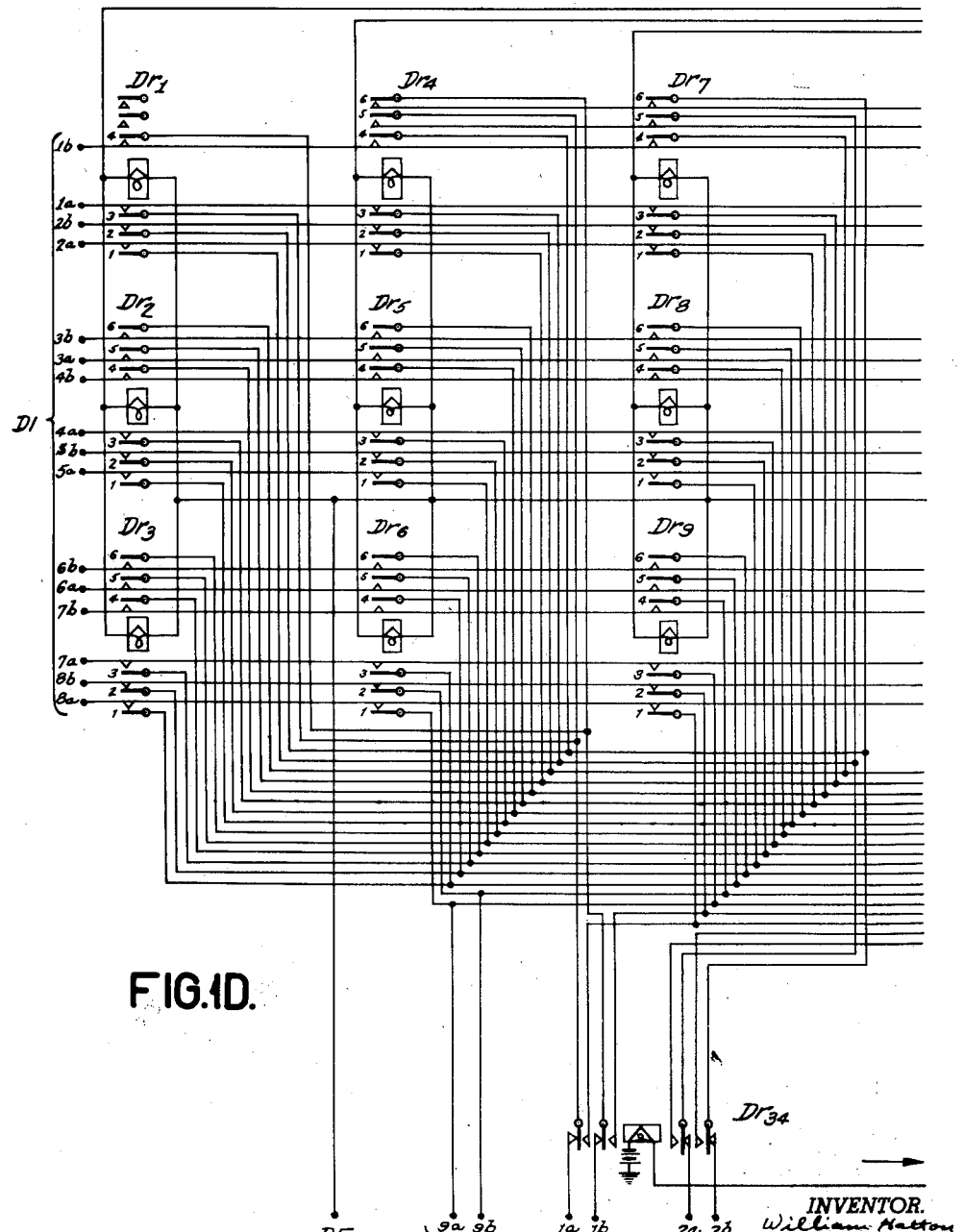
Figure 3D:
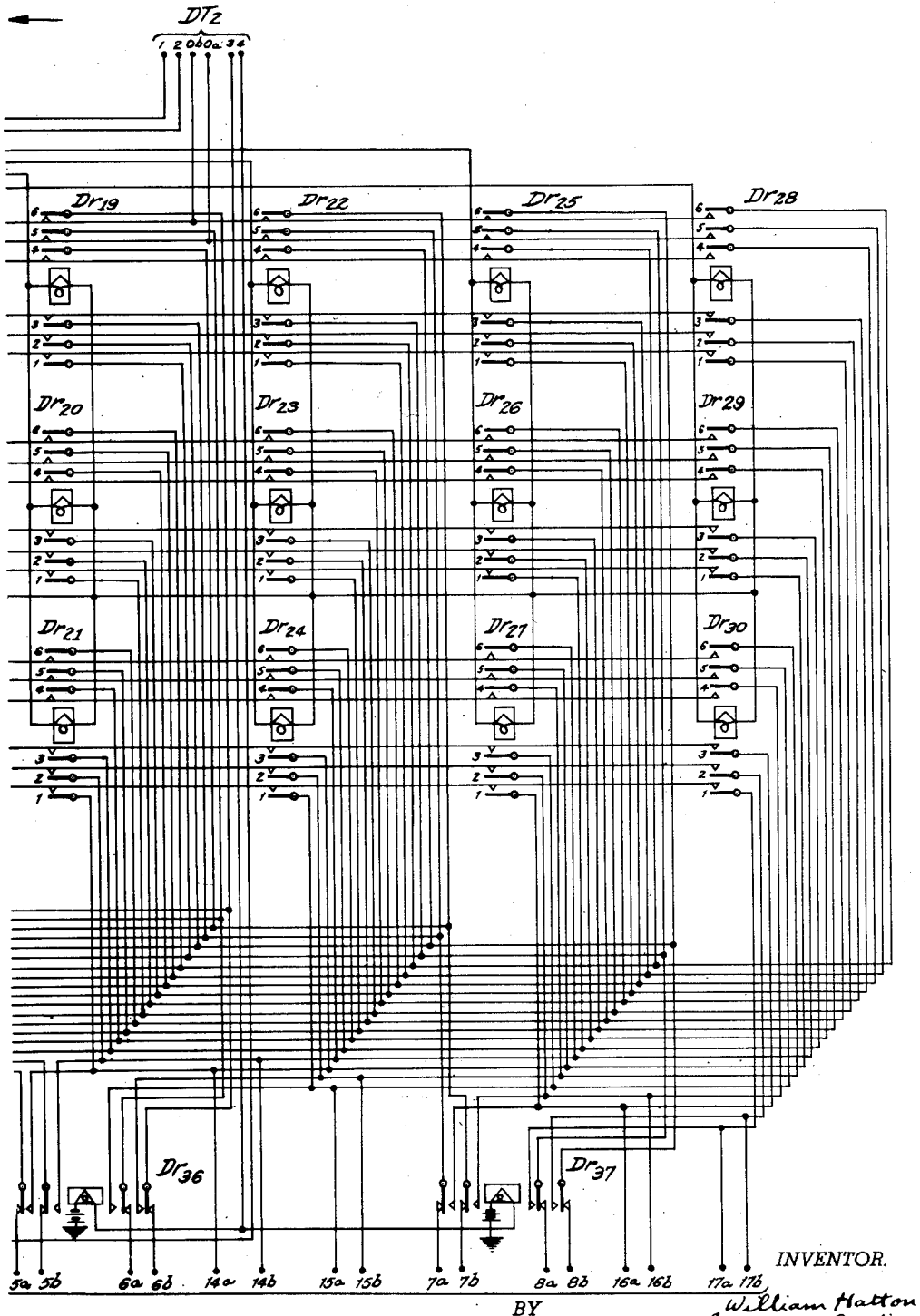
Figure 1M:
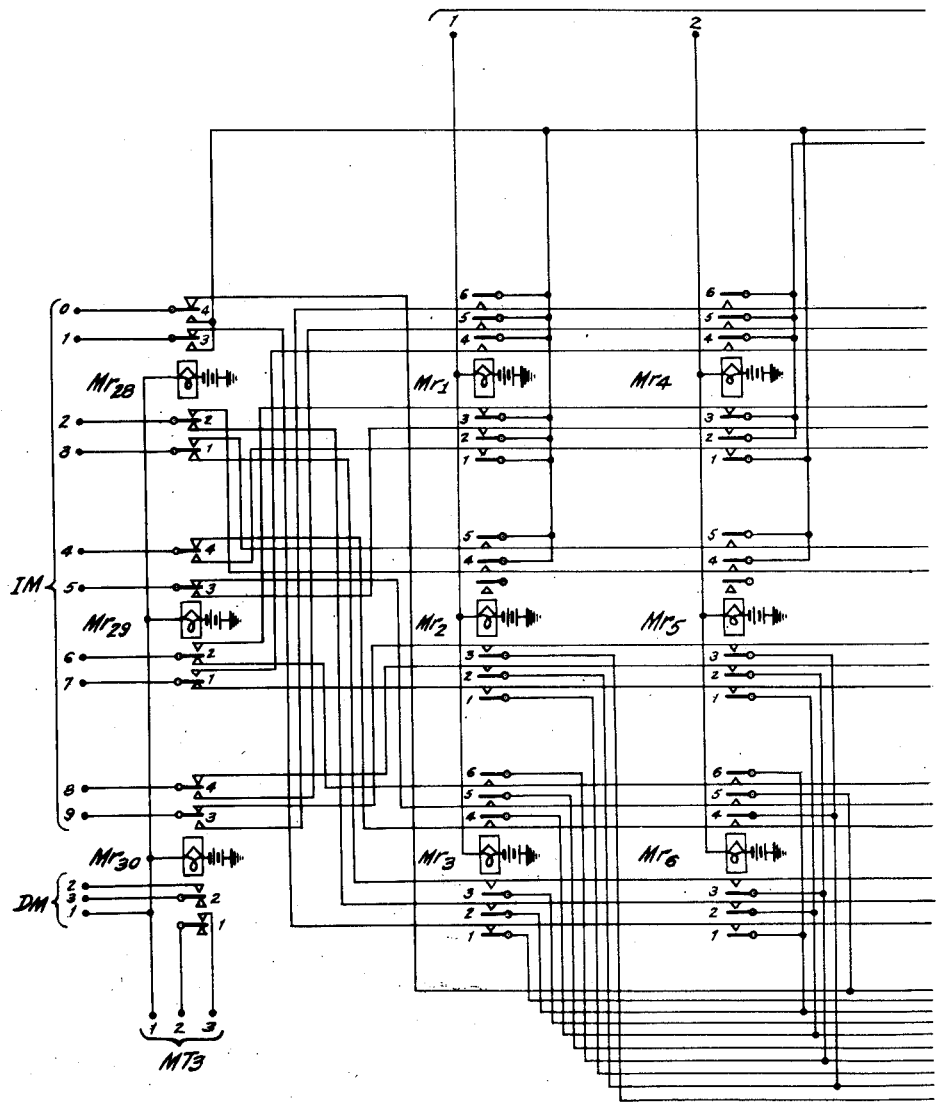
Figure 3M:
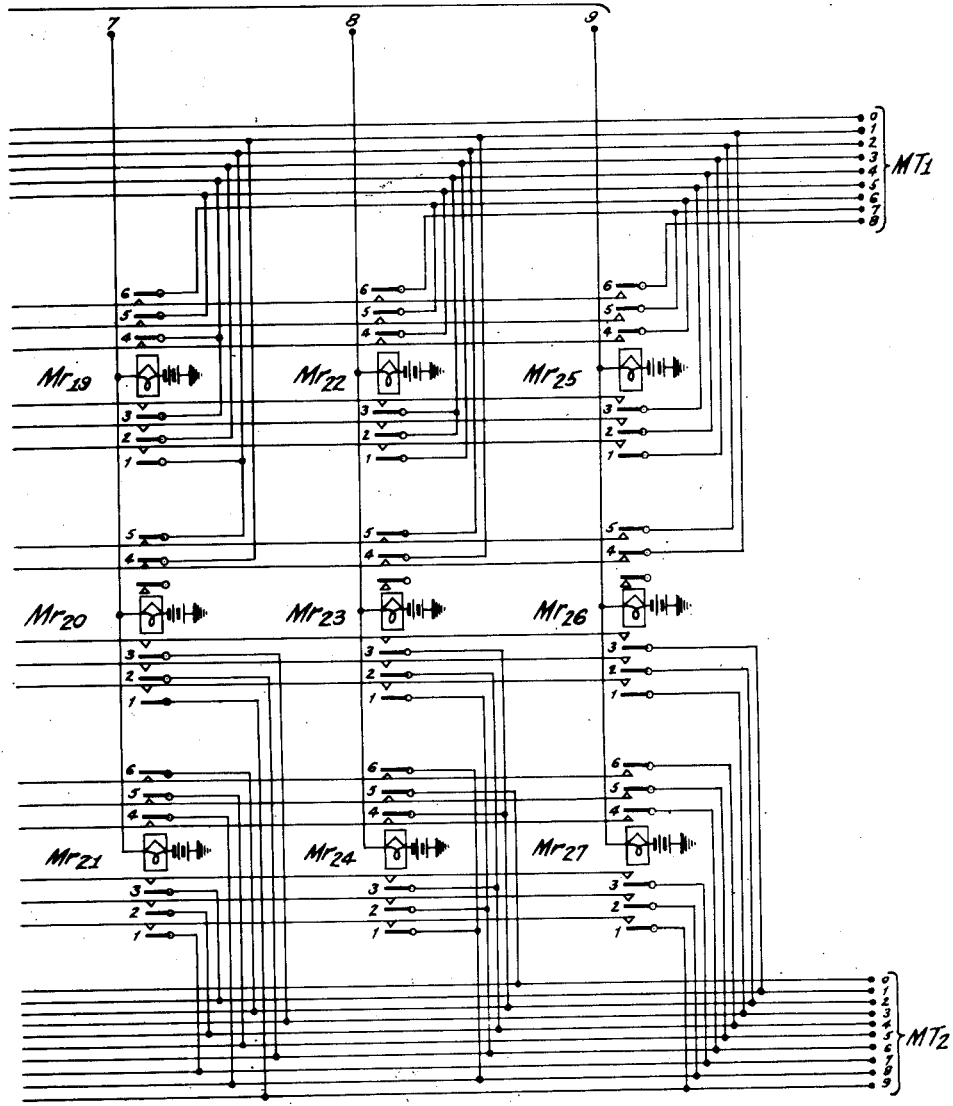
Figure 1P:
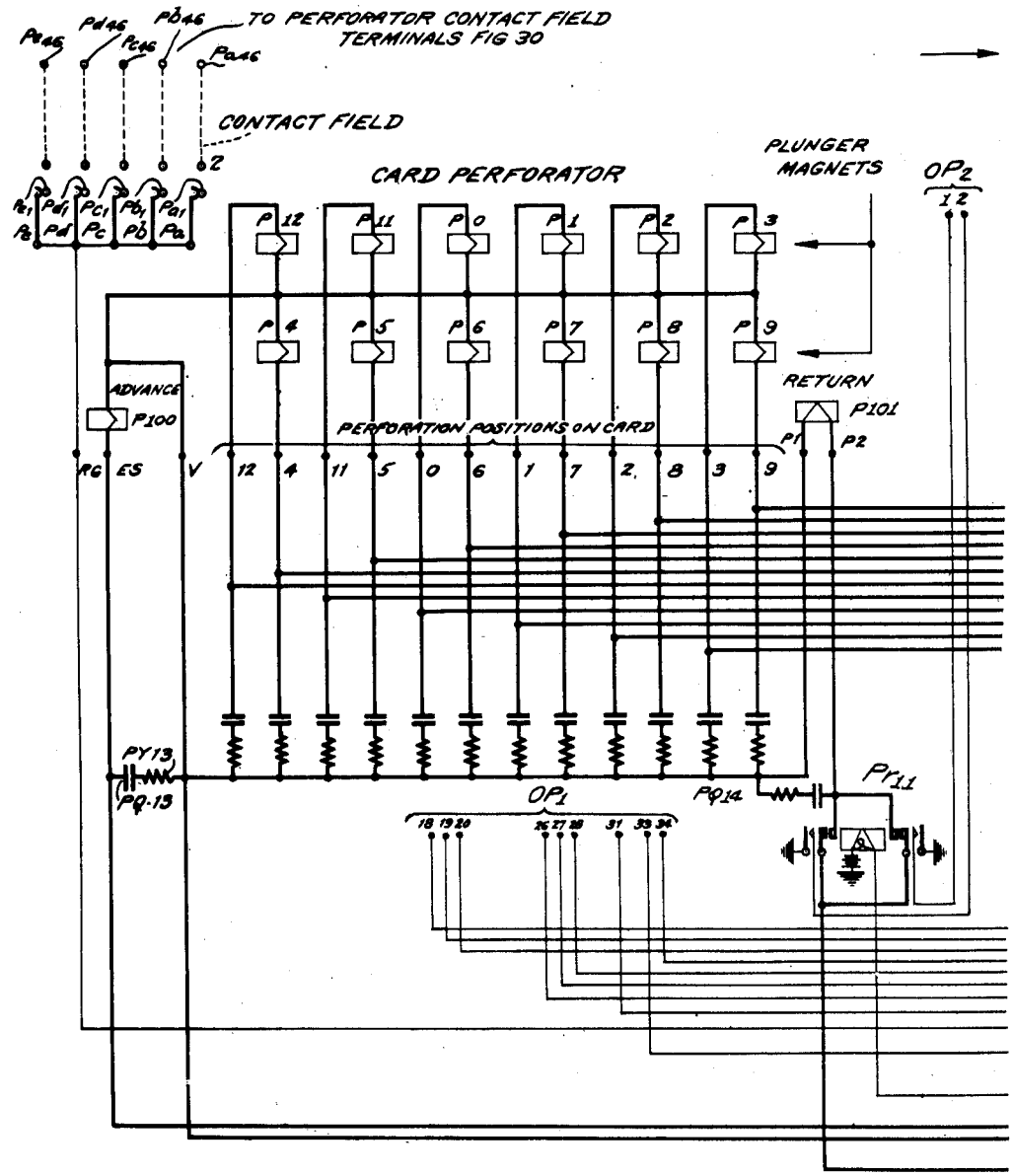
Figure 3P:
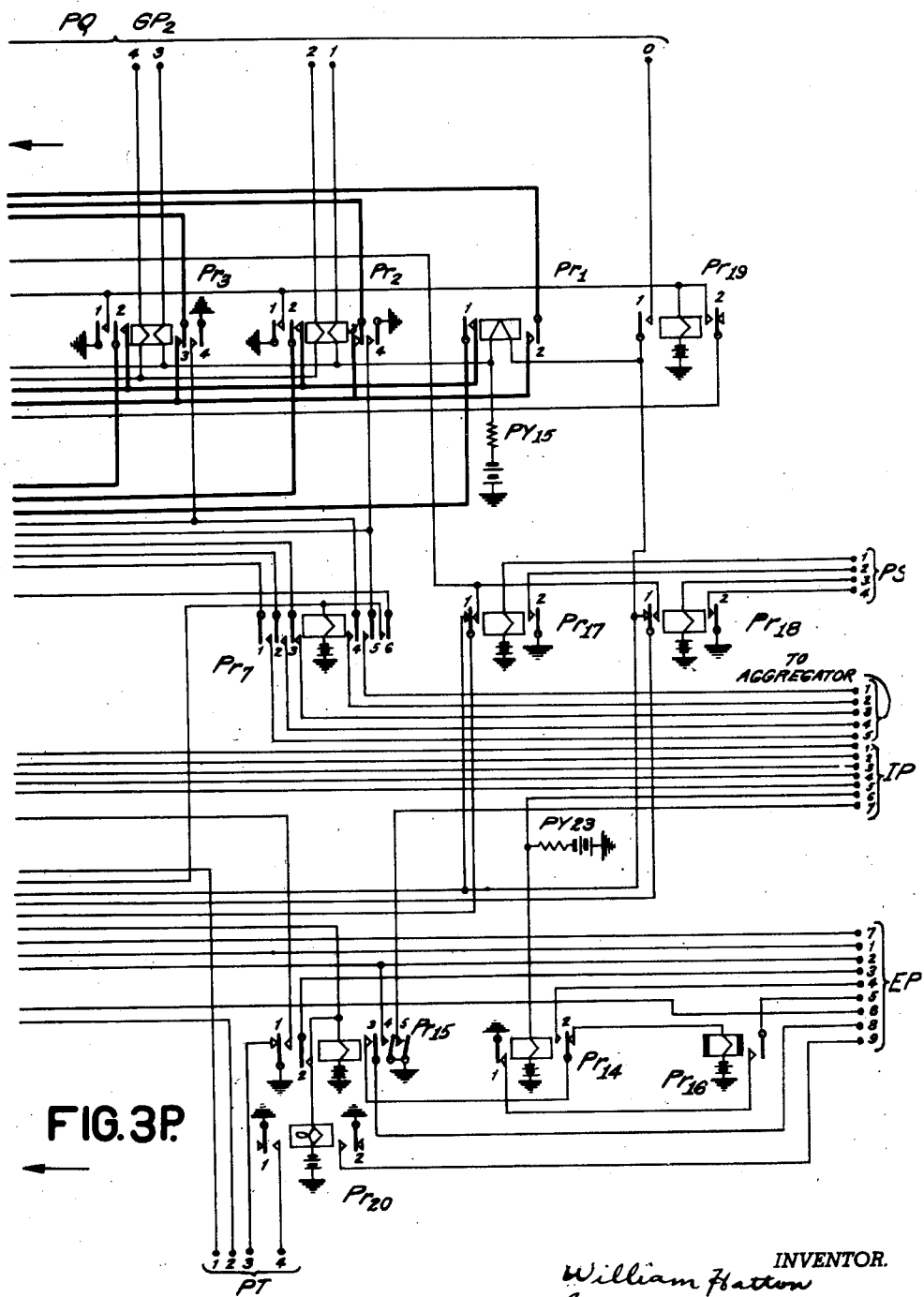
Figure 1Q:
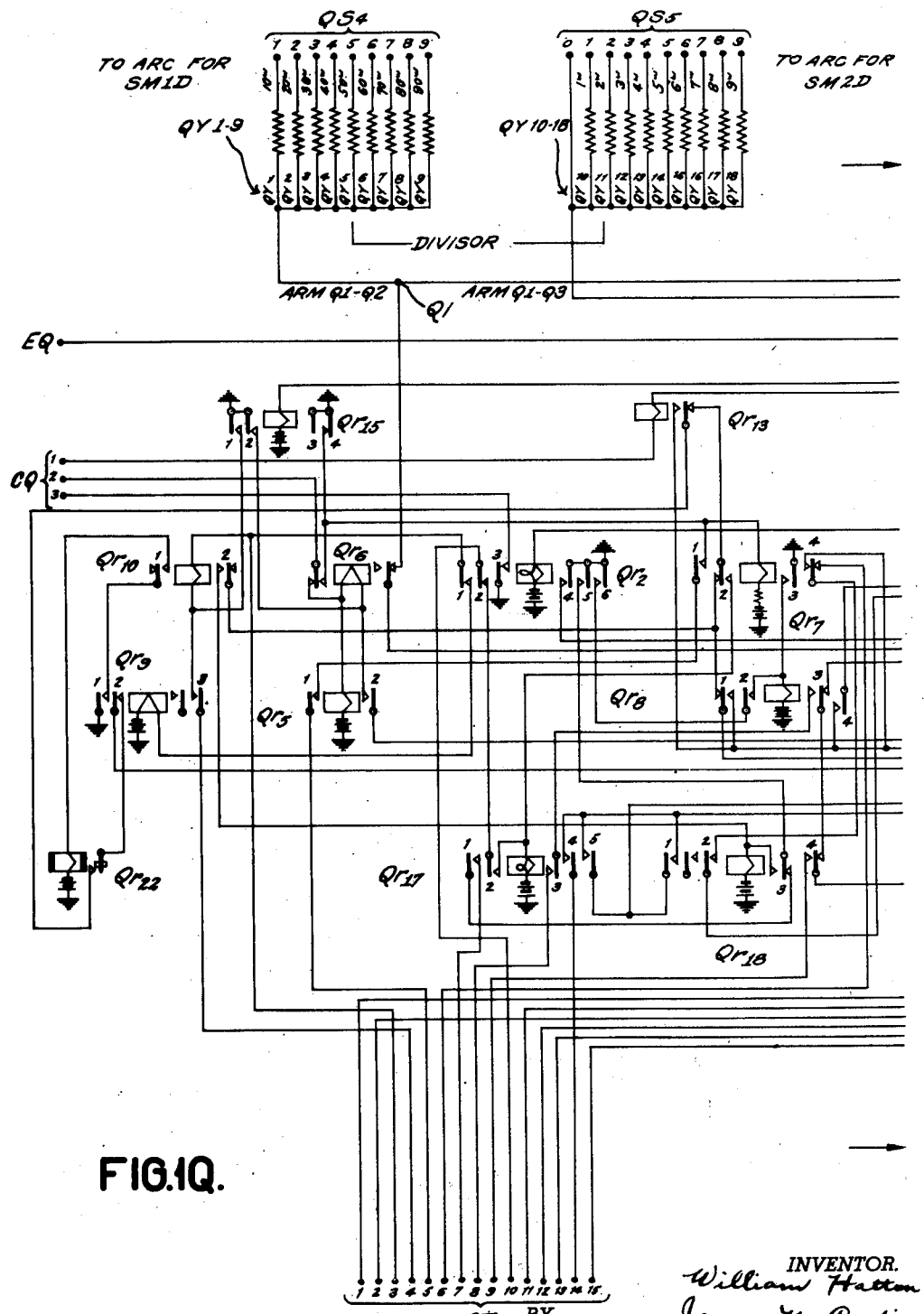
Figure 2Q:
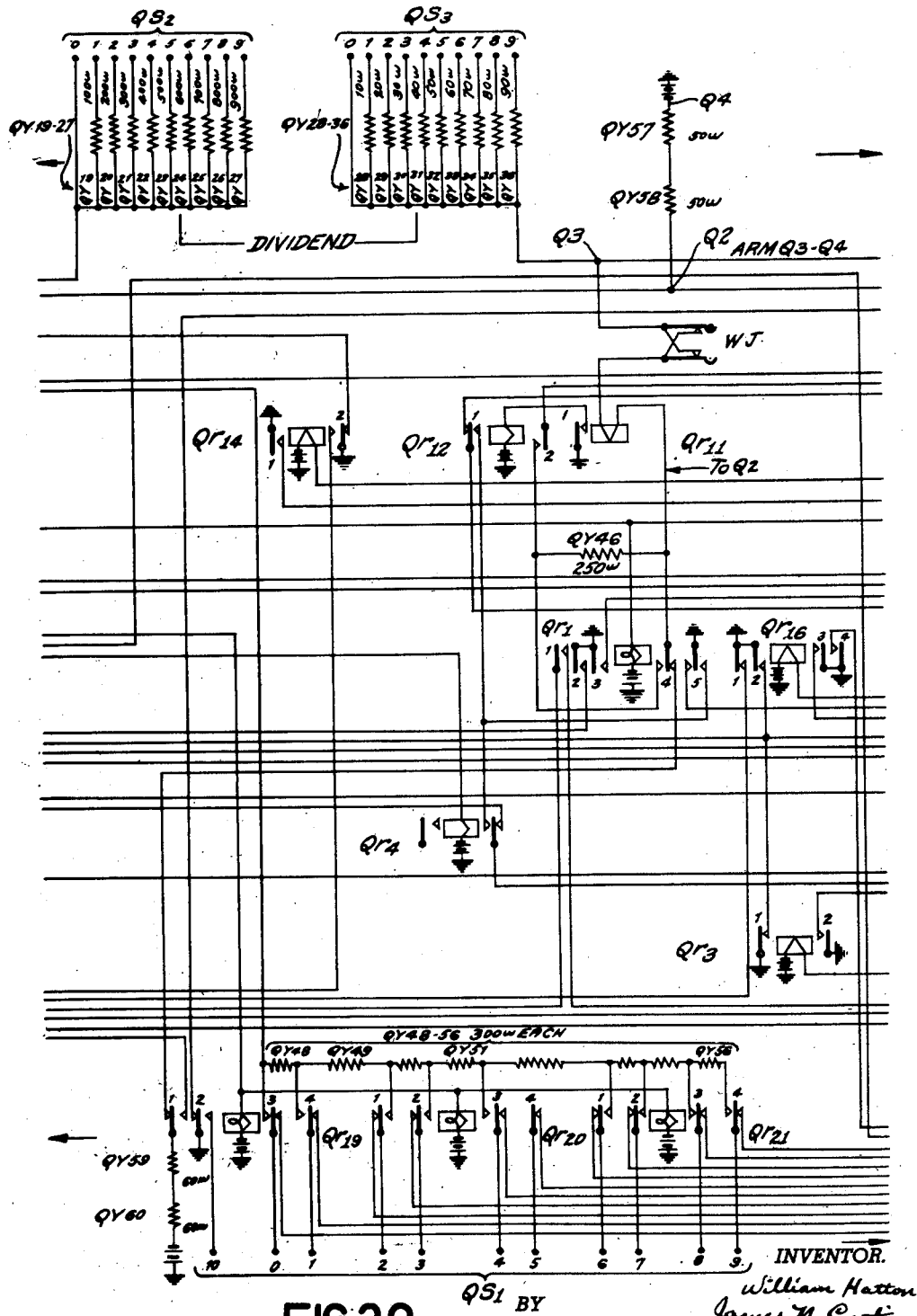
Figure 3Q:
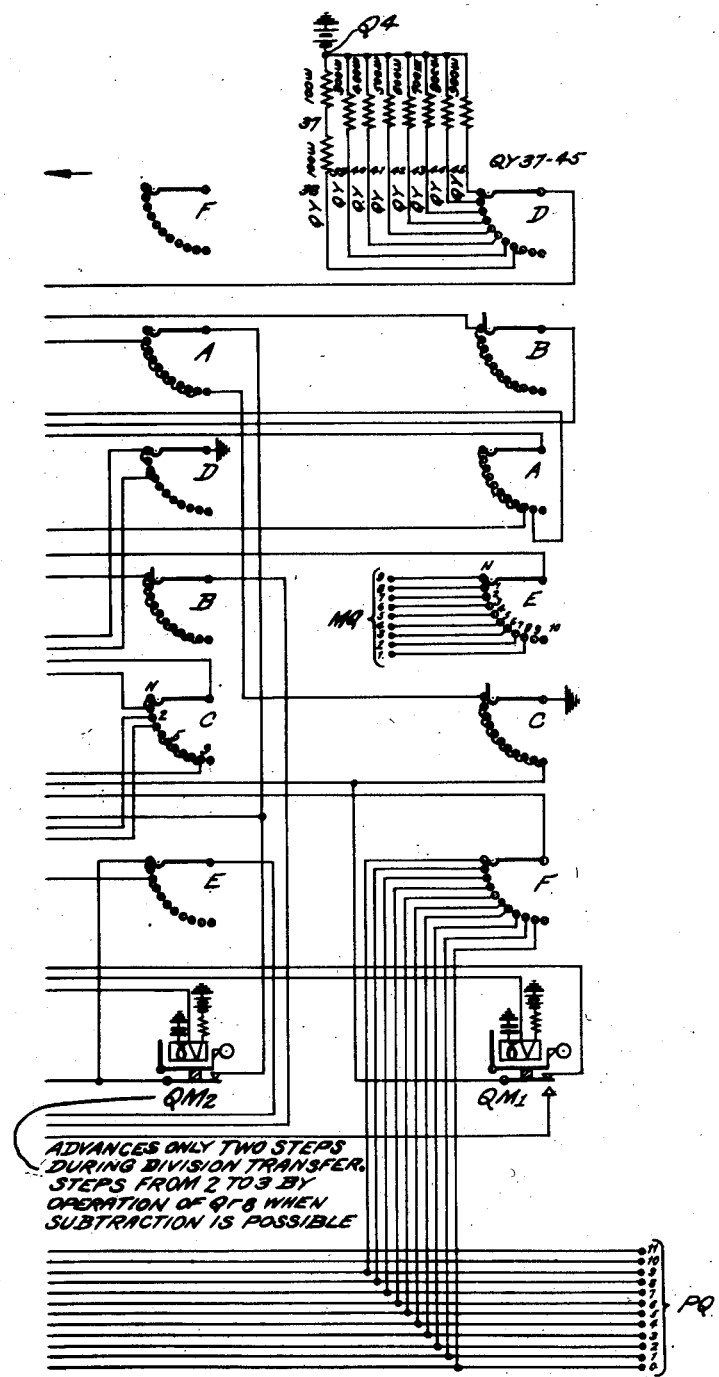
Figure 1S:
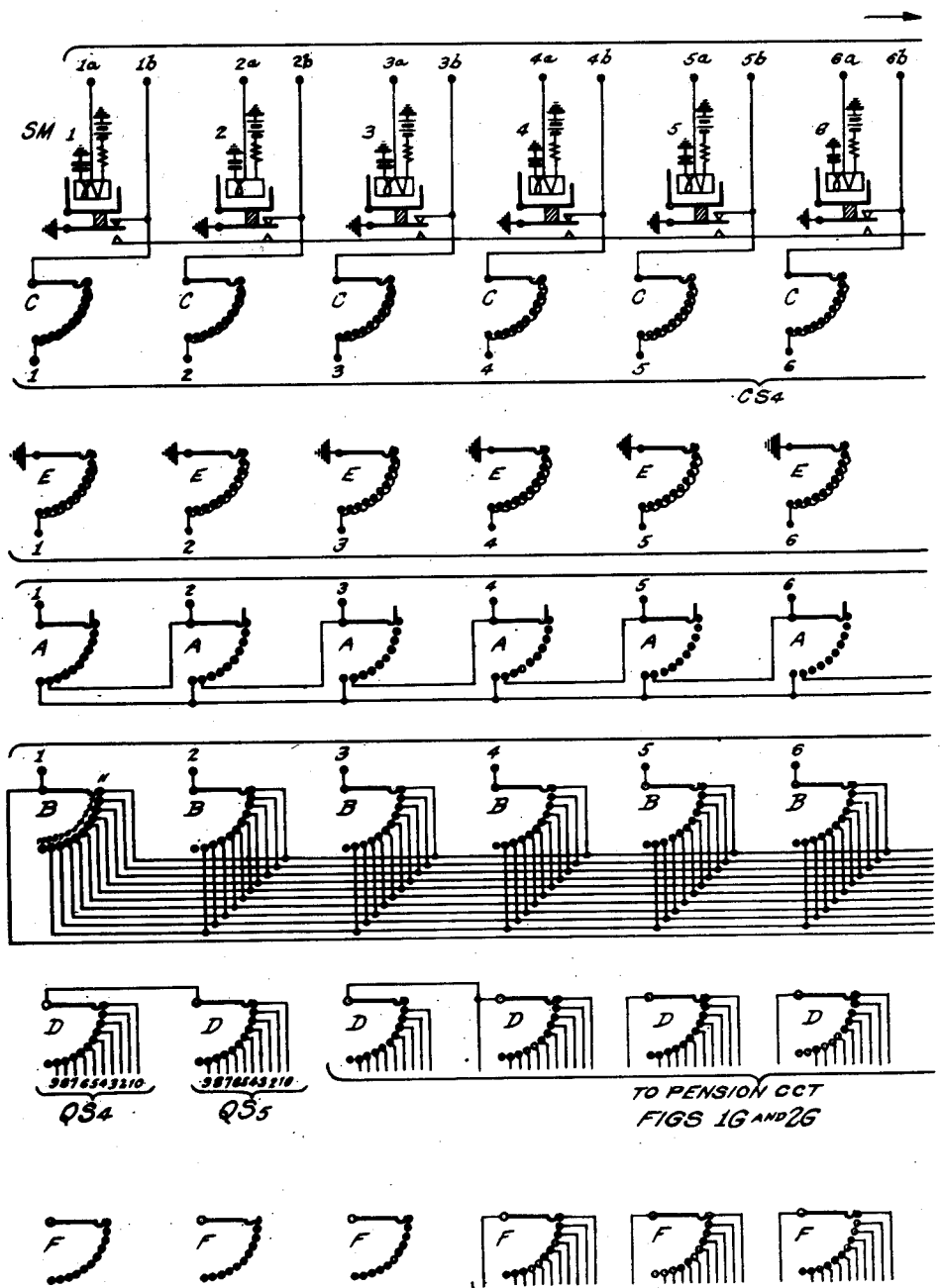
Figure 2S:
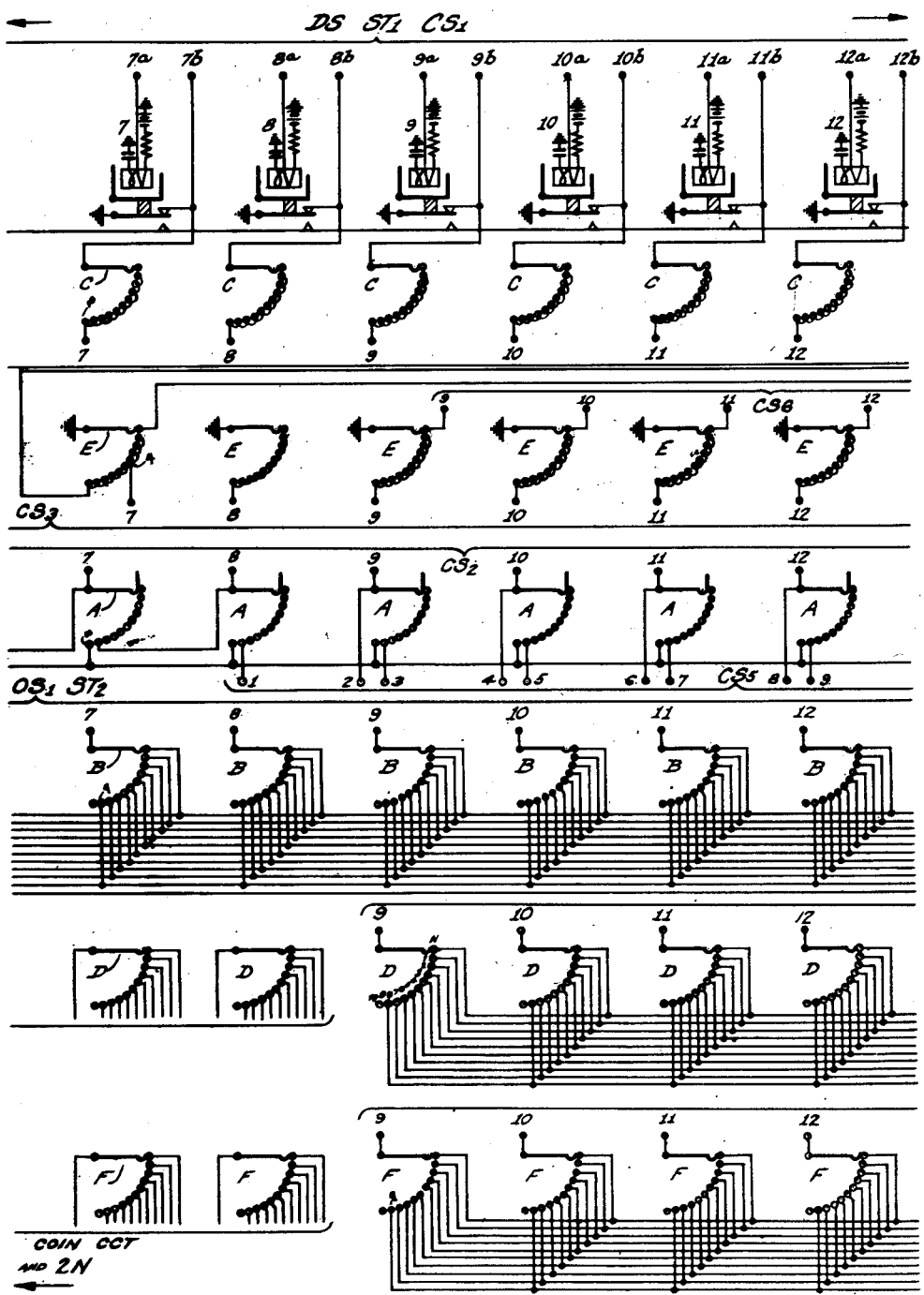
Figure 3S:
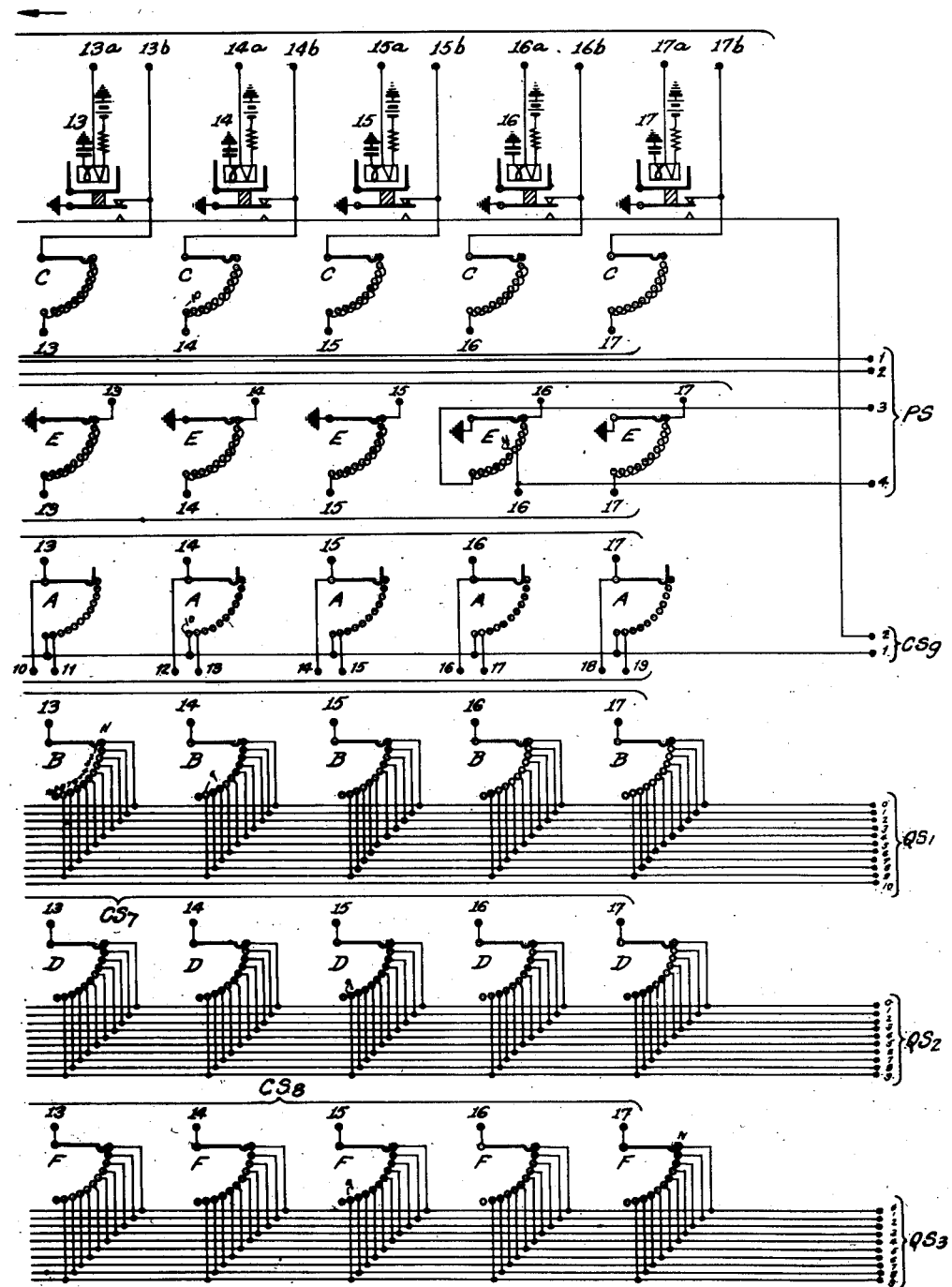
Figure 1T:
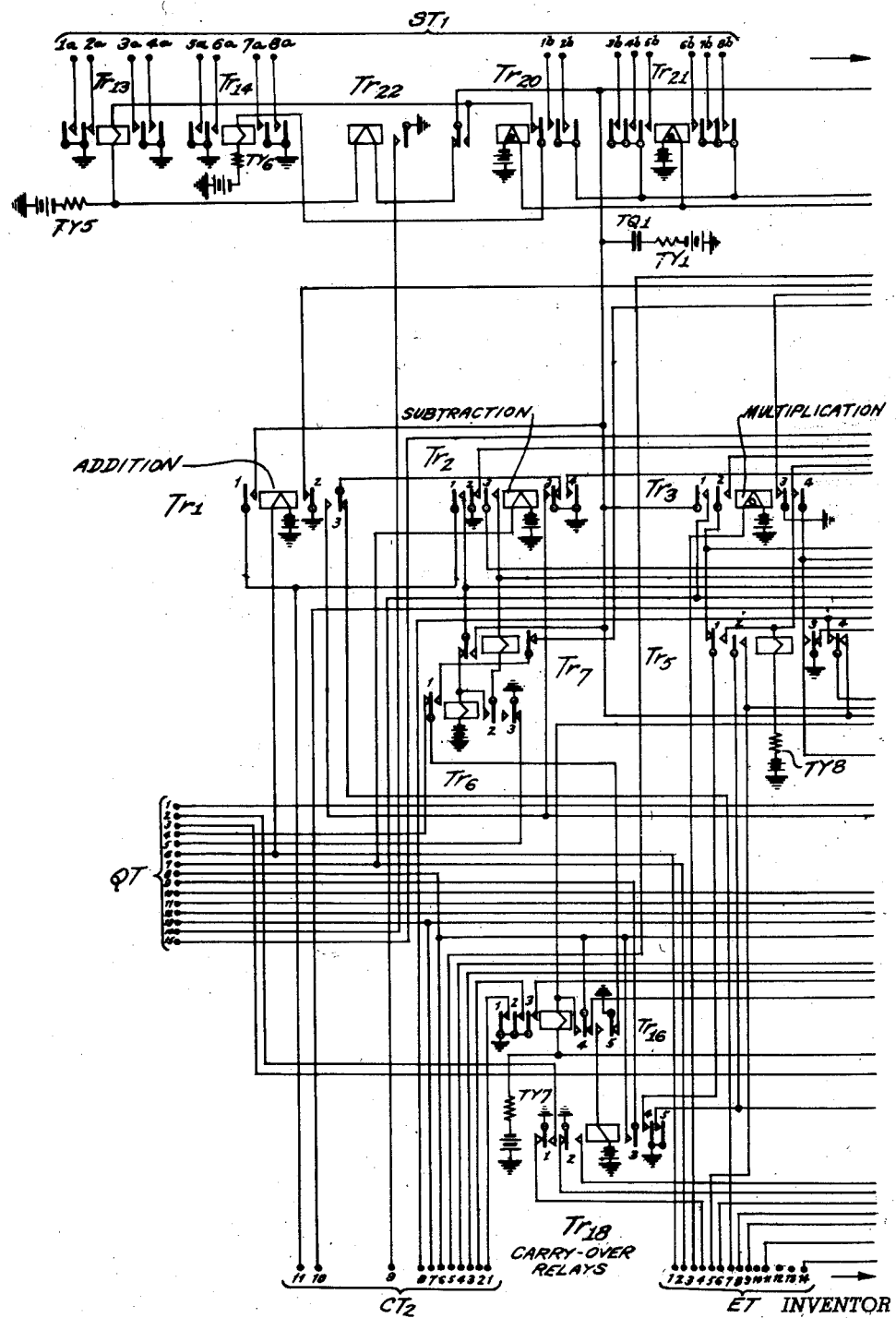
Figure 2T:
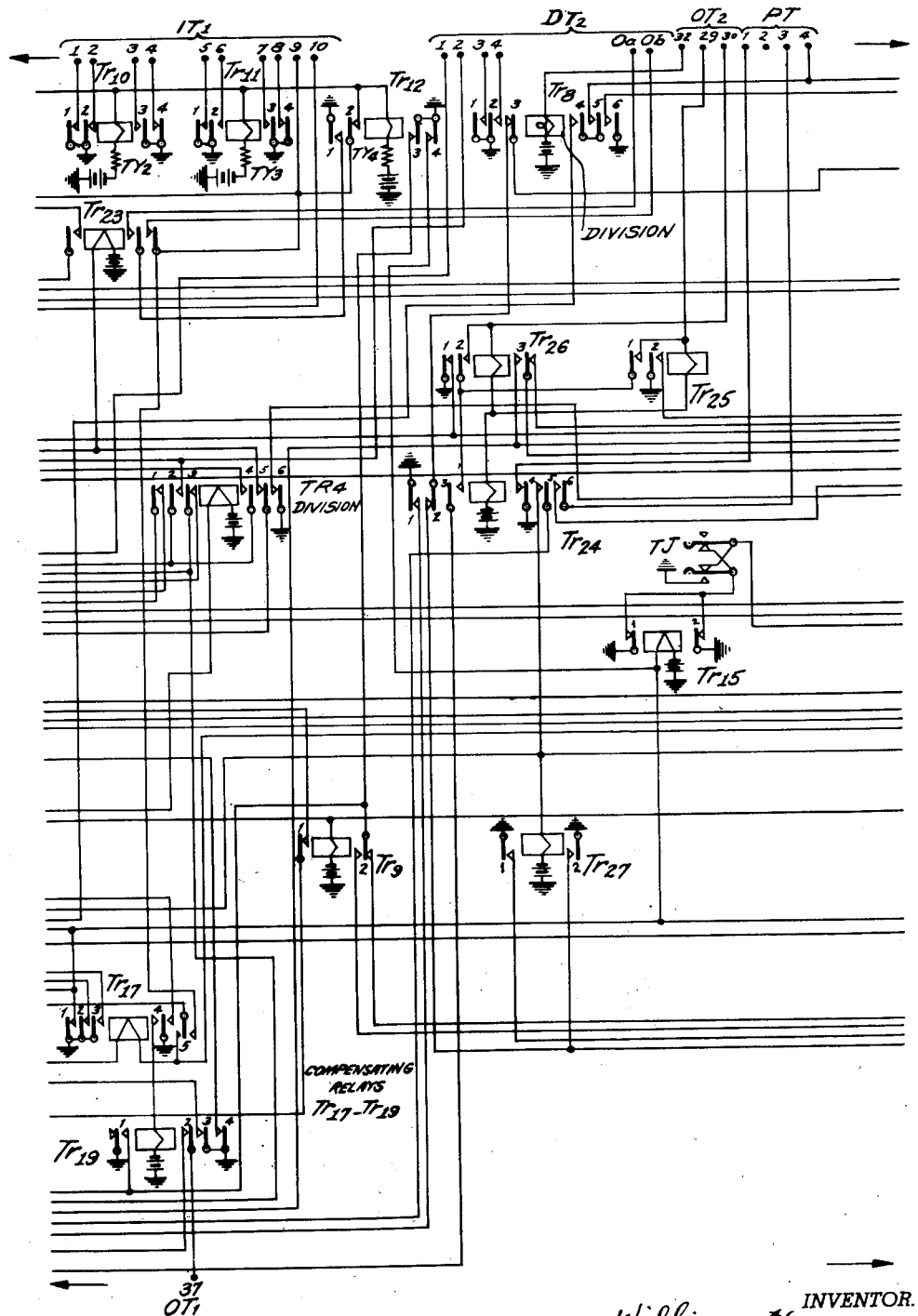
Figure 3T:
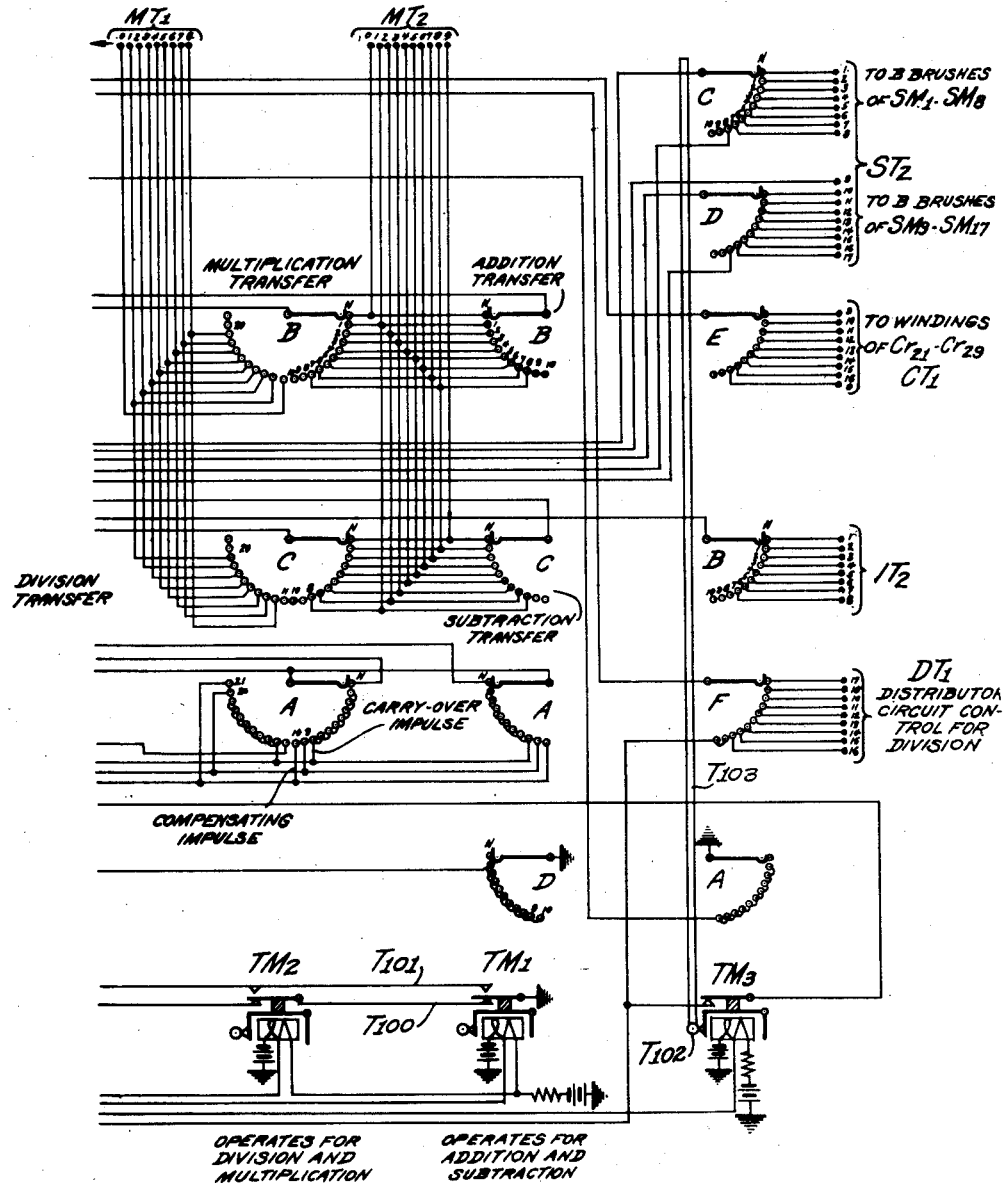

All the digits of a number are transferred concurrently under the control of the transfer circuit, Figs. 1T, 2T and 3T. The ordinal value of each digit and the particular switch to which it is to be transferred are determined by the distributor circuit, Figs. 1D, 2D and 3D.

The digits of the second number read from the card are also stored temporarily in the input storing circuit and then similarly transferred to the accumulation switches of the solution storing circuit. The accumulating switches used in this calculator are of the type which make a complete cycle in eleven steps, ten only of which are used for calculating purposes. The circuit accordingly includes means to cause a switch to make one additional step for every ten steps it makes under the control of the transfer circuit, so as to compensate for its eleven step cycle. This additional step will be referred to hereafter as the "compensating" step. Furthermore, whenever a switch has made ten steps from its normal position, in the course of the successive transfers of two or more digits (and the compensating step has been accomplished) it clearly begins a new cycle. To register this fact, the circuit also includes means to cause the switch recording the digit of next higher ordinal value to make one step, referred to hereinafter as the "carry-over" step. Thus, if a digital value 7 has been transferred to a certain switch in its normal position, N, by causing it to make 7 steps; and if then a succeeding digital value 5 is transferred thereto, by causing it to make 5 steps, it will have made twelve steps in all and its brushes will have made one complete cycle and will be standing in position 1 (next after N). The compensating step will then advance the brushes to position 2 and the carry-over step will advance the brushes of the switch recording the digit of the next higher ordinal value by one step. If this latter switch also started in its normal position, its brushes will now be in position 1, and it will be seen that the positions of the brushes of the two switches, now 1 and 2 respectively, can be used to indicate directly the sum 12 of the two digits 7 and 5 transferred. It follows that, after the transfer of a complete number, the positions in which the brushes of the several switches are standing constitute a direct record, digit by digit, of the cumulative total of the numbers transferred up to this moment to the solution storing circuit.

The switches referred to above are of a kind that has been known for many years in certain of the electrical arts, particularly in automatic telephony, and more recently similar switches have begun to be used in the calculating machine art. The switches are shown in the drawings in the conventional manner. Each switch comprises a magnet which when energized causes its armature to retract a pawl which drops behind a tooth of a ratchet so that when the magnet becomes deenergized, the return of the armature causes the pawl to advance the ratchet a distance of one tooth. In most cases, the armature when operating moves a contact member between front and back contacts. In Fig. 3T the back contact of switch TM1 is indicated by reference character T100 and the front contact by T101. The armature contact and back contact are generally referred to together as the "breaker" contacts. This arrangement is followed on all switches having such front and back contacts. The ratchets of the respective switches are coupled to individual shafts such as shown schematically on switch TM3 which shaft serves to turn a number of brushes over individual contact arcs. The ratchet of TM3 is indicated by reference character T102 and the shaft by reference character T103. In the case of the switches used in the present embodiment of the invention, it will be understood that the brushes advance in effect, from the last contact of an arc to the first contact of the arc in one step, in the same way that they pass from one contact to another in the arc. There are a number of well known ways of accomplishing this result, for example, by the use of double ended brushes.

The addition operation will now be described in detail with reference, for example, to the calculation for which key CK12 has to be depressed. This key causes a series of calculations to take place but at present we are only concerned with that part of the operations which involves addition, the other operations controlled by the key will be described later on. The various circuits completed by the operation of the group of Or relays controlled by key CK12 between the explorer and perforator contact fields and the various multiples associated with the Ca and Cb terminal strips are listed in the table below. On referring to Figs. 10 and 20 it will be seen that when CK12 is closed, relays Or42 to Or51 are operated and as previously explained, an operating ground from the front contact 4 of Er1 is connected to the contacts in the explorer and perforator contacts fields as the explorer and perforator advances from column to column. This operating ground is connected through the tongues and contacts of the Or relays to the various wires of the multiples connected to the Ca and Cb contact strips.

|       |      |      | Multiple | Wire |
|-------|------|------|----------|------|
| Or42  | Ec36 | Ca34 | EO1      | 34   |
| Or43  | Ea19 | Ca3  | IO2      | 3    |
|       | Ea20 | Ca4  | IO2      | 4    |
|       | Ea21 | Ca5  | IO2      | 5    |
|       | Ea22 | Ca6  | IO2      | 6    |
|       | Ea23 | Ca7  | IO2      | 7    |
|       | Ea24 | Ca8  | IO2      | 8    |
| Or44  | Eb19 | Ca20 | EO1      | 20   |
|       | Ea25 | Ca21 | EO1      | 21   |
|       | Eb25 | Ca9  | DO       | 9    |
|       | Ec25 | Ca5  | IO2      | 5    |
|       | Ed25 | Ca20 | EO1      | 20   |
|       | Ea26 | Ca20 | EO1      | 20   |
| Or45  | Eb26 | Ca6  | IO2      | 6    |
|       | Ea27 | Ca7  | IO2      | 7    |
|       | Ea28 | Ca8  | IO2      | 8    |
|       | Ea29 | Ca22 | EO1      | 22   |
|       | Eb29 | Ca9  | DO       | 9    |
|       | Ec29 | Ca4  | IO2      | 4    |
|       | Ed29 | Ca20 | EO1      | 20   |
|       | Ea30 | Ca20 | EO1      | 20   |
| Or46  | Eb30 | Ca5  | IO2      | 5    |
|       | Ea31 | Ca6  | IO2      | 6    |
|       | Ea32 | Ca7  | IO2      | 7    |
|       | Ea33 | Ca8  | IO2      | 8    |
| Or47  | Ea34 | Ca22 | EO1      | 22   |
|       | Eb34 | Ca9  | DO       | 9    |
|       | Ea35 | Ca33 | EO1      | 33   |
|       | Ec34 | Ca37 | OT1      | 37   |
|       | Pa34 | Cb18 | OP1      | 18   |
|       | Pb34 | Cb3  | OS1      | 3    |
|       | Pa35 | Cb4  | OS1      | 4    |
|       | Pa36 | Cb5  | OS1      | 5    |
| Or48  | Pa37 | Cb6  | OS1      | 6    |
|       | Pa38 | Cb7  | OS1      | 7    |
|       | Pa39 | Cb8  | OS1      | 8    |
|       | Pa40 | Ca34 | EO1      | 34   |
|       | Pb40 | Ca35 | EO1      | 35   |
|       | Ea36 | Ca23 | EO1      | 23   |
| Or49  | Eb36 | Ca9  | DO       | 9    |
|       | Ea38 | Ca33 | EO1      | 33   |
|       | Eb37 | Ca32 | EO1      | 32   |
|       | Ec37 | Cb18 | OP1      | 18   |
|       | Pc40 | Cb3  | OS1      | 3    |
|       | Pa41 | Cb4  | OS1      | 4    |
| Or50  | Pa42 | Cb5  | OS1      | 5    |
|       | Pa43 | Cb6  | OS1      | 6    |
|       | Pa44 | Cb26 | OP1      | 26   |
|       | Pa45 | Cb27 | OP1      | 27   |
|       | Ed37 | Cb35 | NO       | 35   |
|       | Pb41 | Cb36 | NO       | 36   |
| Or51  | Pb42 | Cb37 | NO       | 37   |
|       | Pb43 | Cb38 | NO       | 38   |
|       | Pb44 | Cb39 | NO       | 39   |
|       | Pb46 | Ca38 | EO1      | 38   |

With CK12 depressed, Or43 is operated and when the explorer reaches the nineteenth column an operating ground is placed on contact Ea19 which is connected through the third wire of the IO2 multiple through relay Ir53 to battery. The tongues of Ir53 interconnect the windings of relays Ir11 to Ir15 via wires 9 to 13 of the EI1 multiple through the contacts of either Er4 or Er5 depending on whether the upper or lower column of the card is to be read by the feeler contacts EF12 to EF9. In the present example Er5 is operated via ground Er1 front, Eb19, Or44 front, Ca20, multiple EO1 wire 20, Er5, battery. In this way, as the feeler head and the brushes Ea to Ed advance over the explorer contact field, circuits are established to enable the explorer contacts to operate the storing relay groups in accordance with the matter punched on the card. On examining the circuits interconnected by relay Or43 it will be seen that contacts Ea19 to Ea24 are connected through the wires 3 to 8 of the IO2 multiple which will cause routing relays Ir53 to Ir58 for the storing relay sets 3 to 8 to be operated as the explorer advances from column 19 to column 24 and while this takes place the figures recorded by perforations on the card will be sensed by the feeler head and corresponding circuits will be closed to cause the operation of the relays in each group of storing relays associated with the respective relays Ir53 to Ir58 to lock in, in accordance with the perforations.

The connections of Or43 show that the maximum six figures of the first number are stored on the third to the eighth storage relay sets. In order to simplify the description it is assumed that the first number has only three figures and these figures are already stored on the last three storing sets and these three figures are 286.

When the feeler head reaches position 25, relays Dr1, Dr2 and Dr3 of the distributor circuit, Figs. 1D, 2D and 3D, operate, via ground, Er1 front, brush Eb in position 25, terminal CA9, DO wire 8, Dr1, Dr2 and Dr3 in parallel, DE1, Er7 back, CE wire 5, Cr43 back, battery.

Tr1 which controls addition operations, Fig. 1T, also operates via ground, Er1 front, brush Ea in position 25, terminal CA21, EOJ wire 21, Er3 front, ET wire 1, Tr1, battery.

E3 has been operated by Er33 in a circuit explained previously in connection with the setting of the machine in motion.

The object of operating the three of the thirty distributing relays Dr1 to Dr30 at this time is to assign the particular accumulating switches SM1 to SM8, Figs. 1S, 2S, 3S, of the seventeen available switches in the solution storing circuit, to accumulate whatever number may have been recorded on the particular sets of the storage relays in the input storing circuit. It will be noted that the contacts of the eight relays Ir41 to 48, each associated with a set of storage relays, are connected over DI wires 1a to 8a, Dr1, Dr2 and Dr3 front, DS wires 1a to 8a, to the eight magnets SM1 to SM8. Over the circuits just described are transmitted impulses from stepping relays Tr10 and 11 which are used to operate the magnets of the various switches. This arrangement will be described later on.

The various operations of the distributor circuit will be described and circuits traced therethrough as this description progresses. The timing of the characteristic relays of this addition operation can be traced in Figs. 9a, b.

Tr1 when operated, opens the circuit of Er19 and arrests the advance of the feeler head, as already described, until the first number read from the card has been transferred from the accumulating switches as will now be explained.

Tr1 also operates stopping relays Ir41, Ir42, Ir43, Ir44 and Ir45, as follows: Ground, Tr1 front, brush B of TM1 in position N, MT2 wire O, Mr28 back, IM wire O, Ir1 back, Ir2 back, Ir3 back, Ir4 back, Ir5 back, Ir41, battery. Relays Ir42 to Ir45 operate by similar circuits branching from IM wire O, in which these relays lock in obvious circuits to ground at Ir50 front 3. It will be noted that they are associated with the five sets of storage relays in which no digital value has been recorded. It will also be noted that Ir46, associated with the sixth storage set, in which Ir26 and Ir30 are operated to record digit 2, is connected at this stage over Ir26 and Ir30 front to IM wire 2; and that Ir47 and Ir48 are similarly connected over Ir34 and Ir35 front, Ir38 and Ir40 front, to IM wires 8 and 6 respectively for purpose to be explained later.

Tr1 also operates Tr9 and four stepping relays Tr10, Tr11, Tr12 and Tr22, Figs. 1T, 2T and 3T, via ground, Tr2 back, Tr1 front, Tr9, battery. Ground, Tr15 back, TJ, brush A of TM1 in position N, CT2 wire 10, Cr19 front, CT2 wire 11, Tr1 front, Tr10, Tr11 and Tr12, TY2, TY3 and TY4, battery; Tr20 back, Tr22, TY5, battery. In tracing this circuit it should be remembered that Cr19 has already been operated by Er1.

The jack TJ serves for testing purposes. By introducing a plug which terminates in a push button into the jack, it is possible to advance the master switch TM1 or TM2 and the SM solution switches step-by-step, in order to observe the correct operation of the circuit.

The four stepping relays lock to ground at the back contacts of TM1 and the three switches SM6 to SM8, are in parallel, as follows: Ground, TM1 back contact T100, TM2 back, Tr16 back, Tr17 back, Tr12 front, Tr12, etc., resistance, battery. Ground, SM6 back, DS wire 6b, Dr36 back, Dr3 front, DI wire 6b, Ir46 back, IT1 wire 9, Tr12 front 2, Tr12, resistance, battery; and two similar circuits started from SM7 and SM8 back, respectively. Tr12 operates Tr15 in an obvious circuit. Tr15 opens the original operating circuit of the stepping relays, which are, however, now locked. Tr9 and Tr12 operate TM1 as follows: Ground, Tr12 front, Tr9 front, TM1, resistance, battery. Tr11 operates SM6, SM7 and SM8, via ground, Tr11 front, IT1 wire 6, Ir46 back, DI wire 6a, Dr3 front, Dr6 back, DS wire 6a, SM6, resistance, battery; and similar circuits for SM7 and SM8.

When all four switch magnets have operated and opened their interrupter break contacts, i. e., their back contacts, the stepping relays release and in turn open the circuits of TM1, SM6, SM7 and SM8. These switches, and all others in the calculator unit, are step-by-step switches of the type in which the brushes advance when the magnet is deenergized. The brushes of the four switches, therefore, advance one step to position 1. Tr15 does not release when Tr12 releases, because it is held so long as any one of the switch magnets remains operated, via a circuit traced as follows: Ground, SM6 front, CS9 wire 2, CT2 wire 7, Tr15, battery; and also via similar circuits from SM7 and SM8 front, and an obvious circuit from TM1 front contact T101.

When all four switch magnets have released and opened their front contacts, Tr15 releases and recloses another circuit for the stepping relays Tr12, etc., via ground, Tr15 back, brush A of TM1 in position 1, Tr12, etc., resistance, battery.

Tr9 is now held in an obvious circuit from ground in brush D of TM1 off normal. It will be noted that the contacts for this brush with the exception of the N contact are all connected to each other and when the brushes are off normal an operating ground is applied to a number of circuits including the winding of Tr9. Tr12 again operates TM1 and Tr11 again operates SM6, SM7, and SM8.

This cycle of operation maintains the four switches advancing their brushes in unison, with TM1 until the brushes have been returned to their normal position, and SM6, SM7 and SM8 until their advance has been arrested in accordance with the digital values recorded in the sixth, seventh and eighth sets of storage relays, respectively, which will now be described.

For, when SM6 and TM1 have each made two steps, and their brushes are standing in position 2, Ir46 operates and locks via ground, Tr1 front, brush B of TM1 in position 2, MT wire 2, Mr3 front, Mr28 back, IM wire 2, Ir26 front, Ir27 back, Ir28 back, Ir29 back, Ir30 front, Ir46, battery. Ir46 opens the circuit from the tongues of the stepping relays Tr10 and 11 which are connected via the sixth wire of the IT1 multiple to the back contact of the first tongue of Ir46 and this switch accordingly remains with its brushes in position 2. Ir46 also opens the circuit via the ninth wire of ITI and the back contact of the third tongue of Ir46 which is connected via wire 6b of the DI multiple to the interrupter break contact of SM6, so that the further advance of the other three switches is not hindered.

Similarly, when SM8 and TMI have each made six steps, Ir48 operates and locks, via ground, Tr1 front, brush B of TMI in position 6, MT2 wire 6, Mr3 front, Mr29 back, IM wire 6, Ir38 front, Ir39 back, Ir40 front, Ir48, battery. Ir48 opens the circuit of SM8, in a manner just described in connection with the operation of Ir46, and SM8 remains with its brushes in position 6, since this circuit to the magnet SM8 and to the interrupter break contact are broken respectively at the back contacts of tongues one and three of Ir48.

When SM7 and TMI have each made eight steps, Ir47 operates in a similar circuit and locks, opening the circuit of SM7 in the manner just described and its interrupter break contact. SM7 remains with its brushes in position 8.

When TMI, advancing alone, has made one more step totaling nine steps and Tr15 has released, the circuit of the four stepping relays Tr10, Tr11, Tr12 and Tr22 is opened at brush A of TMI, and Tr16 operates instead and locks as follows: Ground, TMI back, TM2 back, Tr16 front, Tr16, TY7, battery. This is the beginning of the so-called carry-over operation described in greater detail below. Tr16 operates Tr15 and Tr18 in obvious circuits. Tr16 also operates the six relays Cr33 to Cr38, as follows: Ground, Tr16 front, CT2 wire 1, Cr33, Cr34, Cr35, battery. Ground, Tr16 front, CT2 wire 2, Cr36, Cr37 and Cr38, battery. Cr35 operates Cr43 in an obvious circuit, and Cr43 locks to ground at Cr18 front, releasing Cr19. Cr19 releases Cr20, and Cr43 releases Dr1, Dr2 and Dr3. The six relays Cr33 to Cr38 have no other function at this stage.

Tr18 releases Ir50, which releases the eight stopping relays Ir41 to Ir48. Ir49 is, however, held independently of Ir50 via the following circuit: Ground, Er10 back, Er33 front, EI1 wire 15, Ir49, battery. Tr18 operates Er6, which at its back contact 1 opens the circuit holding Er33. The operating circuit for Er6 is traced as follows: Ground, Tr18 front, Tr9 front, ET wire 5, Er31 back, Er6, battery. Er33 releases Er3 and Ir49. Er3 releases Er5 and Tr1. Ir43 releases Ir26, Ir30, Ir34, Ir35, Ir38 and Ir40. It will be noted that no relay now remains operated at the input storing circuit, and that the record of the first number read from the card, having been transferred to accumulating switches, has been obliterated from this circuit. The release of Tr1 results in the further advance of the feeler head, as will be explained later. Tr18 also operates TMI: Ground, Tr18 front, Tr9 front, TMI, resistance, battery.

TMI holds Tr15, as before, and releases Tr16 which in turn releases Tr18, and also the six relays Cr33 to 38; Tr18 from a back contact reoperates Ir50 and Ir50 reoperates Ir49, in circuits already traced. Tr18 also releases TMI, which releases Tr15. Tr18 also opens the operating circuit of Er6, which, however, remains locked as described.

When TMI has made ten steps, the compensating operation starts, and Tr17 operates and locks; ground, Tr15 back, brush A of TMI in position 10, Tr17, TY7, battery. Ground TMI back, TM2 back, Tr16 back, Tr17 front, TY7, battery, Tr17 operates Tr15 and Tr19 in obvious circuits. Tr17 also operates the six relays Cr30 to Cr32 and Cr39 to Cr41, as follows: Ground, Tr17 front, CT2 wire 3, Cr39, Cr40 and Cr41, battery. Ground, Tr17 front, CT2 wire 4, Cr30, Cr31 and Cr32, battery. Cr41 operates Cr42 in an obvious circuit and Cr42 locks to ground at Cr18 front. Cr18 holds to ground at Cr32 front, although its operating circuit is now open at Cr42 front. The six relays Cr30 to Cr32 and Cr39 to Cr41 have no other function at this stage. Tr19 operates TMI, as follows: Ground, Tr19 front, Tr9 front, TMI, resistance, battery. TMI releases Tr17, which in turn releases Tr19 and the six relays Cr30 to Cr32 and Cr39 to Cr41. Tr19 releases TMI, which releases Tr15. When brush D of TMI leaves position 10, Tr9 releases.

Cr32 releases Cr18, which releases Cr42 and Cr43. Cr18, Cr19 and Cr20 reoperate, in circuits already traced. It will be noted that TMI has completed its cycle of 11 steps, and returns to its normal position, N.

In the meantime, upon the release of Tr1, already described, Er19 reoperates and Er8, Er10, Er9, Er29 and the advance magnet begin again to operate and release in turn, advancing the feeler head step-by-step, in the manner previously described. When Er29 operates for the first time, it operates Er7, as follows: Ground, Er29 front, Er6 front, Er6 and Er7, battery. Er7 opens the previous locking circuit of Er6 and itself locks via: Ground, Er2 front, Er6 front, Er7, battery. When Er29 releases again, and brushes Ea and Eb leave position 25, it releases Er6 whose original operating circuit has by this time been opened by the release of Tr18, and Er6 releases Er7. Er6 reoperates Er33 from its back contact 1 and Er33 reoperates Er3 from 3 front. It will be noted that the circuit of the distributing relays Dr1, Dr2 and Dr3 remains open at Er7 front, and that of Tr1 at Er3 back, until brushes Ea and Eb of the contact field have also opened these circuits, so that these relays will not be wrongly reoperated.

The feeler head continues to advance towards the columns in which the second number to be read is to be found.

At this stage, the only relays remaining operated in the calculator unit are Er1, Er2, Er3, Er19, Er33; Mr1, Mr2, Mr3; Cr18, Cr19, Cr20, Cr51, Cr52, Cr53, Cr54; Ir49 and Ir50. Switches SM6, SM7 and SM8 have their brushes standing in positions 2, 8 and 6, respectively, thus recording both digitally and ordinally the number 286 read from the card. All other switches are in their normal positions. The storage relays in the input storing circuit have all been released and are ready to record the digits of another number. All relays in the transfer and distributing circuit have also been released leaving these circuits to begin other operations.

It will be seen from the above description of the transfer of the number 286 from the storage relays of the input storing circuit to accumulating switches of the solution storing circuit that the operation involves the following principles. Switch TMI is a master transfer switch which is required to make one complete cycle of 11 steps for the transfer of one complete number. The eight accumulating switches, assigned to accumulate the eight possible digits recorded on the storage relays, start to step in unison with TMI and are stopped individually by the operation of relays Ir41 to Ir48 when they have made a number of steps according to the value of the digit recorded on the corresponding set of storage relays. Accumulating switches controlled from storage sets in which no digital value, or value 0, has been recorded make no step; value 1, one step, etc. Since no accumulating switch needs to make more than nine steps for any one transfer, the circuits of all these switches are opened after the ninth step of TM1, and it is not necessary to provide a circuit, over MT2 wire 9 from brush B of TM1 in position 9 to operate any of the eight relays Ir41 to Ir48 which may still be unoperated at this moment. It will be noted that relays Mr1, Mr2 and Mr3 in the multiplication table circuit were operated during the transfer operation and that the circuits of the eight stepping relays Ir41 to Ir48 pass over contacts of these relays. The digits recorded on the storage relays have, in fact, been automatically multiplied by one in their transfer to the accumulating switches. Had relays Mr3, Mr4 and Mr5 been operated instead, the digits would have been severally multiplied by 2 in their transfer, as will be explained later in connection with a multiplication operation.

Digit distribution

It will also be noted, from the above description at a transfer operation, that the particular accumulating switches, to which the several digits were transferred, were determined by the operation of distributing relays Dr1, Dr2 and Dr3. Had relays Dr4, Dr5 and Dr6 been operated instead, the eight sets of storage relays would have been connected to the eight accumulating switches SM2 to SM9. There are ten such sets of three distributing relays and the operation of any one set assigns a particular set of nine consecutively numbered switches (eight in the case of Dr1, Dr2 and Dr3), according to the calculation operation to be performed. The seventeen switches available are normally separated for addition and subtraction operation, into two groups, comprising the eight switches SM1 to SM8 and the nine switches SM9 to SM17, respectively, either of which groups may be used at will. For division operations they are always so separated. For multiplication operations, and also for addition and subtraction operation, if desired, they can be united in a single group, capable of dealing with numbers having up to 17 digits, as will be explained later. It will be noted that when a set of distributing relays operates, sixteen wires are extended from the storage relays to the accumulating switches. Eight of these designated "a" together with a digit are the operating wires of the eight switch magnets, and the other eight wires designated "b" together with a digit are wired from the interrupter break contacts of the eight switches over which the advance of these switches in unison with the master transfer switch TM1 is assured.

Transfer of second number

In the calculation operations for which key CK12 is depressed, the holes representing the second number to be read from the card are to be found in the bottom half of columns 25 to 28. In the calculation operation concerned, brush Ea in position 29 is shown to be connected by Or45 to terminal Ca22 and EO1 wire 22, over which circuit an operating ground from brush Ea would cause a subtraction operation to be initiated. For the purpose of this explanation which is directed to an addition operation we will assume that brush Ea in position 29 is connected by Or45 to terminal Ca21. An operating ground from the terminal strip to terminal Ca21 initiates an addition operation. The circuit will be described further on. We will assume, for example, that 53 is the second number and is to be added to the first number 286. The digits of the second number are read from the card recorded at the input storing circuit and transferred therefrom to the accumulating switches, already carrying a record of the first number, in such a way that these switches thereafter record the sum of the two numbers. These operations will now be described in detail.

When the feeler head, advancing step-by-step as described, is standing over column 25 of the card, Er5 operates to determine that the lower half of the column shall be read, via ground, Er1 front, brush Ed in position 25, Or44 front, terminal Ca20, EO1 wire 20, Er5, battery.

Er5 locks to ground at Er3 front, Ir57 operates to direct the digital value indicated to the seventh set of storage relays, by the following circuit: Ground, Er1 front, brush Ea in position 27, Or45 front, terminal Ca7, IO2 wire 7, Ir57, battery.

Since holes representing the digital value 5 are encountered, feeler contact EF7 closes and operates Ir33, via ground, feeler contact EF7, Er5 front, EI1 wire 11, Ir57 front, Ir33, battery.

Ir33 locks to ground at Ir49 front. In a similar manner the digital value 3 represented by holes punched in the bottom half of column 28 is recorded by the operation and locking of Ir37 of the eighth storage set, relay Ir57 being released and Ir58 operated instead to direct the signals from the feeler contacts into this set.

When the feeler head reaches position 29, Ir58 releases, and Dr1, Dr2, Dr3 and Tr1 operate, via ground, Er1 front, brush Eb in position 29, relay Or45, terminal Ca9; DO wire 9; Dr1, Dr2 and Dr3 in parallel; DE1, Er7 back, CE wire 5, Cr43 back, CD, battery. Ground, Er1 front, brush Ea in position 29, relay Or45, terminal Ca21 (instead of Ca22 as previously explained), EO1 wire 21, Er3 front ET wire 1, Tr1, battery. The operation of Tr1 sets the calculator for an addition operation.

Tr1 opens the circuit of Er19, which releases and arrests the advance of the feeler head once more, as already described.

Tr1 operates Tr9 from an operating ground from Tr2 back 3, Tr1 front 3, Tr9, battery. Tr1 causes the master transfer switch TM1 to make one cycle of eleven steps, during which, switch SM7 advances its brushes in unison with TF1 by five steps until its circuit is open by the operation of Ir47, and SM8 advances its brushes by three steps until its circuit is opened by the operation of Ir48. The six switches SM1 to SM6 do not advance their brushes at this stage, because their circuits are opened before TM1 operates by the operation of the six stop relays Ir41 to Ir46. When TM1, advancing alone, has made a total of nine steps, the carry-over operation takes place. Tr16, Tr15, Tr18, the six relays Cr33 to Cr38, Cr43 and Er6 operate and Cr19, Cr20, Dr1, Dr2, Dr3, Ir50 the eight relays Ir41 to Ir48, Er33, Er3, Ir49, Er4, Tr1, Ir33 and Ir37 release. Upon the release of Tr1, Er19 reoperates, causing Er8, Er10, Er9, Er29 and the advance magnet E99 to begin once more to operate and release in turn and advance the feeler head. After the next step of the feeler head, Er7 operates, Er6 releases, Er33 and Er3 reoperate and Er7 releases, in turn. All of these operations are similar to those which occurred during the transfer to the accumulating switches of the record of the first number read from the card, and it is not thought necessary to describe them in detail.

It will be noted that no relay now remains operated in the input storing set, and that the record of the second number read from the card, having been transferred to the accumulating switches, has been obliterated from the circuit. The brushes of switch SM6 are still standing in position 2. Those of switch SM8, having made 3 steps from their previous position 6; are now standing in position 9, whilst those of switch SM7, having made 5 steps from position 8, are standing in position 2. Since the brushes of switch SM7 have made more than ten steps in all and have thus begun a new cycle, they must be caused to make in addition one "compensating" step. For the same reason, the brushes of switch SM6, on which is recorded the digit of next higher ordinal value must be caused to make one additional "carry-over" step.

These operations occur as follows:

Carry-over correction

When SM7 reaches position 10 during the transfer, carry-over relay Cr7 operates to register the fact, via: Ground, Cr19 front, CS9 wire 1, brush A of SM7 in position 10, CS2 wire 7, Cr7, battery. Cr7 locks separately to ground at Cr19 front, and Cr18 front. When TM1 next reaches position 9, relays Tr16, Tr15, Tr18, Cr33 to 38 operate, as previously described, and this time the following two additional circuits are closed.

SM6 operates, via ground, Cr7 front, Cr34 front, CS1 wire 6a, SM6, resistance, battery.

Tr16 locks to the interrupter break contact of SM6, via ground, SM6 back, CS1 wire 6b, Cr37 front, Cr7 front, CT2 wire 6, Tr16 front, Tr16, TY7, battery.

Tr16 is locked also to the interrupter break contact of TM1, which switch is operated by Tr19, as already described. TM1 and SM6, in operating, both hold Tr15, as before. When both have opened their interrupter break contacts, and advance, Tr16 releases, followed by Tr18 and the six relays Cr33 to Cr38. Tr18 releases TM1 and Cr34 releases SM6. When both switch magnets have released, Tr15 releases. Tr18 from its back contact 1, via ET wire 4, Er2 front 2, ET1 wire 14, also reoperates Ir50, and Ir50 reoperates Ir49 to clear the storage circuit, as before.

The brushes of SM6 are now standing in position 3 and the carry-over step has been accomplished. Cr7 is still operated, because although Cr19 and 20 have released, as stated, Cr18 remains operated.

Compensating step

With TM1 now in position 10, relays Tr17, Tr15, Tr19 operate as well as the six relays Cr30 to Cr33 and Cr39 to Cr41, the latter being operated from Tr17 front 2 via CT2 wire 3. Cr42 also operates, as already described in connection to the transfer of the first number read from the card. This time Cr31 operates SM7, via ground, Cr7 front, Cr31 front, CS1 wire 7a, SM7, resistance, battery, and Cr40 locks Tr17 to the interrupter break contact of SM7, as follows: Ground, SM7 back, CS1 wire 7b, Cr40 front, Cr7 front, CT2 wire 6, Tr16 back, Tr17 front, TY7, battery.

Tr17 is locked also to the interrupter break contact of TM1, which is operated by Tr19 as before. TM1 and SM7 in operating, both hold Tr15. When both switches have opened their interrupter break contacts Tr17 releases, followed by Tr19 and the six relays Cr30 to Cr32 and Cr39 to Cr41. Tr19 releases TM1 and Cr31 releases SM7. When both switch magnets have released, Tr15 releases. Cr31 also releases Cr18, which releases Cr16, Cr42 and Cr43. Cr18, Cr19 and Cr20 reoperate in circuits already traced. When brush D of TM1 leaves position 10 the circuit from ground through the winding of Tr9 is broken, Tr9 releases, and TM1 has again returned to its normal position N.

The brushes of SM7 are now standing in position 3 and the compensating step has been accomplished.

At this stage, the relays remaining operated in the calculator unit are the same as after the transfer of the first number read from the card. Switches SM6, SM7 and SM8 have their brushes standing in positions 3, 3 and 9 respectively thus recording both digitally and ordinally the number 339, that is, the sum of the numbers 286 and 53 read from the card. This number may be perforated in the card or stored by the calculator for use in a subsequent calculation operation depending on the circuit set up from the contact fields through the contacts of the Or relays. Such operations will be described further on.

Subtraction

The accumulating switches are of the type which can advance their brushes in one direction only. These switches can thus record an increase in the value of the digits to which they are assigned, but not a decrease. The operation of subtraction is therefore carried out by a process involving addition of nine's complements. For example, if the number 47 is to be subtracted from the number 339, the operation may be carried out as follows:

To 339 is added the three digit number 952, which is the complement to 9, digit by digit of 47, or more properly 047, making 1291. This number is manifestly higher by 999, than the required difference. To correct for this, the number 1 is added to 1291, making 1292, which is now too high by 1000. Since the first digit 1 in the number 1292 arises from the carry-over from the digit of the next lower ordinal value, this first carry-over digit is simply ignored, leaving the correct difference 292.

It will be evident that by adding the four digit number 9952, the complement of 0047, the same final result would have been achieved, as also with numbers of more digits. On the other hand, had the two digit number 52, the complement of 47, been used, the requisite carry-over would not have arisen. The number which is added must have at least as many digits as the number to which it is added. This statement should be remembered because the method of substraction now about to be described forms an important part of the direct division operation which will be described further on.

In a calculation operation involving the subtraction of a number read from a card from a number recorded on accumulaitng switches, the number read from the card is recorded temporarily in the input storing circuit, as already described and transferred therefrom to the accumulating switches on a complementary basis.

The transfer circuit insures that the value of each digit transferred is the complement to 9 of the digital value recorded in the input storing circuit. This is accomplished by connecting the wires of the MT2 multiple to the arc for brush C of TM1 in such a way that the contacts of the are are connected to the wires of MT2 corresponding to the nine's complement of the respective contacts. Thus contact 2 is connected to wire 7; 3, to wire 6; 4 to wire 5; etc. Thereafter the Ir storing relays and the Ir stopping relays operate in the same manner as for addition. The transfer circuit also causes the switch which accumulates digits of lowest ordinal value to advance by one step. This step will be referred to hereafter as the "subtraction correction" step.

Finally, the transfer circuit causes the carryover indication from the switch which accumulates digits of highest ordinal value to be ignored. These operations will now be described in detail. The timing of the characteristic relays of the subtracting operation followed by a perforating operation can be traced in Figs. 10a, b.

*Storing of third number read from card*

In the calculation operation for which CK12 is depressed, holes representing a third number are to be read in the lower half of columns 29 to 33. For the purposes of explanation, it is assumed that this number is of two digits, for example 47, and is to be subtracted from the sum 339 already calculated.

When the feeler head E99 has advanced so that it is standing over column 29, Er5 operates to determine that the lower half of the column shall be read as follows: Ground, Er1 front, brush Ed in position 29, Or46 front, terminal Ca20, EO1 wire 20, Er5 battery.

Er5 locks to ground at Er3 front. In position 32, Ir57 operates to direct the digital value indication to the seventh set of storage relays, via ground, Er1 front, brush Ea in position 32, Or46 front, terminal Ca7, IO2 wire 7, Ir57, battery.

Since holes representing the digital value 4 is encountered, feeler contacts 6 and 9 close and operate Ir32 and Ir35, via: Ground, feeler contact EF6, Er5 front, EI1 wire 10, Ir57 front, Ir32, battery; and Ir35 locks to ground at Ir49 front.

Ir57 releases as soon as the feeler head leaves position 32. In a similar manner, the digital value 7, represented by the holes in the lower half of column 33 is recorded by the operation and locking of Ir39 in the eighth storage set.

It will be noted that no relays are operated in the first six sets of storage relays. It may, therefore, be stated that, with Ir32, Ir35 and Ir39 operated at the seventh and eighth sets, the input storing circuit is now recording the number 47, or more exactly the number 00000047. It is now necessary to transfer to the eight accumulating switches SM1 to SM8, now recording the number 339, or more exactly 00000339, the number 99999952, that is, the complement digit by digit of the number 00000047; and also to advance the switch SM8 by one "subtraction correction" step. The latter operation occurs first as will be described.

*Transfer of third number*

When the feeler head reaches position 34, Dr1, Dr2 and Dr3 operate, as follows, ground, Er1 front, brush Eb in position 34, Or41 front, terminal Ca9, DO wire 9, Dr1, Dr2 and Dr3 in parallel, DE1, Er1 back, CE wire 5, Cr43 back, CD, battery.

Tr2 operates to initiate a subtraction operation, via, ground, Er1 front, brush Ea in position 34, Or41 front, terminal Ca22, EO1 wire 22, Er3 front, ET wire 2, Tr2, battery.

Tr2 operates Tr6, via, ground, Tr15 back, brush A of TM1 in position N, CT2 wire 10, Cr19 front, CT2 wire 10, Tr2 front, Tr7 back, Tr6, battery. Tr6 operates SM8, as follows, ground, Tr16 back, Tr6 front, Tr7 back, IT1 wire 10, DI wire 8a, Dr3 front, DS wire 8a, SM8, battery.

Tr6 prepares a locking circuit in series with Tr7, which being short-circuited, does not operate. The circuit is traced as follows, ground, Tr18 back, Tr2 front, Tr4 front in parallel, Tr7, Tr6 front, Tr6, battery. Tr7 is short-circuited by the ground which operates Tr6 on one side and the ground at the prepared locking circuit on the other side. Tr6 locks when the operating circuit is removed and remains locked until the holding ground is removed.

SM8, in closing its front contact, i. e., its interrupter make contact, operates Tr15, via, ground, SM8 front, CS9 wire 2, CT2 wire 7, Tr15, battery.

Tr15 removes the short circuit around Tr7, which operates and releases SM8. SM8 releases Tr15 and advances its brushes from position 9 to position 10. This switch now made ten steps in all, and carry over relay Cr8 operates to register the fact over the follow circuit: Ground, Cr19, front, CS9 wire 1, brush A of SM8 in position 10, CS2 wire 8, Cr8, battery. Cr8 locks to ground at Cr18 front.

It will be noted that a digit of value 1 has thus been recorded on the switch assigned to accumulate digits of the lowest ordinal value, and the subtraction correction step has been accomplished.

The four stepping relays Tr10, Tr11, Tr12 and Tr22 now operate, via, ground, Tr15 back, brush A of TM1 in position N, CT2 wire 10, Cr19 front, CT2 wire 11, Tr2 front, Tr7 front, Tr12, etc., resistance battery.

Tr12 operates Tr15 and TM1 over circuits already traced. Tr10 and Tr11 operate the eight switch magnets SM1 to SM8, via, ground, Tr10 front, IT1 wire 1, Ir41 back, DI wire 1a, Dr1 front, Dr34 back, DS wire 1a, SM1, resistance, battery. The seven other switch magnets are operated over similar circuits.

The four stepping relays lock to the interrupter break contacts T100 of TM1 and the eight magnets SM1 to SM8, via, ground, TM1 back, TM2 back, Tr16 back, Tr17 back, Tr12 front, Tr12, etc., resistance, battery. Ground, SM1 back, DS wire 1b, Dr34 back, Dr1 front, DR wire 1b, Ir41 back, It wire 9, Tr12 front, etc. The seven other switches operated by similar circuits.

When all nine switch magnets have operated and opened their interrupter break contacts, the four stepping relays release and open the circuit of nine magnets. Tr15 is held until all nine magnets have released, over the circuits already traced. When Tr15 releases, the four stepping relays reoperate and the cycle begins again.

In this way, switch TM1 makes nine steps under the control of Tr12, and the eight switches SM1 to SM8 advance their brushes in unison with it, until their circuits are severally opened by the operation of the corresponding stopping relays Ir41 to Ir48 in accordance with the complement to nine of the digital value recorded in the corresponding set of storage relays. Thus, Ir48 operates and opens the circuit of SM8, when TM1 and SM8 have each made two steps, over the following circuit, ground, Tr2 front, brush C of TM is in position 2, MT2 wire 7, Mr7 front, Mr29 back, IM wire 7, Ir39 front, Ir40 back, Ir48, battery.

At this point it should be noted that the contacts for the C brush of TM1 are connected to the MT2 multiple in such a way that the complement to nine of the positions of the brush on the arc is transmitted over the MT2 multiple. In other words contact 1 for the C brush is connected to MT2 wire 8, contact 2 to MT2 wire 7, contact 3 to MT2 wire 6, etc. With this arrangement the stopping relays selected for the subtraction operation corresponds to the nine's complement of the number punched in the card. After the stopping relays are set up, the operation of the calculator for the subtraction operation is the same as that for addition.

Ir48 locks to ground at Ir50 front. Ir47 operates in the similar circuit and opens the circuit of SM1, when TM1 and SM7 have each made five steps. Ir47 also locks to ground at Ir50 front. The six stopping relays Ir41 to 46 find no operating circuit since no relay in the groups of storing relays associated with the six stopping relays have been operated, so therefore, the six switches SM1 to SM6 which they control each make nine steps.

The brushes of the five switches SM1 to SM5, having each made nine steps from their normal position N, are now standing in position 9. Those of SM6, having made nine steps from position 3 are standing in position 1; SM7, having made five steps from position 3, is standing in position 8; and SM8, two steps from position 10, is in position 1.

*Carry-over*

Switch SM6 having reached and passed position 10 during the transfer, carry-over relay operates in this position to register the fact, via, ground, Cr19 front, CS9 wire 1, brush A of SM6 in position 10, CS2 wire 6, Cr6, battery. Cr6 locks to ground at Cr19 front.

The operation of Cr6 insures, as explained in connection with the transfer to the accumulating switches of the second number read from the card, that the switches recording digits of next higher ordinal value, now SM5, will be caused during the tenth step in the cycle of TM1 to make a carry-over step. But the brushes of SM5 are already standing in position 9, and after this carry-over step, will reach position 10, thus rendering switch SM4 liable to make a carry-over step also.

For the same reason, the remaining three switches SM1 to SM3, all standing in position 9 will become liable to make a carry-over step. In order that all switches shall make their carry-over step, when necessary, simultaneously, the circuit is so arranged that the carry-over relay, Cr1 to Cr8, associated with the particular switch operates when, jointly, its brushes are standing in position 9 at the end of a transfer operation and the carry-over relay associated with the switch recording digits of the next lower ordinal value operates or has operated. Thus, in the example being described, when the brushes of switch SM5 leave position 9, Cr6 has operated; Cr5 accordingly operates over the following circuit, ground on Cr19 front, Cr6, CS2 wire 6, brush A of SM5 in position 9, CS2 wire 5, Cr5, battery. Cr5 locks to ground at Cr19 front and Cr18 front.

Since the brushes of the four switches SM1 to SM4 are also standing in position 9, the four associated carry-over relays Cr1 to Cr4 operate, in similar circuits including the A brushes of these switches in position 9, and lock to ground at Cr19 front.

In the meantime, switch TM1 has reached position 9. In this position, Tr16, Tr15, Tr18, the six relays Cr33 to Cr38, Cr43 and Er6 operate, and Cr19, Cr20, Dr1, Dr2, Dr3, Ir50, Ir47, Ir48, Er33, Er3 and Ir49 release, in the same way as after the previous transfer operation. Er3 releases Er5 and Tr2; and Ir49 releases Ir32, Ir35, and Ir39. Tr2 releases Tr6, Tr7 and Tr23.

The switch magnets SM1 to SM5 and SM7 operate, the carry-over relays Cr2 to Cr6 and Cr8 having operated previously. The effect of the operation of Cr1 at this point is without effect for reasons explained below. The carry entry circuit is traced as follows, ground, Cr2 front, Cr33 front, CS1 wire 1a, SM1, resistance and battery.

Cr33 to Cr38 have been operated and the six other switch magnets operate over circuits similar to that just described. Tr16 locks to the interrupter break contacts of the six magnets SM1 to SM5 and SM7, as follows, ground, SM1 back, CS1 wire 1b, Cr36 front, Cr2 front, CT2 wire 6, Tr16 front, Tr16, TY7, battery. The other switch magnets with this group operate over similar circuits.

Tr16 is locked also to the interrupter break contact of TM1, which is operated by Tr18, as before. TM1 and the six other switch magnets on operating, each hold Tr15. When all have opened and interrupter break contacts, Tr16 releases, followed by Tr18 and the six relays Cr33 to Cr38 referred to above. Tr18 releases TM1. Cr33 and Cr34 release the six other SM magnets. When all seven switch magnets have released, Tr15 releases. Tr18 also reoperates Ir50 and Ir50 reoperates Ir49 as before.

The brushes of the six switches SM1 to SM5 and SM7 have thus each made one carry-over step and are now standing in positions 10, 10, 10, 10, 10 and 9, respectively.

It will be noted that although Cr1 is operated, no switch makes a step in consequence of this, the circuit from ground at Cr1 front being open and no circuit being connected to CE wire 7. Thus, the carry-over from switch SM1, which is the switch recording digits of highest ordinal value will be ignored as intended.

It will be noted that, although the carry-over step has driven the brushes of SM7 to position 9, no circuit for the corresponding carry-over relay Cr7 is closed, since Cr19 and Cr20 have released in the meantime, as explained. Had the brushes reached position 9, before the carry-over step, Cr7 would have operated for the same reason that Cr5, etc. operated.

*Compensating step*

With TM1 now in position 10, relays Tr17, Tr15, Tr19, the six relays Cr30 to Cr32 and Cr39 to Cr41, and Cr42, operate, as previously described. This time the magnets of the seven switches which have a compensating step to make are now SM1 to SM6 and SM8 which operate as follows, ground, Cr1 front, Cr39 front, CS1 wire 1a, SM1, resistance, battery. The magnets for the other six switches are operated in a similar manner.

Tr17 locks to the interrupter break contacts of the seven switch magnets, as follows, ground, SM1 back, CS1 wire 1b, Cr39 front, Cr1 front, CT2 wire 6, Tr16 back, Tr17 front, Tr17, TY7, battery. The other six switch magnets operate over similar circuits.

Tr17 is locked also to the interrupter break contact of TM1, which is operated by Tr19, as before. TM1 and the seven other switch magnets, in operating, hold Tr15 when all eight magnets have opened and interrupter break contacts, Tr17 releases, followed by Tr19 and the six relays Cr30 to Cr32 and Cr39 to Cr41. Tr19 releases TM1 and Cr30 and Cr31 release the other seven switch magnets. When all eight switch magnets have released, Tr15 releases. Cr32 also releases Cr18, which releases the seven carry-over relays Cr1 to Cr6 and Cr8, Cr42 and Cr43. Cr18, Cr19, and Cr20 reoperate in circuits already traced. When brush D of TM1 leaves position 10, Tr19 releases and TM1 has again returned to its normal position N.

The brushes of the seven switches SM1 to SM6 and SM8 have thus each made one compensating step. Those of the five switches SM1 to SM5 are again standing in their normal positions, hereafter those of the three switches SM6, SM7 and SM8 are standing in positions 2, 9 and 3, respectively, thus recording both digitally and ordinally the number 292, that is, the difference between the number 339 and the number 47 read from the card.

The number registered on the switches may be perforated into the card or re-used in a subsequent calculation depending on the circuits set up by the Or relays.

The successive positions occupied by the brushes of the eight switches SM1 to SM8 and the different stages of the operations so far described, are shown in the table below:

The twelve plungers P are controlled by twelve plunger magnets P0 ... P9 and P11 and P12, Figs. 3, 8″ and 1P (128, 156 in the patent to Rice et al.). The energization of one of these magnets P0 ... P9, P11, P12 operates the corresponding plunger which pushes one of the set bars PLG (35 in the patent to Rice et al.) down and causes this set bar to be locked in locking slide PLI in operative position to prepare a punch PLJ in the set over which the plunger head PLA is standing.

The operation of the return magnet P101, Fig. 1P, previously mentioned, causes punch block PLH to be pressed against set bar field PLG in a manner further explained below, thus causing these punches PLJ in the punch block PLD which have been prepared by the plungers to be pressed simultaneously against the card CRD standing beneath in holes to be perforated accordingly. The operation of the return magnet P101 also causes the return of the feeler head EXA to its starting position.

As a further consequence of the operation of the return magnet P101, the punches PLJ and set bars PLG are reset to their normal condition by operating locking slide PLI in which they are mounted as explained below, and the plunger head PLA is caused to traverse the punch block PLH from right to left, to its starting position.

| Operation | Steps made during | Position after | SM 1 | SM 2 | SM 3 | SM 4 | SM 5 | SM 6 | SM 7 | SM 8 |
|---|---|---|---|---|---|---|---|---|---|---|
| Read 286 and record | Transfer of 286 | Start | N | N | N | N | N | N | N | N |
|  |  |  |  |  |  |  |  | 2 | 8 | 6 |
|  | Transfer of 53 | Transfer | N | N | N | N | N | 2 | 8 | 6 |
|  |  |  |  |  |  |  |  |  | 5 | 3 |
| Read 53 |  | Transfer | N | N | N | N | N | 2 | 2 | 9 |
| and |  | Carry-over Correction | N | N | N | N | N | 3 | 2 | 9 |
| add |  | Compensation | N | N | N | N | N | 3 | 3 | 9 |
|  |  | Subtraction Correction |  |  |  |  |  | 3 | 3 | 10 |
| Read 47 and subtract | Transfer of complement of 47 |  | 9 | 9 | 9 | 9 | 9 | 9 | 5 | 2 |
|  |  | Transfer | 9 | 9 | 9 | 9 | 9 | 1 | 8 | 1 |
|  |  | Carry-over Correction | 10 | 10 | 10 | 10 | 10 | 1 | 9 | 1 |
|  |  | Compensation | N | N | N | N | N | 2 | 9 | 2 |

Card perforation

The perforation mechanism of the card explorer and perforation machine comprises a punch block PLH (37 in the patent to Rice et al.) with slot PLC within which a card can be accurately positioned. The punch block PLH contains forty-five sets of twelve punches PLJ (36 in the patent to Rice et al.) located over the forty-five columns of the card. A reciprocating head PLA (25 in the patent to Rice et al.) movable independently of the explorer head EXA (84 in the patent to Rice et al.) in the present embodiment as shown schematically in Fig. 8″, carrying twelve plungers P (30 in the patent to Rice et al.) can be located in turn in forty-six different positions. In each of the first forty-five positions, the plungers P are in line with one of the forty-five sets of punches PLJ, and after traversing the punch block PLH, the plungers P ... can be moved into a forty-sixth position. The plunger head PLA is advanced step by step from punch set to punch set, across the punch block from left to right, by an individual advance magnet P100, Fig. 1P, controlled from the calculator unit, and controlling an individual advance mechanism in the same way as individual advance magnet E99 controls an individual advance mechanism for the explorer head EXA of which shaft PLD is shown in Fig. 8″. This shaft is driven over rack and rail PLF by means of an escapement mechanism PLE.

The mechanism just briefly described is not shown in detail in the drawings because such mechanisms are well known in the business machine art from the patents to Rice et al., Mixer, and Lasker cited above, and the mechanism per se is not part of the present invention. More specifically, a suitable card transport mechanism for feeding the card at appropriate moments from a hopper into an explorer slot, from the explorer slot into a perforator slot and from a perforator slot into a hopper, is shown in the patent to Mixer referred to above.

As already stated, punch block PLH and punches PLJ of Fig. 8″ correspond to parts 37 and 36 of Fig. 2 of Rice. The reciprocating head PLA is moved by an escapement mechanism which is shown in Fig. 5 of Rice at 162, 163 to drive the shaft 172 of a gear wheel engaging rack portion of rack and rail 27. The plungers P correspond to parts 30 of Fig. 9 of the Rice patent which are controlled through Bowden wires by solenoids I, III, V, VII, IX, and X of Fig. 11 of Rice. The set bars PLG correspond to part 28 and the locking slide to part 33 in Fig. 9 of Rice. Return magnet P101 corresponds to carriage return control relay 187 in Fig. 13 of Rice. The operation of the return magnet P101 permits the energization of clutch 17 in Fig. 1 of Rice which causes the punch block 37 to be pressed against set bar field 23 (see page 2, col. 1, lines 53 etc. of Rice). In a similar manner, in Fig. 8″, the punches PLJ in the punch block PLD which have been prepared by the plungers P through set bars PLG, are caused to be pressed simultaneously against card CRD standing beneath.

The carriage return and perforating operations are caused in the Rice patent by electromagnetic clutch 16 and retract solenoid 173, respectively, when the cancelling key 176 is depressed. (See page 5, first col., lines 44 etc.). The individual advance magnets P101 and E100 correspond to a column solenoid such as shown at 98.

Referring now to Figs. 1P, 2P and 3P: Whenever holes are to be punched in a particular column of the card, relay Pr10 is operated when the plunger head of the perforator mechanism has been brought into position over this column. One or two plunger magnets P12, P11, P0, P1, P2, P3, P4, P5, P6, P7, P8, and P9 operate under the control of six coding relays Pr1 to Pr6 according to the value of the digits to be represented by the holes. This value is in turn determined by the position in which the brushes of one of the accumulating switches is standing. Punches PLJ through set bars PLG are prepared effective in either the upper or lower half of the column according to whether Pr9 or Pr6, respectively, is operated. Plunger magnets P12, P11, P0, P1, P2, and P3 control the punches PLJ used for the upper half of the card, and plunger magnets P4, P5, P6, P7, P8 and P9 those for the lower half.

The coding relay and plunger magnets operated to control punches for the upper or lower parts of the card in accordance with the different digital values, are as follows:

| Digit | Coding Relays | Plunger magnets operated | |
|---|---|---|---|
| | | Upper Part of Columns | Lower Part of Columns |
| 0 | Pr1 | 12 | 4 |
| 1 | Pr2 | 11 | 5 |
| 2 | Pr2 and Pr6 | 11 and 3 | 5 and 9 |
| 3 | Pr3 | 0 | 6 |
| 4 | Pr3 and Pr6 | 0 and 3 | 6 and 9 |
| 5 | Pr4 | 1 | 7 |
| 6 | Pr4 and Pr6 | 1 and 3 | 7 and 9 |
| 7 | Pr5 | 2 | 8 |
| 8 | Pr5 and Pr6 | 2 and 3 | 8 and 9 |
| 9 | Pr6 | 3 | 9 |

Each time Pr10 operates to energize the plunger magnets, the advance magnet P100, Fig. 1P, also operates. When this magnet releases, the plunger head advances to the next column on the card, where the punch-preparing operation is repeated.

The plunger head PLA also carries, at PLB, five brushes Pa, Pb, Pc, Pd and Pe, grounded at Pr12 front, which wipe over a bank of 46 sets of terminal contacts as the head advances, and signal to the control circuit, to which these contacts are wired, the position in which the plunger head PLA is standing. The control circuit in turn, and depending upon the relay combination set up therein, determines which accumulating switch shall be scrutinised in this position, and thus which punches PLJ shall be prepared.

When all required punches PLJ have been prepared, Pr11 operates and energizes the return magnet P101, which among other things, causes holes to be punched simultaneously in the card CRD by the selected punches PLJ, as previously explained in connection with the Rice patent.

It should be noted that all the magnets in the perforator mechanism are designed to be operated by alternating current (wiring drawn in heavy lines); also that punching does not and cannot take place as soon as the punches have been prepared because the card is, at this stage, still in position beneath the feeler head in slot EXC of the explorer mechanism.

*Preparing of punches*

In the calculation operation for which key 12 is depressed we will assume for the purpose of explaining the present operation that the solution is to be represented by holes punched in the lower half of column 34 to 39 (relays Or47–48). There are some other operations provided for by the operation of CK12 in addition to the perforation operation in columns 34 to 39, but since this part of the specification is directed to describing an addition operation followed by a subtraction operation after which the result of these two calculations is to be perforated in a card, we will assume that a perforating operation is initiated when the punch head reaches position 40. This operation is assumed to be started by an operating ground from the contact field through appropriate Or relay contacts to terminal Ca38 of the terminal strip, Fig. 1o, and wire 38 of the EO1 multiple through the winding of Er28 to battery.

The operation of Er28 connects an operating ground on the sixth wire of the EP multiple which is connected through the windings of Pr11 to battery, thus operating the Pr11 relay. The return magnet P101 is operated from a source of alternating current on the closure of the contacts of relay Pr11.

In connection with the punching operation the SM switches are scrutinized in turn as will now be described.

During the last transfer in the process of subtraction (of the numbers 339 and 47) explained before, i. e., in position 34, relays Tr17, Tr15 and Tr19 operate and Er11 operates during the time of the compensating step, via ground, Er1 front, brush Ec in position 34, Or47 front, terminal Ca37, OT1, Tr19 front, ET wire 11, Er11, battery. Er11 locks, via ground, Er2 front 1, Er14 back, Er11 front, Er11, battery. Er11 operates Pr12, via ground, Er15 back, Er11 front, EP wire 2, Pr12, battery.

When the explorer feeler head reaches the column 35, relay Er12 operates, as follows: Ground, Er1 front, brush Ea in position 35, Or47, terminal Ca33, EO1 wire 33, Er12, battery.

Er12 opens the circuit of Er19 so that the explorer stops in position 35.

Er11 closes a circuit for Er8 in order to continue the pulsing operations of relays Er8–10, by the following circuit: Ground, Er11 front, Er9 back, EY2, EY3, EY4, Er8, battery.

Er8 operates Er10.

Under these conditions the advance magnet E99 for the card explorer does not operate since the operating ground from Er19 front 2 is cut off, and therefor even though Er10 operates, the circuit through the front 1 contact for operating Er29 is open at Er19. Every time, however, Er10 operates, Pr10 and the advance magnet P100 of the perforator mechanism operate, via the following circuits: ground, Er10 front, Er11 front, EP wire 1, Pr10, PY16, battery; and also alternating current source, advance magnet P100, Pr10 front, PY17 and PY18, P100 back to the other terminal of the alternating current source.

The plunger head thus advances step by step towards the columns in which the holes are to be punched. When it is standing over column 34, Pr8 operates to determine that punches shall be prepared for the lower half column, this operation being initiated from the contact field over the following circuit, ground Pr12 front, brush Pa in position 34, Or47 front, terminal Cb18, OP1 wire 18, Pr8, battery.

Pr8 locks to ground at Pr12 front.

In positions 35 and 36 the empty switches SM4 and SM5 are scrutinized.

In standing over column 37, the switch SM6 is scrutinized and coding relays Pr2 and Pr6 operate, via ground, Pr12 front, brush Pa in position 37, Or48 front, terminal Cb6, OS1 wire 6, brush B of SM6 in position 2, QS1 wire 2, QR20 back 1, PQ wire 2, Pr2, Pr6, PY15, battery. Pr2 and Pr6 from their front 1 contacts operate Pr19 in an obvious circuit, and Pr19 locks to ground at Pr12 front.

When Pr10 next operates, plunger magnet P5 operates, via alternating current supply, magnet P5, Pr2 front, Pr8 front, Pr10 front, PY21, PY22, alternating current supply.

At the same time, plunger magnet P9 operates, via alternating current supply, magnet P9, Pr6 front, Pr8 front, Pr10 front, PY21, PY22, alternating current supply.

These magnets P5 and P9 prepare the punch which will later punch a hole, representing the digital value 2, in column 37 in accordance with the table given at the beginning of this section of the specification.

When Pr10 releases, P5 and P9 release and the plunger head advances to position 38. In this position the switch SM7 is scrutinized and coding relay Pr6 operates via ground, Pr12 front, brush Pa in position 38, Or48 front, terminal Cb7, OS1 wire 7, brush B of SM7 in position 9, QS1 wire 9, QR21 back 4, PQ wire 11, PR6, PY15, battery.

When Pr10 next operates, plunger magnet P9 operates via alternating current supply, magnet P9, Pr6 front, Pr8 front, Pr10 front, PY21, PY22, alternating current supply.

The magnet P9 prepares the punch which will later punch a hole representing the digital value 9 in column 38 in accordance with the table given at the beginning of this section of the specification.

When Pr10 releases, P9 releases and the plunger head advances to position 39. In this position the switch SM8 is scrutinized and coding relays Pr2 and Pr6 operate via ground, Pr12 front, brush Pa in position 39, Or48 front, terminal Cb8, OS1 wire 8, brush B of SM8 in position 2, QS1 wire 2, QR20 back 1, PQ wire 2, Pr2, Pr6, PY15, battery.

When Pr10 next operates, plunger magnet P5 operates via alternating current supply, magnet P5, Pr2 front, Pr8 front, Pr10 front PY21, PY22, alternating current supply.

At the same time, plunger magnet P9 operates via alternating current supply, magnet P9, Pr6 front, Pr8 front, Pr10 front, PY21, PY22, alternating current supply.

The magnets P5 and P9 prepare the punch which will later punch a hole representing the digital value 2 in column 39 in accordance with the table given at the beginning of this section of the specification.

When Pr10 releases, P5 and P9 release and the plunger head advances to position 40, in this position Er14 operates via, ground, Pr12 front, brush Pa in position 40, Or48 front, terminal Ca34, EO1 wire 34, Er14, battery. Er14 releases Er11, Pr12, and Pr12 releases Pr8 and Pr19.

Punches have thus been prepared whereby holes, representing both digitally and ordinally the number 339, that is the sum of the two numbers 286 and 53 read from the card will later be punched in columns 37, 38, and 39 of the lower part of the card. It will be noted that Pr19 operates and locks the first time any of the five coding relays Pr2 to Pr6 operates, but not when the sixth coding relay Pr1 operates. The object of this exception is to prevent punching, in a column assigned for the purpose of a hole representing the digital value 0 unless the digit of higher ordinal value is significant. If, for example, three columns are assigned and the solution of the calculation operation recorded on three accumulating switches has but two significant digits; the first of the three switches scrutinized, which constitutes the higest ordinal value of the solution, is recording value 0; and since Pr 19 has not yet operated, Pr1 does not operate and no punch is prepared. On the other hand, if the value of a digit which has a lower ordinal value than a significant digit is 0, Pr19 is already operated when the switch recording it is scrutinized. Pr1 therefore operates in a circuit including Pr19 front, and a punch is prepared.

*Perforation of card and release*

Assuming now that the plunger head has reached column 40 and the circuits are such that an operating ground is connected from the perforator contact field through appropriate Or relay contacts to terminal Ca38 and thence through wire 38 of the EO multiple through the windings of Er28 to battery. As previously explained Er28 when operated places an operating ground on the sixth wire of the EP multiple operating relay Pr11 which in turn operates return magnet P101. The return magnet P101 causes the card CRD to be transferred through skid rollers CDD over table CDC from slot EXC of the explorer mechanism to slot PLC of the perforator mechanism, perforated in columns by the punches PLJ which have been prepared by set bars PLG and then ejected into output hopper CDF. It also causes another card in input hopper CDE to be seized and positioned in slot EXC of the explorer mechanism, and the feeler and plunger heads EXA and PLA to be returned to their respective starting positions. It also causes the punch set bars PLG to be reset by operating locking slides PLI. These operations are all taken care of by the "cross" calculator apparatus used in connection with the present invention. A complete card feeding mechanism is shown in the Mixer patent referred to above. A punching mechanism similar to that just described is shown in the Rice et al. patent referred to above.

During these operations, the return contact E101 and the card contact E100 open and remain open until the mechanism is ready to start a fresh cycle and another card is in position, respectively. In the meantime, Er28 is operated from one of the contacts in the perforator contact field in position 40 via suitable contacts of an Or relay connected to terminal 68 which is connected to EO1 wire 38 and Er28. The operation of Er28 removes the operating ground from Er2 which at its third contact releases Er1. Er6 which was locked from Er2 front 1, via Er6 front 1, Er7 back 2, Er6 to battery is also released as well as Er11, Ir50, Mr1, Mr2 and Mr3. Ir50 releases Ir49. Er11 releases Pr12, which releases Pr9 and Pr19. Er1 releases Er12, Cr51, Cr52, Cr53 and Cr54. Cr51 and Cr53 release Cr18 which releases Cr19 and Cr19 releases Cr20. These circuits were described in connection with the operation of Er1 earlier in the specification.

It will be noted that Er1 and Pr12 have removed ground from the ten brushes Ea to Ee and Pa to Pe, so that these brushes close no circuits during the return motion of the feeler and plunger heads.

Upon the release of Cr53 and Cr54, homing circuits are prepared for switch SM6, SM7, and SM8, the only switches still off normal.

Cr46 and Cr47 operate via: Ground, SM6 back, brush C of SM6 off normal, CS4 wire 6, Cr52 back, Cr50 back, Cr46 and Cr47, battery; and two similar circuits from SM7 and SM8.

Cr46 operates Er28 via: Ground, Cr46 front, CE wire 3, Er26, battery.

Er26 holds Er28 operated. Er28 is slow releasing and has not yet released, although its operating circuit was opened upon the release of Er1 which at its front 4 contact opened the operating ground circuit for contact field brushes Ea . . . Ee. The holding circuit for Er28 may be traced from ground, Er26 front, Er2 back, Er28, battery.

Cr47 operates switch magnets SM6, SM7, and SM8, via ground, brush E of SM6 off normal, CS3 wire 6, Cr47 front, CS1 wire 6a, SM6, resistance, battery, and similar circuits for SM7 and SM8.

As soon as one of the switch magnets closes its interrupter make contact, Cr50 operates, as follows: Ground, interrupter make contact, CS9 wire 2, Cr51 and Cr53 back, Cr50, battery.

Cr50 opens the operating circuit of Cr46 and Cr47, but this circuit is kept closed independently over a contact of Cr46 front. Tr15 also operates, but has no function at this stage.

When all three switch magnets have operated and opened their interrupter break contact, Cr46 and Cr47 release and open their several circuits. When all three magnets have released and opened their interrupter make contacts, Tr15 and Cr50 release. Cr50 recloses the circuits for Cr46 and Cr47. The three switch magnets thus cause each switch to advance step by step until their brushes reach their normal position. In this position, the circuit of the switch magnet is opened at brush E and one of the circuits of Cr46 and Cr47 and brush C. When all switches have returned their brushes to their normal positions, Cr46 and Cr47 remain unoperated, and Er26 releases followed by Er28 and Pr11 in turn. Pr11 releases the return magnet P101.

It will be noted that no relay whatever in the calculator unit now remains operated and that all switches have their brushes standing in their normal positions. The calculator is ready to repeat, with another card the operations which have been described, and will begin automatically, provided the card contact E101 is closed and the starting key OK100, Fig. 1o, and the cycle key EK104, Fig. 1E, remain closed. If no card remains in the hopper, Er2 operates, as before, but the circuit of Er1 remains open and lamp SL, Fig. 1o, glows to indicate that calculation cannot proceed. The circuit is traced as follows: Ground, Er2 front, Er1 back, EO3 wire 1, SL, battery. If the cycle key EK104 and the general key EK103 are both opened during calculation, the circuits are released immediately.

*Multiplication*

The calculator circuits may be set up to perform a multiplication operation by the operation of a suitable CK key. For the purposes of explaining the multiplication operations as performed by the present calculator, we will assume that $87 \times 76 = 6612$ is to be performed.

Figure 11:
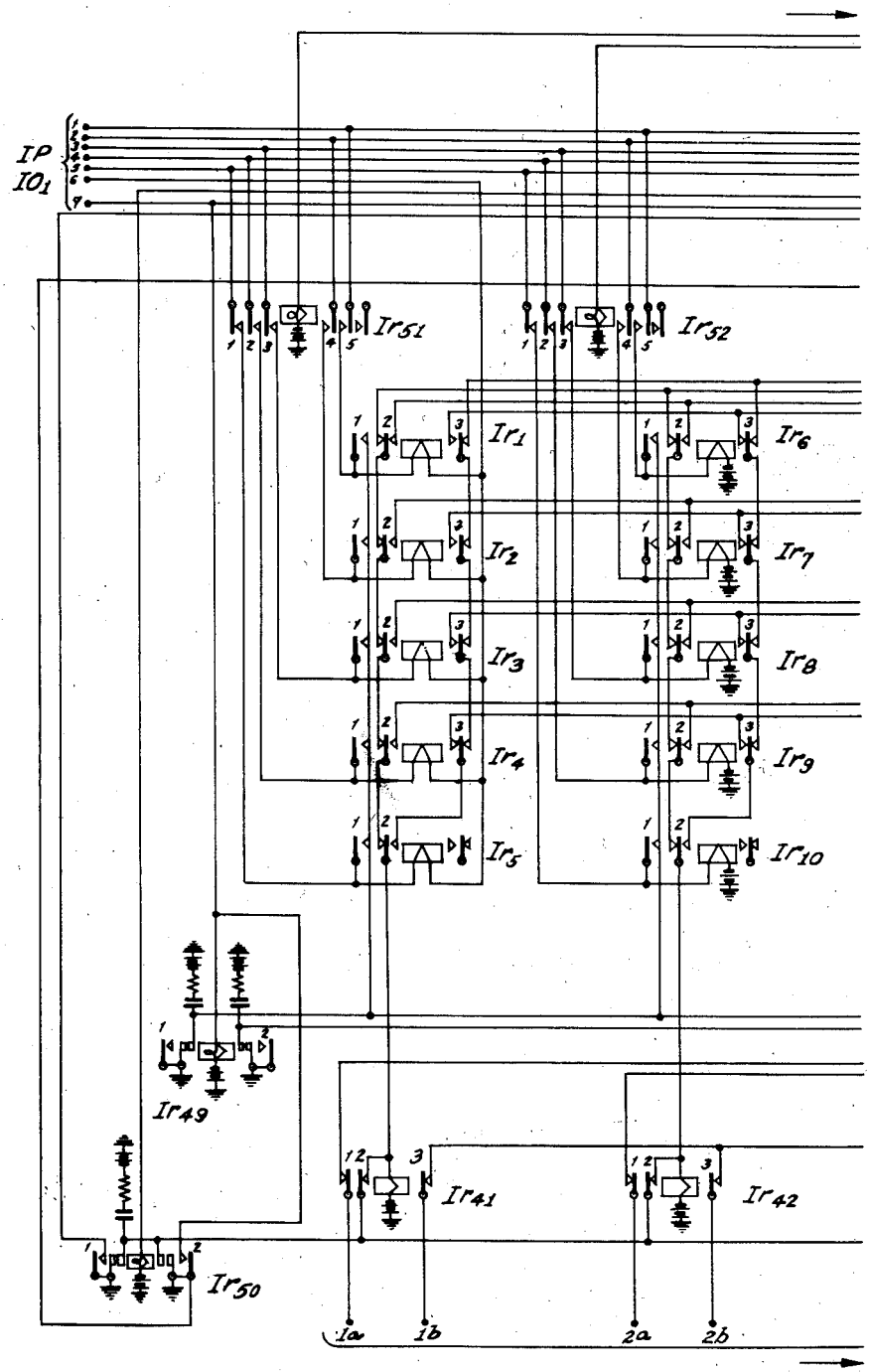
Figure 21:
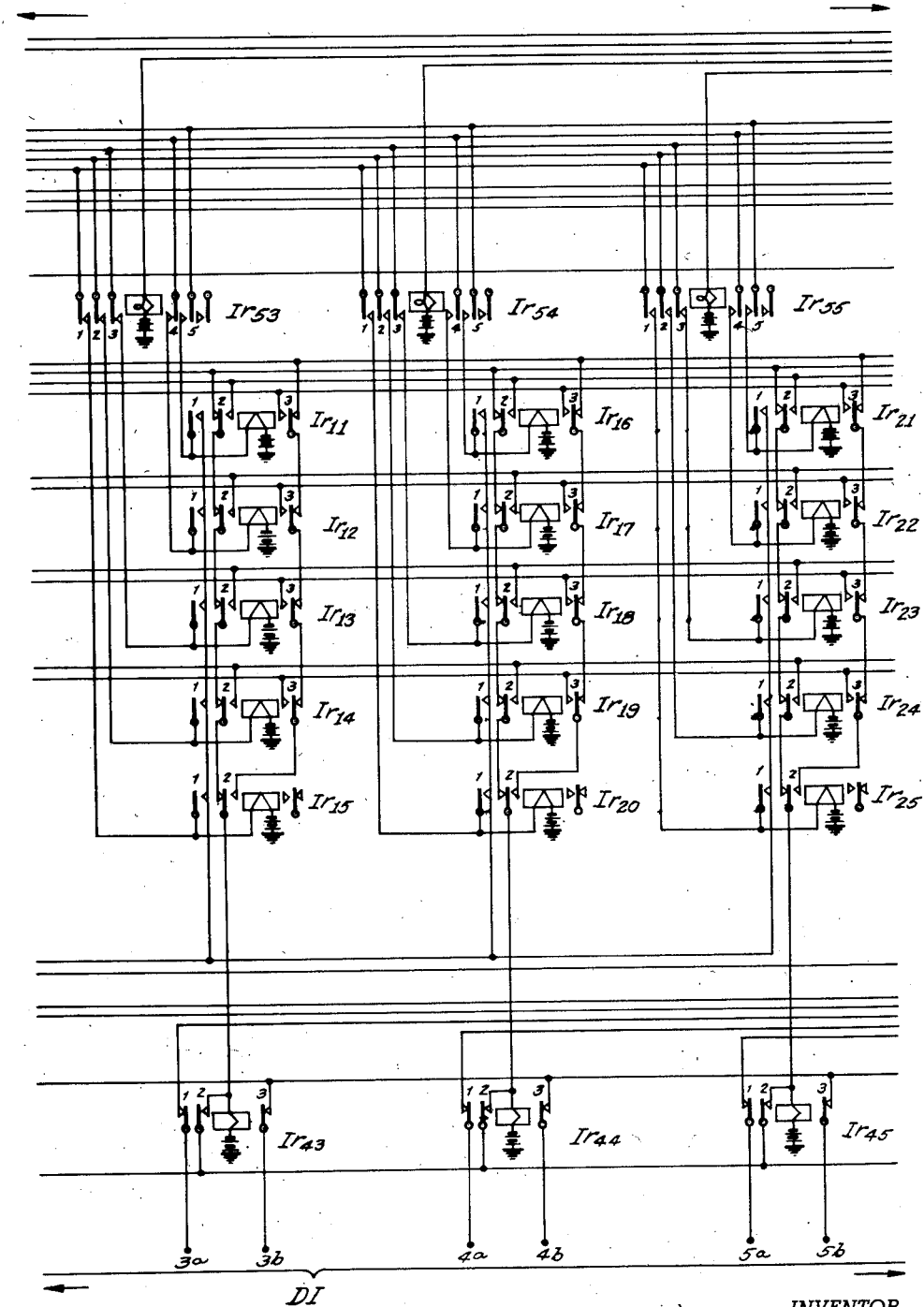
Figure 12A:
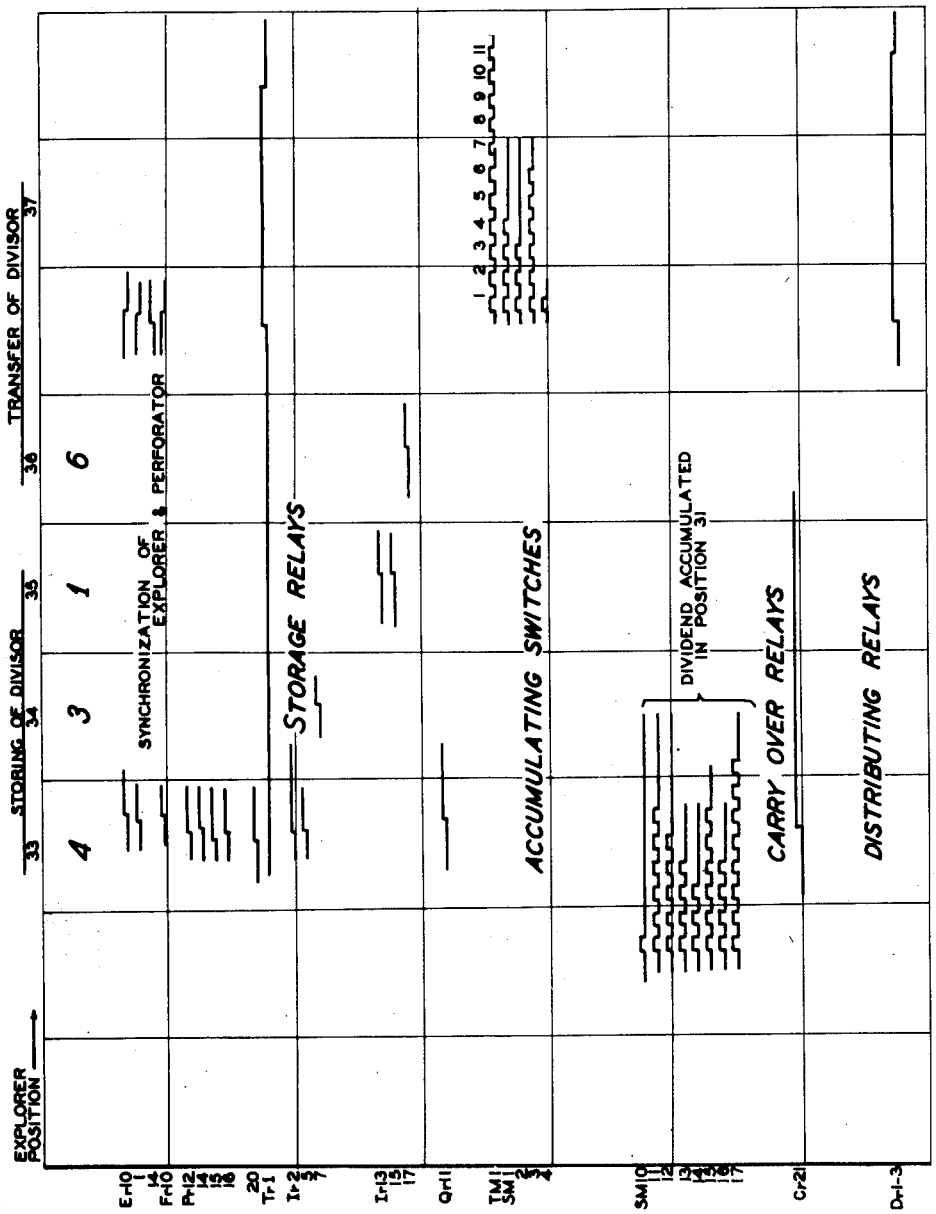
Figure 12F:
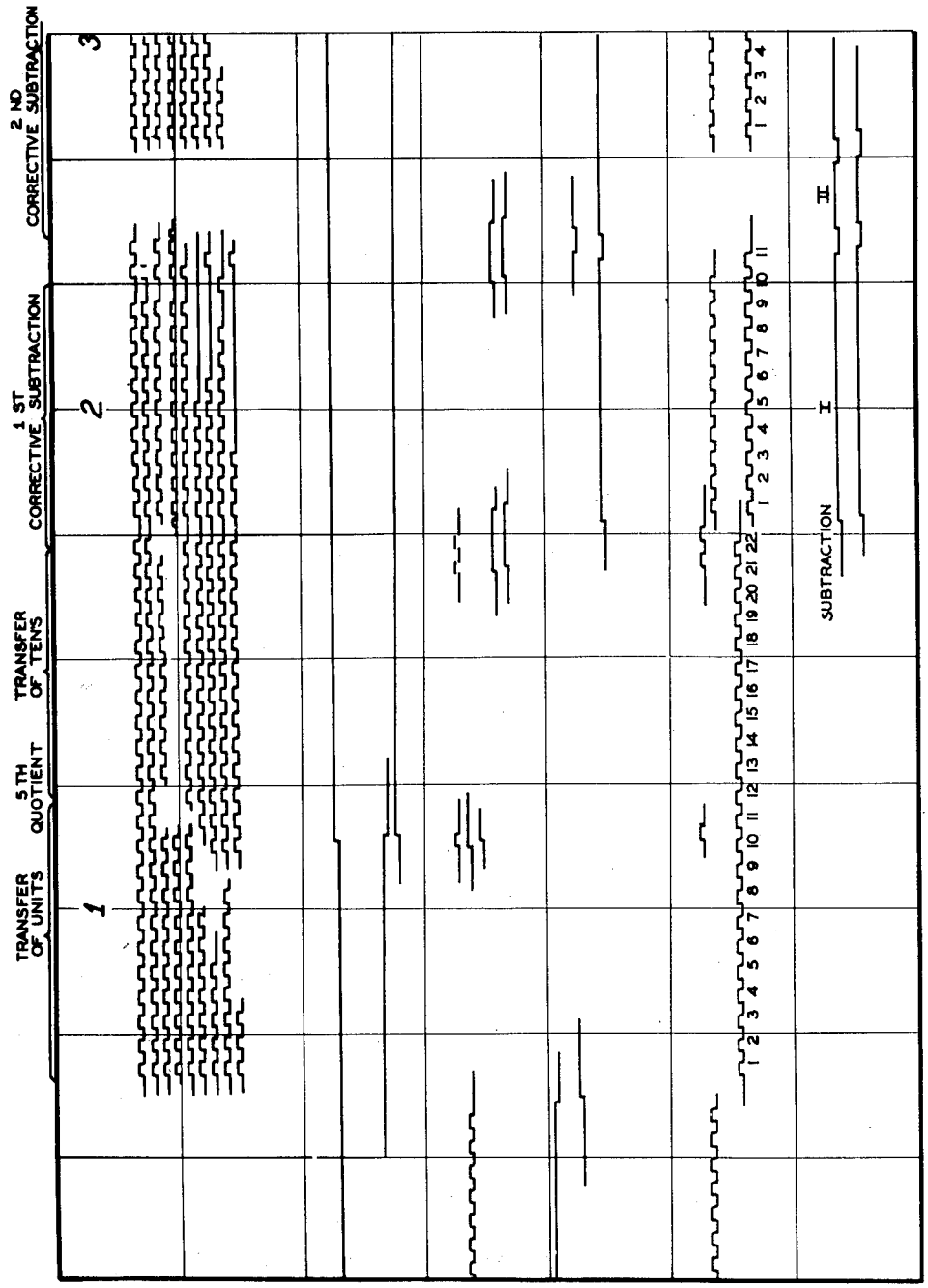
Figure 12I:
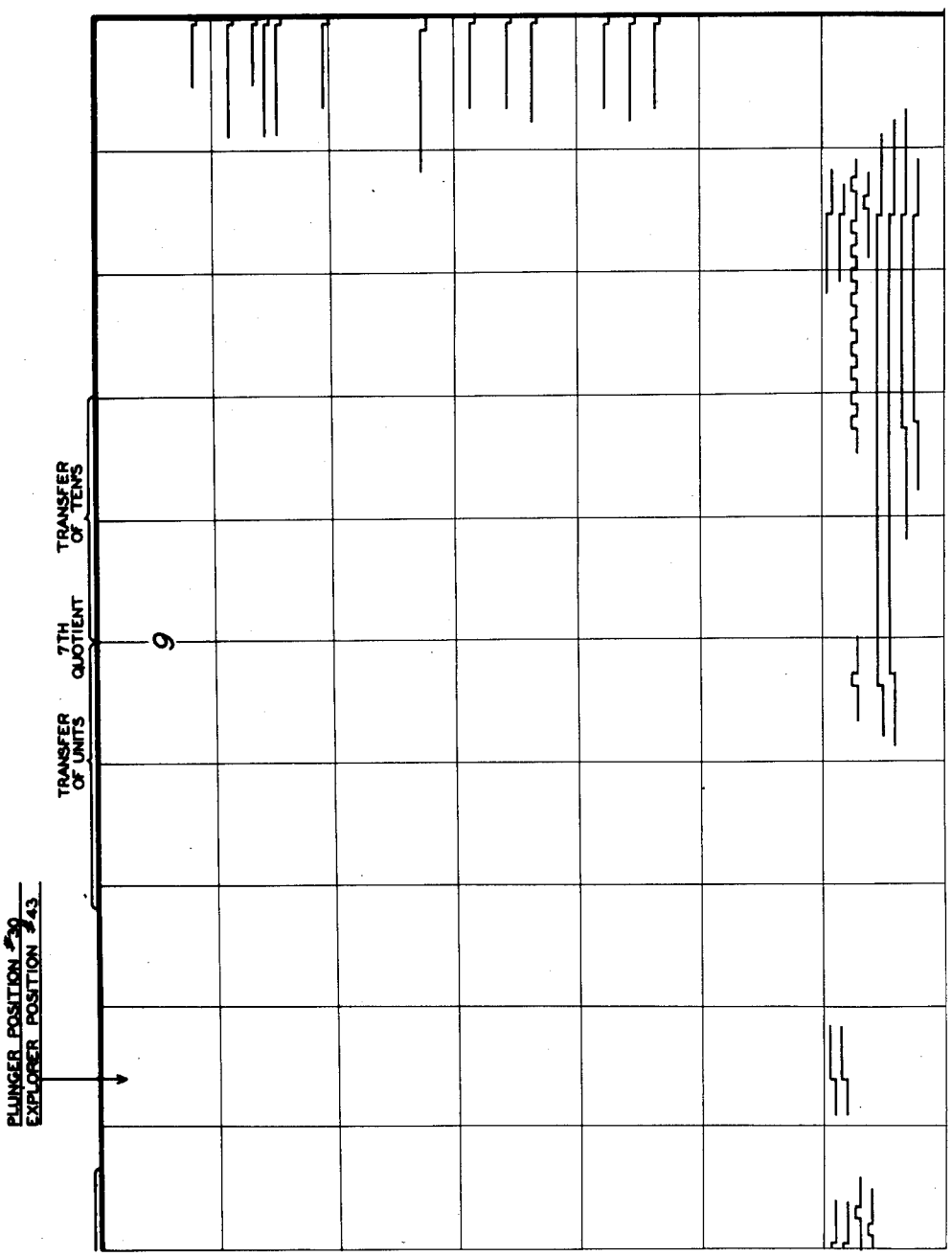

The timing of the characteristic relays of this multiplication operation can be traced in Figs. 11 and 12.

The multiplicand 87 is read from the card and recorded on storage relays. Assuming the control circuit as set up by the Or relays operated by the CK key is such that two two-digit factors are to be multiplied and that the circuit makes provision for selecting the four SM accumulation switches to be used for the calculation. Four switches are required since the product of two two-digit numbers may have four digits. Four SM switches will be assigned as required to accumulate digits of thousands, hundreds, tens and units ordinal values, respectively. The first digit 7 of the multiplier is read in the usual way and the electrical multiplication table, Figs. 1M, 2M and 3M is set for multiplication by 7.

When 87 is multiplied by 7 in the normal way, the process may be expressed thus:

$$\begin{array}{r} 87 \times 7 \\ \hline 56 \\ 49 \\ \hline 609 \end{array}$$

Examining this more closely, it will be seen that the digit 9 for the partial product 49 has the same ordinal value as digit 7 of the multiplicand 87, whereas digit 4 is the carry over to the digit of next higher ordinal value. Similarly, digit 6 of the partial product 56 has the same ordinal value as digit 8 of the multiplicand and therefore the same as digit 4 of the previous partial product to which it must be added; whereas digit 5 is the carry over to the digit of next higher ordinal value. The electrical multiplication table enables the calculator to determine the partial products 56 and 49 directly. The calculator also has a number of step by step switches, i. e., the SM switches, each capable of accumulating successive digits of the same ordinal value as already explained. It could, therefore, cause numbers 56 and 49 to be transferred in succession to accumulating switches, after which these switches would record the product 609. However, the number of transfer operations involved for each digit in the multiplier, would be equal to the number of digits in the multiplicand (maximum 8). In order to carry out the process more directly, the calculator is arranged instead to transfer in succession the number 69, i. e. the partial products without their carry-over digits and the number 54, i. e. the carry-over digits alone. The result is clearly the same, but two transfer operations suffice for each digit in the multiplier, whatever the number of digits in the multiplicand and the process may therefore be more conveniently expressed thus:

$$\begin{array}{r} 87 \times 7 \\ \hline 69 \\ 54 \\ \hline 609 \end{array}$$

So, the multiplication table having been set, as stated, the distributor assigns the second and third of the four indicated switches (accumulating hundreds and tens digits) and the transfer circuit causes these to take six and nine steps respectively. The distributor next assigns the first and the second switches (accumulating thousands and hundreds digits) of the transfer circuit causes these to take five and four steps respectively. The second switch has now taken ten steps in all (0 in its second cycle) and the carry over circuit makes the necessary correction by advancing the first switch by one step, making six in all. The four switches are then recording 6090 which, it will be noted, is a product of 87 and 70.

In the same way, the second digit 6 of the multiplier is read and the multiplication table is reset for multiplication by 6. Following the principle already explained, the process of multiplying 87 by 6 may be expressed thus:

$$87 \times 6$$
$$\overline{\phantom{00}}$$
$$82$$
$$44$$
$$\overline{\phantom{00}}$$
$$522$$
$$\overline{\phantom{00}}$$

The distributor accordingly assigns the third and fourth switches (accummulating tens and units digits) and the transfer circuit causes these to take eight steps, making 17 in all (7 in the second cycle), and two steps, respectively, in accordance with the partial products without their carry over digits. To correct for the carry over of the third switch, the second switch takes one more step. The four switches are then recording 6172. The distributor having next assigned the second and third switches, the transfer circuit causes these to take four steps making 5 in all, and four steps, making 11 in all (one in the third cycle), respectively. The second switch takes an additional step to correct for the carry over of the third switch, making six steps in all. The four accumulating switches, Figs. 1S, 2S and 3S, are finally recording 6612, the product of 86 and 76. The four switches are scrutinized in turn and the card is perforated accordingly in indicated columns and the storage relays are released, in the same way as in the previous examples.

It will be noted that the first factor read, the multiplicand, remains recorded upon storage relays during the whole of the calculation, instead of being immediately transferred to accumulating switches as in the previous examples, and that the digits of multiplier are applied to it in turn, the partial products being recorded one after the other upon accumulating switches.

These operations will now be described in detail.

*Multiplication table*

The multiplication table is composed of nine sets of three relays corresponding to the nine different possible figures of the multiplier, Figs. 1M, 2M and 3M. These twenty-seven relays are designated Mr1 ... Mr27, and they are energized over the multiple EM in case of multiplication. These relays are operated over the MQ multiple for division. The figures of the multiplier are received one after the other on the relay set Er20 ... Er24, which convert the code read on the card to a direct indication of the figure. Ground is connected in this way to one of the wires of the multiple EM to correspond to the figure punched in the card. The numbering of the EM wires corresponds to the multiplier figures. Thus, relays Mr1 ... 3 operate for multiplication by 1. In connection with the latter group of relays, it will be remembered that they are used in connection with addition transfers also. Relays Mr4–6 operate for multiplication by 2, etc., and Mr25–27 are the relays energized for a multiplication by 9.

The connections of the different contacts of relays Mr1–27 correspond to the Pythagore's table. The product of any two figures always contains two figures, "0" being also considered as a first figure. The first figure will be referred to in the following as the ten's figure, and the second one as the U's figure. The connections of the upper eight "make" contacts of relays Mr1–27 corresponds to the eight possible ten's figures and the connections of the bottom 9 "make" contacts corresponds to the 9 possible U's figures. The transfer circuit, as was already mentioned, accomplishes the multiplication transfer in two steps: first the U's figures and then the ten's figures will be transferred to the accumulating switches. Relays Mr28–30 are operated during the ten's transfer in a circuit which will be described later on.

Considering first the U's transfer: as it was explained in connection with addition, the ten wires of the IM multiple are connected to the eight input storing sets Ir1—Ir40, and the stopping relays Ir41—Ir48, which stop impulse sending to the respective SM switches associated therewith, are connected over each input set to the wire corresponding to the figure stored thereon. These ten wires pass via the break contacts of Mr28—Mr30 and via the make contacts of Mr2—5—8—11—14—17—20—23—26 and Mr3—6—9—12—15—18—21—24—27 to the multiple MT2. This multiple is grounded one wire after the other by brush B of the master transfer switch TM2. In the case of multiplication, Tr9 is not operated and the stepping impulses from Tr12 front 3 go through Tr9 back 2 through TM2 to battery. In this case TM1, which operates for addition and subtraction remains unoperated since the impulse circuit, which operates this switch is open at Tr9 front 2. The MT2 multiple is grounded by TM2 in such a way that the wire 0 is grounded before any step is made, the wire 1 is grounded after one step, wire 2 after two steps, etc.

If, for example, the multiplier figure is 3, relays Mr7–9 are operated. It can be seen that the ground over wire 0 or MT2 passes directly via Mr28, back contact 4 to the wire 0 of the IM multiple. All impulse stopping relays Ir41 to Ir48 belonging to Ir storing relay sets storing "0," operate immediately. After one step of the transfer switch, the wire 1 of MT2 is grounded and this ground is connected through front of Mr8 and back of Mr29 to the wire 7 of the IM multiple. All impulse stopping relays belonging to the Ir storing relay sets storing the figure 7 will now operate. It will be noted that the unit's figure of the product $7 \times 3 = 21$ is the digit 1. After two steps, the wire 2 of the MT2 multiple is grounded and this ground is connected through the front of Mr9 and back of Mr29 to wire 41 of the IM multiple. All impulse stopping relays belonging to the Ir storing relays sets storing 4 will now operate. The unit's figure of the product $4 \times 3 = 12$ is the digit 2. In a similar way, the ground on wire 3 of MT2 is connected to wire 1 of the IM multiple, $(1 \times 3 = 03)$; and likewise the wire 4 of MT2 to wire 8 of IM $(5 \times 3 = 15)$, etc.

In another example where the multiplier is 8, for which Mr22–24 are energized, after one step of the transfer switch the wire 1 of MT2 is grounded. Since no product of the nine different figures by eight gives the units 1, the wire 1 is not connected through on the contacts of Mr22-24. After two steps, ground appears on wire 2 of MT2. This ground passes through the front of Mr24 and front of Mr23, and thus the wires 4 and 9 of the IM multiple will be grounded. The impulse stopping relays belonging to Ir storing relay sets either 4 or 9 will now operate, since 4×8=32 and 9×8=72, both having the units 2. Wire 3 of MT2 is again not connected. Wire 4 of MT2 leads to wires 3 and 8 of the IM multiple corresponding to the unit's figures of the product 3×8=24 and 8×8=64.

For the multiplication by 1, relays Mr1-3 are operated, and the nine wires of MT2 are connected through to the correspondingly numbered nine wires of the IM multiple. As previously stated this particular group of relays is used in the addition transfer.

The U's transfer is followed by the ten's transfer, and is preceded by the operation of Mr28-30. Brush B of the transfer switch TM2 now wipes over contacts 11 to 21 which are connected to the wires of the multiple MT1. It should be noted that the contact arcs of switch TM2 are provided with 21 contacts in addition to the N contact. The switch otherwise is the same as the other switches used in the calculator. The contact arrangement wherein each arc has double the number of contacts of the other switches forms a convenient way of operating circuits over two separate multiples for making the unit's and ten's transfer successively. Before any steps are made, in the case of the ten's transfer, wire 0 is grounded; after one step wire 1 is grounded; after two steps, wire 2 is grounded, etc. Taking the same examples as for the U's transfer, the multiplier 3 causes the operation of Mr7-9. Wire 0 of MT1 is first of all connected to wires 0 and 1 of the IM multiple, via fronts of Mr28, since the product of any figure by 0 or 1 has the ten's figure 0. It will be noted that wire 0 of MT1 is connected through on the fronts 5 and 6 of Mr9 and via fronts 1 and 2 of Mr28 to wires 2 and 3 of the IM multiple, so that the impulse stopping relays Ir41-48 will immediately operate if the Ir storing relay sets to which they belong store the figures 2 or 3. It will be noted that 2×3 and 3×3 produce the tens figure 0. Having made one step, the transfer switch TM2 brush B, connects ground to wire 1 of MT1 and this ground is conducted via the fronts of Mr7 and fronts of Mr26-29 to wires 4, 5, 6 of the IM multiple. Thus the impulse stopping relays operate after one impulse if the corresponding storing sets store the figure 4, 5 or 6.

It will be noted the products 4×3=12, 5×3=15 and 6×3=18 have figure 1 as ten's. Wire 2 of MT1, which is grounded after two steps, is connected in a similar way over fronts of Mr7 to wires 7, 8, 9 of the IM multiple in accordance with the products 7×3=21, 8×3=24 and 9×9=27.

In another example of the multiplier 8, relays Mr22-24 energized. Wire 1 of MT1 is connected through the front of Mr23 and the front of Mr28 to wire 2 of IM. It will be noted that 2×8=16 has 1 as the tens figure. Wire 2 of MT1 is connected to wire 3 of IM corresponding to the tens figure 2 of the product 3×8=24. Wire 4 is connected to wires 5 and 6 corresponding to the tens figure 4 of the products 5×8=40 and 6×8=48, etc.

Storing of the multiplicand

Having explained the principles of the multiplication table circuit, the full explanation will now be described with reference to the calculation operation for which CK1 has to be depressed. A table showing the connections made by the Or relays Or6, Or15 to Or19 has been given above. It is not thought necessary to repeat circuits already described in connection with addition so therefore only new circuits will be described in detail.

The multiplicand will be stored on the Ir storage relays in the same manner as for addition. The figures are perforated in the upper half of columns 30 to 35 in the card. The details of this operation have been already described, prior to the detailed description of the addition operation in which CK12 was depressed. Er4 operates from the explorer contacts field while the explorer contacts are standing in position 30, via, ground, Er1 front, Eb30, Or16 front, Ca19, EO1 wire 19, Er4, battery. The operation of Er4 as already explained connects the bus bars E105 which carry the circuits from the explorer feeler contacts EF12, EF11, EF0, EF1, EF2 and EF3 for the upper half of the card columns through to wires 9 to 13 of the EI1 multiple. This multiple can be connected through the contacts of routing relays Ir51 to Ir53 to the windings of the respective relays in each Ir storage group. When routing relays Ir51 to Ir53 are operated progressively, in this instance, from the explorer contact field, combinations of relays in each group are operated according to the perforations punched on the card.

The connections of Or15 show that the figures punched in the card, in this case a maximum of 6 figures for the multiplicand, will be stored on the third to the eighth sets of input storage relays. The two digits of the multiplicand of the typical operation 87×76=6612 is thus preperforated on the card in the columns 34 and 35, and the first digit will be stored on relays Ir34, Ir35 and the second digit by Ir39, of the next storing relay group.

After the storing operation, the feeler head advances past columns 36 and 37 and reaches position 38, where Er16 operates and locks via ground, Er1 front, Ea38, Or16 front, terminal, Ca25, EO1 wire 25, Er16, battery, and ground, Er1 front, Er13 back, Er16 front, Er16, battery. Er16 doubles the operating ground of Ir49 via EI1 wire 15. It also doubles the locking ground of Er4 or Er5, depending on which of these relays is operated. It will be understood that in a multiplication operation, the multiplicand remains stored on the Ir relays.

Transfer of partial products

The figures of the multiplier are perforated on the card, in the upper half of columns 38 to 44. In the example concerned, 7 is perforated in position 43, and 6 is perforated in position 44.

The explorer feeler head, after having explored the figures of the multiplicand advances step by step. Each time Er29 which controls the advance magnet E99 operates, a circuit is closed for Er25, via ground, Er29 front, Er16 front, Er25, battery.

The first five front contacts of Er25 connect the explorer wires to the wires of the windings of five relays Er20 to Er24. These wires are connected to bus bars E105 and through their associated wipers E106 to feeler contacts EF11, EF0, EF1, EF2, and EF3 in case Er4 is energized, and EF5, EF6, EF7, EF8 and EF9, if Er5 is energized. If there is no figure perforated on the card, none of the relays Er20 to Er24 operate, and the explorer advances further. The first figure perforated in the present case will be encountered in position 43. While the explorer feeler head is plunged, that is while any of the EF contacts are closed due to encountering a perforation in the card the following circuit is completed: Ground, feeler contact EF2, Er4 front, Er25 front, Er23, Er30, battery. Er30 opens at its back contact the circuit of Er19. This back contact is shunted by a front contact of Er25, and therefore relay Er19 will only release when the advancing impulse of the explorer is over, that is, when Er29 and Er25 release.

The explorer stops now for the time during which the product of 87×7 is transferred to the accumulating SM switches.

Er23 provides a locking circuit for itself and for Er30, as follows: Ground, Er33 front, Er32 back, Er23 front, Er23, Er30, battery.

The second front contact of Er33 and also wire 16 of EI1 to which this contact is connected are also grounded by the first front contact of Ir50 when the latter is operated.

The transfer is started by the operation of Tr3, via, ground, Er19 back, Er3 front, Er34 back, Er30 front, Er29 back, ET wire 3, Tr3, battery.

The multiplication table is set for the multiplier 7, by the operation of relays Mr19 to Mr21, over the following circuit, ground, Qr14 back, Fig. 2Q, EQ, Er2 front, Er24 back, Er23 front, EM wire 7, Mr19, Mr20, and Mr21 in parallel, battery.

The distributor relays are energized over the contact field of the explorer, and over the contacts of the Or relays, in such a way that the figures of the solution will be stored on accumulating switches as wanted. This part of the circuit will be explained in more detail later. For the present transfer, relays Dr22 to Dr24 operate in the following circuit, ground, Er1 front, brush Ea, contact and terminal 44, Or11 front, terminal C15, wire 15 of the DO multiple, Dr32 back, Dr22, Dr23 and Dr24 in parallel, wire DE1, Er7 back, CE wire 5, Cr43 back, CD, battery.

Relay Tr3 connects ground on brush B of TM2 which wipes over the contacts connected with multiple MT2 during the first half of its revolution, and wipes over those contacts connected to multiple MT1 during the second half of its revolution. The first half of the contact arc for brush B of TM2 is used for the transfer of the unit's figures, and the second half for the transfer of the ten's figures. The stepping relays Tr10 and Tr12 energize via the front 1 contact of Tr3 in an otherwise known circuit. For this operation Tr9 is not energized and therefore switch TM2 is operated from Tr12 front 3 via Tr9 back 2. As TM2 makes nine steps, two of the solution switches step in unison with it in the following manner.

Ground from Tr3 front 4 connected by the B brush of TM2 to wire 0 of MT2 energizes stopping relays Ir41 to 46 via the multiplication table and the back 4 contact of Mr28 and wire 0 of the IM multiple since no figures of the multiplicand are stored on the first six sets of storage relays. The impulsing wires 1a to 6a are therefore open at the back contacts of Ir41–46 before stepping starts, and the SM switches associated with these relays do not step. Ir47 is connected over fronts of Ir35 and Ir34 to wire 8 of the multiple IM, which wire will be grounded via MT2 and brush B of TM2. The product of 8×7=56 has the unit's figure 6; therefore Ir47 has to operate after six steps of TM2 to cut off the operating circuit of the SM switch associated therewith at this point. The circuit may be traced as follows: Ground, Tr3 front, brush B of TM2, wire 6 of MT2, Mr20 front, Mr30 back, IM wire 8, Ir34 and 35 fronts, Ir47, battery.

Before the operation of stopping relay Ir47, six impulses therefore have been produced by impulse relay Tr11 on wire 7a of the DI multiple. These impulses advance the solution switch SM14 in the following circuit: Ground, Tr11 front, wire 7 of IT1, Ir47 back, DI wire 7a, Dr24 front, DS wire 14a, SM14, resistance, battery.

A similar stepping circuit is established for the solution switch SM15, which has to accumulate the units figure of the product 7×7=49, i. e. 9 impulses. Relay Ir48, which is connected over Ir40 back and Ir39 front, to wire 7 of the IM multiple will find no circuit closed during the units transfer; it therefore lets all 9 impulses pass through produced by the transfer circuit for the units transfer.

The way in which the stepping relays are locked and the safe advance of the solution switches is insured has been described in connection with addition, and it is not thought necessary to repeat the description again at this point.

At the end of the units transfer, the transfer circuit produces first a carry-over from the ninth contact of the switch and then a compensating impulse from the tenth contact of the switch. These operations take place over the same circuits as those described in connection with addition. During the carry-over impulse a circuit is closed from the A brush of TM2 on the ninth contact of its arc which operates Tr16; Tr16 from its fifth front contact operates Tr18. Tr18 from its fourth front contact energized Dr33 via Tr5 back 1, and Tr3 front 2, and DT2 wire 2. Dr33 from its fifth front contact provides a locking ground for a number of circuits over wire 1 of the multiple DT2. Dr33 energizes relays Mr28–30, which prepare the multiplication table for the transfer of the tens.

During the compensating impulsing which occurs when brush A of TM2 reaches the tenth contact of its arc, Tr17 is operated from a brush A, and when Tr17 operates Tr19 is operated by ground from Tr17 front. Tr19 energizes Tr5 via front 4 of Tr3. The principal function of Tr5 is that of shifting the distributor circuit between the units and tens transfer so that the tens operate switches of the next higher value. This can not be accomplished from the explorer contact field because at this time the explorer must remain stationary. Once operated, Tr5 locks itself through its front 3 contact to ground. After the compensating step, TM2 arrives at its terminal 11. Relays 17 and 19 have now released due to this last operation of TM2 in the manner previously described. The eleventh contact of the arc for brush A of TM2 is connected via back 4 of Tr5 to the windings of stepping relays Tr10, Tr11 and Tr12. This circuit causes the switch to advance one step to its twelfth contact. The arc for the A brush has its twelfth contact interconnected with contacts 13 to 19 and also connected to the same circuit as the corresponding group of contacts 2 to 9 by means of which TM2 was stepped around during the units transfer, so now the transfer of the tens will continue with TM2 advancing over the second half of its arcs.

Ir50 releases momentarily during the carry-over due to the operation of Tr18 as in the case of addition. Ir50 releases stopping relays Ir41–48, in order to make them available to control the transfer of the ten's impulses. Ir19, which in the case of addition releases after Ir50, is kept energized this time via front 5 of Er16. It will be recalled that Er16 was initially operated from brush Ea in position 38 and held locked thereafter by a locking ground from Er1 front via Er13 back. The Ir storing relays, therefore, are not released in order to maintain the figures of the multiplicand set up thereon.

In the carry-over circuit Figs. 1C, 2C and 3C, Cr43 operates on the carry-over impulse, the circuit for which has already been described but will now be traced again, briefly, as follows: Brush A, TM2, contact 9, Tr16, front, CT2 wire 1, Cr33, 34, 35 ground, Cr35 front, Cr43, battery.

Cr42 operates on the compensating impulse as already described but the circuit is again briefly traced as follows: Brush A, TM2, contact 10, Tr17; and then ground Tr17 front, CT2 wire 3, Cr39, Cr40, Cr41, Cr41 front, Cr42.

Cr18-20 release under control of Cr43 and 42 in required order, and the carry-over relays Cr1-17 release with the opening of the circuits of Cr18-20, after the compensating impulse in the same way as described for addition.

The starting circuit of the transfer of the ten's impulse is controlled from front 1 of Cr19, so that the transfer proceeds only when the locking circuit for the carry over relays is insured. Tr10-12 operate at this time in the following circuit: Ground, Tr15 back, brush A of TM2, contact 11, Tr5 front, CT2 wire 8, Cr19 front, CT2 wire 9, Tr3 front, Tr12-20, battery.

The transfer of the ten's impulses is effected in the same way as those of the U's. The difference is that the multiplication table circuit is, due to the operated Mr28-30, changed over from the U's contacts. At the end of the tens transfer in positions 20 and 21 of TM2, a carry-over and a compensating impulse are produced in the known way.

During the carry-over Ir50 releases again, but Ir49 and thereby the Ir storing relay remain locked as before. The carry-over relays Cr1-17 release due to the play of relays Cr42-43 and Cr18-20. The front 5 of Tr18 (which relay was operated from the A brush of TM2, twentieth contact of the contact arc, Tr16, etc.), energizes Er6 via the front 2 of Tr5, wire 5 of the ET multiple and back 4 of Er31. Er6 releases Er33 which in turn releases Er3. Due to the simultaneous release of Ir50 and Er33 during carry-over, relays Er20-24 and Er30 release, whereby the record of the multiplier digit is wiped out. Er30 at its contact 2 opens the operating circuit of Tr3 which is connected to this contact via wire 3 of the ET multiple, and Tr3 opens the ET multiple, and Tr opens the locking circuit of Tr 5. This relay, however, remains energized for the time of the tenth ten's pulse over its front 1 contact which is connected to ground via the fourth front contact of Tr18, in order not to short circuit the operating circuit of Er6, via front 2 of Tr5. When TM2 arrives at its normal position N, all relays in the transfer circuit, Figs. 1T, 2T and 3T, are released and the transfer of the multiplication by one figure is terminated.

Er30, when released, closes again the circuit of Er19. The impulsing relays Er8-10 of the explorer advance magnet E99 are energized and the explorer makes one step. While this advance magnet is energized, the feelers explore the card perforations, and a combination of the relays Ir20-24 is operated via the fronts of Er25 as before, that is, provided the card bears perforations in the column. If the pilot relay Er30 operates, the explorer stops in the next position and the transfer starts again. If the figure explored is "0", Er30 does not operate and the explorer continues stepping.

On the first operation Er29 after the transfer, Er7 operates and when Er29 releases, both Er6 and Er7 release and Er33 and Er3 energize.

After the last transfer, the explorer makes one step and arrives at a position from which it may operate Er11 in order to start the perforator. It will be recalled that Er11 may be operated from the contact field via wire 32 of the EO1 multiple.

Distributor

The distributor circuit directs the partial products to the different accumulating switches, depending on the original values of the figures of the multiplier. The distributor circuit, Figs. 1D, 2D and 3D, comprises ten sets of 3 relays each, and by operating one of these sets of relays, the eight impulsing wires and the eight locking circuits of the impulsing relays Tr10-12 are connected to a series of eight SM switches out of the 17 provided.

The following table shows the relation between the operated Dr relays and the SM switches to which are directed the eight impulse wires coming from the Ir relay circuits, Figs. 1I, 2I and 3I. For the sake of completeness, the table shows the connections of an addition impulse wire referred to as 0 which is required for subtraction and division and which will be expalined later on.

| Operated D Relays | Impulse wires to S accumulating switches. | | | | | | | | |
|---|---|---|---|---|---|---|---|---|---|
| | $DI_0$ | $DI_1$ | $DI_2$ | $DI_3$ | $DI_4$ | $DI_5$ | $DI_6$ | $DI_7$ | $DI_8$ |
| 1, 2, 3 | | SM1 | SM2 | SM3 | SM4 | SM5 | SM6 | SM7 | SM8 |
| 4, 5, 6 | SM1 | 2 | 3 | 4 | 5 | 6 | 7 | 8 | 9 |
| 7, 8, 9 | 2 | 3 | 4 | 5 | 6 | 7 | 8 | 9 | 10 |
| 10, 11, 12 | 3 | 4 | 5 | 6 | 7 | 8 | 9 | 10 | 11 |
| 13, 14, 15 | 4 | 5 | 6 | 7 | 8 | 9 | 10 | 11 | 12 |
| 16, 17, 18 | 5 | 6 | 7 | 8 | 9 | 10 | 11 | 12 | 13 |
| 19, 20, 21 | 6 | 7 | 8 | 9 | 10 | 11 | 12 | 13 | 14 |
| 22, 23, 24 | 7 | 8 | 9 | 10 | 11 | 12 | 13 | 14 | 15 |
| 25, 26, 27 | 8 | 9 | 10 | 11 | 12 | 13 | 14 | 15 | 16 |
| 28, 29, 30 | 9 | 10 | 11 | 12 | 13 | 14 | 15 | 16 | 17 |

The Dr relays are operated from the terminals of the explorer contact field. After having explored a figure of the multiplier, the explorer steps over to the next position, whereupon it energizes one set of Dr relays in such a way that the impulses are stored on the different SM switches according to their decimal values.

Since the explorer does not move during the multiplication transfer which as already explained is composed of a U's and a ten's transfer, it is necessary to introduce a change in the Dr circuit between the U's and ten's transfers, in order to shift the impulses by one decimal value. The U's impulses of a certain transfer have to be directed to the same switches as the ten's impulses of the next transfer. This change in the Dr circuit is accomplished by relays Dr31-33. As known already, Dr33 operates during the carry-over following the transfer of the U's pulses from Tr18 front, Tr5 back, Tr3 or Tr4 front, DT2 wire 2, Dr33, battery. Dr33 energizes Dr31 and Dr32 in an obvious circuit. These three relays have nine change over contacts, over which the operating wires of the D relay sets are changed from one relay set to another one which directs the impulse wires to eight SM switches which are of one degree higher ordinal value.

Assuming that in the example concerned the multiplicand has six and the multiplier a maximum seven figures. The former six are stored on the Ir storing sets 3 to 8, i. e. on relays Ir11-40. The solution, in this case, may show up a maximum 13 figures, and the solution switches SM4-16 are assigned to accumulate the partial solutions of the different transfers. After having explored the first figure of the multiplier in position 38, the explorer operates in the next position relays Dr7-9 via wire 10 of the multiple DO and via terminal Ca10. The U's impulses of the first partial solution are received by the switches SM5-10, as can be seen from the table above. In this connection it should be remembered that no figures are stored on the first three storage sets. When the U's impulses are transferred, Dr31-33 operate and under these conditions Dr4-6 instead of Dr7-9, are energized. Consequently, the ten's impulses will be sent to the switches SM4-9. In the next position of the explorer, the wire 11 of the DO multiple becomes grounded, and since Dr31-33 are again released, Dr10-12 are operated during the U's transfer, and Dr7-9 are energized during the ten's transfer. The solution is finally stored on the switches SM4-16, so that the units of the solution are in all cases stored on SM16. If, for instance, the multiplicand or the multiplier or both have fewer figures than indicated in the above example, they will always be perforated on the cards according to their decimal value. The solution also terminates on SM16 and in front of this as many other switches as required will be used to store the solution.

The multiplication transfer is started by relay Er30, which operates while the advance magnet Er99 of the explorer is energized, since Er30 is in series with Er20-24 and the advance magnet. The distributor relays, Dr, however, can only operate when the explorer releases and passes to the next terminal, as they are controlled from the contact field. The transfer, of course, cannot start before the distributor is prepared. Relay Er34, which is a slightly slow releasing relay, has the purpose to cover this "step over" time of the explorer. Er34 operates each time Er29, the control relay for the advance magnet is energized, from ground Er29 front. Er34 controls on its back contact 1 the operating circuit of Tr3, traced as follows: Ground, Er19 back, Er3 front, Er34 back, Er30 front, Er20-24, ET3, Tr3, battery. Tr3 supplies the operating ground to brush B of TM2. The transfer will thus start when Er34 is deenergized and its back contacts closed and under these conditions relays Dr are operated with certainty.

Constant multiplier

In case a factor on each of a series of cards have to be multiplied by the same multiplier, the figures of this latter can be recorded on the manually operable digit switches D1 ... D6 of the control unit Fig. 1o and need not be perforated on the cards.

Such an operation is performed when key CK8 is depressed. Relays Or13, Or28-30 are energized in this control circuit. The connections established by these relays may be determined easily from the legends associated with the relay contacts on Figs. 1o, 2o and 3o. For this operation the figures of the multiplicand are perforated in the bottom half of columns 18-22. These figures, as appears from the connections of relay Or28, are stored on the fourth to eighth storage relay sets, routing relays Ir54, 55 ... 58 being operated in succession via the IO2 multiple as brush Ea progresses from the eighteenth to the twenty-second positions of its contact field. When the explorer feeler head reaches position 23, Er31 operates, via: Ground, Er1 front, brush Ea, terminal 23, Or29 front, terminal Ca43, EO1 wire 43, Er31, battery. Er31 energizes Er25 as follows: Ground, Er32 back, Er34 back, Er31 front, Er25, battery.

At the same time, Er12 operates in order to stop the explorer by the release of Er19. This operating circuit may be traced, via: Ground, Er1 front, brush Eb position 23, Or29 front, terminal Ca33, wire 33 of the EO1 multiple, Er12, battery. Assuming that the constant multiplier is 125, the six dials of the control unit are thus placed on their respective contacts numbered 000125. Er31 front 5 connects ground through the brush of the first dial switch and thereby energizes Er32 over the following circuit, ground, Er35 back 2, Er31 front 5, brush C of step by step switch EEM, Fig. 3E; EO2 wire 1, brush of digit switch D1 in position 0, Figure 1o, EO2 wire 0, Er35 back 4, EEM back contact Er32, battery. Er32 energized Er34 in an obvious circuit over Er32 front 1 and now EEM is operated via the front contacts 2 of Er32 and Er34 in series. EEM opens at its back contact or interrupter, the circuit of Er32, with the result that Er32 releases and EEM makes one step.

The above operation is repeated twice owing to the fact that the second and third dial switches, D2 and D3 respectively having their brushes also on position 0.

When the brushes of EEM have reached their fourth contacts, brush C is connected via wire 4 of the EO2 multiple to the brush of switch D4, and Er20 and Er30 operate as follows: Ground, Er35 back 2, etc., brush of digit switch D4 in position 1, 10 wire 1, El1 wire 9, Er25 front, Er20, Er30, battery. Transfer of the multiplicand to the appropriate SM switches is started by the operation of Tr1 for an addition transfer, the multiplicand, however, remains set up on the Ir relays. The addition transfer is used because the first number of the multiplier is 1 since in the present instance the brush D4 is on its contact 1. This illustrates a special condition in a multiplication operation. The circuit may be traced as follows: Ground, Er19 back, Er3 front, Er34 back, Er30 front, Er20 front, Er24 back, ET wire 1, Tr1, battery.

It will be noted that the multiplication operation having multiplier 1 can be accomplished in a single step by an addition transfer.

The distributor relays Dr22-24 are energized over the following circuit: Ground, Er31 front, brush B of EEM on contact 4, wire 15 of DE2, DE22-24 in parallel, wire DE1, Er7 back, CE wire 5, Cr43 back, CD, battery.

In the multiplication table circuit Mr1-3 are operated via ground, Qr12 back, EQ, Er2 front, Er21–24 back, EEM1, Mr1, 2, 3, battery, since none of the relays Er21–24 is energized. Due to the operation of Tr1 an addition transfer operation starts. The addition operation was explained in detail in the description of the addition operation in an earlier part of the specification. The figures of the multicand as stored on the Ir storage relay sets are transferred to the solution switches SM8–15.

During the compensating step, Er32 is energized as follows: Ground, Tr18 front, Tr9 front, ET wire 5, Er31 front, Er32, battery. E32 locks in, as follows: Ground, Er33 front, Er32 front, EEM back contact, Er32, battery. Er33, it will be recalled, is operated from Er2 front, Er6 back; Er2 having been operated from the cycle key EK109 and the cycle control key OK101.

Er32 disconnects the locking ground of Er20 and Er30, so that the multiplying Figure 1 is wiped out. Er32 energizes Er34 in an obvious circuit, and then EEM is energized as already described. When EEM opens its interrupter contact, Er32 releases and EEM steps over to the next terminal.

The brushes of EEM are now standing on their fifth contacts and brush C is connected through the fifth wire of multiple EO2 to the brush of switch D5 which is set on its contact number 2 to record the Figure 2. Or2 operates as follows, ground, Er35 back, Er31 front, brush C of EEM, EO2 wire 5, contact number 2 of digit switch D5, Or2, battery.

Or2 energizes Er20 and Er24, via IO1 wires 1 and 5 which extend across the top of Figures 1I, 2I and 3I and connect respectively with wires 9 and 13 of the EI1 multiple and these wires in turn are connected through the windings of Er20 and 24 and also to battery through the windings of pilot relay Er30, which starts the multiplication transfer. Er30 operates together with Er29 and Er24 and the following circuits are closed the transfer being started by the operation of Tr3 as follows: Ground, Er19 back, Er3 front, Er34 back, Er30 front, Er20 front, Er24 front, ET wire 3, Tr3, battery.

The distributor relays Dr25–27 operate over the arc for the brush B of EEM in the known way, instead of from the contact field as in the case when the number is read from a card. The progressive movement of the switch brush over its contact arc provides a distributing arrangement, equivalent to the explorer contact field.

The multiplication table relays Mr4–6 are energized corresponding to the multiplier 2 and the transfer is accomplished now in 2 steps, U's and ten's transfers, in the known manner. At the end of the ten's transfer Er32 operates and EEM advances to the next terminal.

When the transfer by the last multiplier 5 from switch D6 which has its brush positioned on contact number 5 is terminated, EEM closes the circuit of Er19 and the stepping action of the card explorer is resumed. The circuit is as follows: Ground, Er35 back, Er31 front, brush C of EEM, wire 6 of EO2, Er12 front, Er1 front, Er19, battery.

The set of stepping relays Er8–10 is energized and the explorer leaves position 23 whereby Er31 is released. The switch EEM returns to normal with the help of Er32 and Er34.

The product is now stored on accumulating switches SM8–17 and the solution can be perforated, if no further calculation operation is required.

Continued calculations

In the foregoing explanation of addition and subtraction calculations, it has been shown that a factor can be added to or subtracted from another factor already recorded on accumulating switches by the simple process of continued accumulation, the resulting positions of these switches indicating the solution of the problem. By similar processes, any number of other factors may be added to or subtracted from this solution in succession, while the card remains in the machine, the only restriction being that the number of digits in any factor and in the final solution must not exceed the number of storage relay sets and of accumulating switches respectively available. Since eight relay sets and seventeen switches are provided, the possible number of such successive calculating operations is very great, and almost any operation of the type $$A \pm B \pm C \pm \ldots = S$$

is within the capability of the calculator. Moreover, since the positions of the accumulating switches, after each successive operation, indicate the result of the calculations so far performed, the calculator is able to cause any desired intermediate solution or sub-total to be recorded on the card, as well as the final solution.

It has been shown that the product of a multiplication operation is also ultimately recorded on accumulating switches. The same group of switches is used for multiplication as for addition and subtraction operations, so that the calculator is able to follow a multiplication operation by addition and subtraction operations with the same freedom from restriction, and any practical problem of the type $$(A \times B) \pm C \pm D \pm \ldots = S$$

can be solved.

The scope of the possible calculating operations is still further increased by two additional features. There are, as stated previously, relays in the perforator circuit capable of transposing digital values, indicated decimally by accumulating switches, to the code used in perforating the cards. Instead of, or as well as controlling punches in the perforator mechanism, these relays can also be used to record the coded digital values on storage relays of the input storing circuit. This "back-transfer" process enables the solution of one problem to be made available for use as a factor for a fresh calculating operation, in the same way as if it were a factor newly read from the card. Thus, continued multiplication operations, or a multiplication operation following addition and subtraction operations, of the general types $$A \times B \times C \ldots = S$$

and $$(A \pm B \pm C \pm \ldots) \times D \times \ldots = S$$

can also be performed.

Furthermore, the group of 17 accumulating switches may be divided into two smaller groups, of 8 and 9 respectively, and these may be used separately and independently for any single or continued operation of the types described in the preceding paragraphs, provided that the final solution does not have more than 8 or 9 digits. By performing two such separate operations concurrently, and using the "back transfer" process to make the solution of one of them available as a fresh factor, operations of the types $$(A \pm B \pm \ldots) \times (C \pm D \pm \ldots) \times \ldots = S$$

and $$(A \times B \times \ldots) \pm (C \times D \times \ldots) \pm \ldots = S$$

can be performed without difficulty.

It is often unnecessary, and indeed undesirable, to record on the card all the digits of a solution produced by the calculator. In order that the number recorded may correctly represent this solution, the last digit recorded may, however, require modification or "rounding-off." The calculator is able to round off this digit to the nearest unit or nearest five units, as required.

For example, to record two digits only of a four-digit solution, with the second digit rounded off to the nearest unit, the calculator automatically adds 50 to the complete solution, in response to a signal from the control unit, and records the first two digits of the sum obtained, which is then correct to two significant digits, as will be seen from the following typical cases:

|  | Case 1 | Case 2 |
|---|---|---|
| Complete solution | 2326 | 2374 |
| Add | 50 | 50 |
| Sum | 2376 | 2424 |
| Rounded off solution | 23 | 24 |

If three digits of a four-digit solution are to be recorded, with the third digit rounded off to the nearest 5 units, the calculator automatically adds 25 and causes 0 to be recorded for the third digit, if this digit of the sum obtained is 0, 1, 2, 3 or 4, and 5 to be recorded if it is 5, 6, 7, 8 or 9. The following typical cases illustrate the process:

|  | Case 1 | Case 2 | Case 3 |
|---|---|---|---|
| Complete | 2324 | 2374 | 2376 |
| Add | 25 | 25 | 25 |
| Sum | 2349 | 2399 | 2401 |
| Rounded off | 230 | 235 | 240 |

The rounding off operations are controlled by the operation of Er17 from the explorer contact field via front contacts of Er3. These operations will be described in more detail further on.

*Use of different groups of accumulating switches*

It is possible, as stated, to perform calculation operations upon the group of 8 accumulating switches SM1 to SM8, or upon the group of 17 switches.

If the whole group of 17 switches has to be used, Cr44 is operated in a circuit including the contact of one of the relays Or, terminal Ca41 and CO wire 41 to unite the two groups of switches so as to make subtractive entries in all of these switches, Cr44 locks to ground at Cr52 front and Cr54 front. Cr44, in the course of the subtraction calculation, operates Tr20 and Tr21: Ground, Cr44 front, CT2 wire 5, Tr23 front, Tr20 and Tr21, battery.

It will be recalled that Tr23 is operated from Tr2 front 2. Tr20 connects Tr13 and Tr14 in parallel with Tr12 so that Tr13 and Tr14 operate nine times in unison with Tr12 during the transfer operation, and also operate the eight magnets SM1 to SM8 nine times in circuits including ST1 wires 1a, to 8a. Tr20 and Tr21 include the interrupter break contacts of these eight switch magnets in the locking circuit of Tr12, over wires 1b to 8b of the ST1 multiple, so as to insure that all switches step in unison. These eight switches SM1 to SM8 must be capable of receiving 9 impulses in the case of subtraction, because their positions may be changed due to the carry over operation. In this way subtractive entries can be made either in orders 1 to 8 or 9 to 16 of the accumulator. It is considered that all SM switches in front of the first one which receives impulses over the wire DI multiple, receives the digit 0, i. e. 9 complementary impulses for subtraction. These nine pulses can be furnished to the highest SM switch (beginning with the ninth) by line DT20a, line DT20b serving the same purpose as do line 1b to 8b of the DI multiple. The delivery of pulses out of the distributor to the various SM switches is via lines 9a and 9b DS. Since subtraction relay Tr2 picks up relay Tr23 which enables transmission of nine pulses over line DT20a, as does division relay Qr4, any desired orders of the register can be used for either addition or subtraction.

*Back-transfer*

The transfer operations described so far are all based on the principle. The figures of a number are explored on the card and stored on the eight Ir storing relay sets. Then, depending on the calculation to be performed, the calculator transfers to the SM switches:

(1) The direct number on addition,
(2) The complement of the numbers on subtraction,
(3) A product of the number on multiplication,
(4) The complement of a product of the number on division.

The direction of the operation is always from the Ir relays towards the SM switches. The Ir relays have the necessary contacts to stop the transfer impulses at the appropriate moment. The SM switches have contact arcs required for the output indication and to facilitate the calculation such as carry-over, approximate quotient, translating jobs, etc. The contacts on the Ir relays and SM switches are, in this way, complementary and the roles of the two sets of devices cannot be interchanged.

It may be necessary, however, to use the solution of a calculation in further operations. This is the case, for example, when $A \times B \times C$ has to be calculated. $A \times B$ is obtained in the normal way and the product is accumulated on the SM switches, whereas the Ir relays have only the record of the figures of A. The multiplication of $A \times B \times C$ is only possible if the solution of $A \times B$ is stored on the Ir storing relays, for then the transfers under the control of the figure C cane be performed in the regular way.

The calculator is arranged to transfer the figures stored on the SM switches to the Ir storing relays. This transfer is called "back-transfer" in view of the fact that it is carried out in the opposite direction compared to those described so far.

The number of figures that can be transferred back to the Ir relays is limited to eight by the fact that only eight Ir storing sets are provided in the present modification of the invention. The solution is available either on the switches SM1–8 or on SM10–17 according to the way the circuits are set up.

The back-transfer is carried out by the step-by-step switch TM3. For this operation TM3 advances step-by-step by the impulses of relays Er8–10 and in each position it transfers one figure from a certain SM switch back to the corresponding Ir storing set, in which relays are operated corresponding to the figure denoted by the position of the SM switch.

When the first calculation is complete and the solution is available on the SM switches, the explorer closes the following two circuits prepared in the control unit.

First, depending on the position of the brushes of the SM switches, wherefrom the figures have to be taken, ground is connected either to wire 29 or to wire 30 of the OT2 multiple. In the former case relays Tr25 and Tr24 operate, and in the latter case Tr26 operates with Tr24.

Relay Pr13 operates via front 4 of Tr24 and connects 5 front contacts of the output converting relays Pr1–5 towards the multiple IP.

Secondly, the explorer is stopped for the time of back-transfer by the operation of relay Er12 via wire 33 of the EO1 multiple.

It should be mentioned that it was necessary to release the Ir relays at the end of the preceding calculation. If this were a multiplication operation, it would be necessary for relay Er13 to be operated via wire 44 of the EO1 multiple in the position corresponding to the last transfer. Under these circumstances, with Er13 operated, Er16 is released and when the compensating impulses operates Er6 and releases Er33 all holding grounds of Ir49 are removed and the operated relays Ir1 to Ir40 release. In the position of back-transfer, Er33 and Ir49 operate again in order to prepare again the locking circuits.

The front 1 of Tr24 starts the impulsing relays Er8–10 via wire 9 of the ET multiple. The front 4 of Er10 is connected via wire 8 of the ET multiple, front 4 of Tr24 to relay Tr27, which operates therefore in accordance with the impulses from Er8–10 and energizes the switch magnet TM3 with each operation. The homing circuit of TM3 is opened at the back 2 of Tr24.

Assuming that the figures to be transferred are stored on SM1–8 and that relay Tr25 has been energized, Tr25 grounds the brush C of TM3. In the normal position of TM3, this ground is led to brush B of the switch SM1, through which it energizes combination of relays Pr1–5 according to the figure stored on SM1. The circuit extends via wires 0 to 9 of the QS1 multiple, back contacts QR19, 20 and 21, which connect the respective wires of the QS1 multiple to correspondingly numbered wires of the PQ multiple, and thence to relays Pr1 to Pr5 and battery. At the same time, the front 6 of Tr24 energizes Ir51 via the normal terminal N of arc B of TM3, so that the fronts 4 of relays Pr1–5 are directed via the circuits of relays Pr13 and Ir51 of the IP multiple to the five storing relays Ir1–5. The circuit, therefore, may be traced from ground, Pr15 back, wire 3 of the IT multiple, Tr24 front, brush B of switch TM3 in position N, wire 1 of the IT2 multiple, Ir57, battery. In position 1 of TM3 the ground of Tr25 passes via the arc for brush B of SM2 and relays Pr1–5 are operated in a combination corresponding to the second figure to be transferred. In other words, this circuit progressively reads the setting of the B brushes of the SM switches and causes a record of the number indicated by the position of the respective switches to be transferred back to the Ir storing relays. Since routing relay Ir52 is operated at this time, this second figure will be stored on relays Ir6–10 of the second storing set.

In a manner just described, all figures stored on switches SM1–8 are transferred in eight steps to the Ir storing relays.

After having made eight steps, TM3 arrives at position 9 and ground is now connected via terminal 9 of the arc for brush C of TM3 and wire 6 of the ET multiple to the front 2 of relay Er12. This ground energizes Er19 and the explorer leaves its position as an indication that the back transfer is terminated. Leaving its position, the explorer releases Pr12, Pr13, Pr24 and Pr25. The switch TM3 returns to normal via its interrupter as soon as Tr24 closes its second back contact.

In case the figures to be transferred are stored on switches SM10–17, relay Tr26 instead of Tr25 is energized in series with Tr24. The only difference in the operation will be that the brush D of TM3 is grounded, and thus switches SM10–17 will be explored since the D brushes of these switches are connected by wires 10 to 17 of the ST2 multiple to the contacts of the contact arc for brush D of TM3.

The locking circuits of relays Tr24–26 are provided for the case where the explorer has to leave the position in which these relays have been energized in order to advance during back transfer to the first position of the next number required for calculation. The relays will be unlocked in this case by the operation of Er15 at the appropriate time.

In most cases before calculation with the back-transfer figures can start, the SM switches have to be returned to their home position. This is accomplished by operation either Er26 or Er27 via the contact field of the explorer. Er26 releases Cr51–52, via ground, Er1 front, Er26, CE1, Cr51 in parallel with Cr52 battery, whereupon the switches SM1–8 return to normal in the way already specified. In case where Er27 is operated the relays released are Cr53–54 and the switches SM9–17 are brought to their home position.

Cr51 and Cr52, as well as Cr53 and Cr54, are controlled by Er1 which, in turn, is operated by Er2. Er2 at its third contact releases Er1. Er2 is operated by Er28, which removes the operating ground from Er2. Er28, in turn, is operated from one of the contacts in the perforator contact field while in its end position 40, via suitable contacts of an Or relay connected to terminal 68. This terminal 68 is connected to EO1 wire 38 and Er28, as already explained. Both Er26 and Er27 are kept energized until the last switch reaches its home position and during this time Er6–7 and Er34 are held operated by the front of Er26 or Er27. Er6 is released via Er2 front 1, Er6 front 1, Er7 back 2, Er6, battery. Er6 releases Er33 and Er3 with the purpose of preventing the starting of any further operation before all of the switches reach their home position.

The back-transfer can be accomplished by the perforator circuit. This can be done advantageously if the partial solution to be transferred back has to be perforated as well. In this case relays Pr1–5, and Pr6 are energized by a ground over the perforator contact field and the input routing relays Ir51–58 are energized accordingly.

The back transfer with the perforator is more flexible than with the switch TM3. With the perforator it is possible to take out the figures from any 8 SM switches; and therefore the operation is not restricted to the first or the last 8 switches. It can also be arranged when the perforator is used for this purpose that if less than 8 figures have to be transfererd back, these can be stored on the Ir storing relays at will, i. e. on the first or on the last set.

If perforation is required together with back transfer, relay Pr8 or Pr9 must be operated, in the same manner as for the ordinary punching operations.

The back transfer arrangement enables the calculator to carry out calculations in addition to the problem $A \times B \times C = S$ mentioned above, such other kinds of problems as the following:

$$(A \pm B \pm C \pm \ldots) \times D = S$$

The figures in brackets are added or subtracted and the solution recorded either on SM1–8 or on SM10–17. The solution will then be transferred back to the Ir relays and multiplication starts with the figures of D.

$$(A \times B) \pm (C \times D) \pm \ldots = S$$

The problem of $A \times B$ is stored on SM10–17, for example. Then the multiplication $C \times D$ is carried out and the partial products are accumulating on SM1–8. The solution of the latter is transferred back to the Ir relays and added to or subtracted from the product of $A \times B$ stored on switches SM10–17. Switches SM1–8 are returned to their home position after each multiplication. All further products are treated in the same way and the final solution is available on the switches Sm9–17, the final solution having a maximum of 9 digits.

Rounding-off

As was explained above, the "rounding-off" the solution to the nearest unit or half unit necessitates an addition transfer, whereby the half amount of the required accuracy has to be added.

The explorer circuit has two relays for such purposes, Er17 and Er18. The former is energized from the contact field via wire 24 of the EO1 multiple, Er3 front 4, Er17 to battery. The front contact 1 of Er17 is connected to the seventeenth wire of the EI1 multiple and is permanently connected by a circuit including the front 3 contact of Ir57 to the windings of storing relay Ir33 so that when Er17 operates figure 5 will be stored on the seventh Ir storage set independently of the operation of routing relay Ir47 for the seventh set of storing relays. The second front contact of Er17 connects an operating ground to the first wire of the ET multiple which operated Tr1 to start an addition operation in a manner already described and at the same time one terminal of the explorer contact field must be connected so as to energize one set of the Dr relays in such a way that 5 impulses will be sent to that solution switch which stores the figures thereby rounded-off. The particular contact in the explorer contact field to be used will depend on the circuits set up by the Or key which has been operated. The rounding-off is then effected automatically by the carry over impulses on the preceding switch or switches.

Er18 is operated from the explorer contact field via wire 23 of the EO1 multiple, Er3 front 3, winding of Er18, battery and ground. Front contacts 1, 2, and 3 of Er18 connect an operating ground to wires 20, 19 and 18 respectively of the EI1 multiple. EI1 wire 18 is connected via a circuit which includes the front 1 contact of Ir59 to the wire of Ir35, battery and ground; EI1 wire 19 is connected through the front 5 of Ir57 through the winding of Ir31, battery and ground. When Er18 is operated, Ir31 and 35 of the seventh storing relay set will operate which corresponds to the figure 2. Wire EI20 is connected by a circuit which includes the back contact of Ir58 to the windings of Ir38, battery and ground so when Er18 is operated the figure 5 will be stored on the eighth storage relay set. The fifth front contact of Er18 connects an operating ground via ET1 to the windings of Tr1 which initiates an addition operation in the known manner and thereby Er18 when operated transfers 25 to the solution in order to round it off to the nearest 50. An example of a rounding off operation is described in the next following chapter, "Pay Roll Applicator," especially in connection with the operation of key CK12.

Payroll application

The purpose of the following description is to show how a calculator according to the invention may be used to perform automatically a series of useful calculation operations and for this purpose it is thought that a factory payroll compilation would illustrate the many uses to which the present calculator can be put. The payroll calculation now about to be described contemplates a series of different operations including multiplications, additions, subtractions, and it makes use of two separate circuits, the pension and the note circuits. The former determines, for example, a government pension deduction as as function of the gross earnings of a workman. The second circuit indicates on the card the number of different notes and coins required to pay in cash the net earning.

The gross earnings are determined as a sum total of a series of products obtained by multiplications. The keys CK1–6 of the control unit create circuit conditions for the calculator to perform the following multiplications:

*Key CK1.*—Calculation of salary which is based on piece work. With the calculator circuits set up by this key, in the case of piece work, the number of pieces, for example, will be punched in the upper part of columns 30–35 which number will be multiplied by the unit price of each piece punched in positions 39–44 at the top of the card. The decimal point in this case is behind position 41. With this set up, the product will be perforated in positions 23–28 at the bottom of the card. Two decimals are required in the solution after having rounded-off the third decimal.

The circuits set up by this key are listed in a table earlier in the specification and are also shown on Figures 1o, 2o and 3o of the drawings. The operations of the circuits controlled by this key were also explained above in connection with multiplication.

*Key CK2.*—This key is the same as CK1, the only difference being that the price is computed on the basis of one hundred units.

*Key CK3.*—Salary based on an hourly rate. For this operation the hourly rate is to be punched at the bottom of columns 10–13, to be multiplied by the number of hours punched in columns 18–22 at the bottom of the card. Two decimals appear in each of these figures. The product is to be rounded off and perforated in positions 23–28 at the bottom of the card.

*Key CK4—Cost of material.*—The quantity of material given for instance in kilograms in this case is punched in columns 30–35 which is to be multiplied by the price per kilogram punched in columns 39–34. The product is to be perforated in positions 23–28 at the bottom of the card after having been rounded off at the third decimal.

*Key CK5—Individual piece work.*—Lot price expressed in hours is punched in positions 39-44 at the top of the card to be multiplied by the wage punched in positions 10-13 at the bottom of the card. The product may be perforated in positions 23-28 at the bottom of the card rounded off at the third decimal.

*Key CK6—Group work.*—Hourly rate is to be punched in columns 10-13 at the bottom of the card to be multiplied by number of hours punched in the lower part of columns 18-22. The product is to be perforated in columns 35-39 at the bottom of the card rounded off at the third decimal.

The product of the above six different operations will be summarised in an aggregator. Simultaneously with the perforation of the above solutions, a combination of grounds is sent via the 5 front contacts of $Pr7$ towards an aggregator, such as disclosed in the N or G circuits, which receives at the same time an indication from the contact field of the perforator concerning the ordinal value of the figure transferred so that the figures will be recorded in their right places.

The total obtained by the different departments fixes the percentage of a bonus, for example, and the amount of over-head to be charged. These calculations are carried out under the control of keys CK7-9.

*Key CK7—Bonus.*—This circuit contemplates that the group work total of key CK6 which was punched in the overhead part of columns 35-39 is to be multiplied by a constant multiplier stored on the digit switches $D4$-$D6$. The product of this operation is to be perforated in positions 23-28 at the bottom of the card after having been rounded off at the third decimal.

*Key CK8—"Overhead" calculation.*—The number of hours perforated in the lower part of columns 18-22 is to be multiplied by a constant multiplier stored on digit switches $D4$-$D6$. This constant multiplier represents an overhead charge which is to be computed. The product will be perforated in the lower part of columns 28-34 after having been rounded off to the third decimal.

*Key CK9—"Overhead".*—The labor value in positions 23-28 at the bottom of the card will be multiplied through the circuits set up when this key is operated by a constant multiplier stored on the digit switches $D4$-$D6$. The product will be perforated in the lower part of columns 29-34 after having been rounded off at the third decimal.

*Key CK9.*—This key when operated provides circuit arrangements by which a factor may be multiplied by another factor setup on the digit switches $D1$-$D6$, Figure 1o, and the total perforated in the card. This circuit is intended to illustrate the manner in which the percentage of a number may be calculated and perforated. This circuit might be useful in connection with calculating overhead charges in the factory. In the circuits set up by the operation of the $Or$ relays controlled by key CK9 the labor value will be punched in positions 23-28 at the bottom of the card to be multiplied by a constant multiplier stored on the digit switches $D4$-$D6$. The product will be perforated in the lower part of columns 29-34 after having been rounded off at the third decimal.

*Key CK10.*—The circuits set up by the operation of this key are for the purpose of determining an amount, for example, a government pension, as a function of the gross earnings. In this case the total gross earnings of a workman will be perforated on a card in the lower section of columns 1-6. The amount of the pension will be perforated in positions 7-10. Provision is also made for extracting an amount for insurance which will be perforated in the lower part of columns 11-14. First the pension and then the insurance are subtracted from the gross earnings and the solution obtained in this way will be perforated in positions 19-24 at the bottom of the card.

The figures of the gross earnings are explored and stored on the $Ir$ relay sets 3-8. In position 7 of the explorer, $Tr1$ and $Dr1$-$3$ are energized and the transfer takes place to the switches $SM3$-$8$. In position 8, relay $Gr17$, Fig. 2G, is energized from the contact field via $Or37$ front, terminal $Cb25$, wire 25 of the GO multiple. The respective front contacts of $Gr17$ connect ground to the brushes D of switches $SM3$-$8$, on which are stored the figures of the group earnings. The D brushes and the associated contacts of $SM3$-$8$ are shown both on the S and on the G sheets of drawings to aid in tracing the circuits associated therewith. The relays $Gr1$-$16$, Figs. 1G and 2G, operate singly or in combinations depending on the amounts recorded on switches $SM3$-$8$. The value of the figures stored on $SM3$ is 1000's, but this switch will not be moved from it's N contact during the pension calculations because the amounts involved are less than 1000. The 100's are recorded on $SM4$, the 10's on $SM5$ and the units on $SM6$ while the centimes are recorded on $SM8$.

According to the table shown in Fig. 7 the pension of 2.50 francs is to be deducted from gross earnings up to the amount of 50 francs for a given period. When this amount, or less, is stored on switches $SM3$ to 6 and the decimals thereof, i. e. centimes, on $SM7$ and $SM8$, relay $Gr13$ will be operated irrespective of whether $Gr11$ is operated or not. $Gr11$ is operated from contacts 1 to 9 of the contact arcs for brushes D of $SM7$ and $SM8$ when centimes are recorded by these switches. In the present example, relays $Gr1$ and $Gr2$ are operated from the N position of brush D of $SM4$ since no hundreds digits are recorded. $Gr6$ is operated in the same manner from the N contact of $SM6D$, and relay $Gr10$ is operated from $Gr6$ front 2.

In the case just described where the digit 5 of the amount 50 francs is stored on $SM5$, and the remaining switches on their N position, the operating circuit for $Gr13$ is traced as follows: Ground, $Gr17$ front 2, brush D of $SM5$ on contact 5, $Gr1$ front 1, $Gr10$ front 2, $Gr11$ back 4, $Gr13$, resistance $GY1$, battery, ground.

The circuits for various other values less than 50 francs may be traced from contact N to 4 of brush D for $SM5$ and in each case it will be found that only relay $Gr13$ of the group $Gr13$ to $Gr16$ will be operated. The relays of this group are used to set various circuits from the perforator contact field, via the $Cb$ terminals, wires 21 to 25 of the GO multiple through the $Gr13$—$Gr16$ contacts through corresponding wires of the GP2 multiple which are connected to the windings of relays $Pr1$ to 6 that control from their contacts the plunger magnets for the perforating mechanism. The so-called pension circuit is merely an arrangement whereby one combination of plunger magnets is operated from a range of values set up on the SM switches, in the present case this range is advanced progressively in uniform steps of 25 while the pension or deduction advances with each step at a variably increasing rate.

With Gr15 operated, an operating ground from the perforator contact field is received over wire 21 of the GO multiple, but no circuit is completed to the GP2 multiple since the hundreds switch SM4 is on its N position, so therefor no plunger magnet of the perforating mechanism is operated.

The operating ground for the second figure comes in the same manner on wire 22 of the GO multiple. The circuit therefor may be traced through Gr13 front 3, Gr14 back 3, Gr15 back 2, wire 2 of the GP2 multiple, winding of Pr2 and Pr6 in series, which on operating energizes plunger magnets P5 and P9 to punch subsequently the digit in the lower half of the card as previously explained.

Wire 23 of the GO multiple is energized for the third figure as above. The circuit therefrom to the Pr relays is traced as follows: Ground from perforator contact field, GO wire 23, Gr13, front 2, GP2 wire 5, Pr4, resistance PY15, battery.

Pr4 operates the plunger magnet to cause the digit 5 to be perforated in the card. The fourth figure is always zero and is perforated by an operating ground from the perforator contact field, via wire 28 of the OP1 multiple, through winding of Pr1, PY15, battery, ground, Pr1 operates plunger magnet P4 to cause a zero to be perforated in the card.

Under the above conditions, but with either or both of SM7 or SM8 out of normal to record centimes in addition to the 50 francs, Gr11 and Gr12 will be operated and Gr14 instead of Gr13 will be energized from the 4th front contact of Gr11. According to the table, relay Gr14 is operated when the amount to be taxed is from 50.01 fr. to 75.00 fr., and this relay sets up circuits which will cause the subsequent perforation of 3.50 francs, which is the amount to be deducted in this latter range of income.

Where the income range is within 60 to 69.99 francs, Gr14 operates via ground, contact 6 of brush D of SM5, front 2 of Gr1. It operates also in the same manner from contact 7 of SM5, front 3 of Gr1, and front 1 of Gr6, when the U's switch is on its N contact, or the front 2 of Gr7 when 1 to 4 U's are recorded; or the front 2 of Gr8 when 5 U's are recorded if Gr11 is unoperated which is the case when no centimes are recorded on SM7 and SM8. With Gr14 operated, the figures of the pension are set up on the Pr1 to Pr6 relays which control the plunger magnets as previously described, an operating ground from the perforator contact field being received over wire 21 of the GO1 multiple for the first figure which is 0 since no 1000's are recorded; the operating ground for the second figure is received over GO1 wire 22, which operates Pr3 to cause the operation of plunger magnet P6 to cause the subsequent perforation of the digit 3 at the bottom of the card. The circuit therefor is traced as follows: Ground from contact field GO wire 22, Gr13 back 3, Gr15 back 3, Gr16 back 2, Gr14 front 1, GP2 wire 3, Pr3; Pr3 front 2, alternating current circuit, P6.

The third figure is selected in the same manner via GO wire 23. This figure is the digit 5. The circuit therefor is traced as follows: Ground, GO wire 23, GrO3 back 2, Gr14 front 2, GP2 wire 2, relay Pr4, Pr4 at its front 2 closes the local alternating circuit through plunger magnet P7 which will cause the perforation for the digit 5 to be subsequently made in the card.

It will be seen from the table, Fig. 7, that the last figure of the pension or the amount to be deducted is always zero and no perforation or other record of the same is necessary.

The other pensions listed are determined in the same manner. The circuits therefor may be easily traced on the drawings and further description of this feature of the invention is thought to be unnecessary.

It will be understood that the switches SM3 to SM8 will be explored in succession and the numbers representing the digits of the pension will be set up column by column by the operation of the plunger magnets as the calculation progresses so that these figures will be later perforated in the card.

The explorer energizes Er11 from its contact field in position 8 which operates Pr12 from ground, Er15 back 1, Er11 front 4, EP wire 2, Pr12, battery, ground, whereupon the magnets in the plunger head start to set up column by column the mechanism in the punch field to perforate the figures of the pension. The explorer stops in position 9 by the energization of Er12 from the contact field via EO1 wire 33. This opens the operating circuit for Er19.

Relay Pr13 is energized from the perforator contact field via wire 20 of OP1 in position 7 of the plunger head. The figures of the pension are transferred thereby via the wires of the IP multiple to the Ir storing sets 5 to 8, the eighth set always being 0. The routing relays Ir55 to Ir57 are successively energized from the perforator contact field in the well known manner.

In position 10 of the plunger head, ground from the contact field is connected to the front contact of Er12 via EO1 wire 35 to operate Er19 in order to advance the explorer. In position 10 of the exporer, Tr2 is energized from the contact field via wire 22 of the EO1 multiple, Er3 front 2, wire 2 of the ET multiple to start a substraction operation. Dr1-3 are energized via DO wire 9 from the contact field, whereupon the pension is substracted from the fross earnings. When this transfer is over, the explorer advances to position 15, first exploring in positions 11 to 14 the figures punched in the card representing the amount to be deducted for insurance, as previously mentioned. In position 15, subtraction is started in the well known manner after which the explorer stops in position 16 and starts the advance of the plunger head. The plunger head advances from position 10 to position 19. In position 11, Er15 is energized in order to release Pr12. In position 13, Er14 is energized via wire 34 of EO1, thereby releasing Er15 and Pr12 operates and the circuit is ready for another perforation selecting operation again. The figures of the taxable amount will be perforated in columns 19-24 and when the plunger head reaches position 25 its advance is halted.

The cards may now be completed by setting punches to punch on them the figures for other deductions such as for professional and war taxes, for example, which are functions of the taxable amounts and are taken from a table by a similar series of operations as described in connection with the pension deductions.

For this operation the cards are put back into the hopper to be fed through the apparatus again, and the calculator can proceed in the usual manner to perforate in the cards the amount representing the net earnings, in view of the newly added perforations representing the tax deductions just referred to. The circuit conditions required for this latter operation are established by operating the key CK12. The series of operations involved will now be very briefly described.

The explorer starts from position 19 and explores the figures of the taxable amount, recorded by the SM switches. In position 25-28 the figures of the professional tax are explored and in position 29 subtracted. Similarly, the figures of the war tax are explored and subtracted in position 34. After this transfer, the explorer reaches position 35, where it stops due to the operation of Er12.

Relay Er11 is energized since the last transfer via wire 37 of the EO1 multiple. The plunger head starts to step and operates to cause the figures of the net earnings to be subsequently stored in columns 34-39. In position 40, relay Er14 operates via wire 34 of EO1 in order to release Er11, Pr12, and the other relays operated therefrom. In position 40 of the plunger head, ground is connected to the front of Er12 from the perforator contact field which operates relay Er19 via the front 1 of Er1. The operation of Er19 causes the explorer to step over to advance from column 35 to column 36. In this position the rounding-off to the next 50 centimes is effected through the operation of relay Er18 which is energized via front 3 of Er3 and via wire 23 of EO1. The first 3 front contacts of Er18 operates Ir31, Er35 and Er38 setting up on two adjacent storing relay sets 2 and 5 respectively, representing 25 centimes. Tr1 is operated via wire 1 of the ET multiple from the front 5 of Er18. The operation of Er1 starts an addition transfer to add 25 centimes to the net earnings. The accumulator switches SM3-6 now record the francs of the sum to be paid, and this has to be increased by 50 centimes if the switch SM7 is in any positions from 5 to 9. In this case, Pr17 is energized via the contact arc for the E brush of SM7. As previously explained in connection with "rounding-off," when Er17 is energized, digit 5 will be stored on the Ir7 storage sets by the operation of Ir33. Addition is started by another front contact of Er17. A contact in the explorer contact field will energize one set of DI relays in such a way that five impulses will be sent to that SM switch which stores the figure to be rounded off.

After the rounding-off, the explorer advances to position 37, wherefrom it energizes Er11 and the plunger head starts to step again. The figures of the sum to be paid are set up so that they will be perforated in positions 40-45. On reaching position 46, release relay Er28 is energized which connects operating ground through its front contact to the winding of Pr11. As previously explained when Pr11 operates the return magnet P101 is energized and locks up causing the return of both the explorer and the plunger head to their normal positions. During this return operation the card is released from the explorer head and by suitable means such as the conventional skid wheel mechanism, the card is positioned in the punching mechanism. The punching operation takes place in part of the cycle started by the operation of the return magnet, during which the mechanical components of the punching mechanism which were set by the plunger magnets to record the data to be punched in the card, are reset to normal so that another calculating operation may take place. It may be desirable to indicate on the cards the number and the amount of the various bills and coins, the amount of salary punched in the card. This can be done simultaneously with the setting up of the punching mechanism for the columns in which the amount of the salary is to be perforated.

In the example just described the salary is to be perforated in positions 42-45. The top section of columns 41 to 44 may be used to perforate the different values of bills and notes required to pay a given salary in accordance with the table shown on Fig. 6.

Referring now to Figures 1N and 2N. As a matter of convenience in tracing the circuits, the F brushes and their associated arcs for SM4 to 8 are shown in these drawings. The switches are positioned so that they record the net salary to be paid, the 100's being recorded by SM4, the 10's by SM5, units by SM6 and the centimes by SM8.

Starting with position 37 of the explorer, relay Nr10 is energized via wire 35 of the NO multiple and it locks itself to ground at Pr12 front 5 via wire 5 of the NP multiple. Front 1 of Nr10 connects an operating ground from Er10 front 4 via wire EN to the windings of relays Nr8 and Nr9. With this circuit relays Nr8 and Nr9 operate with the stepping relay Er10. The front contacts of the latter relays connect one side of a source of alternating current to the front contacts of a group of relays Nr1 to Nr7 whose tongues are connected to a ground of wires of the NP multiple the latter being interconnected with the plunger magnets P12, P11, P0, P1, P2, and P3.

Nr1 to 7 energize over the arcs of brushes F of the switch SM4-7 in combinations which can be traced easily on the drawings. The various combinations are also shown in the table, Fig. 6.

The combination of holes punched in the card are coded for the purpose of utilizing to the best advantage the limited space remaining on the card. It is contemplated that the cards punched by the present machine will be used to control a standard tabulating machine that will record the information read therefrom. The coded perforations relative to the number of notes and coins which are to be used to pay the employee are used to operate the usual tabulating machine mechanism from the sensing pins thereof, the interconnections between the pins and the accumulator being altered so that the code shown in Fig. 6 can be used to operate the tabulating machine to produce a normal printed record of the coded amounts. This method of transposing connections between the sensing pins and the tabulator mechanism is well known. As the various cards are handled by the tabulator machine the number and kind of notes and coins for each card are stored on separate accumulators and when the tabulating operation is complete the machine may be caused to print a grand total which will show the total number of notes and coins of each denomination which will be required for a factory payroll.

Figure 6:
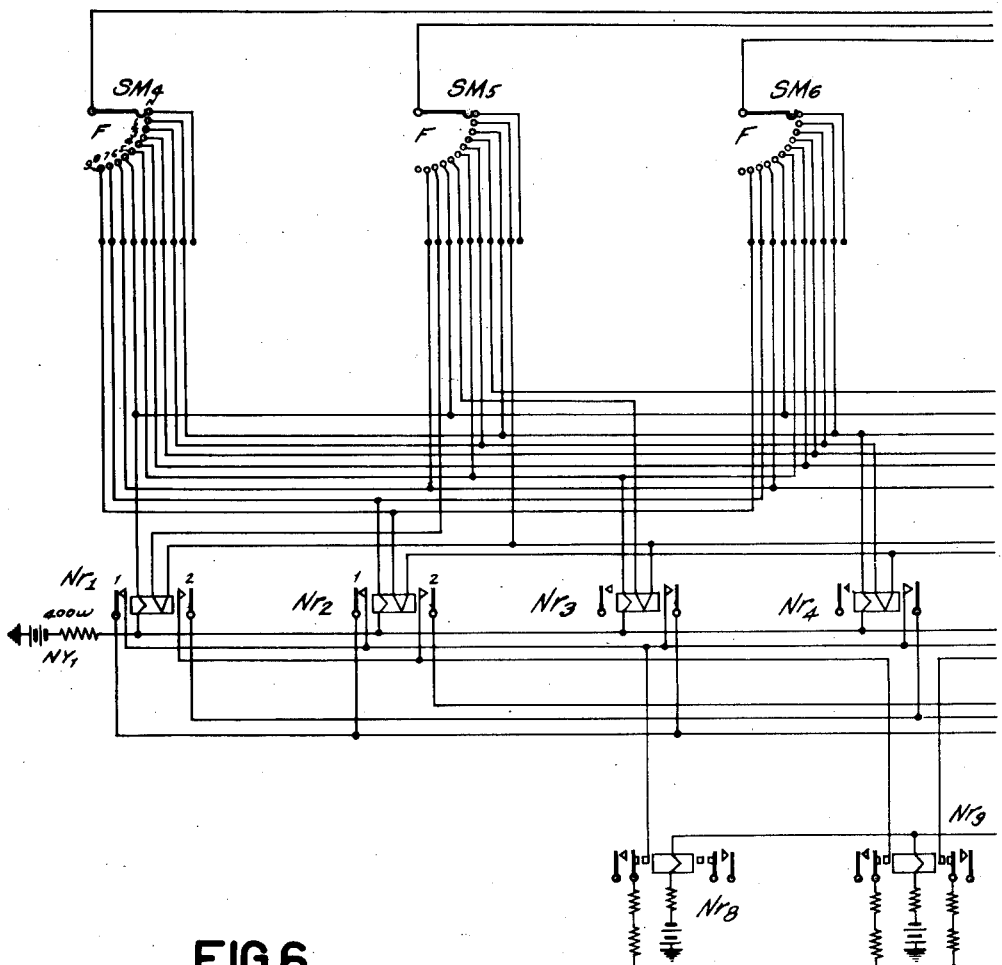

The circuit shown in Figs. 1N and 2N operate as follows:

The first item shown in column 41 of the table of Fig. 6 is the amount of 100 francs. This amount will appear on SM4, the brush F thereof being on its number 1 contact. Ground is connected to the respective F brushes of SM4 to SM8 in succession from the perforator contact field via wires 36 to 39 of the NO multiple. With SM4F on contact 1, Nr4 will be operated through resistance NY1, battery, ground. Nr4 connects potential to wire 11 of the NP multiple which operates plunger magnet P11 which corresponds to digit 1 of the code which is the digit of the so called 90 column code.

When SM4 is in position 2 corresponding to 200 francs relays N4 and 7 are operated and potential is applied thereby to wires 11 and 3 of the NP multiple which energized plunger magnets P11 and P3 to cause the subsequent punching of perforations 1-9 in the same column of the card.

If the brush is on contact 3, Nr5 is operated connecting potential to wire 0 of the NP multiple which operates the plunger magnet P0 to record 3. When the F brush is on its fourth contact Nr5 and 7 are operated and wires NP0 and NP3 are energized, operating plunger magnets P0 and P3 make perforations corresponding to 3 and 9 in the same column for the amount of 400 francs. When the brush is in position 7 Nr1 and Nr7 are operated energizing wires 12, 11 and 3 of the MP multiple thereby operating plunger magnets P12, P11 and P3 which punch respectively 0, 1 and 9 in the same column for the amount of 700 francs. When brush F is on contact 9 of Nr2 and Nr7 are operated energizing wires 12, 0, 3 of the MP multiple which operates plunger magnets P12, P0, and P3 corresponding to the perforations 0, 3 and 9.

It is not thought necessary to trace out the corresponding circuits for the remaining switches as they all operate in a similar manner.

Key CK11 initiates the same operation as key CK10 with the exception that the pension is disregarded and the 0 is perforated in the position reserved for the centimes. This arrangement is useful where, for example, a government pension is not collected every payday but only once a month.

*Division*

To obtain a quotient digit in a division calculation it is necessary in principle to determine how many times the divisor can be substracted from the material part of the dividend, before the remainder becomes less than the divisor. If a division operation is performed by repeated subtractions the process is lengthy particularly if the extraction of many quotient digits is desired. The present invention contemplates direct division and employs a circuit similar to a Wheatstone bridge to provide a short-cut in obtaining quotients. With this arrangement the first two digits of the divisor are compared in a bridge circuit with the first two digits of the material part of the dividend, and an approximate value of the quotient digit is to be determined rapidly. The product of this digit and the divisor is subtracted in one operation, and there remains to be carried out only a check of the accuracy of the operation and a correction if this proves necessary. The process is repeated for each quotient digit extracted and may be continued indefinitely.

The stages of a typical operation $850 \div 219 = 3$, with a remainder of 193, in a calculator are as follows:

The first factor 850 is read from the card, recorded on storage relays and transferred to accumulating switches assigned by the distributor; the first two of the three switches assigned to make eight and five steps respectively; the storage relays are released, and the second factor 219 is read and recorded on them as in the previous examples. The control circuit having indicated that the factors are dividend and a divisor respectively, their first two digits 85 and 21 are compared and yield an approximate quotient 4, which is recorded on a step-by-step switch in the quotient circuit, and the multiplication table is set for multiplication by 4. The processes of multiplying 219 by 4 may be expressed thus;

$$\begin{array}{r} 219 \\ \underline{\times 4} \\ 846 \\ 003 \\ \hline 0876 \end{array}$$

the number 876 is therefore to be subtracted, if possible, from the dividend. The transfer operation involved is analogous to a multiplication operation in that the partial products are transferred in turn; and to a subtraction operation in that they are transferred in the complementary basis. In the present case, the transfer circuit causes the third SM switch to take one step for subtraction correction as previously explained in connection with the description of the subtraction operation, and then causes the three switches to take 1, 5 and 3 steps respectively. It will be noted that 1, 5 and 3 are the 9's complement of the partial product 846. During this transfer and the following 10's transfer the following entries are made:

| Imp. to Q cct. | SM1 | SM2 | SM3 | SM4 | SM5 |
|---|---|---|---|---|---|
| Before div | 0 | 8 | 5 | 0 | 0 |
| Single imp | | | | | 1 |
| 9's imp | 9 | 1 | 5 | 3 | 9 |
| After 9's transfer | 0 | 0 | 0 | 4 | 0 |
| Single imp | | | | 1 | |
| Tens imp | 9 | | 6 | 9 | 0 |
| After ten's transfer | 9 | 9 | 7 | 4 | 0 |
| The first switch has produced only one impulse to the Q circuit and therefore Qr7 is not operated. In position 2 of QM2 relay Qr18 is energized and addition is started | | | | | |
| Addition | | 2 | 1 | 9 | 0 |
| After transfer | 0 | 1 | 9 | 3 | 0 |

The impulse is now given, Qr7 operates; Qm2 advances and proceeds to close the test circuit for Qr13 which includes relay Qr17.

The transfer circuit causes the carry-over indication from the switch which accumulates digits of the highest ordinal value to be ignored, as explained above. Although Cr1 is operated by the transfer circuits and a carryover impulse is being generated, this impulse, insofar as operating the switch recording digits of highest ordinal value is concerned, will have no effect.

Under certain conditions, Cr1 will not be operated which would mean that no carry-over impulse is being generated. This non-operation of Cr1 would indicate that the result of the multiplication of the approximate quotient with the divisor is greater than the dividend. This, in turn, means that the approximate quotient was too large.

A more exact comparison between the result of approximate multiplication and the dividend is effected in operations described under "Correction of Quotient."

The absence of the carry-over impulse or the non-operation of Cr1 or any relay associated with Cr1, may be used to control corrective entries, i. e., to reduce the quotient by one and to add the divisor once more to the accumulating switches SM concerned with these operations. The detailed operations involved are explained below.

For the particular example under consideration, this correction would mean that the quotient would be reduced from 4 to 3 and that the last reading, negative 974, would be increased by 219 which would give 193, and thus, since Cr1 is not functioning, the final and correct result.

The fact the first switch has now carried over indicates that the quotient 3 is correct. The quotient switch is scrutinized and the card is perforated with the value 3; the three accumulating switches are also scrutinized if desired and the remainder 193 is similarly recorded on the card in indicated colums. Alternatively, the remainder 193 may be retained in the calculator as part of a fresh dividend and another quotient digit extracted in a similar manner, a fourth accumulating switch being assigned to provide for the necessary additional digits in the dividend.

*Decimal point*

Before division may start, it is necessary to have both the dividend and divisor in the calculator. The dividend is explored by the explorer in the known way and stored on the $Ir$ relays. When the last figure is stored, relays $Tr1$ and $Dr28$–$30$ are energized as for addition. The figures of the dividend will be thus transferred to the switches $SM10$–$17$.

After this transfer, the explorer advances until it reaches the positions reserved for the divisor. The figures of the divisor are explored column by column and as each column is explored circuits are closed which operate plunger magnets which will later cause the figures of the quotient to be perforated in the card. These arrangements will be described later on.

The perforator has to be set before division can start, to a position which corresponds to the decimal value of the first quotient. Both the dividend and divisor are perforated on the cards according to their decimal values and it must, of course, be the same for the solution. The maximum of figures the dividend and divisor may contain for certain calculations is known, but either or both may have a lower number of figures and still the solution must be perforated in its right place.

The figures of the dividend are stored on the first $Ir$ sets of storage relays as far as possible. This means that if there are a maximum of 5 figures in the dividend, for example, they will be stored on the first 5 $Ir$ sets. It follows then that the last figure of all dividends will be stored for this particular operation on the fifth $Ir$ storage set independently of the number of figures the dividend actually contains. These 5 figures will be transferred to $SM10$–$14$, whereby $SM14$ always receives the last figure of the dividend. In the example of division described below, the dividend has a maximum of eight figures with the units located on $SM13$.

When the explorer reaches the position of the first figure of the divisor, relays $Pr15$ and $Pr20$ are energized via the following circuit: ground, over the contact field of the explorer, wire $31$ of $OP1$, $Pr15$, $Pr20$, battery; $Pr15$ and $Pr20$ lock via ground, $Er1$ front, $Er13$ back, $EP$ wire $3$, $Pr15$ front, $Pr15$, $Pr20$, battery. $Pr15$ operates $Pr12$, which provides locking grounds for the different $Pr$ relays and connects ground from its fourth front contact to the brushes $Pa \ldots Pe$ of the perforator contact field. $Pr15$ also closes an operating circuit for $Pr16$ via ground, $Er2$ front, $Er14$ back, $EP$ wire $8$, $Pr15$ front, $Pr14$ back, $Pr16$, battery.

The starting position of the perforator with respect to the decimal point of the solution depends on the position of the decimal points in the dividend and divisor. Generally the decimal point in both numbers may be between any two figures and it may precede or follow the whole number. In the present case the decimal points of the factors are fixed by their allocations on the card. Should "A" be the maximum number of figures in the dividend before the decimal point and "B" the maximum number of decimal positions in the divisor, then the starting point for the perforator must be $A+B$ columns before, that is to the left of, the position reserved for the units of the solution, for the following reasons:

Before the perforator starts operating the plunger magnets, to register a quotient, the perforator must be advanced, as explained before, from column to column as the calculation proceeds by as many columns as there are figures in the divisor, counting them from the significant figure of highest ordinal value.

Supposing the number of these figures is "C," then $C-B$ would be the number of figures in the divisor before the decimal point. If "D" is the number of figures left of the divisor and A the number of figures left of the dividend, then as a matter of general principle the quotient will contain $A-D$ positions to the left of its units, provided that the first quotient resulting from the division operation involved, although it may be zero, is counted as one position. The first quotient, therefore, will have to be registered D positions to the left of the position reserved for the units of the quotient.

As mentioned before, during the calculation of each figure of the quotient, the perforator has to make, at first, as many steps as there are figures in the divisor, i. e., at first, C steps. Thereafter, as shown before, the perforator has to make $A-D$ further steps. The perforator, therefore, should make altogether $$C+A-D=C+A-B-C=A+B$$

steps before registering the units of the quotient. It has to start $A+B$ steps to the left of the position reserved for the units of the quotient. The perforator is brought into this starting position by the operation of $Er12$ from a position of the explorer field. When the perforator is standing over the starting column of the perforator field ($A+B$ positions left of the unit position of the quotient), locking ground for $Pr12$ is provided and when the explorer reaches the first position of the divisor, then in this position, relays $Pr15$ and $Pr20$ are operated as explained further below with the result that from this position the perforator will be advanced from column to column as the calculation proceeds by as many columns as there are figures in the divisor, counting them from the first figure which is not zero. In this way the perforator will be correctly placed with respect to the decimal point in the solution. This will be described in detail further on.

Another problem which has to be considered simultaneously with the stepping of the perforator is the storing of the divisor on the $Ir$ relays. Division is a continuous subtraction in principle even if it is direct division as it is in the present invention. Quotients are obtained one after the other by such subtractions. It will be considered in the following description that the divisor which is involved in these subtractions starts with a figure 0, because otherwise either the distributor circuit has to be set in the special way or the partial division results in quotients higher than 9, which would take a long time for calculation. Therefore, the figures of the divisor have to be stored on the $Ir$ relays in such a way that the first figure which is not 0 is stored on the first $Ir$ set and then all other figures are stored on the successive storing sets in the right order. Since the perforator, as stated above, must start to step when the first figures of the divisor which is not zero is explored, it is obvious that the input storing can be governed advantageously by the perforator contact field.

When Pr12 operates and grounds the brushes of the perforator contact field, relay Ir51 energizes via one terminal of this field. It will be recalled that Ir51 when operated connects the five exploring wires of the card explorer to the windings of the relays in the first Ir storing set. Relay Pr14 operated by Ir51 over IP wire 5 is the pilot relay of the first Ir set, the common return from Ir1-5 being connnected to the winding Pr14 via wire 6 of the IP multiple to battery. The explorer advances step by step and explores the figures of the divisor punched in the card. When the first figure of the divisor which is not 0 is encountered Pr14 locks and stays locked in as long as Ir1-5 are operated. The front 2 of Pr14 connects ground via wire 4 of the EP multiple to operate Er11. The front 3 of this latter relay closes the circuit for impulsing relay Er8 in an obvious manner. Er8 energizes Er10 in an equally obvious manner and Pr10 is energized via ground, Er8 front, Er11 front 1, EP wire 1, Pr10, PY16, battery so that from now on the plunger head will advance together with the explorer. Since Pr14 operates initially and locks in during the time the feelers which operate contacts EF12-9 of the card explorer are plunged, the remaining time of the first impulse from Er10 would not be sufficient to energize Pr10 and the perforator advance magnet P100. The function of relay Pr16 is to prolong the length of this first pulse by its releasing time. The back 2 contacts of Pr14 disconnects Pr16 which remains unoperated thereafter for the present series of operations and during the releasing time of the latter relay, Er10 is kept energized via wire 5 of the EP multiple and via the front contacts of Pr16 and Pr14 in series.

The plunger head now advances in synchronism with the explorer. In the next position routing relay Ir52 is energized, which it will be recalled connects circuits from the explorer contacts via wires 9 to 15 of the EI multiple through the windings of the second set of storage relays Ir6 to Ir10. The remaining figures of the divisor are set up on the respective groups of storage relays in the same manner.

After exploring the last figure of the divisor, the explorer reaches a position from which three contacts of its contact field initiate the following operations:

Relay Er14 energizes via wire 34 of the EO1 multiple and locks itself to the front of Pr20 via wire 9 of the EP multiple. Er14 in operating opens the circuit from ground at Er2 front, Er14 back, wire 8 of the EP multiple, Pr15 front 3, Pr14 front, wire 4 of the EP multiple, thus opening the circuit holding Er11, which releases and thereby prevents further stepping of the perforator by stepping relay Er10. Tr1 is operated from another terminal of the explorer contact field via wire 21 of the EO1 multiple front of Er3, wire 1 of ET and starts an addition transfer. At the same time, Dr1-3 are energized from the contact field via terminal Ca9, wire 9 of the DO multiple, Dr1, Dr2, Dr3, wire DE1, Er7 back, the fifth wire of the CE multiple, Cr43 back, battery. With relays Dr1-3 operated the figures of the divisor are transferred to switches SM1-8, the first figure not 0, being recorded on SM1.

During the above transfer, Er19 is released due to the operation of Tr1. As is now well known this is for the purpose of stopping the operation of advance magnet E99. When the transfer is over, Er6 operates after the ninth step of TM1 from Tr18 in the known way, and relays Er33 and Er3 are released. Er3 releases Tr1, but at this time all operated storing relays are held in their operated position in the input storage set, the circuits therefore will be described shortly. The explorer makes one step due to the release of Tr1 and in the next position of the explorer relay Er12 is energized from the contact field via wire 33 of the EO1 multiple opening the operating circuit for Er19 at its back contact thus again stopping the explorer. At the same time, Tr8 is operated from the contact field via wire 32 of the OT2 multiple and this is the indication to the transfer circuits that a division operation has started.

The Ir storing relays are maintained in their operated positions at 2 front of Ir49 which is operated by a circuit closed by the front 5 contact of Pr15 through wires 7 of IP. It will be recalled that Pr15 has been locked from Er1 front, Er13 back, which holds operated Ir49. The latter controls the locking circuit for the Ir storing relays, via wire 7 of the IP multiple, but Ir50 operates and releases stopping relays Ir41 to Ir43 after each transfer. The operation of this circuit is as follows: after TM1 has made 9 steps the A brush thereof releases Tr15 thereby operating Tr16 which reoperates Tr15 and also Tr18; Tr18 at its back 1 contact cuts off ground and releases Ir50 which is connected thereto via the following circuit: Wire 4 of the ET multiple, Er2 front 2, wire 14 of the EI1 multiple, Ir50 to battery.

*Approximate quotient*

The usual division operation would entail the repeated subtraction of the whole divisor from a corresponding part of the dividend as long as the former is less than the latter. In order to accelerate this operation, the calculator determines by a Wheatstone bridge arrangement the approximate quotient and instead of single subtractions, the calculator subtracts directly the product of the divisor by the approximate quotient. When this subtraction is terminated the calculator makes the correction of the quotient if it is found necessary, either by increasing the approximate quotient with single subtraction or by diminishing it with single additions.

A general description of the Wheatstone bridge mentioned above will be given, followed by a more specific description in which the circuits are traced.

Referring now to the schematic drawing of the Wheatstone bridge as shown in Fig. 1, and also to Figs. 1Q, 2Q, and 3Q: QY1-13 are resistances expressing in ohms the first two figures of the divisor. The resistances QY1-9 are connected to nine contact terminals for the brush D of SM1 via the QS4 multiple. Switch SM1 stores the first figure of the divisor. QY10-13 are connected to the contacts of arc D of SM2 via the QS5 multiple. The second figure of the divisor is stored on SM2. One resistance of each of the above two groups is connected in the arms Q1-Q2 of the Wheatstone bridge depending on the first two figures of the divisor. If the divisor is 4632 . . . for example, the switch SM1 is in position 4, and SM2 is in position 6, and since the resistances QY1-9 progressively increase in value by steps of 10 ohms and QY10–18 progressively increase in value by steps of 1 ohm, consequently 46 ohms are inserted between the terminals Q1 and Q2 of the bridge.

QY19–36 are resistances expressing in ohms the first two figures of the dividend. The resistances QY19–27 are connected to the contacts for brush D of the switches SM9–17 via the QS2 multiple, and resistances QY28–36 are similarly connected via the QS3 multiple to the contact arcs for brush F of the same switches and the Q circuit of Figs. 1Q, 2Q and 3Q takes care that for calculation of the consecutive quotients one of the resistances QY19–27 representing the first figure of the actual dividend is connected in series with one of the QY28–36 resistances representing the second figure of the actual dividend. If the part of the dividend concerned starts with 2516 ... for example, the value of the resistances inserted between the terminals Q1 and Q3 of the bridge is 25.

At the right hand side of the bridge, QY57–58 are resistances of fixed values, each having 50 ohms resistance which form the arm Q2—Q4 of the bridge. The resistances QY37–45 forming the arm Q3—Q4 of the bridge have the values 200, 300, 400, 500, ... 900 ohms. These latter resistances are connected to the contact arc for the brush D of switch QM1, Fig. 3Q. This switch is similar to the other step by step switches already described herein. A relay Qr11, Fig. 2Q, is connected between points Q2 and Q3 of the bridge. The operation of the bridge circuit is such that relay Qr11 is energized when the bridge is unbalanced. In this state the cross-connection Q3—Q2 of the Wheatstone bridge takes place via Q3, WJ, Qr11, Qr1 front 4, Qr12 front 2, QM1—B, Q2. Qr12 is operated by Qr11 front. Qr1 is energized over the contact arc for brush B of QM2 and the front Tr8 initiating the operation of division D after storing the divisor.

Resistances QY37–45 are varied by QM1 until the ratio of bridge arms Q1—Q2 to Q1—Q3 is about the same as that of arms Q2—Q4 to Q3—Q4 of the bridge. When the bridge is balanced in the manner just described no current will flow through the windings of Qr11 which releases and the position of the switch QM1 at this time indicates the approximate quotient.

Ground is connected to the Wheatstone bridge as soon as Pr15 operates. The front 1 of this relay connects ground via wire 10 of the PQ multiple and via back 2 of Qr6 to the common points of the resistances QY1–9 and QY10–27. One resistance of the former group is connected in the S circuit to one resistance of the group QY10–18, the common point of which leads to battery over QY57–58 at point Q4 of the bridge thereby completing the bottom part of the bridge. Relays Cr21 to Cr29 which are operated one after another during the calculation of a division problem progressively connect the D brushes of one SM switch to the F brush of the next lower SM switch. The operation of these CR relays is described further on.

The resistances QY19–36 are controlled on the front contacts of Cr21–29. For the time being mention only will be made of the fact that TM3 makes one step each time a quotient is obtained. When division starts TM3 is in its normal position N and the following circuit is closed for Cr21: Ground, Pr20 front, PT wire 4, brush E of TM3, CT1 wire 9, Cr21, battery.

Front 5 of Cr21 connects brush D of SM9 to brush F of SM10 by closing the circuit between wire 9 of CS7 and wire 10 of CS8. It will be recalled that SM10 has received the first figure of the dividend, if, of course, the dividend contains the maximum number of figures, whereas SM9 is in its normal position. This means that for the first quotient it is considered that the first figure of the dividend received is zero, and only one resistance of the group QY28–36 is inserted into the Wheatstone bridge representing the real first figure of the dividend in this instance. The common point of QY28–36 is connected to battery over the arc for brush D of QM1 and over the resistances QY37–45.

Qr11 is connected at one side to battery over back 4 of Qr1 and back 1 of Qr19 and at the other side it will be grounded due to the operation of Cr21 which connected brushes SM9D and SM10F, the former positioned on its N contact. This contact is connected by wire 0 of the QS2 multiple, Qr6 back 2, wire 10 of the PQ multiple to ground at Pr15 front 1. Front 2 of Qr12 extends via the arc for brush B of QM1 the circuit of Qr11 to the bottom part of the bridge, the resistances QY1–18 have, however, no full shunting effect yet owing to the resistance QY46 inserted in series with QY1–18. The resistance prevents interruption of the current energizing Qr11 in case Qr1 is slow. Qr11 and its helping relay Qr12 remain energized in the above circuit until Tr8 operates after storing of the divisor. The front 4 of Tr8 energizes relays Qr1 and Qr2 over wire 12 of QT the contact arc for brush B of QM2, Qr1 and Qr2 to battery. The contact 4 of Qr1 disconnects the operating battery of Qr11 from Qr19 back and short circuits resistance QY46 so that now Qr11 is held operated by a current due to the unbalance of the bridge.

QM1 starts to rotate in order to balance the bridge by reducing the ratio of arms Q3—Q4 and Q2—Q4 in steps from 9 to 1, 8 to 1, 7 to 1, etc. QM1 is advanced by relay Qr4, which operates as soon as the front 5 of Qr1 is closed, via the back or interrupter contact of QM1 and via back contacts of Qr18 and Qr8. The front contact of Qr4 becomes grounded via front 1 of Qr12, normal terminal N and brush C of QM2 and front 3 of Qr1. QM1 energizes from Qr4 front and opens the circuit of Qr4, which releases and QM1 makes one step. In this position due to the advance of brush D of QM1, resistance QY45 is replaced by QY44 and the ratio of the bridge resistances is now 8 to 1.

When the bridge is balanced or at least approximately balanced, as is well known, no current or at least no current sufficient to hold Qr11 operated, flows thereacross and therefore Qr11 will release and at its front contact cut off the operating ground from Qr12 which also releases. When Qr4 releases it cuts off ground from Qr1 back 5 to switch magnet QM1 and the switch stops. The position in which QM1 stops is an indication of the approximate value of the quotient. The closing of the back 1 contact of Qr12, as will be seen below, starts the actual division operation.

Since QM1 in its normal position by connecting QY45=900 ohms registers 9 quotient, and if the ratio of the dividend to the divisor is above 9, Qr11 which preferably is polarized releases as soon as Qr1 disconnects the operating battery and QM1 will not move at all; its brush D may be of the "make before break" type. On the other hand, if the ratio in question is less than 1, QM1 is bound to stop in position 9, the circuit of Qr11 being opened on the arc for brush B of QM1.

The reason why the check for the approximate quotient is started from 9 is that the real ratio is in most cases between two figures, in which case the lower figure is wanted. By starting from 9 and going towards 1, when the higher figure is reached, Qr11 has still some holding current, but will certainly release in the position corresponding to the lower figure since the brush in changing from the higher to the lower figure alters the circuit conditions of the bridge and the current flowing through Qr11 will have changed polarity so the relay is without current for an instant.

*Transfer*

The division transfer with the approximate quotient found as above described is carried out in the same geenral way as a multiplication transfer; the difference being that the master switch TM2 controls the transfer in such a way that 9's complements of the figures instead of the direct figures will be added. The difference between division and multiplication is about the same as between subtraction and addition.

Depending on the position in which QM1 stops, the release of Qr12 is followed either by the operation of Qr14 in case the quotient is 9-1 or by the operation of Qr15 if the quotient indicated is 0.

Qr14 is operated via ground, Qr1 front 3, brush C of QM2 positions normal and 1, Qr12 back 1, brush A of QM1 positions normal to 8, Qr14 to battery.

Qr15 is operated via ground, Qr1 front 3, brush C of QM2, Qr12 back, brush A of QM1 position 9, Qr15 to battery.

In case the first quotient is a number from 9-1, the back 2 of Qr14 opens the normally closed circuit of Mr1-3. This circuit is traced from ground, Qr14 back 2, wire EQ, Er2 front, Er21 to 24 back, wire 1 of the EM multiple, Mr1, 2 and 3, battery.

The front 1 of Qr14 connects ground to brush E of QM1. The terminals of the arc for this brush are connected to the relays of the multiplication circuit in conformity with the values of the different positions of QM1, thus preparing the multiplication circuit for multiplication with the appropriate quotient.

Front 2 of Qr14 energizes Tr4 over wire 1 of the QT multiple. Front 6 of Tr4 grounds brush C of TM2 over which the division transfer will be controlled. As can be seen on Fig. 3T of the drawings the wires of the multiples MT1 and MT2 are connected in reversed order to the contact terminals for brush C if compared with the arc for brush B used for multiplication. In this way with any given setting of brush C a wire corresponding in number to the 9's complement of the position of the brush will be grounded.

The transfer is accomplished in two steps; first the U's impulses and then the 10's impulses will be produced as was the case in the multiplication operation. Each series of impulses in the case of division however is preceded by a single subtraction correcting impulse which is effective to act on that SM switch which is the last in receiving impulses for the particular part of the division operation being performed. Each series is then followed by a carry-over and a compensating impulse in the known way.

The circuit for producing the single subtraction impulse, just referred to, is traced as follows:

When Tr4 operates, its front 1 contact closes an operating circuit for Tr6 via back contacts of Tr15, TJ normal terminal N and brush A of TM2 via wire 8 of the CT2 multiple, front 4 of Cr18, wire 9 of the CT2 multiple, front 1 of Tr4 and back 1 of Tr7, Tr6, battery. The single unit impulse is produced in the same way as in the subtraction operation via ground, back 5 of Tr16, front 1 of Tr6, back 2 of Tr7, wire 10 of the IT1 multiple wire 8a of DI and over the D circuit which is connected to the appropriate SM magnet which will be explained later on.

When the operated SM magnet just referred to, closes its front interrupter contact, it furnishes an operating ground for the following circuit: Wire 2 of the CS9 multiple, wire 7 of the CT2 multiple, Tr15, battery. Tr15 is operated, Tr6 locks itself in series with Tr7 over the front 3 contacts of Tr4, back 2 of Tr18 to ground. When Tr7 operates, it opens the SM switch circuit just traced, from ground, back 5 contact of Tr16 and the SM magnet releases and thus advances one step, whereupon Tr15 releases also as previously described. Tr7 when energized, switches the back contacts of Tr15 from Tr6 to the stepping relays Tr10-12 and Tr22. The stepping operation of these relays is resumed and Tr12 advances TM2, and the contacts of Tr10-11 operating therewith step the different SM switches over the back contacts of the impulse stopping relays Ir41-48 and over the distributor circuit. The locking circuit of Tr10-12 and the function of Tr15 are already well known.

During the carry-over following the U's transfer, Tr16 then Tr18 operate as before and front 4 of Tr18 energizes Dr33 via back 1 of Tr3 and front 2 of Tr5 over the second wire of the DT2 multiple, Dr33, battery. Dr33 front 1 energizes Mr28-30 via wire DM1 in order to change over to the connections for the 10's in the multiplication table circuit. The operation of the distributor circuit in this connection will be described further on.

The locking circuit of relays Tr6 and 7 are opened at the back contact 2 of Tr18. Tr6 and 7 have to release in order to enable the circuit to produce a single unit subtraction impulse before the transfer of the 10's, or, more accurately, before the transfer of the 9's complement of the 10's.

During the compensating impulse for the U's which takes place when the brushes of TM2 engage contact ten of their contact arc, brush A of TM2 operates Tr17, which in turn operates Tr19 and the front 4 of Tr19 energizes Tr5 over front 4 of Tr4. Tr5 locks in over its own front contact and Tr18 front. After this impulse the transfer continues with the 10's figure, while the brushes of TM2 are wiping over the second half of their arcs. Again the carry-over and the compensating impulses are produced whereupon QM1 having made 9 steps by circuits hereinafter described, the brush A thereof opens the circuit for Qr14 and Qr14 releases removing ground from wire 1 of the QT multiple. This is the operating ground for Tr4 which releases, causing the release of Tr5. The switch of TM2 arrives at its normal position and the transfer is completed.

Distributor

The distributor circuit D, Figs. 1D, 2D and 3D is controlled during division over the arc of brush F of TM3. Brush F is grounded via front 6 of Tr8. In normal position, relays Dr28–30 energized via Tr8 front 6, brush F of TM3 and wire 17 of the DT1 multiple, via the back 4 of Dr32, i. e. during the transfer of units. During the transfer of the 10's, Dr32 is operated from Dr33 front, Dr33 having been operated during the carry-over following the U's transfer as just described. This circuit is briefly traced as follows, Tr16, Tr18, Tr18 front 4, Dr33 via back 1 of Tr5 and front 2 of Tr4. Relays Dr25–27 are thus operated for the 10's transfer over the wire 17 of the DT1 multiple. The operation of Dr28–30 directs the eight impulse wires from the eight IR storing relay sets via Ir41–48 front 1, DI wires 1a, b–8a, b; Dr28–30 front, DS wires 10a, b–17a, b, to SM10–17 during the U's transfer and via Ir41–48 front 1, DI wires 1a, b–8a, b, Dr25–27 front, DS wires 9a, b–16a, b, to SM9–16 during the 10's transfer for the first quotient.

Besides the eight impulse wires DI wires 1a, b–8a, b, Fig. 31 show a ninth impulse wire, DT20a, b. Over this wire nine impulses are produced in the U's transfers. These nine pulses can be furnished to the highest SM switch (beginning with the ninth) by line DT20a, line DT20b serving the same purpose as do lines 1b to 8b of the DI multiple. The delivery of pulses out of the distributor to the various SM switches is via lines 9a and 9b DS. This is necessary because the dividend may have, beginning from the second quotient, one figure more than the divisor. A circuit for the nine impulses for this purpose is connected by relay Tr23 which operates via battery, Tr4 front 5, Tr5 back 3, ground. The circuit for the nine impulses extends from Tr 23 front via Dr4 front 5, 6, Dr34 front, DS wires 9a, b, to SM9, i. e., the switch preceding the first one of the selected group of eight switches SM10–17.

During the 10's transfer these impulses are not produced and Tr5 is operated opening the operating circuit for Tr23 from ground at its fourth back contact. The wire of the DT2 multiple over which these impulses are sent is marked by the reference character "0a" and, when Tr23 is operated, "0a" is grounded by each operation of Tr12. Wire "0b" of the DT2 multiple is connected to a front contact 3 of Tr23 and interconnects the back contact circuits of the TM switch magnets with the corresponding contacts of the SM switches. Since subtraction relay Tr2 picks up relay Tr23 which enables transmission of nine pulses over line DT20a, as does division relay Qr4, any desired orders of the register can be used for either addition or subtraction.

In connection with the foregoing, it might be well to mention again that in subtraction the nines complement number added must have at least as many digits as the number to which it is added, for, otherwise a carry-over will not occur, so for subtraction the 9's complement for zeros are filled in as digits 9, the required number of places towards the left in the number being added. Consequently those switches not having their operating circuits cut off by stopping relays Ir41 etc. are advanced nine steps.

The same nine switches SM9–17 are reused for all consecutive calculations.

When the first quotient is obtained TM3 makes one step, as previously described, in connection with the back transfer operation, connecting ground at Tr8 front 6 via brush F to TM3 to the wire 18 of the DT1 multiple which is connected to the second contact of the arc for brush F. Wire 18 of DT1 is connected to the tongue 3 of Dr33. Relays Dr34–37 which are energized via front 1 and 2 of Tr8 and DT2 wires 3 and 4, direct during the U's transfer the eight impulses wires DJ, Ia, b–8a b from the eight Ir storing relay sets via Ir41–48 front 1, DI wires 1a–8a, Dr4–6 front, Dr34–37 front, DS wires 11a, b–17a, b, 9a, b, to SM11–17, 9, and also directs the ninth impulse wire DT20a, b via Tr23 front, DT20a, b; Dr4 front 5, 6; Dr34 front, DS wire 10a, b to SM10; and the operation of Dr28–30 directs the eight impulse wires Ir41–48 front 3, DI wires Ia–8a, Dr28–30 front, DS wires 10a, b–17a, b, to SM10–17 during the 10's transfer for the second quotient. Thus during the U's transfer, SM10 will be the first switch and SM9 the last switch which receives impulses; or in other words, SM9 becoming free, is brought in place at the end of the group following next after SM17. During the 10's transfer, SM10 will be the first switch and SM17 the last which receives impulses.

When successive quotients are obtained, TM3 makes altogether eight steps connecting ground via brush F and via 17, 18 and 10–16 of the DT1 multiple, which are successively connected to ground as the switch is stepped around its contact arc.

The following table shows clearly the relationship between impulse wires, the switches SM9–17 and the Dr relays associated with a given group of SM switches and impulse wires.

TABLE

| Quotient Number | Transfer | TM3 | Relays Dr | The impulse wires 1a to 8a of Di multiple for SM switches as shifted by the Dr relays during progress of division operation. |||||||||
|---|---|---|---|---|---|---|---|---|---|---|---|---|
| | | | | 0 | 1 | 2 | 3 | 4 | 5 | 6 | 7 | 8 |
| 1.10 | U's | N | 28–30 | SM9 | SM10 | SM11 | SM12 | SM13 | SM14 | SM15 | SM16 | SM17 |
| | 10's | DT1-17 | 25–27 | | 9 | 10 | 11 | 12 | 13 | 14 | 15 | 16 |
| 2.11 | U's | 1 | 4–6 | 10 | 11 | 12 | 13 | 14 | 15 | 16 | 17 | 9 |
| | 10's | DT1-18 | 28–30 | | 10 | 11 | 12 | 13 | 14 | 15 | 16 | 17 |
| 3.12 | U's | 2 | 7–9 | 11 | 12 | 13 | 14 | 15 | 16 | 17 | 9 | 10 |
| | 10's | DT1-10 | 4–6 | | 11 | 12 | 13 | 14 | 15 | 16 | 17 | 9 |
| 4.13 | U's | 3 | 10–12 | 12 | 13 | 14 | 15 | 16 | 17 | 9 | 10 | 11 |
| | 10's | DT1-11 | 7–9 | | 12 | 13 | 14 | 15 | 16 | 17 | 9 | 10 |
| 5.14 | U's | 4 | 13–15 | 13 | 14 | 15 | 16 | 17 | 9 | 10 | 11 | 12 |
| | 10's | DT1-12 | 10–12 | | 13 | 14 | 15 | 16 | 17 | 9 | 10 | 11 |
| 6.15 | U's | 5 | 16–18 | 14 | 15 | 16 | 17 | 9 | 10 | 11 | 12 | 13 |
| | 10's | DT1-13 | 13–15 | | 14 | 15 | 16 | 17 | 9 | 10 | 11 | 12 |
| 7.16 | U's | 6 | 19–21 | 15 | 16 | 17 | 9 | 10 | 11 | 12 | 13 | 14 |
| | 10's | DT1-14 | 16–18 | | 15 | 16 | 17 | 9 | 10 | 11 | 12 | 13 |
| 8.17 | U's | 7 | 22–24 | 16 | 17 | 9 | 10 | 11 | 12 | 13 | 14 | 15 |
| | 10's | DT1-15 | 19–21 | | 16 | 17 | 9 | 10 | 11 | 12 | 13 | 14 |
| 9.18 | U's | 8 | 25–27 | 17 | 9 | 10 | 11 | 12 | 13 | 14 | 15 | 16 |
| | 10's | DT1-16 | 22–24 | | 17 | 9 | 10 | 11 | 12 | 13 | 14 | 15 |

In the column headed "0" are listed the switches as successively operated by impulses via wire 0a of the DT2 multiple from Tr12 1 front via Tr23 front 2. These pulses are used when it is necessary to fill in the divisor the required number of places towards the left with 9's when the dividend has the greater number of digits.

*Correction of quotient*

As a result of the transfer described in the preceding paragraph, the dividend has been diminished by the product of the divisor and the approximate quotient. The transfer was composed of two subtractions. In this connection, a subtraction means the addition of the complementary number. If the number to be subtracted is smaller, its complementary number when added has to produce a carry-over impulse by the first SM switch. If 37 is to be subtracted from 56, for example, 62 is the 9's complement of 37 to which 1 is added for subtraction correction making the number to be added 63. Then 56+63=119, which means that the solution is 19 and the carry-over impulse I preceding the 19, is an indication that the subtraction is possible. If on the other hand 37 has to be subtracted from 29, then 29+63=92. In this case the absence of the carry-over impulse signified that subtraction is not possible. The calculator makes use of this in the two subtractions of each division transfer. For if these subtractions are possible, the first SM switch of the group on which the dividend is stored will produce a carry-over after each transfer. If both of these carry-over impulses arrive in the Q circuit, from the appropriate Cr carry-over relay, that means that the product of the divisor and the approximate quotient is less than the dividend. The calculator then checks to determine whether or not one or more further subtractions are possible. In the former case, the approximate quotient will be increased for each subtraction by 1. In case one of the two impulses has not been received, the calculator initiates one or more additions until the missing impulse arrives. The approximate quotient is reduced by one for each addition.

The above operations are largely controlled from the Q circuit, Figs. 1Q, 2Q and 3Q. For the calculation of the first quotient the switch SM9 must produce the two impulses mentioned above. Cr9 operates from ground, Cr19 front 3, CS9 wire 1, brush A of SM9 in position 10, CS2 wire 9, Cr9 to battery. Cr9 on operation produces the carry-over in the following circuit: Ground, Cr9 front 3, Cr34 front 3, Cr21 front 1, CQ wire 2, Qr6 back, Qr5, battery. In connection with the circuit just traced it will be recalled that Cr34 was operated from Tr16; and Cr21 operated from ground, Tr8 front, brush E of TM3 in position N, CT1 wire 9, Cr21 to ground. Cr22 to 29 are operated successively in corresponding circuits as TM3 is advanced.

Assuming first that both pulses arrive: the first pulse due to the U's transfer, operates Qr5 which locks itself after the impulse in series with Qr6. The second impulse from Cr9 follows the same circuit except that since now Qr5 and 6 are operated, the second impulse is directed via front 1 of Qr6 to relay Qr7, which operates and locks via front 1 of Qr5 to the back of Tr6. Qr7 energizes Qr8, which has a locking circuit via front 6 of Qr2. If the two subtractions were possible, relays Qr5–8 are operated at the end of the division transfer.

Each time the transfer circuit, Figs. 1T, 2T and 3T, produces the carry-over, the front 1 of Tr18 energizes Qr3 via wire 2 of the QT multiple, front 1 of Qr1 and via the contact arc for brush E of QM2. Qr3 locks itself with its front 1 over the interrupter contact of QM2. The front 2 of Qr3 energizes QM2, and when this switch magnet opens its back contact, Qr3 releases and QM2 being then deenergized, advances the switch one step. The same operation is repeated during the 10's transfer so that QM2 is advanced to position 2 at the end of the division transfer.

When brush C of QM2 leaves position 1, the circuit of Qr14 is opened so that Qr14 and Tr4 release, in order to stop the transfer circuit. Qr14 also releases the Mr relay group which has been operated and Mr1–3 operate again from ground, Qr14 back, wire EQ, Er2 front, Er21 to 24 back, wire 1 of the EM multiple, Mr1–3, battery. This circuit sets the multiplication table for an addition transfer, or rather a multiplication by one.

Each time the T circuit produces the compensating impulse, which is done from contact ten of the particular TM switch in use, front 3 of Tr19 energizes Qr9 via wire 3 of the QT multiple, front 1 of Qr2. Qr9 locks itself after the impulse, via Qr2 front 1, over relay Qr10 to the back contact of Tr16, the circuit extending over wire 4 of QT4 and the back contact of Tr6. Each time a subtraction starts, both Qr9 and Qr10 release due to the operation of Tr6. It will be recalled that Qr6 is operated under the circumstances from front 4 of Tr4, Tr15 back, normal terminal N for brush A of TM2, wire 8 of the CT2 multiple, front 4 of Cr18, wire 9 of the CT2 multiple, front 1 of Tr4, and back 1 of Tr7. This circuit was described in connection with the subtraction correcting impulses.

As previously stated, when subtraction is possible, Qr5–8 are operated. When QM2 reaches contact 2, that is, the third contact of the respective contact arcs, the circuit is closed by brush C thereof from ground, Qr1 front 3, Qr8 front 1, interrupter back contact of QM2, Qr3 to battery. Qr3 operates and tongue 2 front thereof grounds QM2 causing the magnet to energize, opening its back contacts. This breaks the operating circuit and QM2 and Qr3 release. In this way QM2 is stepped from position 2 to position 3 which was possible due to the operation of Qr8. In position 3 of QM2 a check is made by the quotient circuit to determine whether the remainder of the dividend is less or more than the divisor. For this purpose, the first figure of the remainder and that of the divisor is compared.

This comparison is accomplished by a chain of nine resistances QY48–56 the resistance components of which are connected like a potentiometer between the ten wires of the multiple QS1, Fig. 2Q. This multiple serves during other calculations to indicate the figures of the solution. For division, relays Qr19–21 are energized by Qr2 and the wires of the QS1 multiple numbered 0, 1, 2 . . . 9 are switched over to QY48–56.

The principle of the comparing multiple is that the second figure of the dividend remainder and the first figure of the divisor are compared. It is the second figure of the dividend remainder and the first figure of the divisor for the following reasons: Since SM9 is higher by one ordinal degree at present than the first figure of the divisor stored on SM1, it is the first condition that SM9 be in its normal position indicating zero, because, if not, further subtractions are possible. In order to compare the two switches, as illustrated in Fig. 14, a grounded relay is connected to wire 0 of QS1 and at the same time battery is connected to one wire of the multiple over that solution switch which stores the second figure of the remainder and ground is connected to one wire (another or the same) of the multiple over that solution switch which stores the first figure of the divisor. If the divisor is higher than the dividend, the corresponding switch with its grounded wire will be in front of that wire which is connected to battery by the switch of the dividend, and the relay Qr13, connected to wire 0 will operate.

SM9 is the first switch storing the remainder for the first quotient. If SM9 is in its normal position, the second figure of the remainder, i. e. the position of SM10 will be compared, with that of SM1, and Qr13 will or will not operate in the following circuit: Ground, brush E of SM9 position N, CS6 wire 9, Cr21 front, CQ wire 1, Qr13, Qr19 front 3, wire 0 of the comparing multiple, QS1, depending upon whether or not the battery derived from the dividend remainder to be compared, i. e. from SM10, and connected to any of the wires 1 to 9 of QS1, succeeds or precedes the ground derived from the divisor, for example, from SM1, and connected to any of the wires 1 to 9 of QS1. This battery is connected to the comparing multiple over the resistances QY59–60 via front 1 of Qr19, wire 15 of QT, brush D of TM3, wire 10 of the multiple ST2, brush B of SM10, one of the wires 1 to 9 of QS1 connected to the contact in the arc of brush B of SM10 corresponding to the dividend remainder figure stored, one of the following contacts: Qr19 front 4, Qr20 front 1, 2, 3 or 4, Qr21 front 1, 2, 3 or 4, and the end of one of the series connected resistances QY48–56.

The ground is connected to the comparing multiple via front 2 of Qr19, wire 10 of QS1, brush B of SM1, one of the wires 1 to 9 of QS1 connected to the contact in the arc of brush B of SM10 corresponding to the division figure stored, one of the following contacts: Qr19 front 4, Qr20 front 1, 2, 3 or 4, Qr21 front 1, 2, 3 or 4, and the end of one of the series connected resistances QY48–56.

The resistances QY59–60 are protective resistances in the case both switches (SM1 and SM10 at present) are in the same position.

The principle of the comparing multiple can be explained by way of Fig. 14 in which 0 to 9 represent the wires of the multiple QS1, and QY48–56 the series connected resistances. 0 is connected over relay Qr13 to ground. If, for example, as shown in Fig. 14 in full lines, ground applied to any one of the wires 1 to 9 succeeds battery applied to any one of the wires 1 to 9, as shown in Fig. 14 where battery is applied to wire 4 and ground to wire 6, then current passes between points 0 and 4 through resistances 48, 49, 50 and 51, and Qr13 is operated. In this case, the divisor represented by ground is higher than the dividend remainder represented by battery.

If, however, battery succeeds ground as, for example, shown in Fig. 14 in dotted lines where battery is applied to wire 6 and ground to wire 4, then current passes between points 4 and 6 through resistances QY52 and 53, and relay Qr13 is not operated. In this case, the divisor represented by ground is lower than the dividend remainder represented by battery.

If dividend remainder and divisor are equal, as shown, for example, in Fig. 7 in dotted lines where ground and battery are both applied to wire 8, Qr13 is also not operated.

Now Qr13 either may or may not operate, depending on whether the first figure of the divisor is>the first figure of the remainder or, whether the first figure of the divisor is≦than the first figure of the remainder.

Assuming first that Qr13 operates thus signalling that the first figure of the divisor is higher than the remainder, the following circuit is closed for Qr3: Ground, Qr1 front, brush C on its contact 3 of QM2, Qr9 front, Qr22 front, Qr13 front, interrupter contact of QM2, Qr3, battery.

QM2 advances in the known way to position 4 and the approximate quotient being proved to be right can be perforated. It will be understood that only plunger magnets are operated at this time, the actual perforating operation occurring only when the calculation has been completed and the return magnet has been operated.

Qr16 is energized at Qr1 front via contact 4 of the arc for brush C of QM2. The front 2 of Qr16 energizes Qr3 via ground to Qr16 front 2, the interrupter of QM2, Qr3, battery. Qr3 energizes QM2 for Qr3 front 2 so that this switch advances up to the position 10. While energized, front 3 of Qr16 connects ground to brush F of QM1. The terminals of this arc are wired via the PQ multiple to the output converting relays Pr1–6 with the result that the quotient obtained is perforated, that is, plunger magnets are operated which will subsequently cause the desired perforations to be made. Front 4 of Qr16 energizes Pr10 via wire 11 of the PQ multiple in order to advance the plunger head of the perforator mechanism by one step. Front 1 of Qr16 operates Tr27 via wire 11 of QT which in turn energizes switch magnet TM3. When QM2 has made nine steps, brush C thereof opens the circuit to Qr16 which releases. When Qr16 releases, TM3 makes one step, due to the release of Qr16 and Tr27.

Arriving at position 10, QM2 opens at its arc for brush B the circuit for relays Qr1 and Qr2. Consequently in addition to these two relays, the relays Qr5–10, Qr19–21, Qr22 and Qr13 release. QM1 returns to normal with the help of Qr4, the circuit for which was closed through Qr8 back, Qr18 back, QM1 back, brush C of QM1, ground. The front contact of Qr4 which is now grounded via back 5 of Qr1, energizes QM1. When QM1 reaches the home position, terminal 10 of the arc for brush A of QM2 is grounded via the normal terminal N of the arc for brush C of QM1. Qr3 energizes therefrom via QM2 back and QM2 advances to its normal position, where it is ready for the calculation of the next quotient.

Now let it be assumed that Qr13 is not operated when QM2 arrives at position 3. This signifies that the remainder may still be higher than the divisor. This fact is not certain because Qr13 does not operate if the first figure of the remainder is identical with that of the divisor, in which case the possibility of subtraction may depend even on the last figure. In position 3, of QM2, the ground via the arc for brush C now energizes relay Qr17, via front 2, Qr9, front Qr22, back of Qr13 and front 2 of Qr7. Qr17 locks itself via front 2 of Qr2 to back 4 of Tr17 via wire 10 of the QT multiple. Tr2 is energized by ground, Qr2 front 5, Qr18 back, front 2 of Qr17 and subtraction is started. Qr17 at this time connects the impulse circuit from Tr22, via wire 14 of the QT multiple, Qr17 front 4 to QM1 to cause QM1 to advance with TM1 for nine pulses, thus effectively stepping QM1 back to record a quotient of the next higher value. This operation is explained in more detail below. The multiplication table is set again for figure 1 by ground from Qr14 back 2, via wire EQ after the release of Qr14 as described in the operation previously traced, and the distributor remains in a position corresponding to the U's transfer for division as already described.

The subtraction starts with the single subtraction mentioned in the preceding paragraph impulse in the way already described in connection with the principle of the subtraction process. Tr2 operates Tr6, via ground, Tr15 back, brush A of TM1 in position N, CT wire 11, Cr19 front, CT2, wire 11, Tr2 front, Tr7 back, Tr6 battery. When Tr6 operates, relays Qr7, Qr9–10 and Qr22 release.

If the subtraction is possible, SM9 has to produce again a carry-over impulse which energizes as before relay Qr7. It should be noted that during the subtraction operation QM2 does not move from position 3. Qr5 and 6 were held from the former division operation by ground from Qr1 front. Qr1 and Qr2 under these conditions stay locked from Tr6, brush B of QM2, until the division and punching operations are complete and the circuit for brush B of QM2 is opened in position 10 of the switch. Therefore a single carry-over pulse will operate Qr7 after subtraction as described below.

At the end of the transfer Qr9–10 and Qr22 operate and now the position of Qr13 is checked. If Qr13 is operated, the new remainder is less than the divisor and the circuit can proceed to select the plunger magnet or magnets to cause subsequent punching of the quotient.

The approximate quotient must be corrected in this case, by increasing it by one, before the operation of the plunger magnet. Since the positions of QM1 have diminishing values as the switch is advanced, i. e. 9, 8, 7 . . . 0, it is necessary to bring QM1 backwards, in effect, by one position. The circuit accomplishes this in such a way that 10 impulses are sent to QM1 and since the switch requires 11 impulses to make a complete cycle it will be seen that the brush will step at a contact lower by one than a contact on which it rested before. Relay Tr22 operating with Tr10–12 produces nine impulses. The front of Tr22 is connected via wire 14 of the Qt multiple, front 5 of Qr17, back contact of Qr4, to switch QM1. At this time Qr4 is deenergized since Qr8 has been operated as a result of the operation of Qr7. The carry-over impulse for QM1 is obtained from the front 1 of Tr18, wire 2 of the QT multiple, via front 1 of Qr1, the contact arc for brush E of QM2, front 6 of Qr17, back contact of Qr4 and the magnet of QM1. The stepping operation of the respective SM switches is now also under the control of the interrupter of QM1 since the back contact of the switch is connected via back 5 of Qr18, front 3 of Qr8, front 4 of Qr17 via wire 8 of the QT multiple to the common locking wire of the stepping relays.

Qr17 is locked to the back contact of Tr17. It will therefore release during the compensating impulse when Tr11 is operated thus releasing Tr2 in order to stop the transfer.

If Qr13 fails to operate after one subtraction, when Qr7 has been energized, then a further subtraction is required. Qr11 operates as soon as Qr22 closes its front contacts and the above operation is repeated.

In case Qr7 does not receive the carry-over impulse, that is to say, the subtraction was not possible, the circuit has to add back the divisor to the switches on which the dividend is stored. In this case Qr13 is not operated before the addition operation because the divisor was indicated to be less than the remainder. Under the circumstances, as soon as Qr22 operates which occurs during the compensating operation, a circuit is closed for Qr18 via front 2 of Qr10, back 2 of Qr7, back contact of Qr13, etc. Qr18 locks to Qr2 front and is thus held until QM2 steps to the tenth contact. Qr18 starts addition by operating Tr1 via brush D positioned on contact 3 of switch QM2, front 3 of Qr18, back 4 of Qr7 and wire 6 of the QT multiple. The addition transfer is accomplished in the usual manner and thereafter relays Qr9–10 and Qr22 release due to the operation of Tr16 which opens the ground circuit for Qr9 and Qr10 during the carry-over and operate again on the compensating impulse, locking to the back contact of Tr16 again when the circuit is grounded at Tr11 front. Qr7 will receive the carry-over impulse from SM9 in the same manner it received the impulse in the previously described subtraction operation. Qr7 when operated disconnects at its back 4 contact the starting ground for the addition operation and energizes Qr3 via the D brush of QM2 in position 3, Qr18 front 3, Qr7 front 4, back contact QM2, Qr3, ground. Qr3 operates QM2, which leaves position 3 and initiates punching of the quotient in the known way.

The above described operation may be briefly summarized as follows: The approximate quotient was corrected by diminishing it by one to compensate for the addition of the divisor to the switches on which the remainder is stored. This was accomplished by QM1 making one step during the carry-over of the addition transfer by means of the following circuit. Ground, Tr18 front, wire 2 of QT2, Qr1 front 1; E brush of QM2 in position 3, Qr18 front 1, Qr4 back, QM1 battery.

It will be noted that Qr4 released when Qr7 and Qr8 operated. The back or interrupter contact of QM1 is connected via front 5 of Qr18 and via front 3 of Tr18 to the common locking circuit of the stepping relays.

In case the approximate quotient as found by QM1 is too high, SM9 will produce only one pulse in the course of the U's transfer and the 10's transfer. Under these circumstances one impulse will be produced in any case. After the division transfer, when QM2 reaches position 2, it finds Qr7 and Qr8 unoperated, and the single impulse received operates Qr5 and Qr6 which lock in from Qr1 for the rest of the operation, thus causing Qr18 to operate via front 2 of Qr10, back 1 of Qr8 and ground via terminal 2 of the arc for brush C of QM2. Qr18 starts addition as before, and QM1 makes one step for each addition. When after one or several additions relay Qr7 receives the missing carry-over impulse, and operates, the addition operation stops, Tr1 being disconnected at the back 4 contact of Qr7. QM2 leaves positions 2 and 3 via front 4 of Qr7 and arriving at position 4 initiates the perforation of the quotient obtained by operating the plunger magnet or magnets which will cause the perforations for the quotient digit just obtained to be punched in the desired column on the card. In this case the comparison by relay Qr13 is not necessary, since the calculator arrives to the correct quotient after having wrongly selected a quotient of higher value which was not accepted by the circuit.

As can be seen from Figs. 1Q, 2Q and 3Q, the Wheatstone bridge has the same resistances of 200 ohms for the quotient 1 and 2. If, therefore, the resistances Qr37–38 do not balance the bridge, QM1 will stop only in position 9, indicating the quotient to be 0. It is quicker in this case to start single subtraction immediately than to multiply first by 1.

In case of a 0 quotient, the release of Qr12 is followed by the operation of Qr15 via terminal 9 of the arc for brush A of QM1, over the following circuit: Ground, Qr1, front 2, brush C of QM2 positioned on contacts 1 or 2, Qr12 back 1, brush A of QM1 positioned on contact 9, Qr15, battery.

Qr9–10 and Qr22 are now energized from the front 1 of Qr15. Qr5–6 are operated from the front 2 of Qr15. Brush D of QM2 is grounded and the contacts N and 1 of its arcs are strapped together and connected through the fourth front contacts of Qr8 to the back contact of QM2 and thence through the winding of Qr3. When Qr3 is energized it supplies from its front 2 contact an operating ground for QM2 causing the switch to take two steps thus moving its brushes to contact 2. QM2 is advanced from position 2 to position 3 by an operating ground from Qr1 front 3, brush C of QM2 on position 2, Qr8 front, back contact of QM2, Qr3, etc. Thus QM2 stops in position 3 under the same circuit conditions as after division transfer which has produced both pulses. The subsequent operations depend on Qr13. If this relay is operated showing the divisor is greater than the dividend, the appropriate plunger magnet will be operated so that the required 0 will be subsequently perforated. If not, then subtraction starts by the operation of Qr17 in the way previously described.

All following quotients will be determined in the same manner. For the second, third and the follow quotients 1, one of the relays Cr22 to Cr29 is energized via one of the wires 10 to 0 of CT1, since TM3 is in one of the positions 1 to 8, respectively. The Dr relays which will be energized for the U's and 10's transfers are shown on the table above. The solution switch which stores the first figure of the dividend is now SM10 and the switch storing the last figure is SM9. The carry-over circuit, Figs. 1C, 2C and 3C must take care that the carry-over impulse of the switch SM9 is acting now on SM17, and on the other hand the carry-over impulses of SM10 must be prevented from acting on SM9. The necessary circuit conditions are set up by the operation of relay Cr45 and one of the relays of the Cr21–29 group, as explained before.

Cr45 is operated from the front 3 contact of Qr2 via the third wire of the CQ multiple. The front 1 of Cr45 directs the carry-over impulse of Cr9 to the switch SM17, via wire 17a of the CS1 multiple. The front 2 of Cr45 connects relay Cr9 via CS2 wire 9 and wires 19 and 2 of the CS5 multiple to the terminal 9 of the arc for brush A of SM17 in order to complete the carry-over circuit. Contact 3 front of Cr45 connects the interrupter contact of SM17 to the common locking circuit of Tr10–12 via front 4 of Cr9, as follows, wire 17b of CS1, Cr45 front 3, Cr21 back 2, Cr37 front 3, Cr9 front 4, CT2 wire 6.

Referring now to the group of relays Cr21–29 and taking Cr22 for example, it will be seen that the first changeover disconnects the carry-over impulse of SM10 from SM9 and directs it to the relays Qr5–7. The back 2 of Cr22 opens the locking circuit of the interrupter of SM9, which is only required if the carry-over impulse is sent to the magnet of SM9. The back 3 of Cr22 opens the connections by the releasing Cr10 and Cr9 of terminal 9 of the arc for brush A of SM9. The front 4 as was already explained connects ground to the comparing relay Qr13 via the E brush of the SM10 in position N, and finally the front 5 of Cr22 closes that part of the Wheatstone bridge which corresponds to the first two figures of the actual dividend. In the case of Cr22 these are the brushes D of SM10 and F of SM11 which store the two figures mentioned above.

The connections of all other Cr21–29 relays are similar. Relay Cr23 will be operated via wire 11 of CT1 for the third quotient; Cr24 via wire 12 of CT1 for the fourth quotient, etc. If more than nine quotients are required, Cr21 will be energized again for the tenth quotient.

*First quotient*

Cr21 is energized as previously described from the arc of brush E of TM3 and wire 9 of the CT1 multiple, and therefore the Wheatstone bridge has 10 ohms for the dividend. Since the brush D of SM10 is on contact 1 the 10 ohm resistance QY28 will be connected over the QS3 multiple wire 1 to form the lower left hand side of the bridge while the 40 ohm resistance QY4 which is connected by brush D of SM1 on its contact 4 which indicates that the first figure 4 of the divisor is stored thereon is connected in series with QY12 which is a 3 ohm resistance corresponding to figure 3, the second figure of the divisor. These latter resistances are connected by means of the brush D of SM2, to form the upper left hand side of the bridge with a total of 43 ohms. It will be noted that the D brushes of SM1 and SM2 are strapped together. QM1 stops in position 9 and thereby indicates the quotient 0. QM2 advances to position 3, where Qr13 operates, SM10 being in position 1 and SM1 in position 4, and the quotient circuit proceeds to make a perforation selection as previously described. The zero will not be recorded on the card, however, since Pr1 is not operated. The plunger head now advances to position 25.

*Second quotient*

TM3 being in position 1, Cr22 is energized. As previously stated the Cr21–29 group of relays are operated progressively via the CT1 multiple from brush E of TM3. This switch advances one step as each quotient is determined. The Wheatstone bridge now has 16 ohms in one arm and 43 ohms in the other, the resistances for divisor being unchanged QY19, a 10 ohm resistance representing the first significant digit of the dividend is now in series with the 60 ohm resistance QY33 representing the figure 6 which is the second figure of the dividend. These latter resistances are connected, as explained before, by means of the brush D of SM11 via CS7 wire 9, Cr21 front 4, Cr22 front 4, SC7 wire 10. QM1 will most probably indicate the quotient 3.

| | | Direct | Complementary |
|---|---|---|---|
| 4316×3= | U's | 2 9 3 8 | 7 0 6 1 |
| | 10's | 1 0 0 1 | 8 9 9 8 |

The SM switches now advance as follows:

|  | Imp. to Q cct. | SM10 | SM11 | SM12 | SM13 | SM14 | SM15 | SM16 | SM17 | SM9 |
|---|---|---|---|---|---|---|---|---|---|---|
| Before div |  | 1 | 6 | 5 | 4 | 3 | 6 | 4 | 8 | 0 |
| Single imp |  |  |  |  |  |  |  |  |  | 1 |
| U's impulses |  | 9 | 7 | 0 | 6 | 1 | 9 | 9 | 9 | 9 |
| After U's transfer | 1 | 1 | 3 | 6 | 0 | 5 | 6 | 4 | 8 | 0 |
| Single imp |  |  |  |  |  |  |  |  | 1 |  |
| 10's impulses |  | 8 | 9 | 9 | 8 | 9 | 9 | 9 | 9 |  |
| After 10's transfer | 1 | 0 | 3 | 5 | 9 | 5 | 6 | 4 | 8 | 0 |

SM10 produces two carry-over impulses for the Q circuit. Qr7 operates and QM2 advances to position 3 where the position of SM11 is compared with that of SM1. Qr13 thereby operates and the quotient 3 will be perforated on the card in position 25.

*Third quotient*

TM3 is in position 2 and Cr23 is energized. The Wheatstone bridge has 350 ohms against 43 ohms. QM1 probably will indicate 8, but let us assume that it does not leave its normal position and thus indicates the quotient 9.

|  |  | Direct | Complementary |
|---|---|---|---|
| 4316×9 | U's | 6 7 9 4 | 3 2 0 5 |
|  | 10's | 3 2 0 5 | 6 7 9 4 |

The switches advance as follows:

|  | Imp. to Q cct. | SM11 | SM12 | SM13 | SM14 | SM15 | SM16 | SM17 | SM9 | SM10 |
|---|---|---|---|---|---|---|---|---|---|---|
| Before div |  | 3 | 5 | 9 | 5 | 6 | 4 | 8 | 0 | 0 |
| Single imp |  |  |  |  |  |  |  |  |  | 1 |
| U's impulses |  | 9 | 3 | 2 | 0 | 5 | 9 | 9 | 9 | 9 |
| After U's transfer | 1 | 2 | 9 | 1 | 6 | 2 | 4 | 8 | 0 | 0 |
| Single imp |  |  |  |  |  |  |  |  | 1 |  |
| 10's impulses |  | 6 | 7 | 9 | 4 | 9 | 9 | 9 | 9 |  |
| After 10's transfer |  | 9 | 7 | 1 | 1 | 2 | 4 | 8 | 0 | 0 |
| SM11 has produced only one impulse for the Q circuit and therefore Qr7 is not operated. In position 2 of QM2 relay Qr18 is energized and addition is started. |  |  |  |  |  |  |  |  |  |  |
| Addition |  |  | 4 | 3 | 1 | 6 |  |  |  |  |
| After transfer | 1 | 0 | 1 | 4 | 2 | 8 | 4 | 8 | 0 | 0 |

The impulse is now given, Qr7 operates and QM2 advances and proceeds to perforate. During addition, QM1 makes one step via a front of Qr18 and therefore the plunger magnets are operated to cause figure 8 to be perforated.

*Fourth quotient*

TM3 is in position 3 and Cr24 is energized. The Wheatstone bridge has 140 ohms against 43 ohms like for the second quotient, but we can now assume that it indicates 2.

|  |  | Direct | Complementary |
|---|---|---|---|
| 4316×2 | U's | 8 8 6 2 2 | 1 3 7 7 |
|  | 10's | 0 0 0 1 | 9 9 9 8 |

The switches advance as follows:

|  | Imp. to Q cct. | SM12 | SM13 | SM14 | SM15 | SM16 | SM17 | SM9 | SM10 | SM11 |
|---|---|---|---|---|---|---|---|---|---|---|
| Before div |  | 1 | 4 | 2 | 8 | 4 | 8 | 0 | 0 | 0 |
| Single imp |  |  |  |  |  |  |  |  |  | 1 |
| U's impulses |  | 9 | 1 | 3 | 7 | 7 | 9 | 9 | 9 | 9 |
| After U's transfer | 1 | 0 | 5 | 6 | 6 | 2 | 8 | 0 | 0 | 0 |
| Single imp |  |  |  |  |  |  |  |  | 1 |  |
| 10's impulses |  | 9 | 9 | 9 | 8 | 9 | 9 | 9 | 9 |  |
| After 10's transfer | 1 | 0 | 5 | 6 | 5 | 2 | 8 | 0 | 0 | 0 |
| SM12 has produced two impulses: Qr7 operates and QM2 goes to position 3, where Qr13 is found on its back, SM13 being in front of SM1. Therefore Qr17 is energized and subtraction starts. |  |  |  |  |  |  |  |  |  |  |
| Single imp |  |  |  |  |  |  |  |  |  | 1 |
| Subtraction |  | 9 | 5 | 6 | 8 | 3 | 9 | 9 | 9 | 9 |
| After transfer | 1 | 0 | 1 | 3 | 3 | 6 | 8 | 0 | 0 | 0 |

The carry-over impulse is now given and Qr7 operates. When Qr22 operates, Qr13 will be already on the front, SM13 being in position 1. QM2 advances and initiates punching.

QM1 receives during subtraction 10 impulses via fronts of Qr17 and thus it is indicating the quotient 3.

*Fifth quotient*

TM3 is in position 4 and relay Cr25 is energized. The Wheatstone bridge has now 130 ohms against 43 ohms. It will now be supposed that the bridge relay releases with a certain delay and QM1 stops only in position 8, indicating the quotient 1. It has to be pointed out that this case cannot happen normally, but the circuit has to work correctly even in such a case.

The switches advance as follows:

| | Imp. to Q cct. | SM13 | SM14 | SM15 | SM16 | SM17 | SM9 | SM10 | SM11 | SM12 |
|---|---|---|---|---|---|---|---|---|---|---|
| Before transfer | | 1 | 3 | 3 | 6 | 8 | 0 | 0 | 0 | 0 |
| Single imp | | | | | | | | | | 1 |
| U's impulses | | 9 | 5 | 6 | 8 | 3 | 9 | 9 | 9 | 9 |
| After U's transfer | 1 | 0 | 9 | 0 | 5 | 2 | 0 | 0 | 0 | 0 |
| Single imp | | | | | | | | | 1 | |
| 10's impulses | | 9 | 9 | 9 | 9 | 9 | 9 | 9 | 9 | |
| After 10's transfer | 1 | 0 | 9 | 0 | 5 | 2 | 0 | 0 | 0 | 0 |

Both impulses have been produced by SM13, therefore QM2 advances to position 3 and starts subtraction, since Qr13 cannot be operated.

| | | | | | | | | | |
|---|---|---|---|---|---|---|---|---|---|
| Single imp | | | | | | | | | 1 |
| Subtraction | | 9 | 5 | 6 | 8 | 3 | 9 | 9 | 9 |
| After transfer | 1 | 0 | 4 | 7 | 3 | 6 | 0 | 0 | 0 | 0 |

The carry-over impulse is produced by SM13,

|  | Direct | Complementary |
|---|---|---|
| 4316×9= {U's | 6 7 9 4 | 3,2 0 5 |
| {10's | 3 2 0 5 | 6 7 9 4 |

| | Imp. to Q cct. | SM15 | SM16 | SM17 | SM9 | SM10 | SM11 | SM12 | SM13 | SM14 |
|---|---|---|---|---|---|---|---|---|---|---|
| Before transfer | | 4 | 2 | 0 | 0 | 0 | 0 | 0 | 0 | 0 |
| Single imp | | | | | | | | | | 1 |
| U's impulses | | 9 | 3 | 2 | 0 | 5 | 9 | 9 | 9 | 9 |
| After U's transfer | 1 | 3 | 5 | 2 | 0 | 6 | 0 | 0 | 0 | 0 |
| Single imp | | | | | | | | | 1 | |
| 10's impulses | | 6 | 7 | 9 | 4 | 9 | 9 | 9 | 9 | |
| After 10's transfer | 1 | 0 | 3 | 1 | 5 | 6 | 0 | 0 | 0 | 0 | but Qr13, is not yet operated, therefore subtraction is started again. QM1 having received 10 impulses is now in position 7.

| | | | | | | | | | |
|---|---|---|---|---|---|---|---|---|---|
| Single imp | | | | | | | | | 1 |
| Subtraction | | 9 | 5 | 6 | 8 | 3 | 9 | 9 | 9 |
| After transfer | 1 | 0 | 0 | 4 | 2 | 0 | 0 | 0 | 0 | 0 |

The carry-over impulse is received and Qr13 now energizes. QM1 is stepped to position 6 and the quotient 3 is perforated in position 28 of the perforator.

Sixth quotient

TM3 is in position 5 and Cr26 is energized. SM14 being in normal position, the Wheatstone bridge has 40 ohms against 43 and QM1 will undoubtedly indicate zero. QM2 advances to position 3, where Qr13 is found on its back as SM15 and SM1 are standing in the same position. The Q circuit, therefore, starts subtraction:

| | Imp. to Q cct. | SM14 | SM15 | SM16 | SM17 | SM9 | SM10 | SM11 | SM12 | SM13 |
|---|---|---|---|---|---|---|---|---|---|---|
| Before transfer | | | 4 | 2 | 0 | 0 | 0 | 0 | 0 | 0 |
| Single imp | | | | | | | | | | 1 |
| Subtraction | | 9 | 5 | 6 | 8 | 3 | 9 | 9 | 9 | 9 |
| After transfer | | 9 | 9 | 8 | 8 | 4 | 0 | 0 | 0 | 0 |
| SM14 does not produce the required carry-over impulse signalling that the subtraction is not possible. Qr18 operates via back of Qr7 and addition is started. | | | | | | | | | | |
| Addition | | | | 4 | 3 | 1 | 6 | | | |
| After addition | | 1 | 0 | 4 | 2 | 0 | 0 | 0 | 0 | |

QM1 receives first 10 impulses and then during addition 1 impulse, so it comes back to its position 9 and the "0" quotient is perforated in position 29 of the perforator.

Seventh quotient

TM3 is in position 6 and relay Cr27 is energized. The Wheatstone bridge has 420 ohms against 43 and therefrom QM1 remains in its normal position and indicates 9.

Qr7 and Qr13 operate. The quotient 9 will be perforated in position 30 of the perforator. The division thereby is terminated. One terminal of the perforator contact field 31 is connected to wire 38 of EO1. Relay Er28 operates and causes the release of the calculator.

Fractional differences and other calculations

The "direct division" and "back transfer" features provide a ready means of performing calculations of the type:

$$\frac{A-B}{A}=S$$

and similar combinations. If the quantity $A-B$ is determined by a regular subtraction operation, the record of the factor A is lost, as soon as the factor B has been deducted. In such a case, therefore, the factor A, recorded in the usual manner on storage relays, is transferred simultaneously to two separate groups of accumulating switches. One only of these groups is used for the subtraction operation, after which it records the quantity $A-B$. The factor A is then transferred by the "back transfer" process to the storage relays, and the accumulating switches used to record it are restored. A regular division operation is then performed with $A-B$ as dividend and A as divisor.

Computations, of the type $$\frac{A-B}{B}=S$$

can be carried out by retaining the factor B on the storage relays (instead of releasing the latter), after obtaining the quantity $A-B$ by a regular subtraction operation, and then performing a straightforward division operation.

More complex problems involving division, such as:

$$\frac{A}{A\pm B}=S$$

$$\frac{A\pm B}{A\pm B}=S$$

$$\frac{A\pm B\pm\ \cdots}{C\pm D\pm\ \cdots}=S$$

$$\frac{A\times B\times\ \cdots}{C\pm D\pm\ \cdots}=S$$

$$\frac{A\pm B\pm\ \cdots}{C\times D\times\ \cdots}=S$$

$$\frac{A\times B\times\ \cdots}{C\times D\times}=S$$

and many other, are capable of rapid solution by judicious combinations of the numerous computing devices included.

While the present invention has been described in connection with punched card equipment, it will be understood that many of its features as disclosed herein may be modified for use with other types of apparatus without departing from the spirit thereof.

What is claimed is:

1. Electric calculating apparatus comprising exploring means for reading a plurality of digits in a preselected order from a record card while moving thereacross, means for storing the digits read in the order of reading, means for performing a desired type of computation with respect to the numbers represented by the stored digits, multi-order accumulating means for receiving the digits of a number in different orders thereof, relay means for selecting the orders of said accumulating means in which the numerical results of said computation are to be placed, and means operated by the movement of the exploring means for controlling said relay means.

2. Electric calculating apparatus comprising exploring means for reading from a record card the digits of a plurality of groups of digits in predetermined order, means for producing relative movement of said exploring means and said record card for said card reading operation, means for storing the numbers read depending upon the position of said exploring means, a contact field and cooperating brush means therefor means controlled from said contact field for storing the digits read depending upon the movement of said exploring means, means for producing relative movement between said brush means and said field in synchronism with the card reading operation, a plurality of accumulating switches, the number of said switches being in excess of the number of digits to be accumulated, circuit means operated from said contact field after the reading of one of said groups of numbers effective to cause the number read to be registered on said storing means and further circuit means operated from said contact field effective to cause the number stored to be transferred to a predetermined group of said accumulating switches.

3. Electric calculating apparatus comprising exploring means for reading from a record card the digits of a plurality of groups of digits in predetermined order, means for producing relative movement of said exploring means and said record card for said card reading operation, means for storing the numbers read depending upon the position of said exploring means, a contact field and cooperating brush means therefor, means controlled from said contact field for storing the digits read depending upon the movement of said exploring means, means for producing relative movement between said brush means and said field in synchronism with the card reading operation, a plurality of accumulating switches, the number of said switches being in excess of the number of digits to be accumulated, circuit means controlled from said contact field to cause the number read to be registered on said storing means and further circuit means operated from said contact field effective to cause the number stored to be transferred to a group of accumulating switches and other circuit means also operable from said contact field to initiate a predetermined calculation operation.

4. Electric calculating apparatus comprising exploring means for reading from a record card the digits of a plurality of groups of digits in predetermined order, means for producing relative movement of said exploring means and said record card for said card reading operation, means for storing the numbers read depending upon the position of said exploring means, a contact field and cooperating brush means therefor, means controlled from said contact field for storing the digits read depending upon the movement of said exploring means, means for producing relative movement between said brush means and said field in synchronism with the card reading operation, a plurality of accumulating switches, the number of said switches being in excess of the number of digits to be accumulated, circuit means controlled from said contact field to cause the number read to be registered on said storing means and further circuit means operated from said contact field effective to cause the number stored to be transferred to a group of accumulating switches and other circuit means including relay means operable from said contact field to stop the reading of said card by said explorer means until said transfer has been accomplished.

5. Electric calculating apparatus comprising exploring means for reading the digits of a plurality of groups of digits in predetermined order from a record card, means for producing relative movement of said exploring means and said record card for said card reading operation, a contact field and cooperating brush means therefor, means for producing relative movement between said brush means and said field in synchronism with the card reading operation, means controlled from said contact field for storing the digits read depending upon the movement of said exploring means, a plurality of accumulating switches, the number of said switches being in excess of the number of digits to be accumulated, circuit means controlled from said contact field to cause the number read to be registered on said storing means, and further circuit means operated from said contact field effective to cause the number stored to be transferred to a group of accumulating switches, other circuit means including relay means operable from said contact field to stop the reading of said card by said exploring means until said transfer has been accomplished, and circuit means operable on the completion of said transfer effective to cause said exploring means to resume the card reading operation.

6. Electric calculating apparatus comprising exploring means for reading the digits of a plurality of groups of digits in predetermined order from a record card, means for producing relative movement of said exploring means and said record card in the card reading operation, a contact field and cooperating brush means therefor, means for producing relative movement between said brush means and said field in synchronism with the card reading operation, means controlled from said contact field for storing the digits read depending upon the movement of said exploring means, a plurality of accumulating switches, the number of said switches being in excess of the number of digits to be accumulated, circuit means controlled from said contact field to cause the number read to be registered on said storing means and further circuit means operated from said contact field effective to cause the number stored to be transferred to a group of accumulating switches, other circuit means including relay means operable from said contact field to stop the reading of said card by said exploring means until said transfer has been completed, a locking circuit for said relay means effective to hold said relay means energized during said transfer, and other relay means operable in response to the completion of the transfer for releasing the first mentioned relay means to permit the card reading operation to continue.

7. Electric calculating apparatus comprising exploring means for reading the digits of a plurality of groups of numbers in predetermined order, a plurality of card sensing contacts in said exploring means arranged to be operated by perforations in the card being sensed, means for advancing said exploring means column by column in respect to the card, a contact field associated with said exploring means having a plurality of rows of contacts, brush means cooperating with said contacts adapted to advance from row to row of said contacts as the explorer advances, storage relay means comprising a plurality of sets of storage relays, a plurality of routing relays adapted to connect the windings of said storage relays to corresponding ones of said card sensing contacts, means for operating said routing relays one after another as the card sensing operation progresses comprising circuits from said contact field closed one after another by said brush means; impulse circuits, a plurality of step-by-step accumulator switches. circuit means controlled from said contact field for connecting impulse circuits to selected orders of said plurality of switches in order to advance said switches, a plurality of stopping relays, one stopping relay being associated with each storage relay set and one of the selected accumulator switches; said stopping relays being adapted when operated to disconnect the impulse circuit from one of said selected switches, and circuit means controlled by the operation of one or more storage relays of a set to cause the operation of the associated stopping relay in accordance with the number of steps the accumulating switch associated therewith is required to advance.

8. In an electric calculating apparatus according to claim 7 in which a circuit is closed at the contact field after the digits of the first number are stored, other relay means operated by said circuit, said other relay means being adapted to govern the type of calculation operation which is to take place.

9. In an electric calculating apparatus according to claim 7 in which a circuit is closed at the contact field after the digits of the first number are stored, means operated by said circuit to initiate the transfer of the numbers stored to the accumulating switches, and other circuit means operated during said transfer which will release the operated storage relays after transfer has been effected.

10. In an electric calculating apparatus according to claim 7 in which a card may be sensed having data recorded by perforations in the upper and lower halves of the columns thereof, relay means selectively operated from said contact field to operatively connect the windings of the storing relays to the explorer contacts for sensing either the upper or lower halves of the columns.

11. Electric calculating apparatus comprising exploring means for reading the digits of a plurality of groups of numbers in predetermined order, a plurality of card sensing contacts in said exploring means arranged to be operated by perforations in the card being sensed, means for advancing said exploring means column by column in respect to the card, a contact field associated with said exploring means having a plurality of rows of contacts, brush means cooperating with said contacts adapted to advance from row to row of said contacts as the explorer advances, storage relay means comprising a plurality of sets of storage relays, a plurality of routing relays adapted to connect the windings of said storage relays to corresponding ones of said card sensing contacts, means for operating said routing relays one after another as the card sensing operation progresses comprising circuits from said contact field closed one after another by said brush means; impulse circuits, a plurality of step-by-step accumulator switches, circuit means controlled from said contact field for connecting impulse circuits to selected orders of said plurality of switches in order to advance said switches, a plurality of stopping relays, one stopping relay being associated with each storage relay set and one of the selected accumulator switches; said stopping relays being adapted when operated to disconnect the impulse circuit from one of said selected switches, and circuit means controlled by the operation of one or more storage relays of a set to cause the operation of the associated stopping relay in accordance with the number of steps the accumulating switch associated therewith is required to advance, relay means selectively operable from said contact field to operatively connect the windings of the storing relays to said card sensing contacts, a plurality of job relays, push button means for operating said relays in predetermined combinations, circuits extending from the contacts of said job relays to contacts in said explorer contact field in accordance with a desired calculation operation, said circuits being adapted to select the columns of the card to be sensed; to control the type of calculation to be performed and to apply the result of the calculation.

12. Electric calculating apparatus according to claim 7 including a plurality of master transfer switches, a plurality of brushes on each switch and individual contact arcs cooperating with each brush, relay means selectively operated from the explorer contact field after the storing of the digits of the first number has been completed arranged to close circuits controlling the type of calculating operation to be performed, one of said circuits operatively connecting the magnet of a transfer switch to an impulse circuit, and another circuit selecting a brush of said switch, which with its associated contact arc will perform the desired calculation transfer.

13. Calculating apparatus comprising a card exploring unit adapted to sense data perforated on a card when moving thereacross, an input storage unit controlled by said exploring unit comprising a plurality of relays adapted to store the data read by said exploring unit, an accumulating unit comprising a plurality of accumulating switches, and transfer means controlled by the movement of the card exploring unit for making connection to selected orders of accumulating switches, said transfer means being capable of adjustment to transfer from said input storage unit to said selected accumulating switches, either the digits read by said card exploring unit for addition purposes or the complement thereof for subtraction purposes, and means under the control of said exploring unit for indicating which type of transfer is to be carried out by said transfer unit.

14. Calculating apparatus comprising a card exploring unit adapted to sense data perforated on a card while moving thereacross, an input storage unit controlled by said exploring unit comprising a plurality of relays adapted to store the data read by said exploring unit, an accumulating unit comprising a plurality of accumulating switches, and transfer means for making connection to selected orders of accumulating switches, the selection being effected under control of the explorer movement, said transfer means being capable of adjustment to cause the digit read by said card exploring unit to be transferred from said input storage unit to said accumulating orders for addition purposes, or a multiple thereof to be transferred to said accumulating orders for multiplication purposes and means under the control of said card exploring unit for determining which type of transfer is to be carried out by said transfer means.

15. Electric calculating apparatus comprising exploring means for reading a plurality of digits progressively in a preselected order from a record card, means for storing the digits read in the order of reading means for performing a desired type of computation with respect to the numbers represented by said digits, multi-order accumulating means for receiving the digits of a number in different orders thereof, circuit means for selecting the orders of said accumulating means in which the numerical results of said computation are to be placed, and means operated by the progress of said exploring means for controlling said circuit means.

16. Electric calculating apparatus comprising a plurality of groups of input storage relays for storing incoming numbers, each digit of an incoming number being stored in a separate group of said storage relays, a plurality of accumulating switches, a plurality of groups of distributor relays for selecting accumulating switches in groups each group of switches being selected by a separate group of distributor relays, a source of pulses, a master switch common to all accumulating switches and connecting the source of pulses over the distributor relays to the accumulating switches of the selected group for stepping the switches of said group in unison and means including connections from each of the switches of said group to one of said groups of storage relays for causing each of the switches of said group to stop stepping when it has reached a point corresponding to the number stored in the corresponding group of storage relays.

17. An electric calculator comprising a plurality of step-by-step switches each having an operating magnet, an armature therefor having a tongue, a pair of stationary contacts cooperating with said tongue, one being a back contact and the other a front contact, a master transfer switch similar to said switches, a plurality of brushes each having contact arcs for each of said switches, a stepping circuit for producing impulses for advancing said switches, said circuit including stepping relay means and an interrupter relay, a source of potential connected to one winding terminal of said stepping relay means, the opposite terminal being connected via a group of interconnected contacts and a cooperating brush of said master transfer switch through the back contacts of said interrupter relay, to ground potential, a circuit for operating said interrupter relay from a front contact of said stepping relay means whereby said relays operate to produce timed impulses, a circuit connecting the operating magnet of said master transfer switch to a front contact of said stepping relay means for operating said magnet and advancing said switch, and means for ensuring the operation of all of said switches in unison comprising control circuits for said stepping relay means operated from the first mentioned contacts of said switches.

18. An electric calculator according to claim 17 wherein the interrupter relay is also operable from the front contact of the transfer switch to ensure uniform operation of all of said step by step switches.

19. An electric calculator according to claim 17 in which a holding circuit is provided for said stepping relay means whereby said stepping relay means may be held energized independently of the operation of said interrupter relay.

20. An electric calculator according to claim 17 in which said stepping relay means is provided with a holding circuit to ensure the synchronized operation of said switches, said holding circuit comprising a circuit from ground potential, the armature back contacts of any of said switches, a front contact of said stepping relay means and the winding of said relay means to battery.

21. An electric calculator according to claim 17 in which the normal pulsating operation of said switches is interrupted when said brush of said master transfer switch is not in contact with said interconnected segments.

22. An electric calculator according to claim 17 in which said switches are provided with arcs comprising 11 contacts, said interconnected contacts comprising the second to ninth contacts.

23. An electric calculator according to claim 17 in which said switches are provided with arcs each of eleven contacts, said interconnected contacts being the consecutively numbered contacts 2 to 9, a plurality of selectable relays, each of which will initiate the calculation of a different kind of problem, and circuit means controlled by the operation of any one of said relays for initiating the advance of the master transfer switch, so at the start of a transfer operation the brushes thereof move from the first contact to the second, whereupon said switch is advanced by means of the circuit inculding said interconnected contacts.

24. An electric calculator according to claim 17 in which said switches are provided with arcs each of eleven contacts, said interconnected contacts being the consecutively numbered contacts 2 to 9, selectively operated means for operating said transfer switch to advance the brushes thereof from the first contact to the second at the start of the transfer cycle, whereupon said brushes are stepped over nine contacts under the control of the circuit including said interconnected contacts, and circuit means to cause said switches to advance one additional step during each cycle for compensation purposes.

25. Electric calculating apparatus comprising means to sense progressively data punched on a card column by column, means depending upon the progress of the sensing means to store according to the decimal system the digits of a first number punched on a card, a master transfer switch, a plurality of step by step accumulator switches for accumulating digits of the result of a computation, means responsive to the progress of the sensing means for selecting connections through said master transfer switch to a predetermined group of accumulating switches, means selectively operated for initiating an addition operation, a multiplying circuit, means to actuate said multiplying circuit to perform a multiplication by one, means including said multiplication circuit when so actuated and said master transfer switch to transfer said number from said storing means to a predetermined group in said plurality of accumulator switches so the switches of said group by their positions indicate the first number punched on the card, said master transfer switch being common to all groups in said plurality of accumulator switches, means to sense the second number on the card and transfer said second number to said group of accumulator switches in like manner, carry over circuit means responsive to any of the accumulator switches of said group making nine steps from a home position to advance the switch of the next higher ordinal value by one, whereby the sum of both numbers is recorded on the accumulator switches of said group, and means controlled by the accumulator switches of said group for recording the amount registered thereon.

26. Electric calculating apparatus comprising means to sense progressively data punched on a card column by column, means depending upon the progress of the sensing means to store according to the decimal system the digits of a first number punched on a card, a master transfer switch, a plurality of step by step accumulator switches for accumulating digits of the result of a computation, means responsive to the progress of the sensing means and inculding said master transfer switch for transferring said storing means to a predetermined group in said plurality of accumulator switches, means selectively operated for initiating a subtraction operation, means for reading a second number from the card and storing the same in the same manner, as said first number, means including said master transfer switch for transferring nines complements of the number last stored to the accumulator switches of said group, said master transfer switch being common to all groups in said plurality of accumulator switches, means to add one to the accumulator switch of said group of the lowest ordinal value, means responsive to any of said accumulator switches of said group making ten steps to advance the switch of the next higher ordinal value by one, means to ignore the carry over of the switch of said group of the highest ordinal value, whereby the accumulating switches of said group record the total of the subtraction operation.

27. Electric calculating apparatus comprising a transfer switch, a plurality of contact arcs on said switch, brushes therefor, one of said arcs being for a multiplication transfer and another for a division transfer, a multiple connected to a first group of contacts of each of said arcs for the purpose of transferring units of partial products of a multiplication operation, the wires of said multiple being connected to the contacts of the arc for a multiplication transfer so that the wires are energized according to progressively increasing numerical values as the brush advances, while the same wires of said multiple are connected in reversed order to said group of contacts for the division transfer whereby said wires are energized to produce complements of the partial products of the number being transferred, a second multiple interconnected to a second group of contacts in each of said arcs for multiplication and division for transferring tens partial products, said second multiple being interconnected to said second group of contacts for a multiplication transfer so that the wires thereof are energized according to progressively increasing numerical values as the brush advances, while the same wires of said second multiple are connected in reversed order to said second group of contacts for the division transfer whereby the wires of said second multiple are energized so that complements of said other partial products will be transferred.

28. Electric calculator apparatus comprising card explorer means for reading the data punched on a card column by column, calculating circuit means operated from data read from the card, means for producing a relative movement of the explorer and card during the exploring operation, brush means and a cooperating contact field comprising a plurality of rows of contacts, the rows corresponding in number to the columns of the card, means for advancing the brush means over the contact field in synchronism with the relative movement of the explorer and card, a plurality of circuits controlling calculating operations adapted to be closed and then opened by said brush means as it engages the respective rows of contacts one after another, a control unit for said calculator having a plurality of manually operable switch means, one for each type of calculation, a self locking relay circuit including a plurality of relays operatively associated with each of said switch means, and means controlled from any of said self locking relay circuits for establishing the necessary connections to the respective contacts in said contact field for the required operations of the calculator whereby the operations of the calculator are timed invariably in respect to the reading of the card in accordance with an operated switch means.

29. An electric calculator according to claim 28 in which said card explorer is advanced in respect to the card by an advance magnet which steps the explorer from column to column on the card and in which after the digits of the first number have been read from the card, the advance magnet is disabled by means controlled by the closing of a contact in the contact field.

30. An electric calculator according to claim 28 in which said card explorer is advanced in respect to the card by an advance magnet which steps the explorer from column to column on the card and in which after the digits of the first number have been read from the card, the advance magnet is disabled by means controlled by the closing of a contact in the contact field and in which means is provided for rendering said disabling means ineffective after a predetermined series of operations by the calculator thereby permitting the advance magnet to resume its stepping operation.

31. Electric calculator apparatus according to claim 28 wherein said manually operable switch means comprises a plurality of manually operable push buttons electrically coupled with said contact field, one for a given series of computations, a self locking relay circuit associated with each of said push buttons for establishing connections adapted to initiate a predetermined series of computations, depending upon the advance of said brush means, each of said push buttons having a front contact connected to a corresponding one of said relay circuits, and a back contact, said back contacts being serially connected in a common energizing circuit for said relays whereby simultaneous operation of two of said relays is prevented.

32. Electric calculating apparatus according to claim 28 wherein said manually operable switch means comprises a plurality of manually operable push buttons electrically coupled with said contact field, one for a given series of computations, a self locking relay circuit associated with each of said push buttons for establishing the necessary connections for a predetermined series of computations depending upon the advance of said brush means, each of said push buttons having a front contact connected to a corresponding one of said relay circuits and a back contact, said back contacts being serially connected in a common energizing circuit, said common energizing circuit including two manually operable release switches in parallel, whereby when it is desired to release the established connection for a particular type of calculation it is necessary simultaneously to operate both of said release switches.

33. Electric calculating apparatus comprising an explorer unit for progressively sensing data registered on a carrier, a calculating unit capable of performing a plurality of types of computations, a control unit electrically coupled with said calculating unit so as to effect computations depending upon the progress of said explorer unit, said control unit having a plurality of manually operable switch means electrically coupled to said explorer unit so as to effect computations depending upon the progress of said explorer unit, one for a given series of computations, a general starting circuit for said calculating apparatus, normally open circuit breaking means in said starting circuit and means responsive to the operation of one of said switch means for closing said circuit breaking means.

34. Electric calculator apparatus comprising card explorer means for reading the data punched on a card column by column, means for producing a relative movement of the explorer and card during an exploring operation, brush means and a cooperating contact field, said contact field comprising a plurality of rows of contacts, the rows corresponding in number to the columns of the card, means for advancing the brush over the contact field in synchronism with the relative movement of the explorer and card, a plurality of circuits controlling calculations adapted to be closed and then opened by said brush means as it engages the respective rows of contacts one after another, a control unit for said calculator having a plurality of manually operable switch means, one for each series of calculations, a self locking relay circuit including a plurality of relays operatively associated with each of said switch means, means controlled from any of said self locking relay circuits for establishing the predetermined connections from the respective contacts in said field for the required operations of the calculator apparatus whereby the operations thereof are timed invariably in respect to the reading of the card, a plurality of groups of storing relays, means for storing in succession digits of numbers read from a card on groups of said storing relays under control of circuits operated from said contact field, a plurality of accumulator switches, transfer switch means, transfer means comprising circuits controlled from said contact field and said transfer switch means for transferring successively two numbers from said storing relays to said accumulator switches to perform an addition calculation, said transfer means including means for restoring said storage relays before a succeeding group of figures is stored thereon and transferred to said accumulating switches.

35. Electric calculator apparatus comprising card explorer means for reading the data punched on a card column by column, means for producing a relative movement of the explorer and card during an exploring operation, brush means and a cooperating contact field, said contact field comprising a plurality of rows of contacts, the rows corresponding in number to the columns of the card, means for advancing the brush over the contact field in synchronism with the relative movement of the explorer and card, a plurality of circuits controlling calculations adapted to be closed and then opened by said brush means as it engages the respective rows of contacts one after another, a control unit for said calculator having a plurality of manually operable switch means, one for each series of calculations, a self locking relay circuit including a plurality of relays operatively associated with each of said switch means, means controlled from any of said self locking relay circuits for establishing the predetermined connections from the respective contacts in said field for the required operations of the calculator apparatus whereby the operations thereof are timed invariably in respect to the reading of the card, a plurality of groups of storing relays, means for storing in succession digits of numbers read from a card on groups of said storing relays under control of circuits operated from said contact field, a plurality of accumulator switches, transfer switch means, transfer means comprising circuits controlled from said contact field and said transfer switch means for transferring from said storing relays the digits of a first number read from a card to said accumulating switches, and thereafter transferring from said storing relays the complement of the digits of a second number read from a card for a subtraction transfer, said transfer means including means for restoring said storage relays before a succeeding group of figures is stored thereon and transferred to said accumulating switches.

36. Electric calculating apparatus according to claim 35 in which means are provided to add in a predetermined position under the control of transfer switch means the digit one to the switch of lowest ordinal value.

37. Electric calculator apparatus comprising means for entering a pair of numbers digit by digit, a contact field comprising a plurality of rows of contacts and cooperating brush means, means to advance said brush means from one row of contacts to another as the respective digits of said numbers are entered, one or more circuits controlling calculation operations adapted to be closed and then opened by said brush means as it engages one contact row after another, a control unit for said calculator having a plurality of manually operable switch means, one for each series of calculation operations, a self locking relay circuit operatively associated with each of said switch means, means controlled from any of said self locking relay circuits for establishing the predetermined connections from said circuits to the respective contacts in said contact field for initiating given series of calculations, operations, whereby said operations are timed invariably in respect to the entering of the digits of said numbers.

38. In an electric calculator apparatus according to claim 37, entry receiving means comprising a plurality of groups of storing relays, means for storing digits of a number digit by digit under control of circuits operated from said contact field on predetermined ones of said groups of storing relays, a plurality of transfer switches, a plurality of accumulator switches, means including circuits controlled from said contact field for selecting a first transfer switch for transferring a number from said storing relays to said accumulator switches, and means including other circuits controlled from said contact field to select thereafter a second transfer switch of a different type from said first transfer switch to transfer to said accumulator switches digit groups derived during a calculation operation.

39. In an electric calculator apparatus according to claim 37, entry receiving means comprising a plurality of groups of storing relays, means for storing digit by digit successive numbers representing respectively the dividend and divisor of a problem under control of circuits operated from said contact field, a plurality of transfer switches, including one for division and one for addition, a plurality of accumulator switches, means controlled by circuits operated from the contact field for initiating a division operation in accordance with the operation of one of said manually operated switch means, means for transferring under the control of said addition transfer switch to transfer to selected first and second groups of said accumulating switches the digits of said successive numbers, the transfers of each number being effected under the control of said contact field after the storing of each respective number and before storing of the successive number on said storing relays effective to cause the transfer of said second number to the second group of accumulating switches, means controlled by circuits from said contact field to select said division transfer switch, and means including said division transfer switch for transferring to said first group of accumulator switches by a number of successive complementary partial products, and circuit means for deriving said product including means for producing an approximate quotient by comparing part of the digits of divisor and dividend.

40. An electric calculator comprising means for progressively exploring a number of data positions, a plurality of groups of storing relays, means depending upon the progress of the exploring means to store the digits of a number for a calculation operation on said storing relays, a plurality of accumulating switches, means controlled by said storing relays for actuating said accumulating switches to register the result of a calculation, means comprising a plurality of relays for receiving one at a time the digits registered on said accumulating switches, recording means including set up members for recording the digits arranged over field of data positions, received by said relays and means for progressively setting up said members over a number of data positions, the progress of the set up means being dependent upon the arrival of the explorer means in a predetermined position with the set up members being controlled by the last-mentioned relay means.

41. In an electric calculator according to claim 40, impulsing means common to both exploring and set up means, and means under control of the explorer means for controlling the progress of both said means selectively so as to occur either independently from each other or in unison.

42. In an electric calculator according to claim 40, impulsing means common to both exploring and set-up means, and means under control of the explorer means for controlling the progress of both said means selectively so as to occur either independently from each other or in unison, the selection being effected upon arrival of the explorer means in a predetermined position.

43. In an electric calculator according to claim 40, impulsing means common to both exploring and set-up means, means under control of the explorer means for controlling the progress of both said means selectively so as to occur either independently from each other or in unison, the selection being effected upon arrival of the explorer means in a predetermined position, and means for stopping the progress of the set-up means preparatory to set-up operations, in a position depending upon the progress of said set-up means and corresponding to the decimal value of the first recording position.

44. In an electric calculator according to claim 40, impulsing means common to both exploring and set-up means, means for controlling the progress of both said means selectively so as to occur either independently from each other or in unison, the selection being effected upon arrival of the explorer means in a predetermined position, means for stopping the progress of the set-up means in a process of division preparatory to setting up the quotients, in a position depending upon the progress of said set-up means, said position being $a + b$ positions before the position reserved for the units of the quotient, $a$ being the maximum number of figures left of the decimal point of the dividend and $b$ being the maximum number of figures right of the decimal point of the divisor, from which position exploring and set-up means are caused to progress in unison until all the quotients are recorded.

45. An electric calculator comprising a plurality of groups of storing relays, means to store the digits of a number for a calculation operation on said storing relays, a plurality of accumulating switches, means controlled by said storing relays for actuating said accumulating switches to register the result of a calculation, means comprising a plurality of relays for receiving one at a time according to a code the digits stored on said accumulating switches, card perforating means, said card perforating means including groups of punch set-up members controlled by the last mentioned relay means whereby the digits successively received thereby are set up on said members and means for operatively connecting the relays of successive predetermined groups of the first mentioned storing relays to means controlled by the last mentioned relay means whereby the latter transfer back one digit at a time to the former the result of a calculation operation registered on said accumulating switches for use in a further calculating operation.

46. An electric calculator comprising a plurality of groups of storing relays, means to store the digits of a number for a calculation operation on said storing relays, a plurality of accumulating switches, means controlled by said storing relays for actuating said accumulating switches to register the result of a calculation, means comprising a plurality of relays for storing one at a time according to a punched card code the digits stored on said accumulating switches, card perforating means, said card perforating means being controlled by the last-mentioned relay means whereby the stored digits are perforated in a card, and means operated by the last-mentioned relay means for re-operating the first-mentioned storing relay means to transfer back to said storing relay means the result of a calculation so that said result may be used in connection with further calculation operations.

47. Electric calculator comprising means for progressively exploring a number of data posipositions, a plurality of groups of storing relays, means for storing the digits of a number for a calculation operation on said storing relays, a plurality of accumulating switches, means controlled by said storing relays for actuating said accumulating switches to register the result of a calculation, means comprising a plurality of relays for receiving the digit stored on said accumulating switches one at a time according to a punch card code, card perforating means including punch set-up members, and means for progressively setting up said punch set-up members over a number of data positions, the progress of the set-up means being dependent upon the arrival of the exploring means in a predetermined position, with the setting up of the punch set-up members being controlled by the last mentioned relay means, whereby at a predetermined movement the digits set up on the punch set-up members are perforated in a card.

48. An electric calculator according to claim 47 in which the result of a problem is registered by said accumulating switches according to the decimal system and converted by the last mentioned storing relays into digits of a punched card code.

49. In a calculator adapted to perform division calculations, means to register numbers for a dividend and divisor, means for obtaining an approximate quotient digit, means for subtracting the partial products of said quotient digit and divisor from the dividend by successive operations, means to produce extra carry-over impulses with the successive subtractions when subtraction is possible, and means controlled by said extra carry-over impulses for comparing the value of at least the highest digit of the remainder with that of the corresponding digit of the divisor to determine whether or not said remainder is smaller than the divisor.

50. A calculator, according to claim 49, further comprising means controlled by said comparing means to change the value of said quotient a predetermined amount when said remainder is determined to be non-negative and not smaller than the divisor.

51. A calculator, according to claim 49, further comprising means controlled by the comparing means to increase the value of the quotient digit by one when all of the extra carry-over impulses appear because the remainder as determined by the comparing means is not smaller than the divisor and other means controlled by said comparing means to initiate a subtraction transfer to subtract the divisor from said remainder.

52. In a calculator adapted to perform division calculations, means for registering the numerals of a dividend and a divisor, means for obtaining an approximate quotient, means for subtracting the product of said approximate quotient and the divisor from the dividend registering means to obtain a remainder in the dividend registering means, and circuit means under control of the highest digit bearing orders of the dividend and divisor registering means for comparing at least the highest digit of the remainder with the highest digit of the divisor to determine whether or not the remainder is smaller than the divisor.

53. In a calculator adapted to perform division calculations, means for registering the numerals of a dividend and a divisor, means for obtaining an approximate quotient, means for subtracting the product of said approximate quotient and the divisor from the dividend registering means, means under control of the registering means including circuit means for comparing at least the highest digit of the remainder thereby derived with the corresponding digit of the divisor to determine whether or not the remainder is smaller than the divisor, said comparing means including relay means in circuit with a source of predetermined potential, a circuit including a number of series connected resistances for energizing said relay means, means for imparting potentials of opposite polarity to points of the circuit corresponding to the values of predetermined digits of remainder and divisor of the same ordinal position, and means for operating said relay means only when the divisor digit has a value which is larger than or equal to the dividend digit.

54. In a calculator adapted to perform division calculations, means for registering the numerals of a dividend and a divisor, means for obtaining an approximate quotient, means for subtracting the product of said approximate quotient and the divisor from the dividend registering means, means under control of the registering means including circuit means for comparing at least the highest digit of the remainder thereby derived with the corresponding digit of the divisor to determine whether or not the remainder is smaller than the divisor, said comparing means including relay means in circuit with a predetermined potential, a circuit including a number of series connected resistances for energizing said relay means, means for imparting potentials of opposite polarity to points of the circuit corresponding to the values of predetermined digits of remainder and divisor of the same ordinal position, potentials and connections being such that the relay means are only operated when the divisor digit has a value which is larger than or equal to the dividend digit, and means depending upon the non-operation of said indicating means, after a comparing operation, and connected to said circuit means for selecting successive digits of remainder and divisor to compare said digits successively in the order of ordinal position.

WILLIAM HATTON.

REFERENCES CITED

The following references are of record in the file of this patent:

UNITED STATES PATENTS

| Number | Name | Date |
|---|---|---|
| 1,813,830 | Weiner | July 7, 1931 |
| 1,876,296 | Hofgaard | Sept. 6, 1932 |
| 2,045,436 | Bryce | June 23, 1936 |
| 2,093,529 | Tauschek | Sept. 21, 1937 |
| 2,099,754 | Robinson | Nov. 23, 1937 |
| 2,108,146 | Simpson | Feb. 15, 1938 |
| 2,122,112 | Powell | June 28, 1938 |
| 2,126,621 | Daly | Aug. 9, 1938 |
| 2,141,597 | Cunningham | Dec. 27, 1938 |
| 2,170,543 | Bryce | Aug. 22, 1939 |
| 2,176,933 | Smith | Oct. 24, 1939 |
| 2,185,697 | Wood | Jan. 2, 1940 |
| 2,217,196 | Bryce et al. | Oct. 8, 1940 |
| 2,224,774 | Tauschek | Dec. 10, 1940 |
| 2,237,150 | Kolm | Apr. 1, 1941 |
| 2,239,524 | Johnstone et al. | Apr. 22, 1941 |
| 2,268,203 | Carpenter et al. | Dec. 30, 1941 |
| 2,293,127 | Fishack et al. | Aug. 18, 1942 |
| 2,295,448 | Bryce et al. | Sept. 8, 1942 |
| 2,332,304 | Davies | Oct. 19, 1943 |
| 2,343,273 | Avery | Mar. 7, 1944 |
| 2,344,885 | Kozma et al. | Mar. 21, 1944 |
| 2,346,616 | Saxby | Apr. 11, 1944 |
| 2,352,027 | Smith | June 20, 1944 |

FOREIGN PATENTS

| Number | Country | Date |
|---|---|---|
| 405,317 | Great Britain | Feb. 5, 1934 |
| 463,916 | France | Dec. 30, 1913 |
| 629,156 | Germany | Apr. 27, 1936 |
| 796,214 | France | Jan. 17, 1936 |